(12) United States Patent
Gong et al.

(10) Patent No.: US 11,588,872 B2
(45) Date of Patent: Feb. 21, 2023

(54) SYSTEM AND METHOD FOR CODEC FOR COMBINING DISPARATE CONTENT

(71) Applicant: C-HEAR, INC., Dallas, TX (US)

(72) Inventors: Changhong Gong, Plano, TX (US); Charles Gong, Plano, TX (US); Adena Harmon, Fort Worth, TX (US); Taha Kadado, Sachse, TX (US); Jesse Collard, Irving, TX (US); Alan Rodriguez, Dallas, TX (US); Jean Achterberg, Grapevine, TX (US); Tim A. Jones, McKinney, TX (US); Kenneth Leuzinger, Flower Mound, TX (US); Rashad Kadado, Sachse, TX (US)

(73) Assignee: C-HEAR, INC., Dallas, TX (US)

( * ) Notice: Subject to any disclaimer, the term of this patent is extended or adjusted under 35 U.S.C. 154(b) by 97 days.

(21) Appl. No.: 16/934,183

(22) Filed: Jul. 21, 2020

(65) Prior Publication Data
US 2020/0351323 A1    Nov. 5, 2020

Related U.S. Application Data

(63) Continuation-in-part of application No. 16/251,581, filed on Jan. 18, 2019, now Pat. No. 11,330,031.
(Continued)

(51) Int. Cl.
*H04L 65/70* (2022.01)
*H04L 65/75* (2022.01)
(Continued)

(52) U.S. Cl.
CPC ............ *H04L 65/70* (2022.05); *G06F 16/116* (2019.01); *G06F 16/13* (2019.01); *G06F 16/176* (2019.01)

(58) Field of Classification Search
CPC . H04L 65/607; H04L 65/4069; H04L 65/602; G06F 16/116; G06F 16/13; G06F 16/176
See application file for complete search history.

(56) References Cited

U.S. PATENT DOCUMENTS

| 5,559,608 | A | 9/1996 | Kunihiro |
|---|---|---|---|
| 5,856,973 | A | 1/1999 | Thompson |

(Continued)

FOREIGN PATENT DOCUMENTS

| CN | 1510906 A | 7/2004 |
|---|---|---|
| CN | 101595475 A | 12/2009 |

(Continued)

OTHER PUBLICATIONS

European Patent Office, Extended European Search Report for related application EP 18817293.6,; Valero, Monia; dated Mar. 30, 2021; 11 pages.

(Continued)

*Primary Examiner* — Shirley X Zhang
(74) *Attorney, Agent, or Firm* — Gregory M. Howison

(57) ABSTRACT

A method for encoding and decoding disparate content includes receiving, at a storage location, a combined file created by an encoder, wherein the combined file includes a plurality of data of one or more content types, receiving, from a client device, a request for retrieval of the combined file, determining a compatibility of the client device to decode and view content of the combined file, and transmitting, based on the determination, the combined file to a decoder, wherein the decoder separates the combined file into the plurality of data of the one or more content types.

20 Claims, 66 Drawing Sheets

Related U.S. Application Data which is a continuation of application No. 15/785,148, filed on Oct. 16, 2017, now Pat. No. 10,187,443.

(60) Provisional application No. 63/002,495, filed on Mar. 31, 2020, provisional application No. 62/988,030, filed on Mar. 11, 2020, provisional application No. 62/876,940, filed on Jul. 22, 2019, provisional application No. 62/518,034, filed on Jun. 12, 2017.

(51) Int. Cl.
    *G06F 16/11* (2019.01)
    *G06F 16/13* (2019.01)
    *G06F 16/176* (2019.01)

(56) References Cited

U.S. PATENT DOCUMENTS

| | | |
|---|---|---|
| 6,888,569 B2 | 5/2005 | Fox et al. |
| 6,915,012 B2 | 7/2005 | Osborne et al. |
| 6,965,646 B1 | 11/2005 | Firestone |
| 6,990,293 B2 | 1/2006 | Hu |
| 7,024,534 B2 | 4/2006 | Sasaki et al. |
| 7,359,085 B2 | 4/2008 | Edwards |
| 7,480,382 B2 | 1/2009 | Dunbar et al. |
| 7,689,898 B2 | 3/2010 | Merril et al. |
| 7,782,373 B2 | 8/2010 | Seo et al. |
| 7,979,886 B2 | 7/2011 | Frojdh et al. |
| 8,271,544 B2 | 9/2012 | Chan et al. |
| 8,306,368 B2 | 11/2012 | Beato et al. |
| 9,009,123 B2 | 4/2015 | Agush |
| 2001/0013068 A1 | 8/2001 | Klemets et al. |
| 2003/0174218 A1 | 9/2003 | Battles et al. |
| 2003/0188182 A1 | 10/2003 | Sato et al. |
| 2004/0141630 A1 | 7/2004 | Bhaskaran et al. |
| 2004/0150723 A1 | 8/2004 | Seo et al. |
| 2005/0086582 A1* | 4/2005 | Frojdh .................... H04L 65/70 715/202 |
| 2005/0123042 A1 | 6/2005 | Park |
| 2006/0233247 A1 | 10/2006 | Visharam et al. |
| 2006/0239564 A1 | 10/2006 | Cha et al. |
| 2006/0259168 A1 | 11/2006 | Geyersberger et al. |
| 2007/0156726 A1 | 7/2007 | Levy |
| 2007/0162571 A1 | 7/2007 | Gupta et al. |
| 2008/0037658 A1 | 2/2008 | Price et al. |
| 2008/0129758 A1 | 6/2008 | Fox et al. |
| 2008/0165956 A1 | 7/2008 | Zhu et al. |
| 2008/0294691 A1 | 11/2008 | Chang et al. |
| 2009/0046934 A1 | 2/2009 | Beato et al. |
| 2009/0067817 A1 | 3/2009 | Chuang et al. |
| 2009/0132721 A1 | 5/2009 | Soroushian et al. |
| 2009/0290706 A1 | 11/2009 | Amini et al. |
| 2011/0097058 A1 | 4/2011 | Jiang et al. |
| 2011/0314176 A1 | 12/2011 | Frojdh et al. |
| 2012/0128058 A1 | 5/2012 | Bakharov et al. |
| 2012/0197966 A1 | 8/2012 | Wolf et al. |
| 2012/0311721 A1 | 12/2012 | Chen et al. |
| 2012/0317381 A1 | 12/2012 | Zhu et al. |
| 2013/0026221 A1 | 1/2013 | Murray et al. |
| 2013/0083848 A1 | 4/2013 | Joch et al. |
| 2014/0050421 A1 | 2/2014 | Agush |
| 2015/0104153 A1 | 4/2015 | Braness et al. |
| 2015/0156240 A1 | 6/2015 | Ronca et al. |
| 2016/0019375 A1 | 1/2016 | Fasoli et al. |
| 2016/0086636 A1 | 3/2016 | Huang et al. |
| 2016/0337680 A1 | 11/2016 | Kalagi et al. |
| 2017/0214947 A1* | 7/2017 | Kiefer ................ H04N 21/6334 |

FOREIGN PATENT DOCUMENTS

| | | |
|---|---|---|
| CN | 105723676 A | 6/2016 |
| GB | 2396988 A | 7/2004 |
| WO | 2011103364 A1 | 8/2011 |
| WO | 2014092624 A1 | 6/2014 |

OTHER PUBLICATIONS

PCT: International Preliminary Report on Patentability of PCT/US2018/035817 (related application); dated Mar. 19, 2020; 10 pages.

CN: First Office Action of 2018800518430 (related application); Nov. 3, 2021; 21 pages.

International Search Report and Written Opinion of the International Searching Authority from PCT/US20/042956, dated Nov. 30, 2020.

Shifa et al. "Lightweight cipher for h. 264 videos in the internet of multimedia things with encryption space ratio diagnostics." In: Sensors. Mar. 11, 2019; 28 pages.

Patent Cooperation Treaty: International Preliminary Report on Patentability for PCT/US20/042956 (related case), Mik Kobayashi; dated Feb. 3, 2022; 9 pages.

Chinese Patent Office: Second Office Action of CN 2018800518430 (related application); dated Jun. 20, 2022; Cao Maojie; 10 pages.

* cited by examiner

SYSTEM AND METHOD FOR CODEC FOR COMBINING DISPARATE CONTENT

CROSS-REFERENCE TO RELATED APPLICATIONS

This application is a continuation-in-part of U.S. patent application Ser. No. 16/251,581, filed Jan. 18, 2019, and entitled SYSTEM AND METHOD FOR ENCODING IMAGE DATA AND OTHER DATA TYPES INTO ONE DATA FORMAT AND DECODING OF SAME. U.S. patent application Ser. No. 16/251,581 is a continuation of U.S. patent application Ser. No. 15/785,148, filed Oct. 16, 2017, which issued as U.S. Pat. No. 10,187,443 on Jan. 22, 2019, and entitled SYSTEM AND METHOD FOR ENCODING IMAGE DATA AND OTHER DATA TYPES INTO ONE DATA FORMAT AND DECODING OF SAME. U.S. patent application Ser. No. 15/785,148 claims priority to and the benefit of U.S. Provisional Patent Application No. 62/518,034, filed Jun. 12, 2017, and entitled DATA FORMAT SPECIFICATION AND METHOD OF BLENDING AND SEPARATING IMAGE DATA STREAM OR FILES AND OTHER DATA STREAM OR FILES INTO AND FROM THE DATA FORMAT STREAM OR FILE. This application also claims priority to and the benefit of U.S. Provisional Patent Application No. 62/876,940, filed Jul. 22, 2019, and entitled SYSTEM AND METHOD FOR CONTINUOUS ENRICHMENT OF ENCODED CONTENT AND SECURITY MEASURE FOR DECODING OF SAME. This application also claims priority to and the benefit of U.S. Provisional Patent Application No. 62/988,030, filed Mar. 11, 2020, and entitled SYSTEM AND METHOD FOR DATA MOBILITY AND SCARCITY OF ENCODED CONTENT. This application also claims priority to and the benefit of U.S. Provisional Patent Application No. 63/002,495, filed Mar. 31, 2020, and entitled SYSTEM AND METHOD FOR SELECTIVE ENCRYPTION OF ENCODED CONTENT. The contents of U.S. Pat. No. 10,187,443 and U.S. patent application Ser. Nos. 16/251,581, 15/785,148, 62/518,034, 62/876,940, 62/988,030, and 63/002,495 are incorporated by reference herein in their entirety.

TECHNICAL FIELD

The present disclosure is related generally to data exchange and storage. More particularly the present disclosure relates to the blending of an image data stream or file and another non-image data stream or file into a single data format.

BACKGROUND

Image data streaming or files are popular media to share pictures on computers or devices, over the internet or other networks, and are viewed on a number of different computing devices, like smartphones. But in many cases, it may be desirable to share or store other information while viewing and storing the image data, especially to see the picture and hear audio at the same time.

Current techniques for this usage include storing or exchanging the image data or file separately from the non-image data or file. For example, users store or exchange the pictures with JPEG files, and the voice or audio data in way or mp3 files alongside the image files. The problem with this method is that, in order to see the image and hear the associated audio at the same time, the users have to do two actions to save or transfer two data files, one for the image, another for the audio.

Video media data or file has both "moving" image and audio information data, but this is a different media usage. The video takes more space to store, and wider network bandwidth to exchange, and the resolution of the image frames in the video file is much lower than the resolution that can make up the image data format.

Therefore, what is needed is a method and technique for blending the image data stream or file along with non-image data or files in a single data stream or file, a method and technique for separating and returning the image data stream or file and the non-image streams or files from the single blended data stream or file generated, a stream data or file data structure or format for the blended single stream or file, and an application program to implement the methods of blending and separating, noted above.

SUMMARY

In one aspect thereof, a method of a codec for encoding data streams into a combined file is provided. The method comprises accessing a first file having a first plurality of data bytes, accessing a second file having a second plurality of data bytes, combining the first file and the second file to provide the combined file containing a header and a body, comprising the steps of in a first storing step, storing a block of data bytes of a first byte block size, from the first plurality of data bytes, in the body of the combined file as a first file byte block, wherein a byte block size includes at least one or more bytes of data, in a second storing step, sequentially storing a block of data bytes of a second byte block size, from the second plurality of data bytes, in the body of the combined file as a second file byte block, repeating the first and second storing steps to sequentially store all of the data bytes in the first file and the second file in the combined file, and storing, in the header, information relating to the first byte block size and the second byte block size.

In another aspect thereof, a system for encoding data streams into a combined file and decoding the combined file into separate data streams is provided. The system comprises a network interface coupled to a processor and a memory to the processor, the processor configured to access a first file having a first plurality of data bytes, access a second file having a second plurality of data bytes, combine the first file and the second file to provide the combined file containing a header and a body, wherein, during combining, the processor is further configured to in a first storing step, store a block of data bytes of a first byte block size, from the first plurality of data bytes, in the body of the combined file as a first file byte block, wherein a byte block size includes at least one or more bytes of data, in a second storing step, sequentially store a block of data bytes of a second byte block size, from the second plurality of data bytes, in the body of the combined file as a second file byte block, repeat the first and second storing steps to sequentially store all of the data bytes in the first file and the second file in the combined file, and store, in the header, information relating to the first byte block size and the second byte block size.

A data structure or format (hereinafter referred to as chm format, chif format, CHM, or CHIF) for the blended stream or file is created in accordance with this disclosure. The data structure or format has two parts: the metadata bytes at the header section in the beginning and the raw data bytes at the body section. Along with the chm data format, a protocol (hereinafter referred to as chm formatting) is created to blend an image data stream or file with one or more non-image data streams or files.

In one aspect, a method of blending an image file with a non-image file is provided. The method may begin with accessing both image and non-image data streams or files by the application program which implements the technology set forth by this disclosure. Once accessed, the application may read the data information of both image and non-image streams or files, and based on the chm format, it may create and write the metadata bytes into the beginning header section of a chm format data stream or file. Next, the application may read one chunk of data bytes from each of the image and non-image data streams or files, and write the two chunks of data bytes into the chm format stream or file. And the application may continue and repeat reading one chunk of data bytes from two data streams and writing the two chunks of data bytes into the chm format data stream or file until it reaches the end of the two image and non-image data streams or files. The process of this method is called "chm encoding."

In another aspect, a method of separating the chm format data stream or file and returning back the image stream or file and the non-image stream or file is provided. The method may begin with accessing the chm format data stream or file which is generated by the blending method above with the application program. Once accessed, the application may read and retrieve the metadata information from a header section of the stream or file. Next, based on protocol, the application may read two chunks of bytes from the chm format data stream or file, and it may write one chunk of bytes into the image stream or file, and another chunk of bytes into the non-image stream or file. And the application may continue and repeat reading the next two chunks of bytes from the chm format data stream, and writing each chunk of the bytes into their own data streams or files until it reaches the end of the chm format data stream or file, and it returns the image and non-image data streams or files back to their original states. The process of this method is called "chm decoding."

The application program introduced above is the software which implements the blending/separating methods and the protocol to execute the processes to blend/separate the image the non-image data streams or files into/from the single chm format data stream or file.

In another aspect, a method for encoding and decoding disparate content includes receiving, at a storage location, a combined file created by an encoder, wherein the combined file includes a plurality of data of one or more content types. The method further includes receiving, from a client device, a request for retrieval of the combined file. The method further includes determining a compatibility of the client device to decode and view content of the combined file. The method further includes transmitting, based on the determination, the combined file to a decoder, wherein the decoder separates the combined file into the plurality of data of the one or more content types.

In another aspect, an electronic device includes a memory, a network interface, and at least one processor coupled to the memory and the network interface. The at least one processor is configured to receive a combined file created by an encoder, wherein the combined file includes a plurality of data of one or more content types. The at least one processor is further configured to receive, from a client device, a request for retrieval of the combined file. The at least one processor is further configured to determine a compatibility of the client device to decode and view content of the combined file. The at least one processor is further configured to transmit, via the network interface, and based on the determination, the combined file to a decoder, wherein the decoder separates the combined file into the plurality of data of the one or more content types.

In another aspect, an electronic device includes a memory, a network interface, and at least one processor coupled to the memory and the network interface. The at least one processor is configured to receive, from a client device, a request for decryption and decoding of a combined file, wherein the combined file includes metadata and plurality of data of one or more content types, wherein the metadata includes a universally unique identifier (UUID), and wherein the combined file is encrypted. The at least one processor is further configured to decrypt the combined file. The at least one processor is further configured to determine, based on the UUID, that decoding of the combined file is allowed. The at least one processor is further configured to decode, based on the determination, the combined file, wherein the decoding separates the combined file into the plurality of data of the one or more content types. The at least one processor is further configured to transmit, via the network interface, the plurality of data of the one or more content types to the client device.

In another aspect, an electronic device includes a memory and at least one processor coupled to the memory. The at least one processor is configured to receive a combined file created by an encoder, wherein the combined file includes metadata and an image associated with a plurality of data of one or more content types. The at least one processor is further configured to feed at least one of the plurality of data into at least one artificial intelligence model. The at least one processor is further configured to receive one or more outputs from the at least one artificial intelligence model. The at least one processor is further configured to create an enriched combined file by modifying the metadata of the combined file based on at least a portion of the one or more outputs from the at least one artificial intelligence model, The at least one processor is further configured to perform on the enriched combined file at least one of: analytics, indexing, or object recognition.

In another aspect, a method of an electronic device for selective encryption of content to be encoded into a container includes receiving, by a processor of the electronic device, a plurality of content items for encoding into a container, wherein each one of the plurality of content items is associated with a content key value, receiving, by the processor, one or more content selections from among the plurality of content items, retrieving, by the processor, encryption data for use in encrypting the one or more content selections, encrypting, by the processor, at least one content selection of the one or more content selections using an encryption key derived using the encryption data, for the encrypted at least one content selection, associating, by the processor, a corresponding content key value of the encrypted at least one content selection with the encryption data, encoding, by the processor, the associated corresponding content key value of the encrypted at least one content selection and the encryption data into the container, and encoding, by the processor, the encrypted at least one content selection and remaining content items of the plurality of content items into the container.

In another aspect, an electronic device includes a memory, and at least one processor coupled to the memory. The at least one processor is configured to receive a plurality of content items for encoding into a container, wherein each one of the plurality of content items is associated with a content key value, receive one or more content selections from among the plurality of content items, retrieve encryption data for use in encrypting the one or more content selections, encrypt at least one content selection of the one or more content selections using an encryption key derived using the encryption data, for the encrypted at least one content selection, associate a corresponding content key value of the encrypted at least one content selection with the encryption data, encode the associated corresponding content key value of the encrypted at least one content selection and the encryption data into the container, and encode the encrypted at least one content selection and remaining content items of the plurality of content items into the container.

In another aspect, a method for encoding and decoding disparate content includes receiving, at a storage location, a combined file created by an encoder, wherein the combined file includes a plurality of data of one or more content types, receiving, from a client device, a request for retrieval of the combined file, determining a compatibility of the client device to decode and view content of the combined file, and transmitting, based on the determination, the combined file to a decoder, wherein the decoder separates the combined file into the plurality of data of the one or more content types.

In another aspect, an electronic device includes a memory, a network interface, and at least one processor coupled to the memory and the network interface. The at least one processor is configured to receive a combined file created by an encoder, wherein the combined file includes a plurality of data of one or more content types, receive, from a client device, a request for retrieval of the combined file, determine a compatibility of the client device to decode and view content of the combined file, and transmit, via the network interface, and based on the determination, the combined file to a decoder, wherein the decoder separates the combined file into the plurality of data of the one or more content types.

In another aspect, an electronic device includes a memory, a network interface, and at least one processor coupled to the memory and the network interface. The at least one processor is configured to receive, from a client device, a request for decryption and decoding of a combined file, wherein the combined file includes metadata and plurality of data of one or more content types, wherein the metadata includes a universally unique identifier (UUID), and wherein the combined file is encrypted, decrypt the combined file, determine, based on the UUID, that decoding of the combined file is allowed, decode, based on the determination, the combined file, wherein the decoding separates the combined file into the plurality of data of the one or more content types, and transmit, via the network interface, the plurality of data of the one or more content types to the client device.

In another aspect, an electronic device includes a memory, and at least one processor coupled to the memory. The at least one processor is configured to receive a combined file created by an encoder, wherein the combined file includes metadata and an image associated with a plurality of data of one or more content types, feed at least one of the plurality of data into at least one artificial intelligence model, receive one or more outputs from the at least one artificial intelligence model, create an enriched combined file by modifying the metadata of the combined file based on at least a portion of the one or more outputs from the at least one artificial intelligence model, and perform on the enriched combined file at least one of: analytics, indexing, or object recognition.

BRIEF DESCRIPTION OF THE DRAWINGS

For a more complete understanding, reference is now made to the following description taken in conjunction with the accompanying Drawings in which.

DETAILED DESCRIPTION

Figure 1:
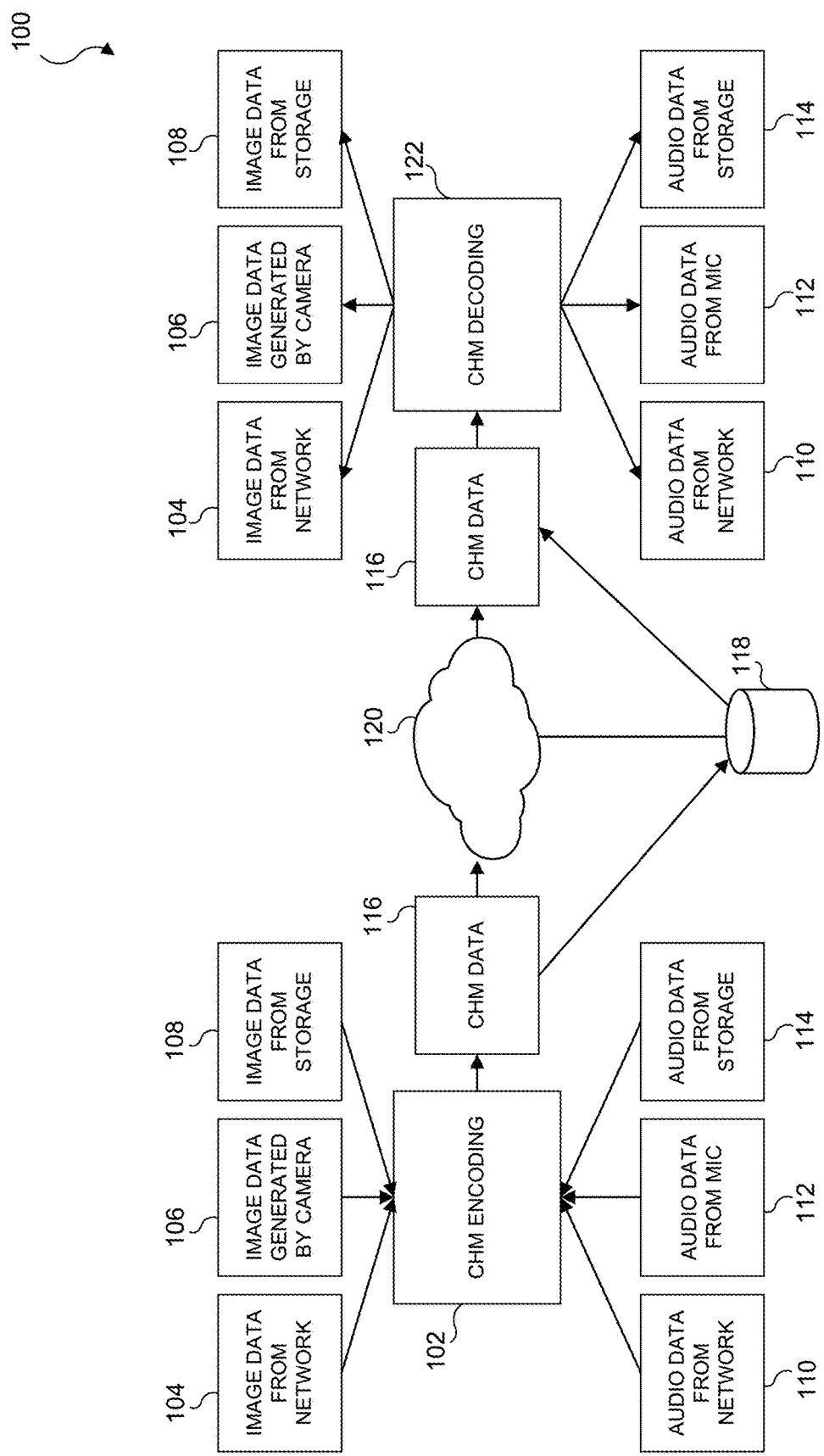
FIG. 1 illustrates a flowchart of a CHM encoding and decoding process for image and non-image data streams, in accordance with various embodiments of the present disclosure.

Referring now to the drawings, wherein like reference numbers are used herein to designate like elements throughout, various views and embodiments are illustrated and described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Digital information such as images, audio, video, text, annotations, etc., is presented and stored as data binaries or bytes. When those data bytes are stored in the media depository, they are called files. When they are loaded in the memory of computing devices or are transmitted in the wire of the network, they are called streams. Blending (encoding) and separating (decoding) operations process the data bytes in the streams or the files.

Different types of information (images, audio, video, text, documents, programs, etc.) have different data byte structures, called data formats, when either in the stream or in the file. For example, when an image is stored in the disk or exchanged via the network, if the image is using JPEG data format, it is the JPEG format or structure of data bytes are stored in a file, or transmitted in a stream over the network. Similarly, when audio is stored on the disk or exchanged via the network, if the audio is using an MP3 data format, it is the MP3 format or structure of data bytes that are stored in a file, or transmitted in a stream over a network. So, saving or transmitting an image and an image-related non-image (like audio) has to do two individual processes or tasks, one for image, another for non-image.

The present disclosure provides a unique data stream or file format and structure—CHM format, having all the data bytes of both the image and the non-image stream or file, and thus is a combined file or data stream. Along with the CHM format, this disclosure provides the protocol—CHM formatting protocol, having the method, algorithm, and specification to blend the image and non-image data streams or files into one CHM data stream or file, or separate the CHM data stream or file back to the image and non-image data streams or files in their original state.

Referring now to FIG. 1, there is illustrated a flowchart of one embodiment of a CHM encoding and decoding process 100 for image and non-image data streams in accordance with various embodiments of the present disclosure. One example includes an image and its description. An encoding method 102 disclosed herein may access image data from a network 104 image data generated by a camera 106, or image data from storage 108. The encoding method 102 may also access audio data from a network 110, audio data from a mic 112, or audio data from storage 114. The encoding method 102 then reads the data bytes from the image and non-image (audio) stream or file, and blends and writes the data bytes into one single stream of CHM data 116 or a CHM file with the CHM data format. The CHM data 116, which contains both image and non-image data, can be saved into data storage 118 or transmitted to others over a network 120 with one single step. And a decoding method 122 disclosed herein separates the image and the audio back to their original states before the image is displayed and the image audio is played.

The image data stream or file format contemplated herein may be any digital image format. Examples of image data streams or files contemplated herein include, but are not limited to, JPEG, GIF, TIFF, PNG, Bitmap, RAW, PNM, WEBP, DCM, AVI, MVL, and the like.

The non-image data stream or file format contemplated herein may be any digital non-image format. Examples of non-image data streams or formats may include text data, word processing data, audio data such as MP3, MP4, AIFF, WAV, etc., video data, DCM, AVI, MVL, and the like.

The blending (encoding) and separating (decoding) methods or processes are executed by an application program running in a computing device. The computing devices contemplated herein may include, but are not limited to, desktop computers, laptop computers, tablet computers, handheld computers, smart phones and other cellular phones, and similar internet enabled mobile devices, digital cameras, any digital image generating and processing devices, a customized computing device configured to specifically carry out the methods contemplated in this disclosure, and the like. The application program running in the computing device contemplated herein may include, but is not limited to, the software executables, the component or library via API called by other software, or the Web APIs or Web Services, and the like.

After they are separated from the CHM format stream or file, the image or non-image data bytes and their structures or formats are back in their original states without any changes, so that they can be presented by their players or processors as the original data streams or files without any changes in quality or functions.

Figure 2:
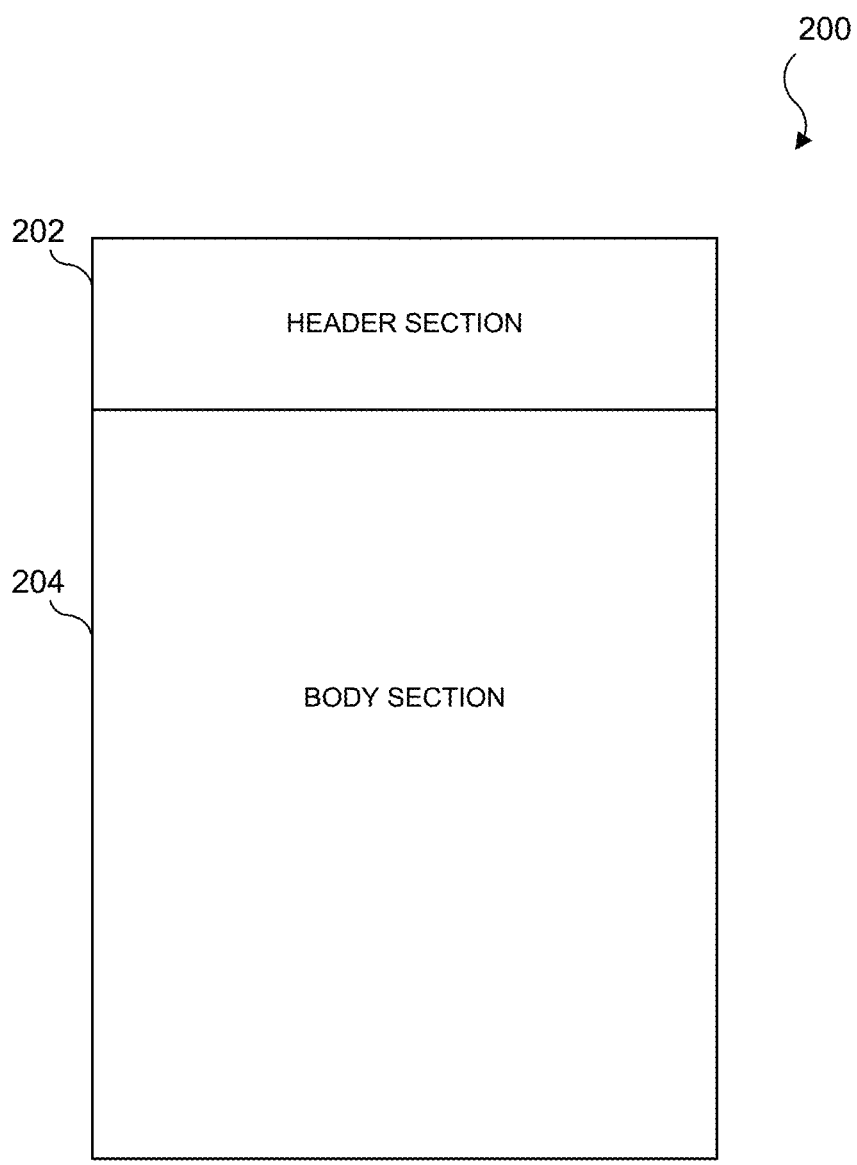
FIG. 2 illustrates a data structure or format, referred to as CHM format, for a blended stream or file, in accordance with various embodiments of the present disclosure.

Referring now to FIG. 2, there is illustrated a data structure or format 200, referred to as CHM format, for the blended stream or file, in accordance with various embodiments of the present disclosure. The data structure or format 200 has two parts: a metadata header section 202 that includes metadata bytes at the beginning and a body section 204 that includes raw data bytes. The metadata header section 202 records the blending protocol, and other information, such as data size and data format, of the original image and non-image data stream or file, and the base block size of blending and separating. The blended data stream or file is called "CHM" format stream or "CHM" format file, respectively.

A data process protocol, referred to as CHM formatting, for blending and separating two data streams or files is provided. The protocol defines how to determine the block sizes for breaking the image and non-image data byte streams or files based on their original data sizes, and defines the algorithm, steps and sequences to read and write the blocks of image data bytes and non-image data bytes, so as to blend and separate the image data stream or file and non-image data stream or file.

Figures 3A, 3B:
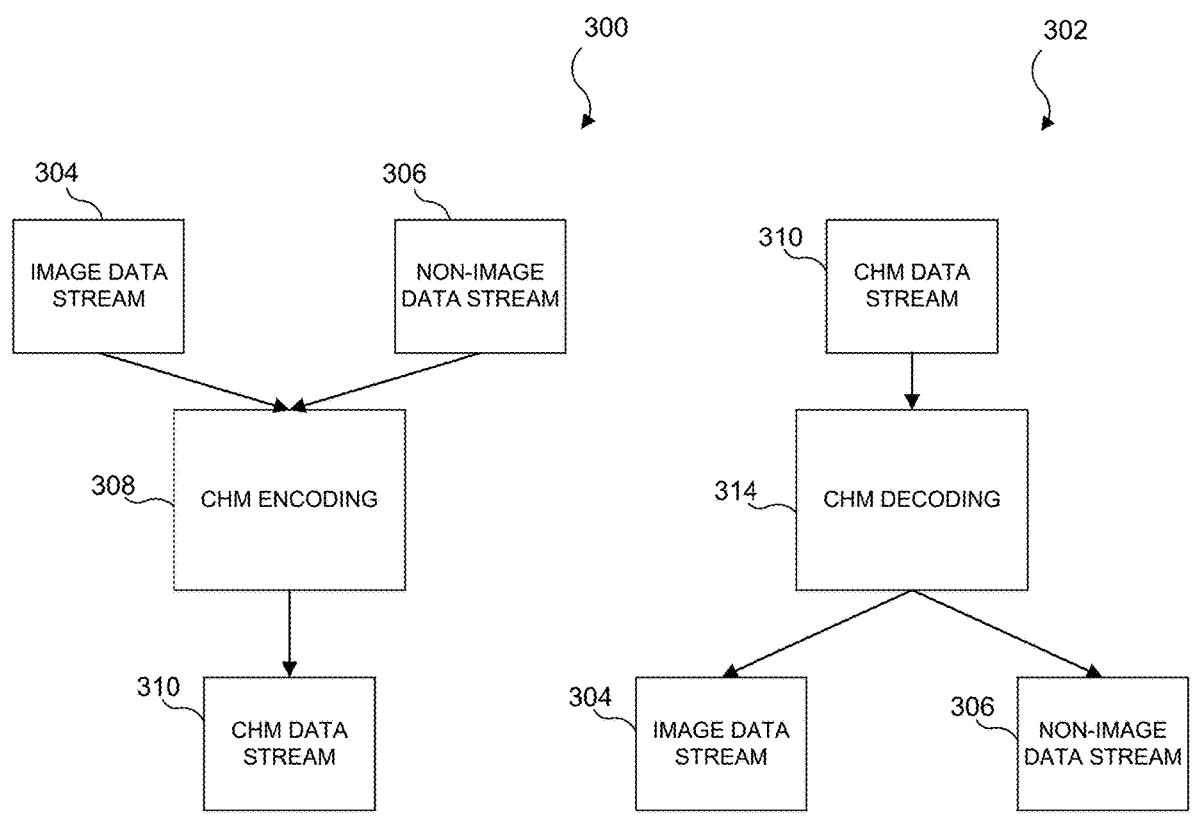
FIG. 3A illustrates a flowchart of a method of blending or encoding an image stream or file with a non-image stream or file into a CHM format data stream, in accordance with various embodiments of the present disclosure.
FIG. 3B illustrates a flowchart of a method of separating or decoding an image stream or file and a non-image stream or file from a CHM format data stream, in accordance with various embodiments of the present disclosure.

Referring now to FIGS. 3A and 3B, there is illustrated a method of blending or encoding an image stream or file with a non-image stream or file into a CHM format data stream or file is and decoding of the same is provided, in accordance with various embodiments of the present disclosure. FIG. 3A illustrates a flowchart of one embodiment of an encoding process 300 and FIG. 3B illustrates a flowchart of one embodiment of a decoding process 302. The process 300 may begin with accessing both a target image data stream 304 (or target image file) and a target non-image data stream 306 (or target non-image file) by an application program configured to perform a CHM encoding operation 308. Once accessed, the program may read data information from both the image data stream 304 and the non-image data stream 306, create metadata header bytes based on the CHM data format, and write the header bytes at a beginning section of a CHM data stream 310 (or CHM file). Next, based on the data of the image data stream 304 and the non-image data stream 306, using the CHM formatting protocol, the program may calculate a block size for breaking up the image data stream 304 and the block size for breaking up the non-image data stream 306. Then, the program may read one block of data bytes from the image data stream 304, and one block of data bytes from the non-image data stream 306, and write the two blocks of data bytes in order into the body section of the CHM data stream 310. The program may continue to read the next two blocks of data bytes from the image data stream 304 and the non-image data stream 306, and may generate the single CHM data stream 310, and thus may complete the blending or CHM encoding process. The CHM format data stream 310 may include all the data bytes of the image data stream 304 and all the data bytes of the non-image data stream 306.

As shown in FIG. 3B, a method of separating or decoding the single CHM data stream 310 and returning the image data stream 304 and the non-image data stream 306 is provided. The method, by a program configured to perform a CHM decoding operation 314, may begin with accessing the CHM data stream 310 which may be generated by the blending method described with respect to FIG. 3A. Once accessed, the program may read the metadata header section of the CHM data stream 310 and then retrieve the metadata which has the blending protocol and the information of the original image data stream 304 and non-image data stream 306. Next, based on the image data stream 304 and the non-image data stream 306, with the CHM formatting protocol, the program may calculate out the block size used to break out the image data stream 304 and the block size used to break out the non-image data stream 306.

The program may read one block of bytes from the body section of the CHM data stream 310 and write the byte block into the image data stream 304, and read another block of bytes from the body section of the CHM data stream 310 and write the byte block into the non-image data stream 306. The program may continue to read the next two blocks of bytes from the body section of the CHM data stream 310, and write each data byte block into the image and non-image data streams 304 and 306 accordingly, and the program may repeat reading/writing steps until it reaches the end of the CHM data stream 310, returning the image and non-image data streams 304 and 306 back to their original states without changing any bytes of their data and the formats, thus with no change of the qualities or features of them.

Figure 4:
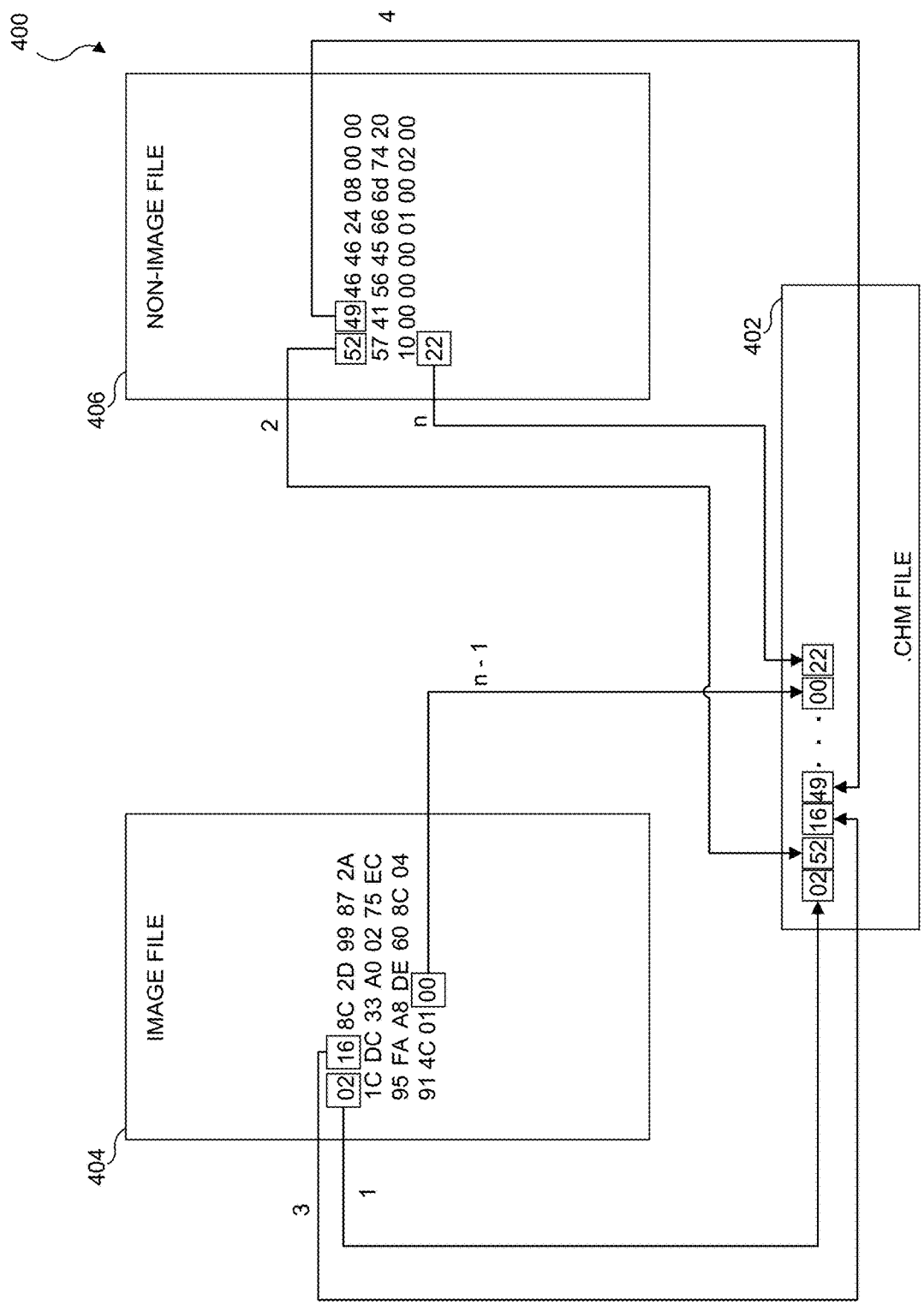
FIG. 4 illustrates a diagrammatic view of one embodiment of a CHM file encoding process, in accordance with various embodiments of the present disclosure.

Referring now to FIG. 4, there is illustrated a diagrammatic view of one embodiment of a CHM file encoding process 400 in accordance with various embodiments of the present disclosure. The body section of a CHM file may be created by blending the bytes of one file or data stream with one or more other files or data streams. As illustrated in FIG. 4, CHM file 402 is created by blending the bytes of an image file 404 and a non-image file 406. It should be understood that the image file 404 and non-image file 406 may be any file type, even two image files or two non-image files, and that an image file and a non-image file are used for example purposes. In some embodiments, a priority for the blending algorithm or protocol is to ensure the bytes from each of the files are distributed within the CHM file 402 as evenly as possible, even though the image file 404 and the non-image file 406 may not be identical in size.

The example shown in FIG. 4 demonstrates how an algorithm may perform the encoding process in the event that two files happen to have the same number of bytes. The bytes of the image file 404 and the non-image file 406 are represented in FIG. 4 in hexadecimal format. At a first step 1, the encoder copies a first byte "02" from the image file 404 and writes the first byte "02" as the first byte of the body section of the CHM file 402. At second step 2, the encoder copies a first byte "52" from the non-image file 406 and writes the first byte "52" as the next byte of the body section of the CHM file 402. At a third step 3, the encoder copies a second byte "16" from the image file 404 and writes the second byte "16" as the next byte in the body section of the CHM file 402. At a fourth step 4, the encoder copies a second byte "49" from the non-image file 406 and writes the second byte "49" as the next (and fourth) byte in the body section of the CHM file 402.

This process of alternating between the image file 404 and the non-image file 406 to copy a byte at a time from each continues for all the bytes in the image file 404 and the non-image file 406 until all bytes from the image file 404 and the non-image file 406 are written to the CHM file 402. At a penultimate step n−1, the encoder copies a last byte "00" from the image file 404 and writes the last bye "00" to the body section of the CHM file 402. At a last step n, the encoder copies a last byte "22" from the non-image file 406 and writes the last byte "22" to the body section of the CHM file 402. After the last step n, the CHM file 402 is completed, the CHM file 402 now containing all bytes from the image file 404 and the non-image file 406 blending together. The CHM file 402 thus may be the same file size as the sum of the file sizes of the image file 404 and the non-image file 406, as the CHM file contains the bytes of each of the image file 404 and the non-image file 406, with little other information added.

Figure 5:
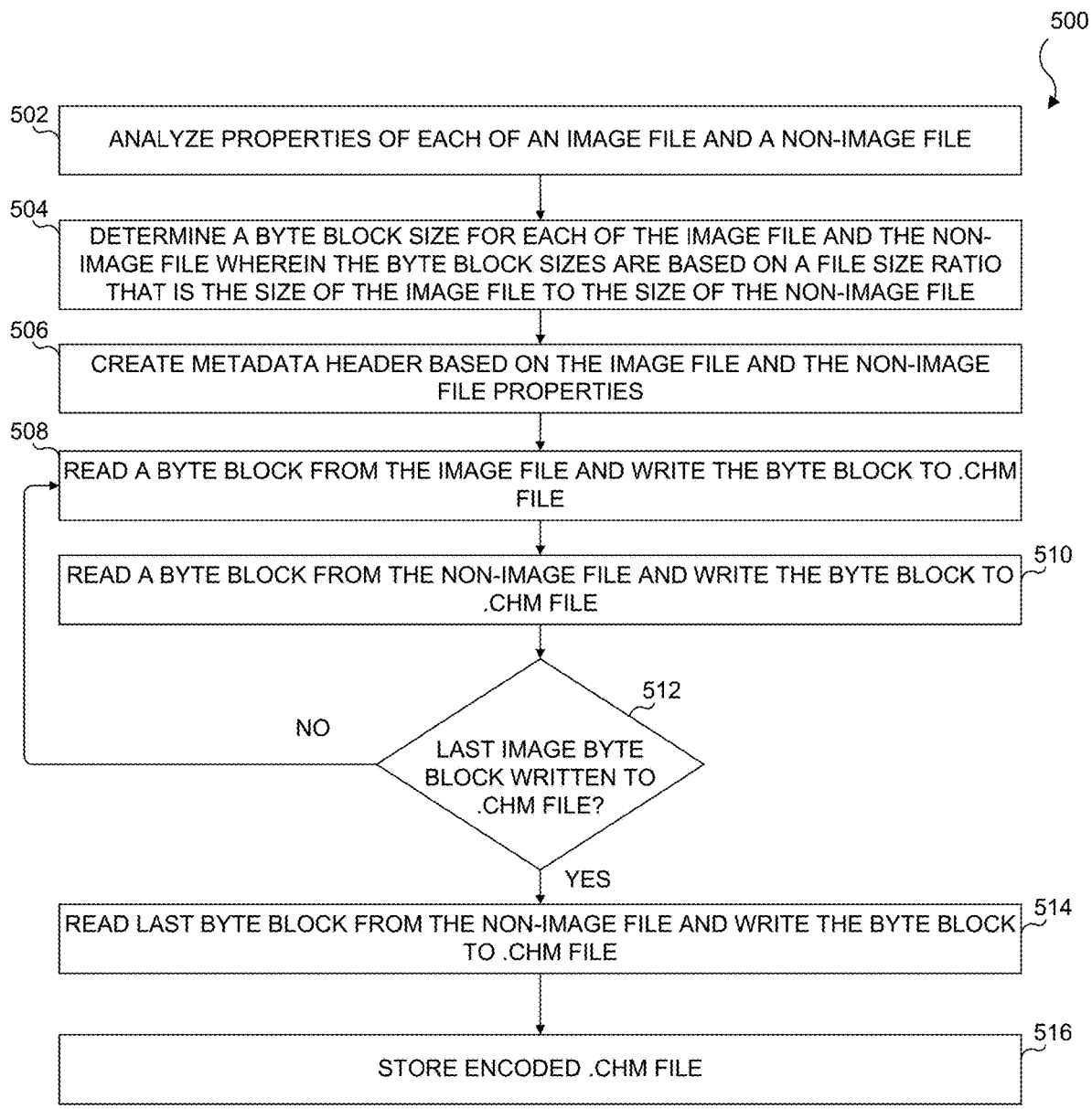
FIG. 5 illustrates a flowchart of a CHM creation process in accordance with various embodiments of the present disclosure.

Referring now to FIG. 5, there is illustrated a flowchart of a CHM creation process 500 in accordance with various embodiments of the present disclosure. The process 500 begins at step 502 where an encoder or application analyzes properties of each of an image file and a non-image file. At step 504, the encoder determines an appropriate byte block size for each of the image file and the non-image file wherein the byte block sizes are based on a file size ratio that is the size of the image file to the size of the non-image file. For example, as in the example illustrated in FIG. 4, the image file 404 and the non-image file 406 both contain twenty-five bytes of data. Therefore, there is a 1:1 ratio between the image file 404 and the non-image file 406.

In the case of a 1:1 ratio, the byte block size for both the image file and the non-image file may be one byte, in order to even distribute each byte from the image file and the non-image file within the CHM file. If, for example, a 3:1 ratio existed between the number of bytes of the image file to the non-image file, three bytes would be copied from the image file and written to the CHM file for every one byte from the non-image file, or vice versa in the case of a 1:3 ratio. In the event that the number of bytes of the image file and the non-image file cannot be expressed easily as a ratio, other methods for determining the byte block size may be performed, as described herein.

After the byte block size for the image file and for the non-image file is determined, the process flows to step 506. At step 506, the encoder creates a metadata header for a new CHM file based on the image file and non-image file properties. The metadata header may also include information concerning the byte block size of each of the image file and the non-image file, so that a decoder may use the metadata header information at a later time to determine how the CHM file should be decoded. At step 508, the encoder reads a byte block from the image file and writes the byte block to a body section of the new CHM file. At step 510, the encoder reads a byte block from the non-image file and writes the byte block to the CHM file. The process 500 flows to decision block 512, where it is determined whether the last image file byte block has been written to the CHM file. If not, the process flows back to step 508 to write another byte block from the image file, to write another non-image file byte block at step 510, and return to decision block 512 to again determine whether the last image file byte block has been written to the CHM file. If at decision block 512 it is determined that the last byte block has been written to the CHM file, the process 500 flows to step 514 to read the last byte block from the non-image file and write the byte block to the CHM file. The process 500 ends with step 516, where the encoded CHM file is stored.

Figure 6:
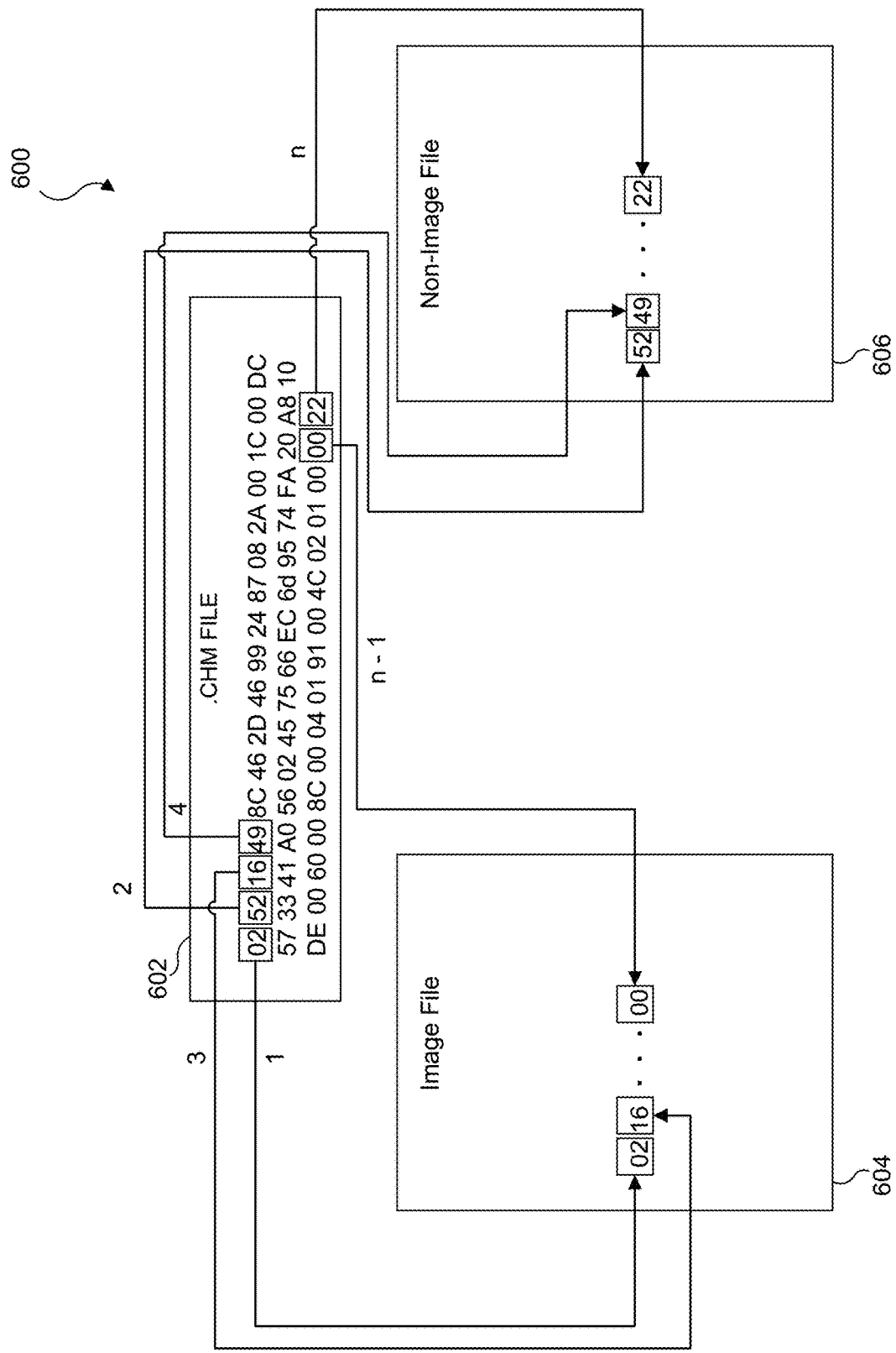
FIG. 6 illustrates a diagrammatic view of one embodiment of a CHM file decoding process in accordance with various embodiments of the present disclosure.

Referring now to FIG. 6, there is illustrated a diagrammatic view of one embodiment of a CHM file decoding process 600 in accordance with various embodiments of the present disclosure. A CHM file 602 may include a plurality of bytes blended into the CHM file previously during a CHM encoding operation. The plurality of bytes in the CHM file 602 is shown in FIG. 6 as what may be the final result of the encoding process illustrated in FIG. 4, with the plurality of bytes in the CHM file 602 including all the bytes from the image file 404 and the non-image file 406. To decode the CHM file and recreate an image file 604 and a non-image file 606, a decoder may determine the byte block size used to create the CHM file 602 and begin reading and writing byte blocks from the CHM file 602 to the image file 604 and the non-image file 606.

At a first step 1, the decoder reads a first byte "02" from the CHM file 602 and writes the first byte "02" to the image file 604 as the first byte of the image file 604. At a second step 2, the decoder reads a second byte "52" from the CHM file 602 and writes the second byte "52" to the non-image file 606 as the first byte of the non-image file 606. At a third step 3, the decoder reads a third byte "16" from the CHM file 602 and writes the third byte "16" to the image file as the second byte of the image file 604. At a fourth step 4, the decoder reads a fourth byte "49" from the CHM file 602 and writes the fourth byte "49" as the second byte of the non-image file 606. This pattern continues until all bytes from the CHM file are read and written to the image file 604 and the non-image file 606. At a penultimate step n−1, the decoder writes a penultimate byte "00" to the image file 604 as the last byte of the image file 604. At a last step n, the decoder writes a last byte "22" to the non-image file as the last byte of the non-image file 606. After step n, the image file 604 and the non-image file 606 are completed. The image file 604 and the non-image file 606 may be exact copies of the image file and non-image file that were used during creation and encoding of the CHM file 602, such as the image file 404 and non-image file 406.

Figure 7:
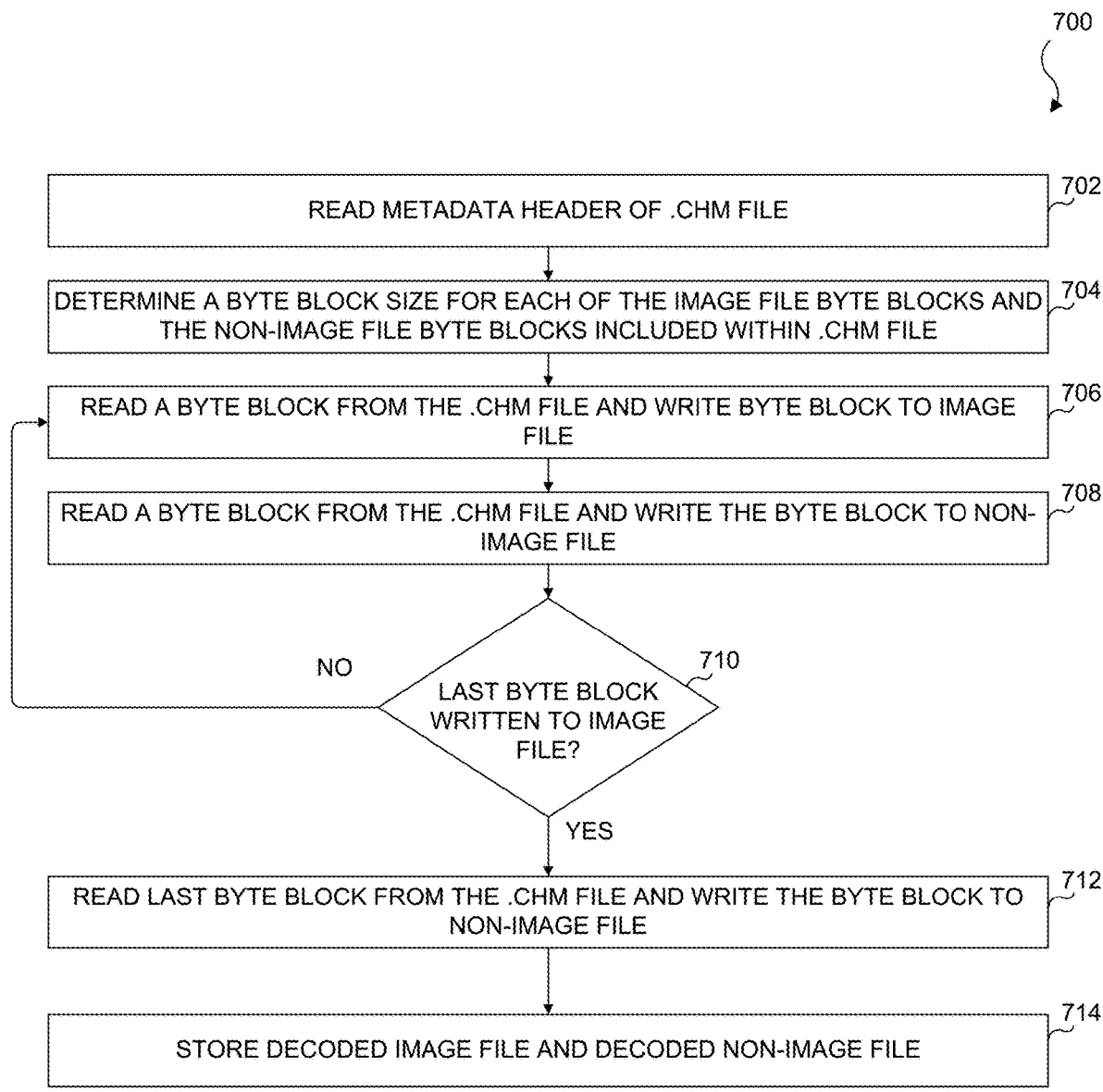
FIG. 7 illustrates a CHM decoding process in accordance with various embodiments of the present disclosure.

Referring now to FIG. 7, there is illustrated a CHM decoding process 700 in accordance with various embodiments of the present disclosure. The process 700 begins at step 702 where a decoder reads a metadata header of a CHM file. The metadata header may contain information related to the original data streams used to create the CHM file, such as byte block sizes for the files. At step 704, the decoder determines a byte block size for each of the image file byte blocks the non-image file byte blocks included within the CHM file. At step 706, the decoder reads a byte block from the CHM file and writes the byte block to an image file. At step 708, the decoder reads a byte block from the CHM file and writes the byte block to a non-image file. At decision block 710, the decoder determines whether the last byte block has been written to the image file. If not, the process flows back to step 706 and the decoder reads the next image file byte block from the CHM file and writes the byte block to the image file, and then moves to step 708 again to read the next non-image byte block from the CHM file and write the byte block to the non-image file.

If at decision block 710, it is determined that the last image file byte block has not been written to the image file, the process flows to step 712 where the decoder reads a last byte block from the CHM file and writes the byte block to the non-image file. After step 712, the image file and the non-image file are completed. The image file and the non-image file may be exact copies of the image file and non-image file that were used during creation and encoding of the CHM file. The process 700 ends with step 714 where the decoded image file and the decoded non-image file are stored.

Figure 8:
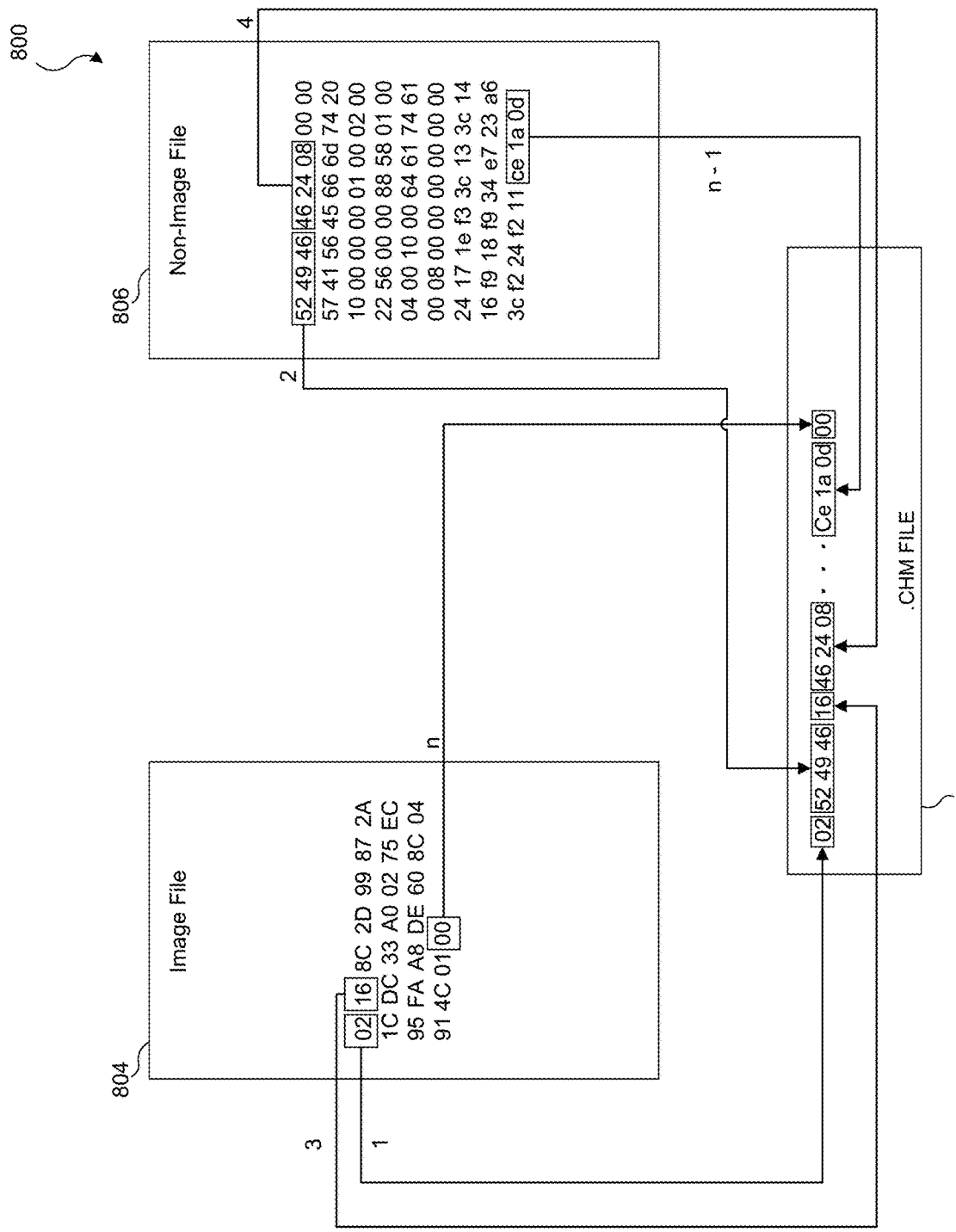
FIG. 8 illustrates a diagrammatic view of an embodiment of a CHM file encoding process where the files to be blended into a CHM file do not have an equal number of bytes, in accordance with various embodiments of the present disclosure.

Referring now to FIG. 8, there is illustrated a diagrammatic view of an embodiment of a CHM file encoding process 800 where the files to be blended into a CHM file 802 do not have an equal number of bytes, in accordance with various embodiments of the present disclosure. FIG. 8 illustrates an image file 804 having a total of 25 bytes and a non-image file having a total of 72 bytes. The protocol for CHM encoding and decoding may call for the bytes of the files combined into the CHM file 802 to be as evenly distributed as possible. For example, the protocol may be written to avoid having multiple byte blocks of a single file be bunched together. For instance, if only one byte was written from the image file 804 and the non-image file 806 at a time, such as that illustrated in FIG. 4, the resulting CHM file would have the first 50 bytes be evenly blended from the image file 804 and the non-image file 806, but the last 47 bytes of the CHM file would all be non-image file bytes. While the protocol may allow for such an encoding algorithm, the protocol may dictate a more even distribution of bytes.

As shown in FIG. 8, the encoder determines that the byte block size for the image file 804 is one byte, while the byte block size for the non-image file 806 is three bytes. This may be determined by a mathematical operation such as $$b = \lceil \frac{y}{x} \rceil,$$

or b=ceil(y/x), where y is the number of bytes for the file having a larger number of bytes, x is the number of bytes for the file having the least number of bytes, and b is the block size for the file having the larger number of bytes. So, for example, since non-image file 806 has 72 bytes, and image file 804 has 25 bytes, b=3. If more than two files are to be written into the CHM file, this operation could be performed for every file that has more bytes than the file with the fewest bytes. For example, if another non-image file was to be blended into the CHM file 802, the block size for the non-image file 806 would still be 3 and the block size for the image file 804 would still be 1. If the other non-image file has 38 bytes, for example, b=2 for the other non-image file. The encoder would then alternate between the three files, writing a byte from the image file 804 to the CHM file, three bytes from the non-image file 806 to the CHM file, and two bytes from the other non-image file to the CHM file, until all bytes are copied to the CHM file.

As shown in FIG. 8, the encoder, at a first step 1, reads a first byte "02" from image file 804 and writes it as the first byte of the CHM file 802. At a second step 2, the encoder reads the first three bytes "52 49 46" from the non-image file 806 and writes the bytes to the CHM file 802. At a third step 3, the encoder reads a second byte "16" from the image file and writes the second byte to the CHM file 802 after the already written bytes. At a fourth step 4, the encoder reads the next three bytes in the non-image file 806 and writes the three bytes to the CHM file 802. This process of switching between the image file 804 and the non-image file 806 continues until all bytes from the image file 804 and the non-image file 806 are written to the CHM file 802. At a penultimate step n-1, the last three bytes of the non-image file 806 are written to the CHM file 802. At a last step n, the last byte of the image file 804 is written to the CHM file 802.

It should be noted that the number of bytes used as an example in FIG. 8 cause a byte block from the image file 804 to be the first and last write to the CHM file 802. It will be understood that depending on the number of bytes in the files, the algorithm may not perfectly evenly distribute byte blocks. In the example of FIG. 8, there were 25 byte block writes from the image file 804 and 24 byte block writes from the non-image file 806. However, the algorithm still distributed them in an even manner. In some embodiments, an assigned byte block size cause there to be a remainder of bytes left over. For example, if there were 125 bytes in one file and 15 bytes in another, b=9. So, there would be 15 writes from the file with 15 bytes (one byte per byte block). However, after the 13$^{th}$ write for the file with 125 bytes (at 9 bytes per byte block), 117 bytes from the file would have been written into the CHM file after that 13$^{th}$ write. Since there are 125 bytes in the file, there are 8 bytes remaining to be written after the 13$^{th}$ write. In this scenario, for the 14$^{th}$ write from the file having 125 bytes, the encoder may determine that a full byte block does not remain in the file, and simply write the last 8 bytes into the CHM file as the last byte block written from the file with 125 bytes. In other embodiments, the encoder may divide the last 8 bytes into two byte blocks of 4 bytes each, so that there is a 14$^{th}$ and a 15$^{th}$ read/write operation for both the file with 15 bytes and the file with 125 bytes.

In some embodiments, to limit the time spent performing read/write operations, a multiplier may be applied. For example, if the number of bytes for the files are 25 and 72, as in FIG. 8, b=3, and the encoder may write one byte at a time for the image file 804 and three bytes at a time for the non-image file 806. However, this causes there to be a total of 49 read/write operations. A multiplier may be applied to decrease the number of read/write operations, which may be useful in speeding up the process and limiting strain on resources, especially for files having a large number of bytes. For example, a 2x multiplier may be applied, increasing the byte block size for the image file 804 to 2, and the byte block size for the non-image file 806 to 6. Thus, the encoding process would only require twenty-five read/write operations (including any extra writes for remainders).

Figure 9A:
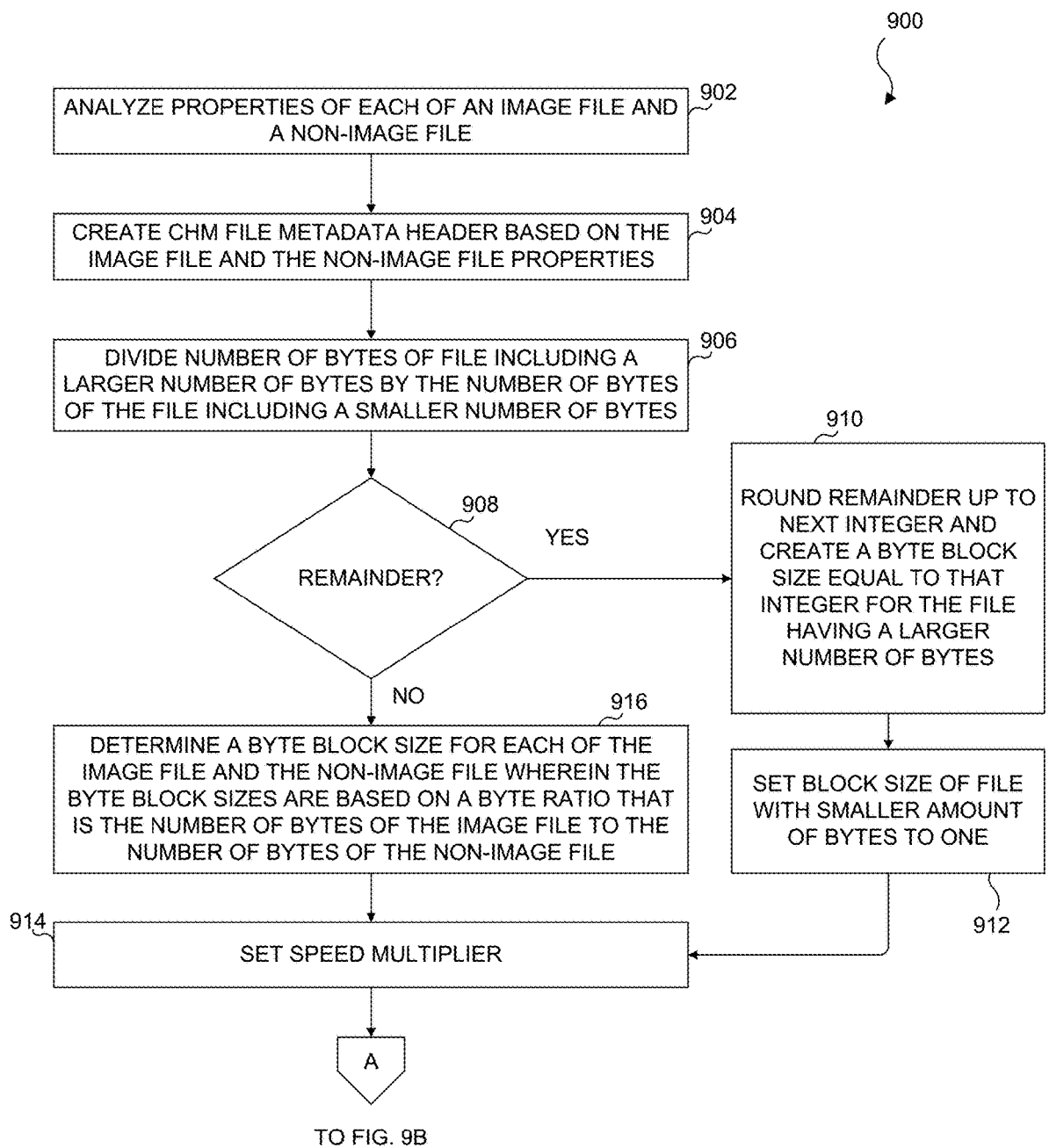
FIGS. 9A and 9B illustrate a flowchart of a CHM encoding process in accordance with various embodiments of the present disclosure.
Figure 9B:
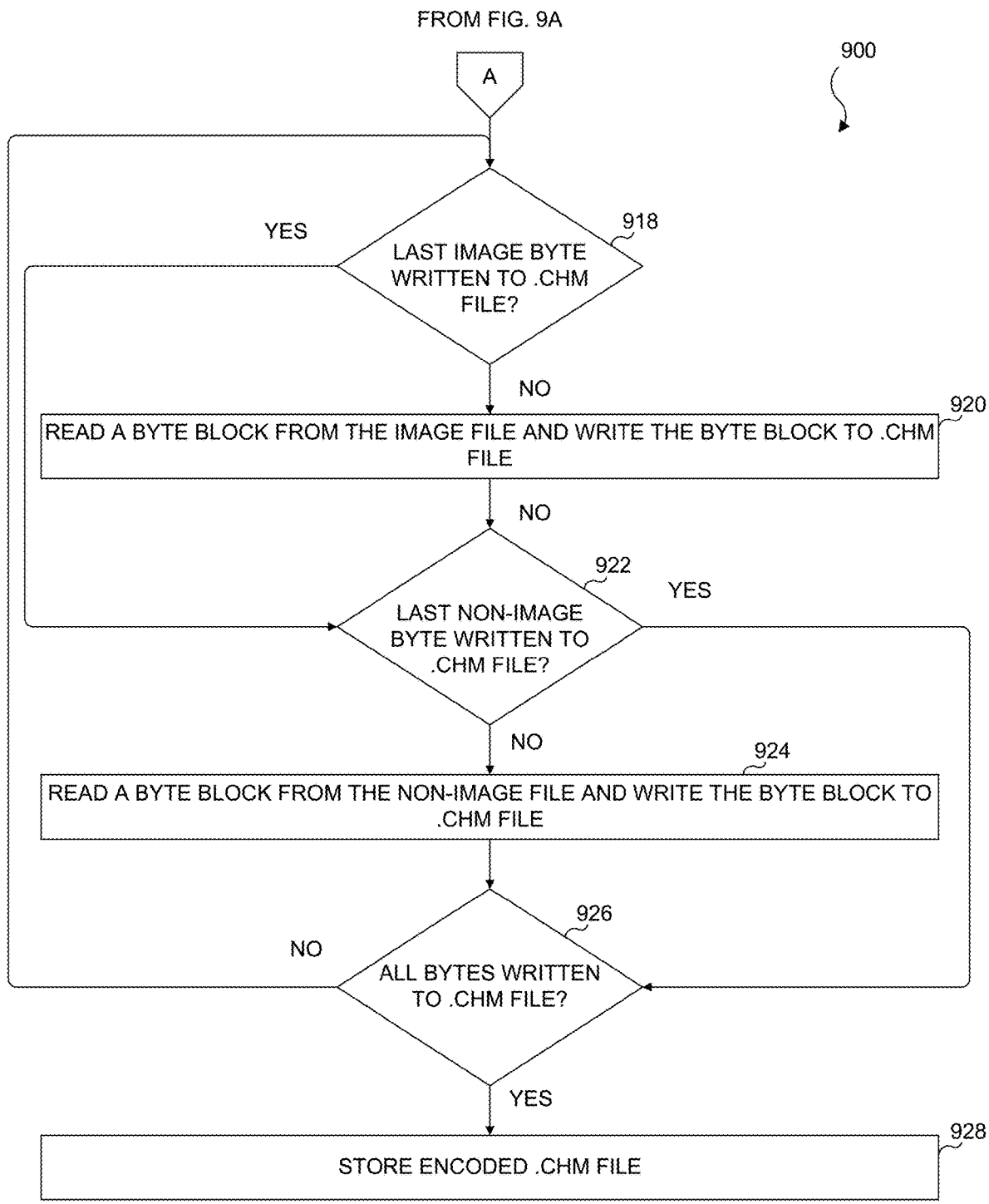

Referring now to FIGS. 9A and 9B, there is illustrated a flowchart of a CHM encoder process 900 in accordance with various embodiments of the present disclosure. The process begins at step 902 where an encoder analyzes the properties of each of an image file and a non-image file. It will be understood that the files may be any file type or combinations of file types, and that use of an image file and non-image file is just for example purposes. At step 904, the encoder creates a metadata header using information found during step 902 concerning the image file and the non-image file. At step 906, the encoder divides the number of bytes of the file that has a larger number of bytes by the number of bytes of the file that has a smaller number of bytes. At decision block 908, it is determined whether the division performed in step 906 results in a number having a remainder. If so, the process 900 flows to step 910 where the result of the division in step 906 is rounded up to the next integer (2.5 to 3, for example) and a byte block size that is equal to that integer is assigned for the file having a larger number of bytes. Steps 906-910 may be practically in the encoder program by performing a ceil( ) function or by performing integer division and adding one to the result. At step 912, the byte block size for the smaller file is set to one. The process then flows to step 914.

If at decision block 908 it is determined there is no remainder, the process flows to step 916 where the byte block sizes for the image file is set based on a ratio of the number of bytes of the image file to the number of bytes of the non-image file. For example, if the image file has 18 bytes and the non-image file has 27 bytes, the ratio is 2:3, so the encoder would assign a byte block size of 2 to the image file and a byte block size of 3 to the non-image file. The process then flows to step 914. At step 914, a speed multiplier is set such as described herein, to optionally speed up the encoding process and reduce the number of read/write operations. If not needed, the speed multiplier can be set to 1 to keep the assigned byte block sizes.

The process 900 then flows to decision block 918, where it is determined whether the last image file byte block has been written to the CHM file. If not, the process 900 flows to step 920. At step 920, the encoder reads a byte block from the image file and writes the byte block to the CHM file. At decision block 922, it is determined whether the last non-image file byte has been written to the CHM file. If not, the process 900 flows to step 924. At step 924, the encoder reads a byte block from the non-image file and writes the byte block to the CHM file. At decision block 926, it is determined whether all bytes from both the image and the non-image file have been written to the CHM file. If not, the process 900 flows back to decision block 918. If at decision block 918 it is determined that the last image file byte has been written to the CHM file, the process flows to decision block 922. If at decision block 922 it is determined that the last non-image file byte has been written to the CHM filed, the process flows to decision block 926. If at decision block 926 it is determined that all bytes have been written, the process flows to step 928. At step 928, the encoded CHM filed is stored.

Figure 10:
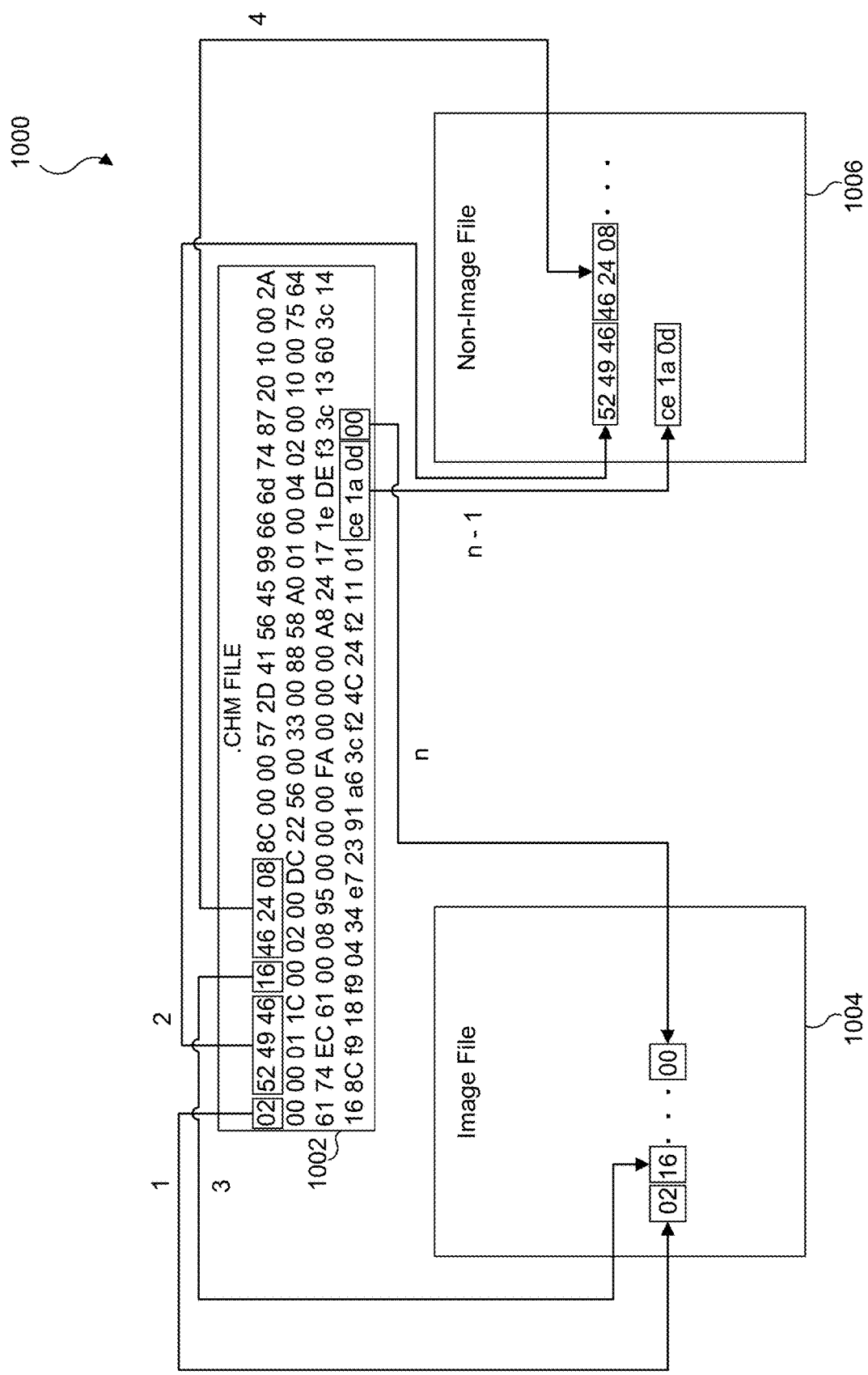
FIG. 10 illustrates a diagrammatic view of an embodiment of a CHM file decoding process where the files to be decoded from a CHM file do not have an equal number of bytes, in accordance with various embodiments of the present disclosure.

Referring now to FIG. 10, there is illustrated a diagrammatic view of an embodiment of a CHM file decoding process 1000 where the files to be decoded from a CHM file 1002 do not have an equal number of bytes, in accordance with various embodiments of the present disclosure. The header data of the CHM file may indicate how the CHM file 1002 was created, and the byte block sizes used for the files making up the CHM file 1002. The example shown in FIG. 10 is a decoding process of the CHM file illustrated in FIG. 8. At a first step 1, a first byte "02" is read from the CHM file 1002 and written to an image file 1004. At a second step 2, three bytes "52 49 46" are read from the CHM file 1002 and written to a non-image file 1006. At a third step 3, a byte "16" is read from the CHM file 1002 and written to the image file 1004. At a fourth step 4, three bytes "46 24 08" are read from the CHM file 1002 and written to the non-image file 1006. The process 1000 continues alternating writing one byte to the image file 1004 and writing three bytes to the non-image file 1006 in order to write all bytes from the CHM file 1002. At a penultimate step n−1, the first three bytes "ce 1a 0d" of the last four bytes of the CHM file are written to the non-image file 1006. At a last step n, the last byte "00" of the CHM file is written to the image file 1004. After step n, the image file 1004 and the non-image file 1006 are completed. The image file 1004 and the non-image file 1006 may be exact copies of the image file and non-image file that were used during creation and encoding of the CHM file 802, such as the image file 804 and non-image file 806.

Figure 11:
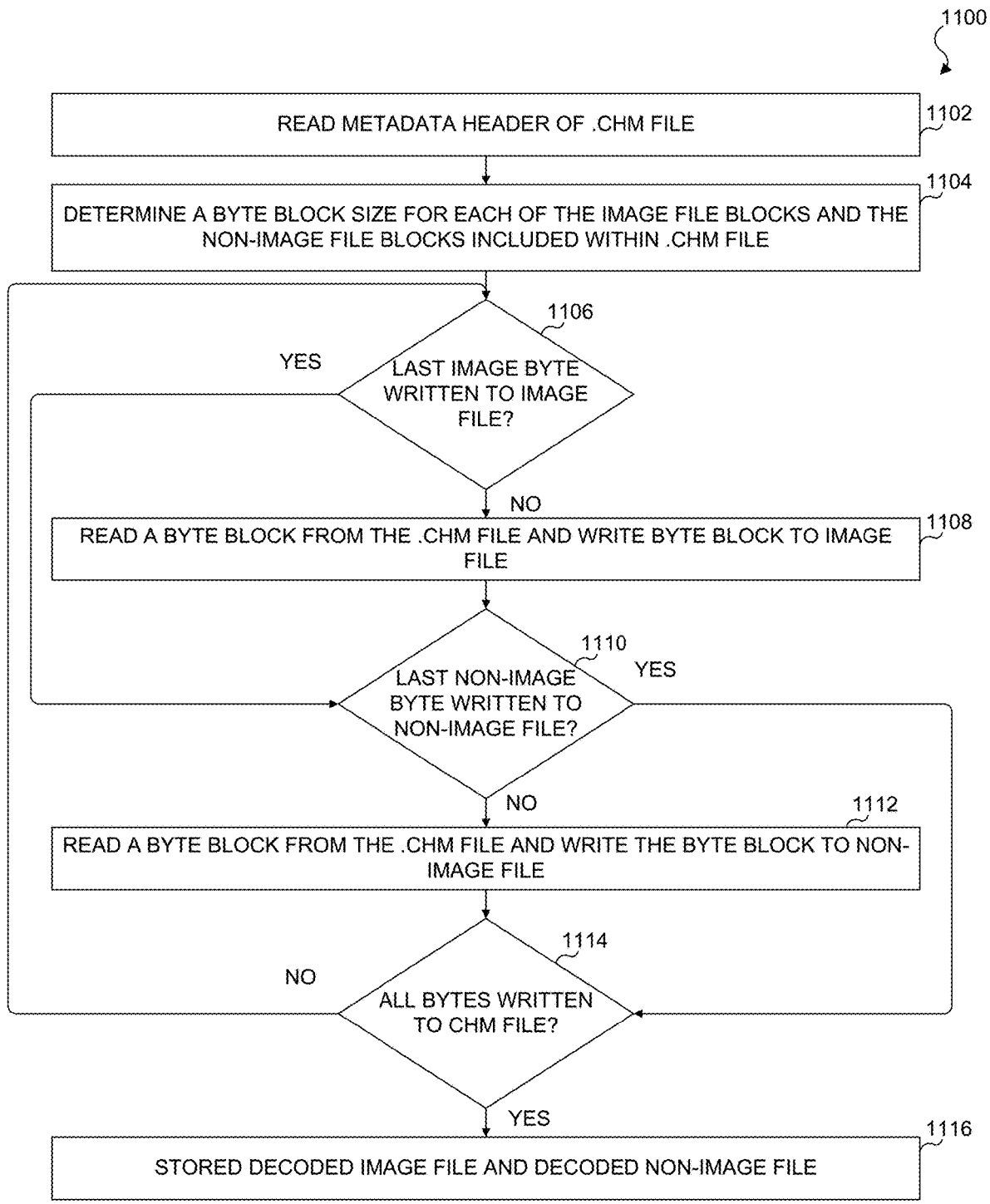
FIG. 11 illustrates a flowchart of a CHM decoding process in accordance with various embodiments of the present disclosure.

Referring now to FIG. 11, there is illustrated a flowchart of a CHM decoding process 1100 in accordance with various embodiments of the present disclosure. The process 1100 begins at step 1102 where a decoder reads the metadata header of a CHM file. At step 1104, the decoder determines a byte block size for each of the image file blocks and the non-image file blocks included within the CHM file.

The process 1100 then flows to decision block 1106, where it is determined whether the last image file byte block has been written to an image file. If not, the process 1100 flows to step 1108. At step 1108, the decoder reads a byte block from the CHM file and writes the byte block to the image file. At decision block 1110, it is determined whether the last non-image file byte has been written to a non-image file. If not, the process 1100 flows to step 1112. At step 1112, the decoder reads a byte block from the CHM file and writes the byte block to the non-image file. At decision block 1114, it is determined whether all bytes from the CHM file have been written to the image file and non-image file. If not, the process 1100 flows back to decision block 1106. If at decision block 1106 it is determined that the last image file byte has been written to the image file, the process flows to decision block 1110. If at decision block 1110 it is determined that the last non-image file byte has been written to the non-image file, the process flows to decision block 1114. If at decision block 1114 it is determined that all bytes have been written to the CHM file, the process flows to step 1116. At step 1116, the decoded image and non-image files are stored.

Figure 12:
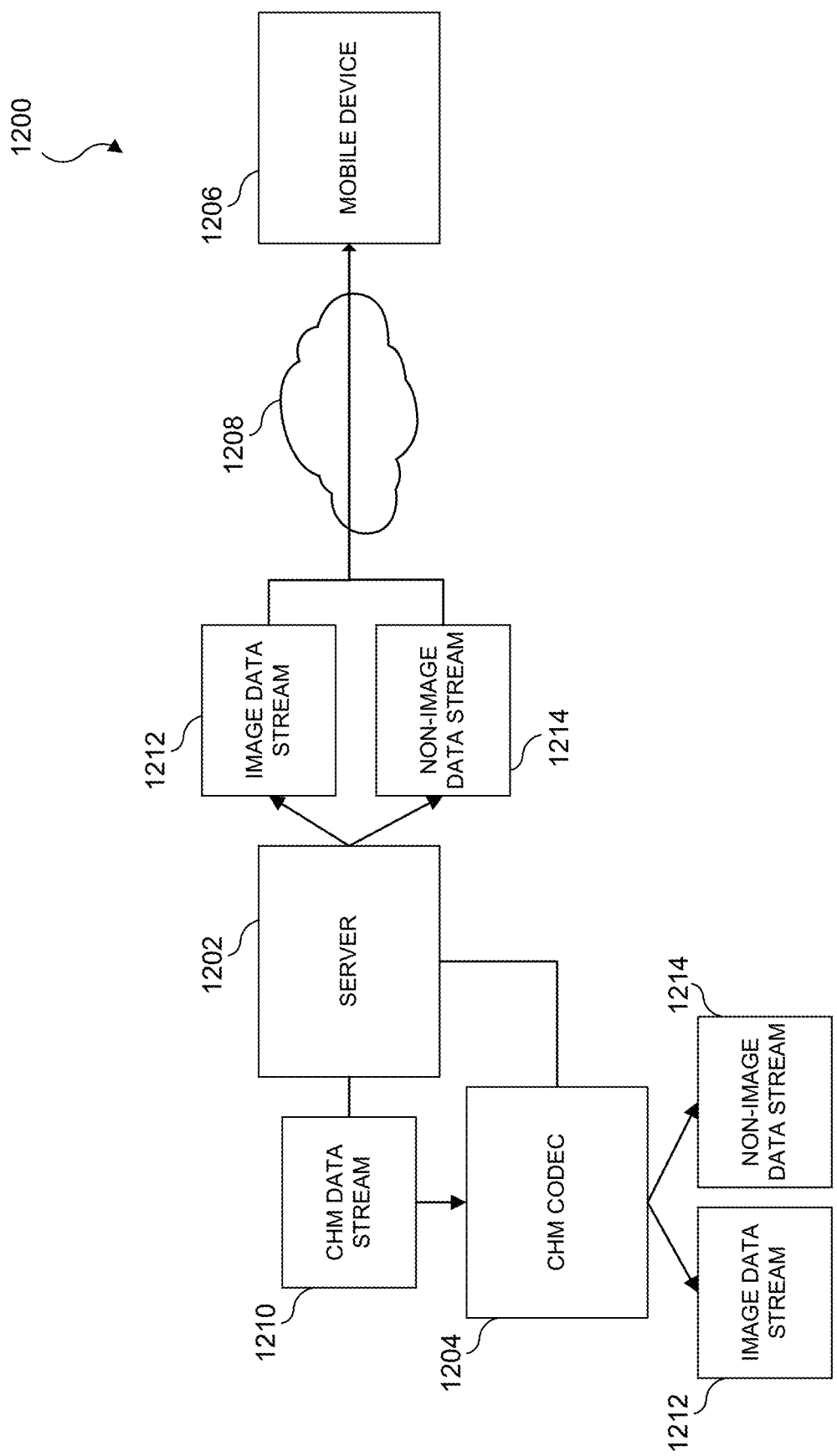
FIG. 12 illustrates a diagrammatic view of a server-side CHM file decoding and transmission system in accordance with various embodiments of the present disclosure.

Referring now to FIG. 12, there is illustrated a diagrammatic view of a server-side CHM file decoding and transmission system 1200 in accordance with various embodiments of the present disclosure. The system 1200 includes a server 1202 that includes a CHM codec 1204. The CHM codec 1204 may be a program for encoding and/or decoding CMH files or data streams. The server 1202 may receive a request from a mobile device 1206, the request being sent over a network 1208. The server may have a CHM file stored thereon. The server 1202 may be a web server configured to present the CHM file as part of a webpage. For instance, the webpage may be an online store page for a product. The CHM file may be used to store an images or images of the product and accompanying audio to describe the product, as well as other file types and information. When the webpage loads on the mobile device 1206, a user of the mobile device 1206 may view images of the product and hear audio describing the product. It will be understood that this is but one example, and the systems and processes described herein may be used to present images and accompanying audio in other scenarios as well.

In some embodiments, the server 1202 may decode the CHM file before sending the separate files or data streams over the network 1208 to the mobile device 1206. This allows for the webpage and the contents of the CHM file to be viewed or accessed without the mobile device 1206 requiring a CHM codec or browser plugin to decode the CHM file. In other embodiments, the mobile device 1206 may include such a codec or plugin, in which case the server may transmit the CHM file to the mobile device 1206, and the mobile device 1206 would perform a decoding process on the CHM file. As shown in FIG. 12, the server 1202 provides a CHM data stream 1210 to the CHM codec 1204, the CHM data stream 1210 being a stream from the CHM file stored on the server. The CHM codec 1204 decodes the CHM data stream 1210 into separate files or data streams that were originally used during creation of the CHM file. As one example, and as illustrated in FIG. 12, the CHM codec 1204 may decode the CHM data stream 1210 into a separate image data stream 1212 and a separate non-image data stream 1214. The server 1202 may then transmit the image data stream 1212 and the non-image data stream 1214 over the network 1208 to the mobile device 1206, for use by the mobile device.

Figure 13:
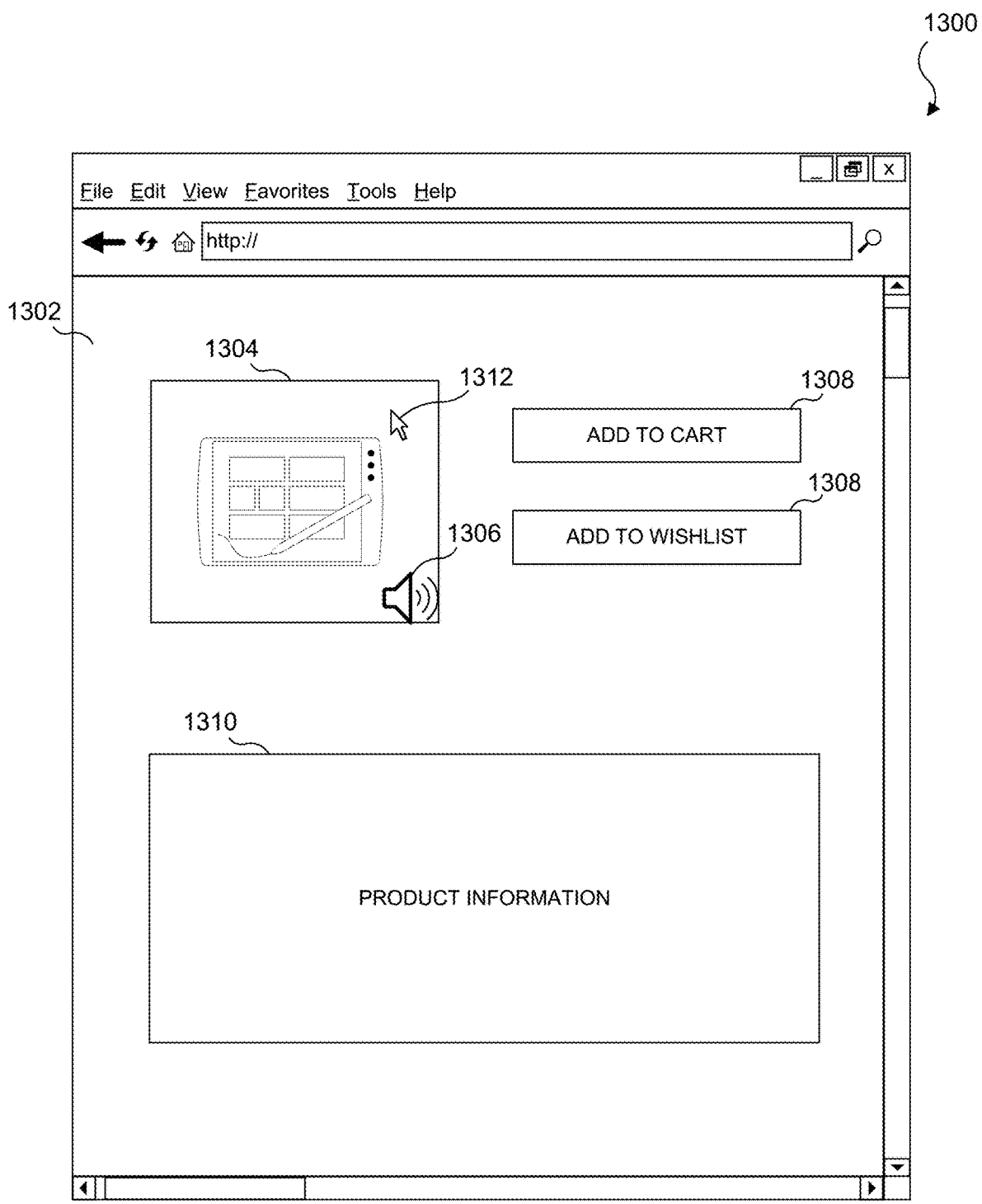
FIG. 13 illustrates a browser window showing a webpage including an image with accompanying audio presented on the webpage, in accordance with various embodiments of the present disclosure.

Referring now to FIG. 13, there is illustrated a browser window 1300 showing a webpage 1302 including an image 1304 with accompanying audio 1306 presented on the webpage 1302, in accordance with various embodiments of the present disclosure. As described with respect to FIG. 12, a CHM file may be received by a device on which a browser or other means of accessing web content resides. A server may decode a stored CHM file and then transmit the separate streams to the device, the separate streams providing content to be presented on the webpage 1302. Once the webpage 1302 is loaded in the browser window 1300 the image 1304 and other webpage content such as user interaction buttons 1308 and textual product information 1310 may be presented. The audio 1306 may begin playing once the website is loaded, or the audio 1306 may only play upon a trigger instructing the audio 1306 to play. For example, the audio 1306 may only play when a mouse cursor 1312 is placed over the image 1304, when the image 1304 is clicked on, or when the image 1304 is scrolled such that the image 1304 is viewable in the browser window 1300, with the audio 1306 stopping once the user scrolls away from the image 1304.

Presenting audio with an image in this way offers a more efficient means of providing audio information with an image. Typically, if one wishes to provide image content in association with audio content, one would create a video file, such as an MP4 file, and lay an audio track over the image. This may be an inefficient method of associating audio content with an image because if the goal is to provide audio content with one or more still images, rather than with moving video content, creating a video file to achieve such creates a bigger file than needed, as video files are commonly much larger than an image or an audio file, even when the image or audio file sizes are combined. The CHM file is the same or a similar size to the combined size of the image and audio files, and thus provides a more efficient file type that takes up less storage, is transmitted faster, etc. It will be understood that this may be the case for other file types as well, such as if a text document was also included in the CHM file, the size of the CHM file would only increase in an amount close to that of the size of the text document.

Figure 14:
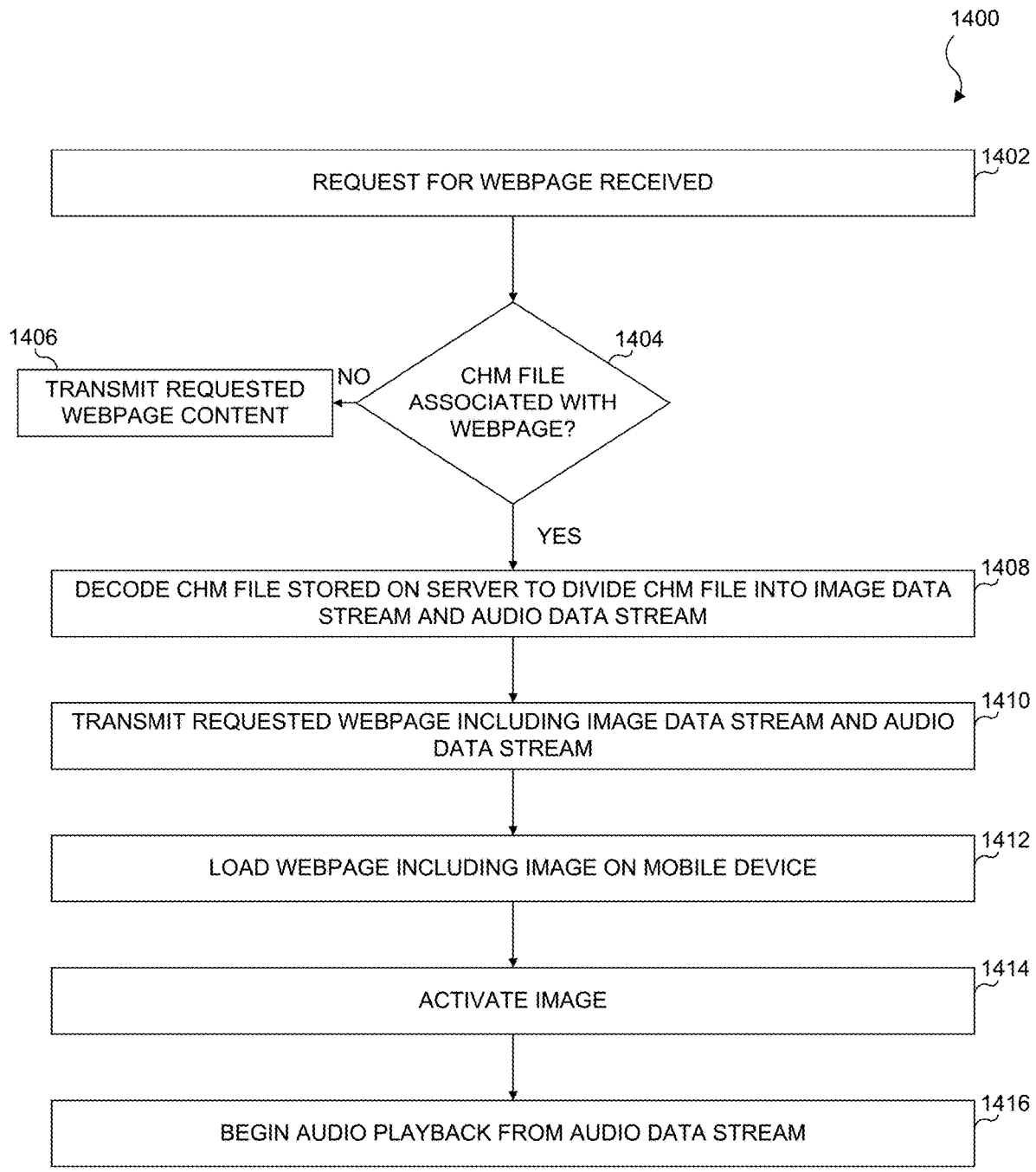
FIG. 14 illustrates a flowchart of a server-side CHM decoding process in accordance with various embodiments of the present disclosure.

Referring now to FIG. 14, there is illustrated a flowchart of a server-side CHM decoding process 1400 in accordance with various embodiments of the present disclosure. The process 1400 begins at step 1402 when the server receives a request for a webpage. At decision block 1404, it is determined whether a CHM file is associated with the requested webpage, such as if content to be loaded on the webpage is encoded within the CHM file. If not, the process 1400 ends at step 1406, where the server transmits the requested webpage content. If at decision block 1404 it is determined that there is a CHM file associated with the requested webpage, the process 1400 moves to step 1408. At step 1408, the server decodes the CHM file, or CHM files, stored on the server that is associated with the requested webpage. The decoding process divides the CHM file into separate data streams, such as an image data stream and an audio data stream.

The process 1400 then flows to step 1410, where the server transmits the requested webpage content, including the data streams separated from the CHM file, such as the image data stream and audio data stream. At step 1412, the webpage, including the separated data stream content, such as the image, is loaded on a mobile device. At step 1414, the image, now loaded as part of the webpage in a browser or other means of displaying web content, is activated. Such activation may be a tap on a touchscreen, a click, a mouse rollover, a scrolling operation that brings the image into view, or other means. At step 1416, audio playback begins from the audio data stream.

Figure 15:
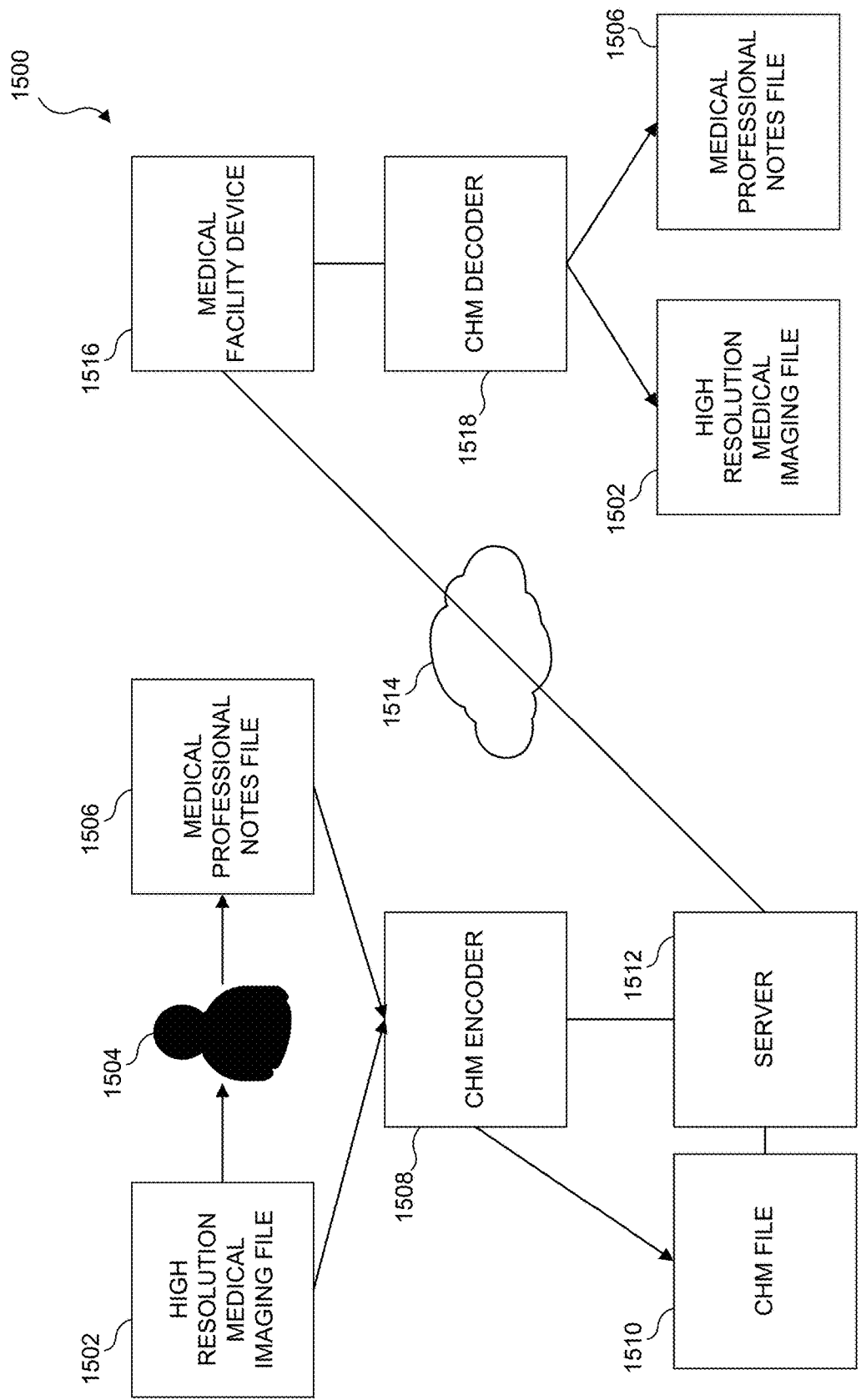
FIG. 15 illustrates a medical imaging and dictation CHM file creation system in accordance with various embodiments of the present disclosure.

Referring now to FIG. 15, there is illustrated a medical imaging and dictation CHM file creation system 1500 in accordance with various embodiments of the present disclosure. A medical imaging process (such as an MRI, X-ray, etc.) may create a high resolution medical imaging file 1502. A medical professional 1504, such as a doctor, surgeon, medical assistant, etc., may review the medical imaging file 1502 in order to provide an opinion on what is shown in the medical imaging file 1502. During such a review, the medical professional 1504 may create a notes file 1506. The notes file 1506 may be a text document including written or textual notes, the notes file 1506 may be an audio dictation where the medical professional's speech is recorded, or other means of storing the medical professional's notes. Once the notes file is created, the medical imaging file 1502 and the notes file 1506 are provided to a CHM encoder 1508. The CHM encoder 1508 may be configured to perform a CHM encoding operation only, or may include a codec for both encoding and decoding of CHM files. The CHM encoder 1508 creates a CHM file 1510, including both the medical imaging file 1502 bytes and the notes file 1506 bytes. The CHM file 1510 may be stored on a server 1512 or another device for storage, until needed at a later time.

For example, a medical facility, such as a medical specialist seeing the patient after the high resolution medical image was created, may request to see the high resolution medical imaging file 1502, along with the notes file 1506. Upon such a request, the server 1512 may transmit the CHM file 1510 over a network 1514 to a medical facility device 1516 belonging to the requesting medical facility. The medical facility device 1516 may include or be operatively connected to a CHM decoder 1518. The CHM decoder 1518 may be configured to perform a CHM decoding operation only, or may include a codec for both encoding and decoding of CHM files. Upon receiving the CHM file 1510 from the server 1512 by the medical facility device 1516, the CHM decoder 1518 may decode the CHM file 1510 to separate from the CHM file 1510 the high resolution medical imaging file 1502 and the medical professional notes file 1506. The CHM file 1510 may only be a size at or similar to the combined sizes of the high resolution medical imaging file 1502 and the notes file 1506. In some embodiments, no compression may be applied during creation of the CHM file 1510, so as to avoid in loss of image quality of the medical imaging file 1502 from a compression process. The CHM file 1510 allows for the imaging file 1502 to be transmitted and separated back out of the CHM file 1510 in its original, high resolution, state, so that another medical professional can review the image without any loss in quality. During review of the medical imaging file 1502, the notes file 1506 may be reviewed at the same time, such as listening to a dictation performed by the medical professional 1504 while viewing the imaging file 1502.

Figure 16:
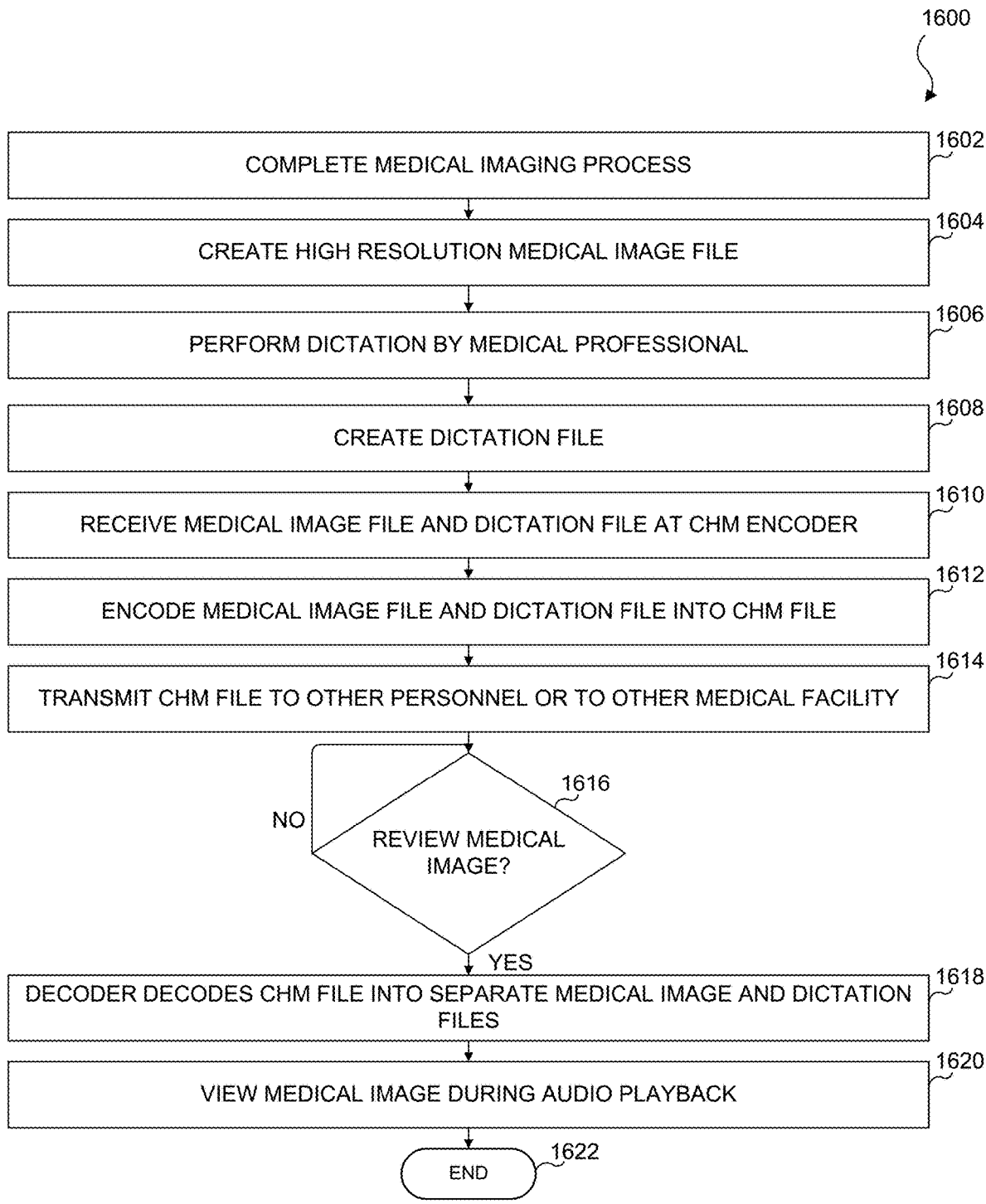
FIG. 16 illustrates a medical imaging and dictation CHM file creation process in accordance with various embodiments of the present disclosure.

Referring now to FIG. 16, there is illustrated a medical imaging and dictation CHM file creation process 1600 in accordance with various embodiments of the present disclosure. The process 1600 begins at step 1602, where a medical imaging process is completed, such as an MM, X-ray, etc. At step 1604, a high resolution medical image file is created of a subject of the medical imaging process. At step 1606, a medical professional performs a dictation or other means of creating notes providing an analysis or opinion of what the medical professional may see in the high resolution medical image file. At step 1608, a dictation file is created to store the dictation or other notes created in step 1606.

At step 1610, a CHM encoder receives the medical image file and the dictation file. At step 1612, the CHM encoder encodes the medical image file and the dictation file into a CHM file. At decision block 1616, it is determined whether the medical image is to be reviewed, such as by a doctor or other medical professional. If not, the CHM file may be stored until such time as the image is to be reviewed. If so, the process 1600 flows to step 1618. At step 1618, a CHM decoder decodes the CHM file in order to separate the CHM file into the individual files or data streams used to create the CHM file, in this case the medical image file and the dictation file. At step 1620, the medical image file is viewed while also accessing the dictation file, such as listening to audio playback from the dictation file while viewing the medical image. The process then ends at step 1622.

A binder file may also be provided. A binder file may incorporate multiple CHM files within the binder file in order to provide file groupings defined by the CHM file. While a CHM file may include bytes from any number of files, as described herein, a binder file can be used to transmit a series of CHM files where each of the CHM files is created from a number of associated files. For instance, CHM files stored in a binder file may each include an image data stream and an audio data stream. When the binder file is accessed, the first CHM file may be decoded to present to a user the image from the first CHM file, while also playing the audio from the first CHM file. Once audio playback is complete, the next CHM file in the binder file may be decoded so that the image and audio from the next CHM file can be presented. Thus, the binder file allows for a series of images, or a presentation, to be provided to a user. The binder file may include CHM files having any types of file data streams stored therein, such as text files, document files, video files, executable files, etc., in order to provide a full suite of information and content to a user.

Figure 17:
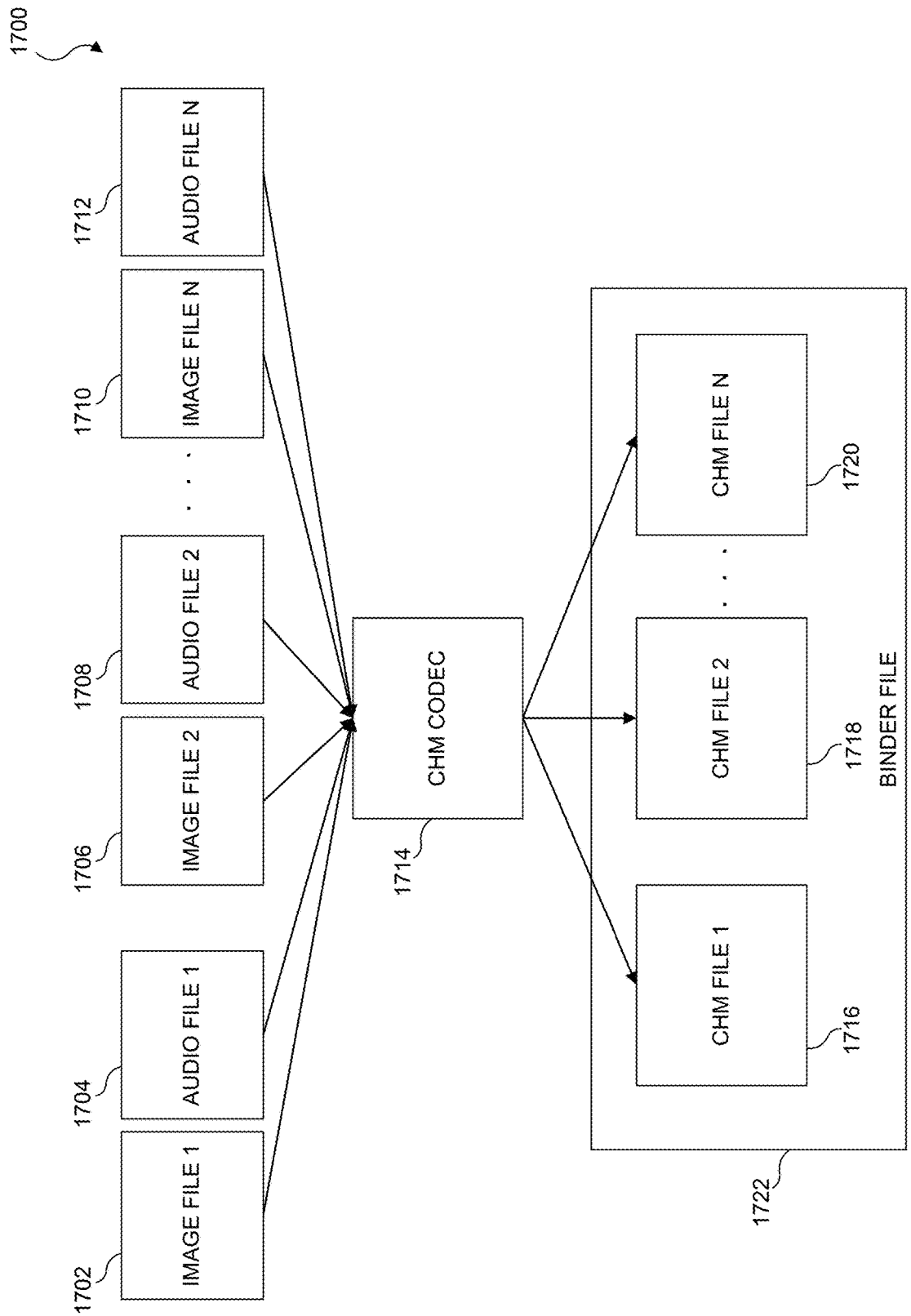
FIG. 17 illustrates a diagrammatic view of a CHM binder file creation process in accordance with various embodiments of the present disclosure.

Referring now to FIG. 17, there is illustrated a diagrammatic view of a CHM binder file creation process 1700 in accordance with various embodiments of the present disclosure. There is shown a plurality of image files associated with an audio file. A first image file 1702 is associated with a first audio file 1704, a second image file 1706 is associated with a second audio file 1708, and an $n^{th}$ image file 1710 is shown associated with an $n^{th}$ audio file 1712. The plurality of image and audio files are processed by a CHM encoder 1714 to create a plurality of CHM files, each of the plurality of CHM files created from an image file and its associated audio file. A first CHM file 1716 is created from the first image file 1702 and the first audio file 1704. A second CHM file 1718 is created from the second image file 1706 and the second audio file 1708. An nth CHM file 1720 is created from the nth image file 1710 and the nth audio file 1712. Each of the plurality of CHM files may then be stored within a binder file 1722.

Figure 18:
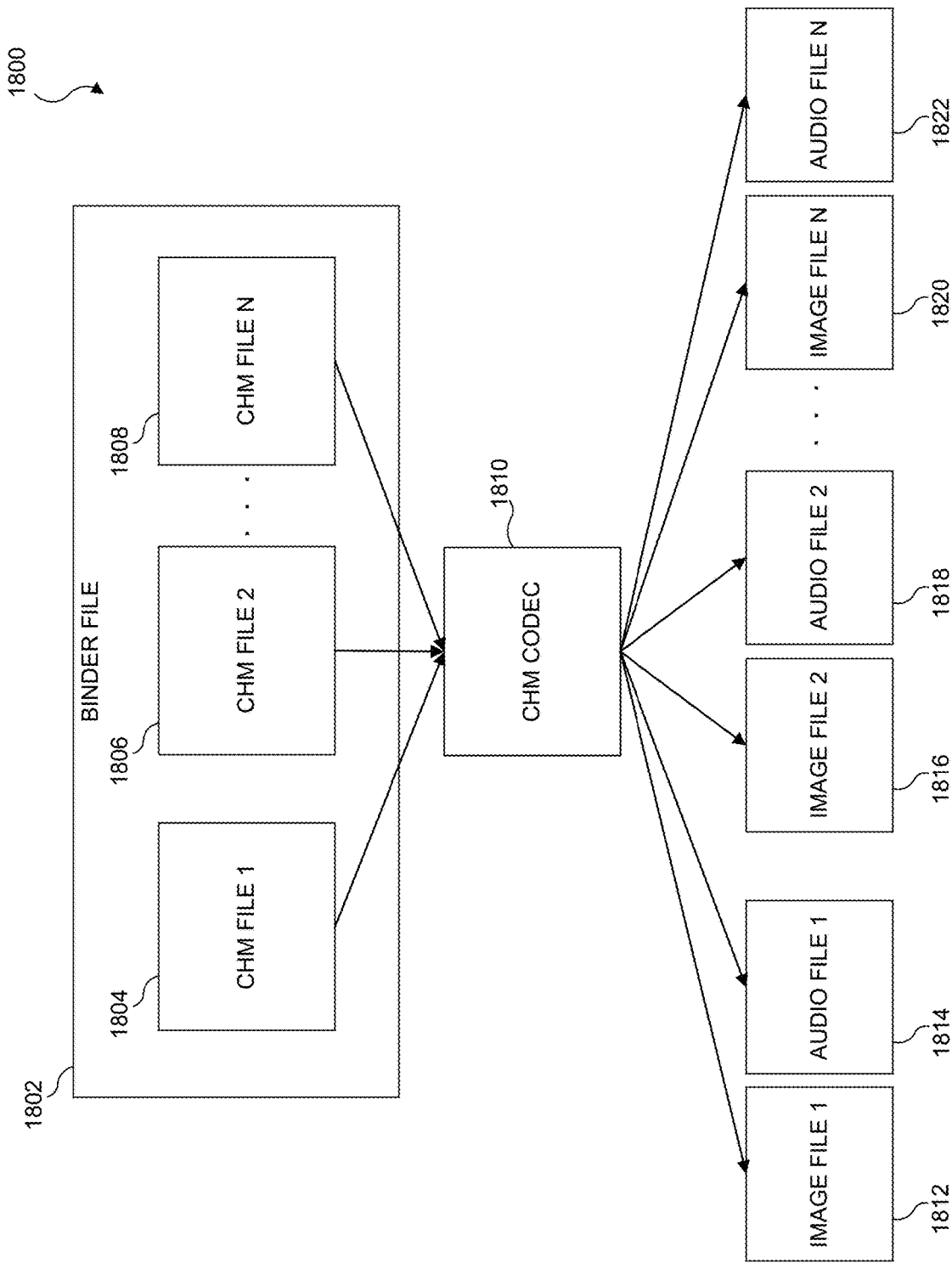
FIG. 18 illustrates a diagrammatic view of a CHM binder file decoding process in accordance with various embodiments of the present disclosure.

Referring now to FIG. 18, there is illustrated a diagrammatic view of a CHM binder file decoding process 1800 in accordance with various embodiments of the present disclosure. A binder file 1802 may include a plurality of CHM files. As illustrated in FIG. 18, the binder file 1802 includes a first CHM file 1804, a second CHM file 1806, and a nth CHM file 1808, indicating that any number of CHM files may be included in the binder file 1802. To decode and present the contents of the plurality of CHM files, the CHM files may be decoded by a CHM codec 1810, such as the decoding processes described herein. The CHM codec 1810 each of the plurality of CHM files into separate files or data streams that may be identical to the files or data streams used during the encoding process to create the CHM file. For example, decoding of the first CHM file 1804 provides a first image file 1812 and a first audio file 1814.

Once the first CHM file 1804 is decoded, audio from the first audio file 1814 may be played while the image of the first image file 1812 is presented to a user. Upon completion of playback of the first audio file 1814, or if the user performs an action that ends the audio playback or otherwise advances the process, the CHM codec 1810 may decode the second CHM file 1806 to provide a second image file 1816 and a second audio file 1818. Once the second audio file 1818 has completed playback, the CHM codec 1810 decodes the nth CHM file 1808, producing an nth image file 1820 and an nth audio file 1822. In this way, a series of content may be presented to a user.

Figure 19:
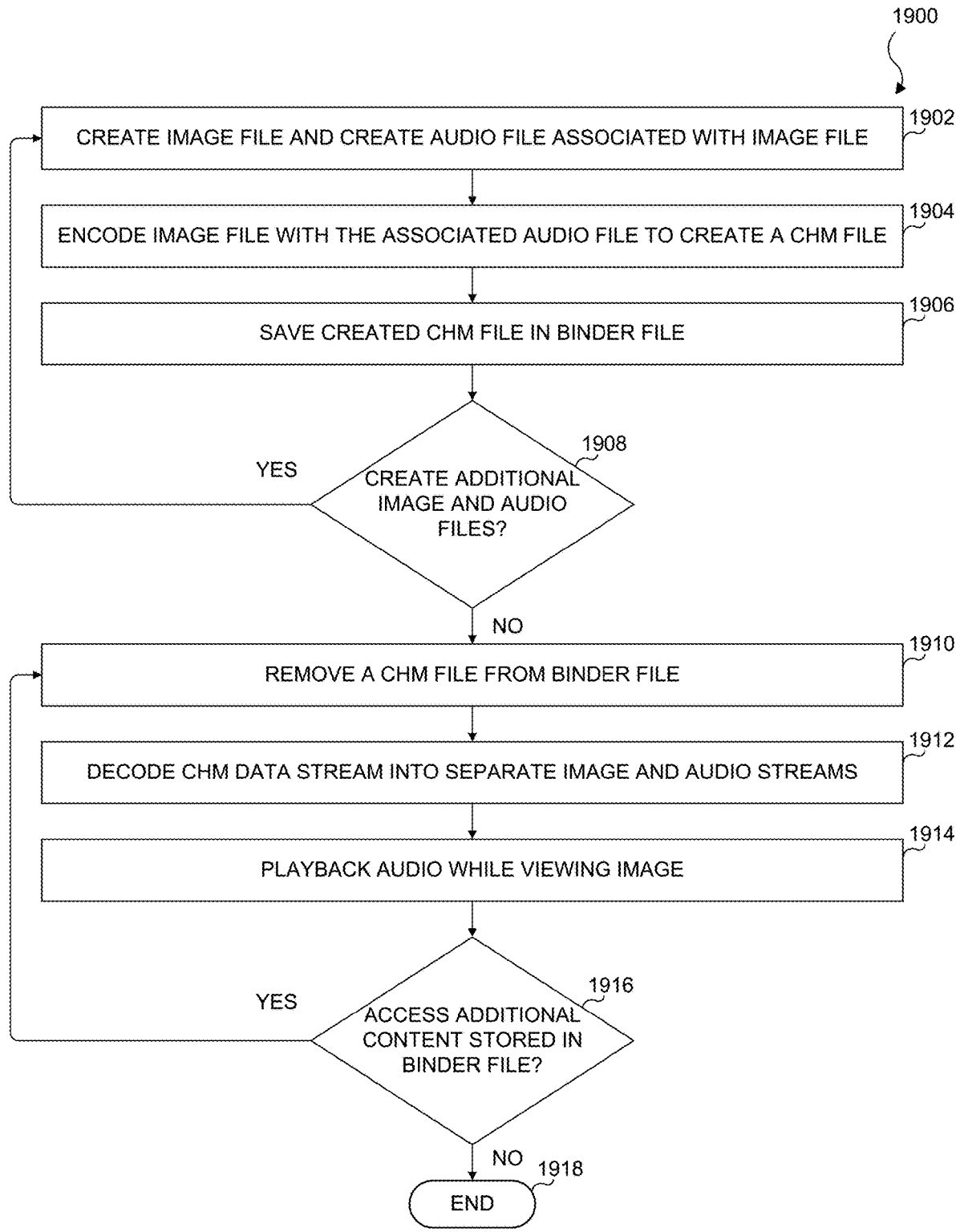
FIG. 19 illustrates a binder file creation and decoding process in accordance with various embodiments of the present disclosure.

Referring now to FIG. 19, there is illustrated a binder file creation and decoding process 1900 in accordance with various embodiments of the present disclosure. The process 1900 begins at step 1902 where an image file and an audio file associate with the image file are created. At step 1904, the image file and the associated audio file are encoded into a CHM file. At step 1906, the CHM file created in step 1904 is saved into a binder file. At decision block 1908, it is determined whether additional image and audio files are to be created. If so, the process 1900 moves back to step 1902 to create another image file and associated audio file, encode the image file and audio file into a CHM file at step 1904, and save the CHM file into a binder file. If at decision block 1908 it is determined that no additional image and audio files are to be created, and thus no more CHM files encoded and stored in the binder file, the process 1900 flows to step 1910.

At step 1910, a CHM file is removed from the binder file. At step 1912, the CHM file removed from the binder file in step 1910 is decoded into separate image and audio streams. At step 1914, audio playback from the audio data stream is performed while the image from the image data stream is presented. At decision block 1916, it is determined whether additional content stored in the binder file is to be accessed. If so, the process 1900 flows back to step 1910 to remove another CHM file from the binder file, decode the CHM data stream at step 1912, and playback audio at step 1914. If at decision block 1916 it is determined that no additional content is to be accessed, the process 1900 ends at end block 1918.

Figure 20:
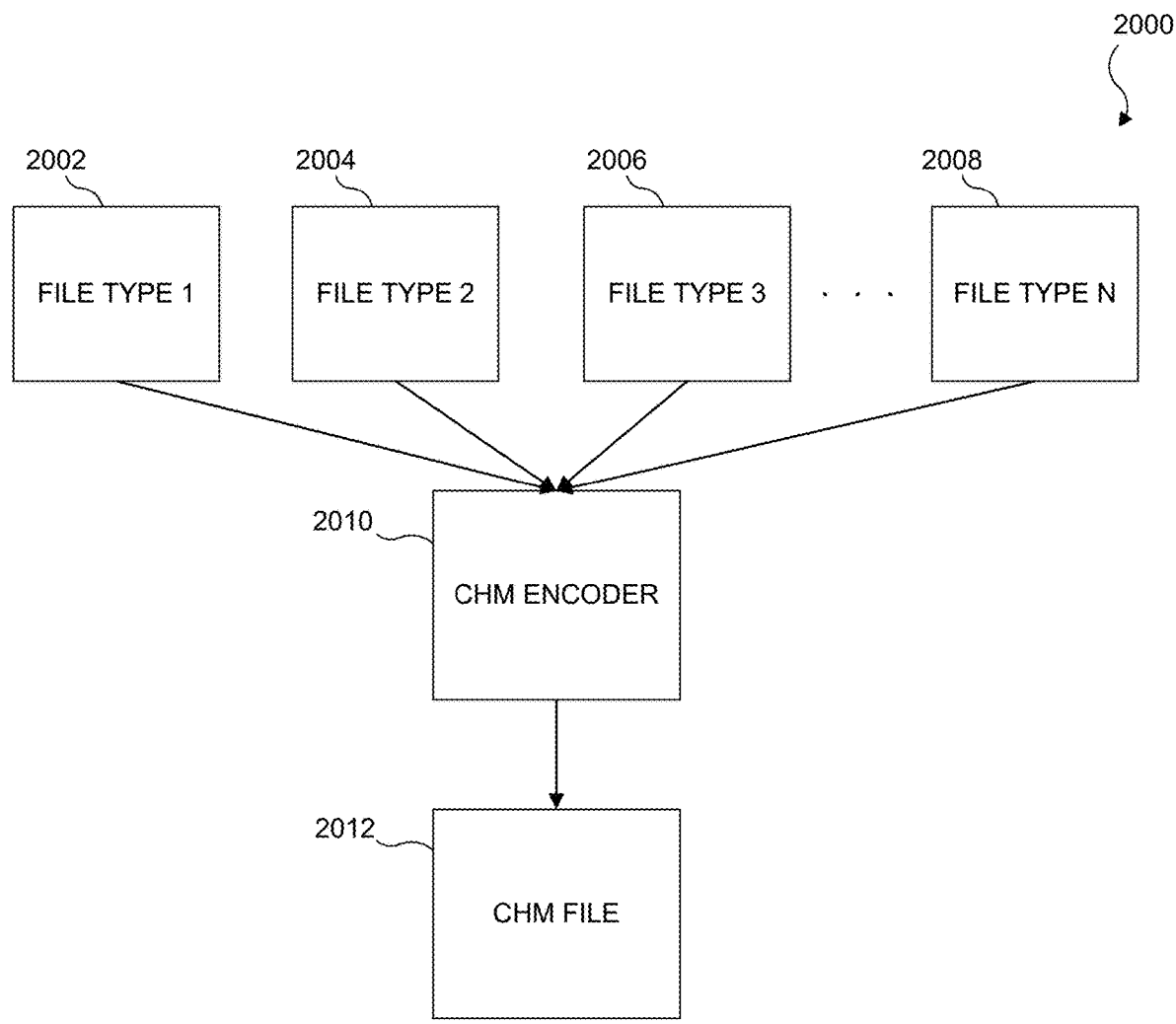
FIG. 20 illustrates a diagrammatic view of a CHM file encoding process wherein files of multiple file types are encoded in accordance with various embodiments of the present disclosure.

Referring now to FIG. 20, there is illustrated a diagrammatic view of a CHM file encoding process 2000 wherein files of multiple file types are encoded in accordance with various embodiments of the present disclosure. A CHM file may include the bytes of any number of files of various file types blended into the CHM file and later decoded out of the CHM file. FIG. 20 illustrates a plurality of files each having a file type being encoded into a single CHM file. There is shown a file of a first file type 2002, a file of a second file type 2004, a file of a third file type 2006, and a file of an nth file type 2008, indicating that there may be any number of files, each having a different file type. It will be understood that multiple files of the same file type may also be included, such as including three image files, two audio files, and four text documents, for example. The plurality of files may be sent to a CHM encoder 2010. The CHM encoder 2010 encodes all of the plurality of files into a CHM file 2012. The encoding process may be performed in as described herein to evenly distribute the bytes of each of the files within the CHM file 2012.

Figure 21:
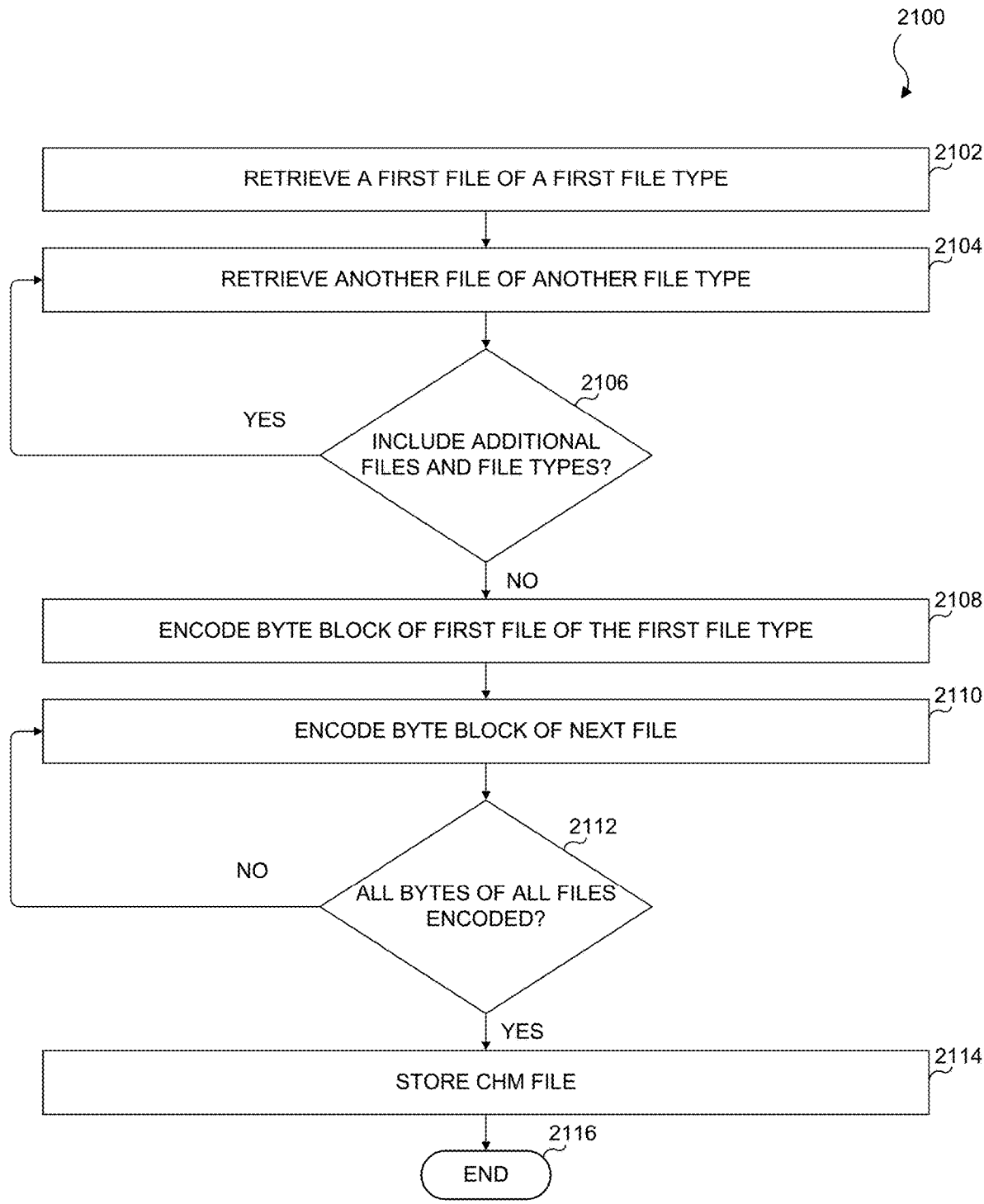
FIG. 21 illustrates a flowchart of a CHM file encoding process wherein files of multiple file types are encoded in accordance with various embodiments of the present disclosure.

Referring now to FIG. 21, there is illustrated a flowchart of a CHM file encoding process 2100 wherein files of multiple file types are encoded in accordance with various embodiments of the present disclosure. The process 2100 begins at step 2102, where a first file of a first file type is retrieved. At step 2104, another file of another file type is retrieved. At decision block 2106, it is determined whether additional files and files of other types are to be included in the encoding process. If so, the process moves back to step 2104 to retrieve another file. If at decision block 2106 it is determined that no additional files or file types are to be included in the encoding process, the process flows to step 2108. At step 2108, a byte block of the first file of the first file type is encoded. At step 2110, a byte block of the next file retrieved is encoded. At decision block 2112, it is determined whether all byte of all files have been encoded. If not, the process 2100 moves back to step 2110 to encode the next byte block. In step 2110, the "next" file may be a file that the encoding process returns to in order to write the next byte block from that file. For instance, if the process 2100 is encoding three files into a CHM file, step 2108 may be performed to encode the first byte block of the first file, step 2110 may be performed to write the first byte block from the second file, and at decision block 2112 it is determined that not all bytes have yet been written. The process 2100 would then move back to step 2110 to write the first byte block of the third file. After determining again at decision block 2112 that not all bytes have been written, the process 2100 may move back to step 2110 to write the next byte block of the first file, and so on until all bytes from all files are encoded. Once at decision block 2112 it is determined that all bytes from all files have been decoded, at step 2114 the CHM file is stored. The process 2100 then ends at step 2116.

Figure 22:
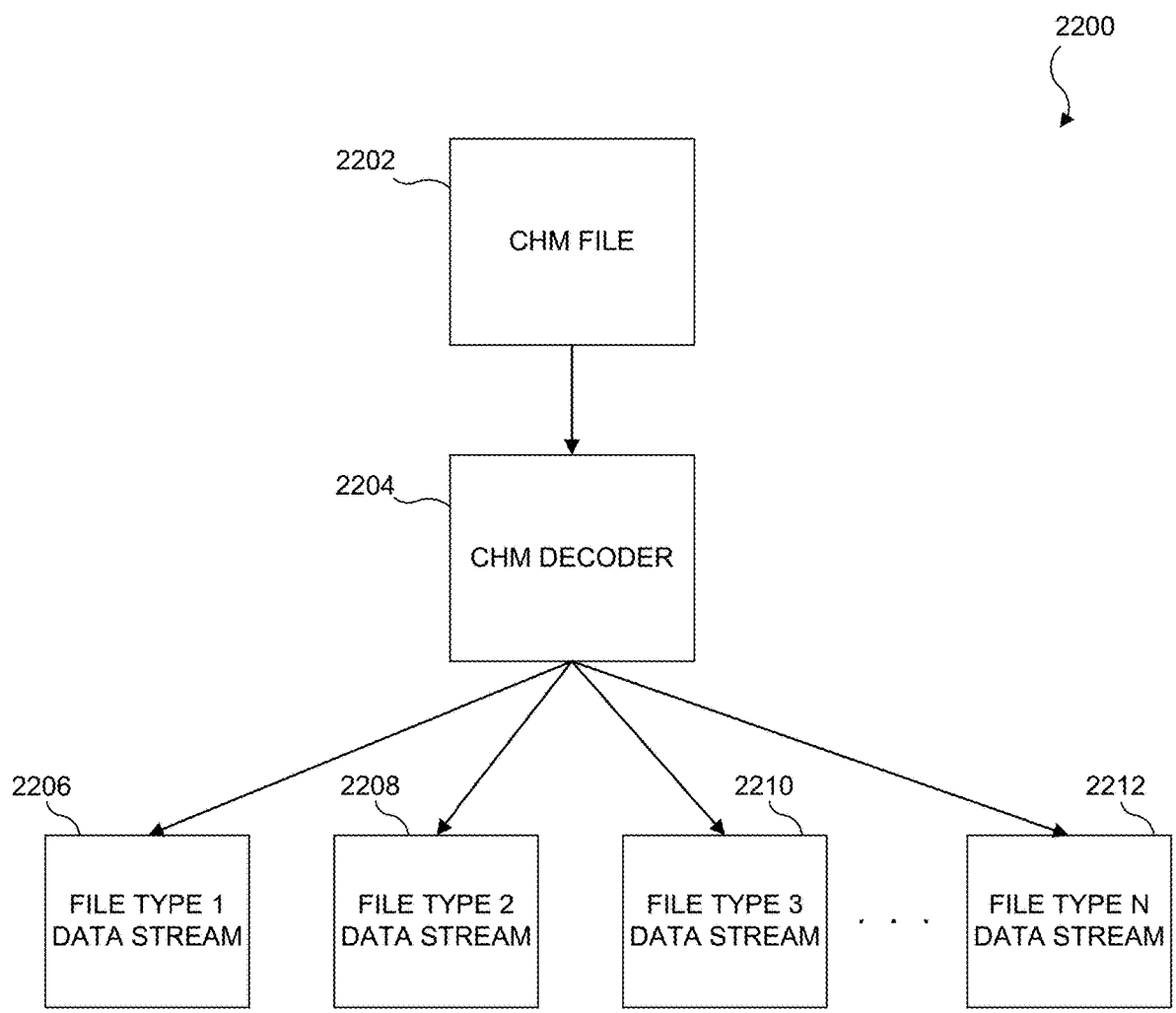
FIG. 22 illustrates a diagrammatic view of a CHM file decoding process wherein files of multiple file types are decoded, in accordance with various embodiments of the present disclosure.

Referring now to FIG. 22, there is illustrated a diagrammatic view of a CHM file decoding process 2200 wherein files of multiple file types are decoded, in accordance with various embodiments of the present disclosure. A CHM file 2202 containing the blended bytes of a plurality of files of various file types is processed by a CHM decoder 2204. The CHM decoder 2204 may perform a decoding operation such as those described herein. The CHM decoder 2204 decodes the CHM file 2202 into a plurality of data streams of various file types. There is shown in FIG. 22 a data stream of a first file type 2206, a data stream of a second file type 2208, a data stream of a third file type 2210, and a data stream of an nth file type 2212.

Figure 23:
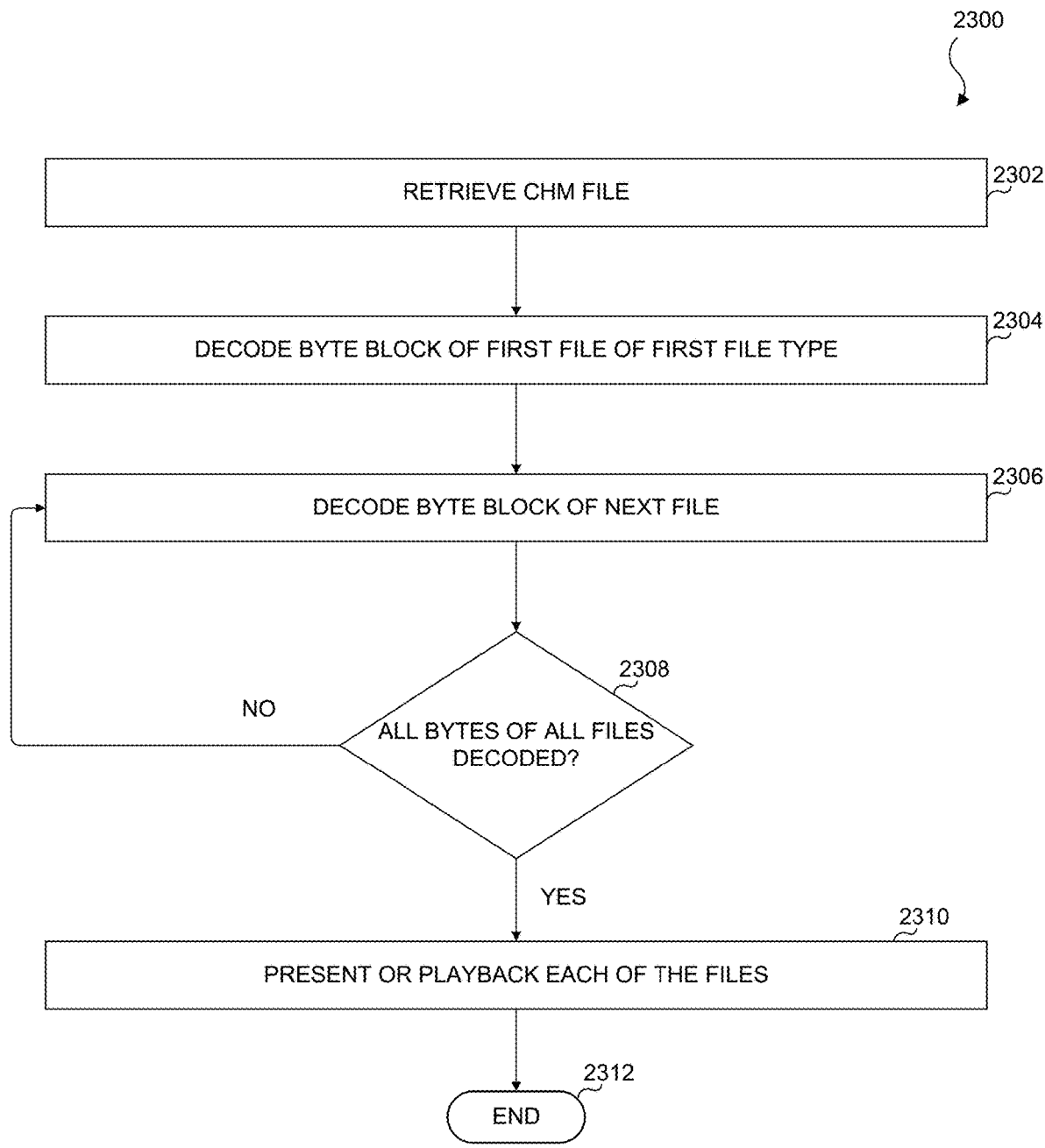
FIG. 23 illustrates a flowchart of a CHM file decoding process wherein files of multiple file types are decoded, in accordance with various embodiments of the present disclosure.

Referring now to FIG. 23, there is illustrated a flowchart of a CHM file decoding process 2300 wherein files of multiple file types are decoded, in accordance with various embodiments of the present disclosure. The process 2300 begins at step 2302 where a CHM file is retrieved. At step 2304, a byte block of a first file of a first file type is decoded from the CHM file. At step 2306, a byte block of a next file is decoded. At decision block 2308, it is determined whether all bytes of all the files have been decoded. If not, the process 2300 moves back to step 2306 to decode the next byte block of the next file. If it decision block 2308 it is determined that all bytes have been decoded, the process 2300 flows to step 2310. At step 2310, the decoded files may be presented or played back to a user. The process then ends at end block 2312.

Figure 24:
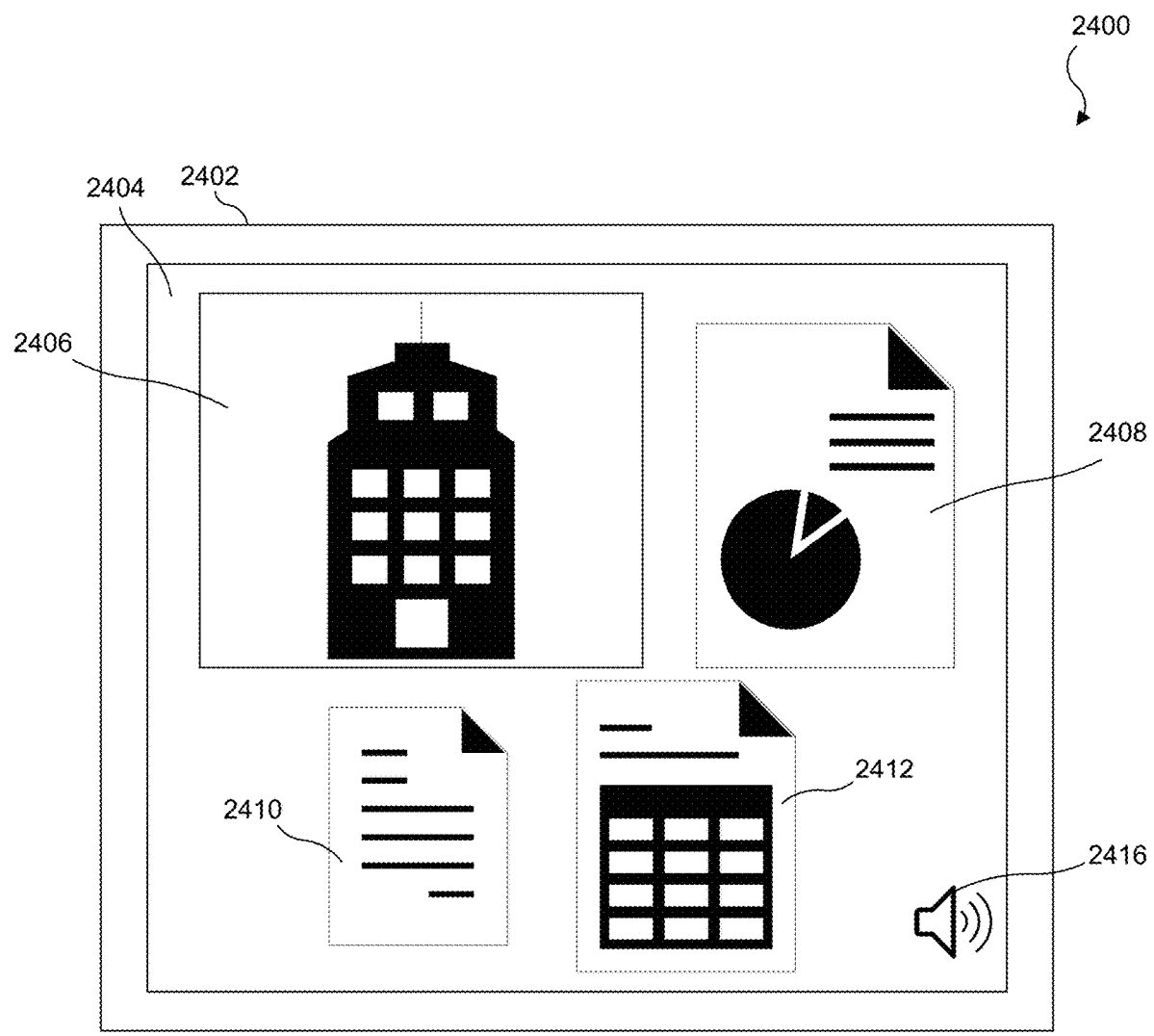
FIG. 24 illustrates a diagrammatic view of a multiple file type CHM presentation in accordance with various embodiments of the present disclosure.

Referring now to FIG. 24, there is illustrated a diagrammatic view of a multiple file type CHM presentation 2400, in accordance with various embodiments of the present disclosure. The presentation 2400 may be presented to a user after or during a successful CHM decoding operation such as that described herein. The presentation 2400 shows that a CHM file may allow for a full suite of files and information to be presented to a user. FIG. 24 illustrates a device 2402 including a screen 2404. The presentation 2400 presents on the screen 2404 a plurality of files of various file types For example, and as shown in FIG. 24, there may be presented an image 2406, a presentation document 2408 (such as a Microsoft Powerpoint document), a text document 2410, and a spreadsheet document 2412. While a user is viewing these files of differing file types, audio 2414 may be played back to provide the user additional information concerning what the user is seeing on the screen 2404.

Figure 25:
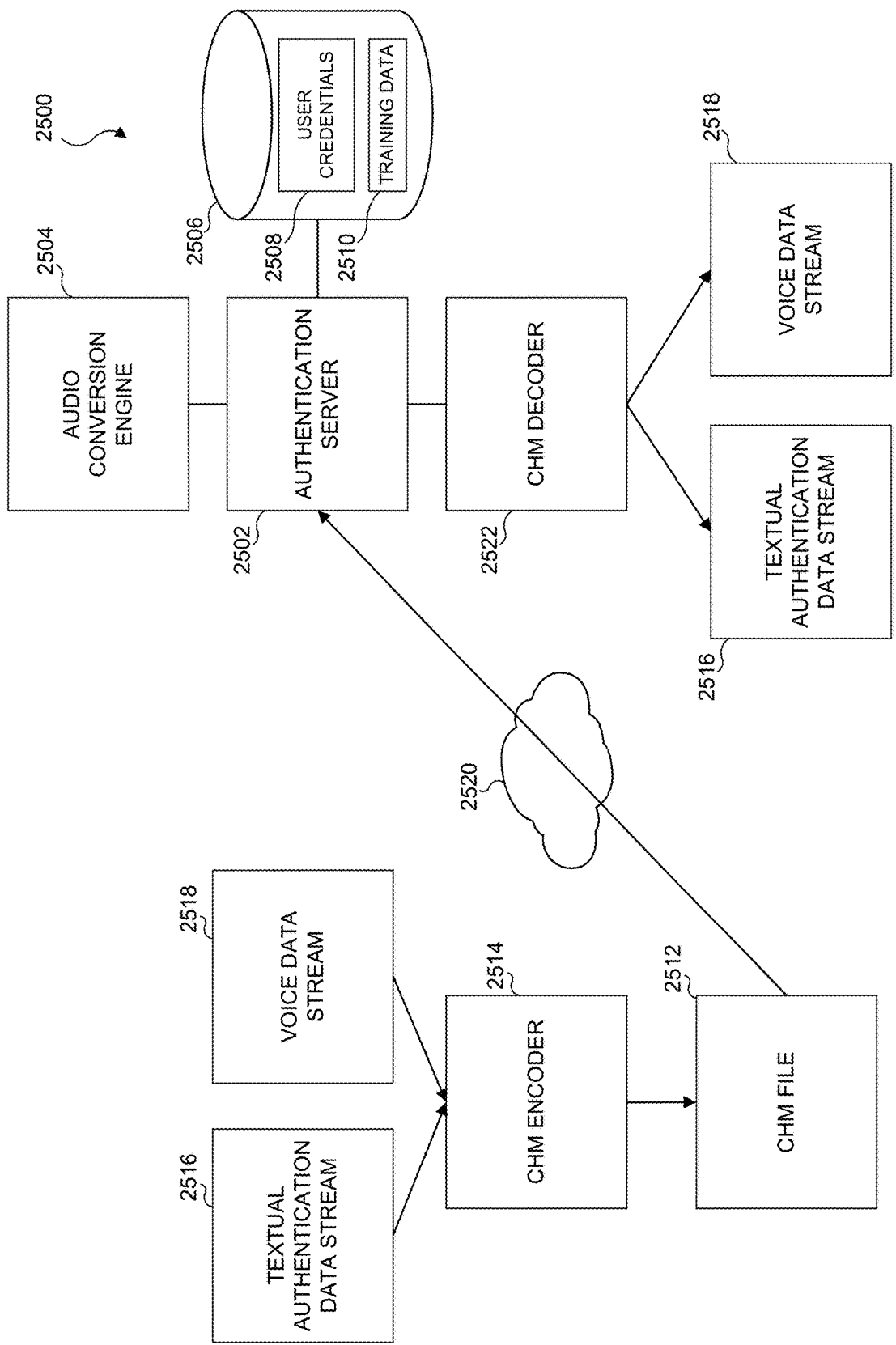
FIG. 25 illustrates a diagrammatic view of a voice authentication system utilizing CHM files, in accordance with various embodiments of the present disclosure.

Referring now to FIG. 25, there is illustrated a diagrammatic view of a voice authentication system 2500 utilizing CHM files, in accordance with various embodiments of the present disclosure. The system 2500 includes an authentication server 2502. The authentication server 2502 may include an audio conversion engine 2504 and a database 2506. The authentication server 2502 may use the audio conversion engine 2504 to recognize speech and convert audio to text and may use the database 2506 to recognize user speech patterns and commands to perform voice authentication for various purposes. The database 2506 may include user credentials 2508 and training data 2510. The user credentials 2508 may include user authentication data such as usernames, passwords, answers to security questions, and other information that the system might use to authenticate a user. The training data 2510 may include user-specific data that has been accumulated over time as the user has utilized the authentication server 2502 to authenticate items. The training data 2510 may record the speech patterns of a user to recognize the specific speech patterns for the user. The authentication server may perform voice recognition through acoustic and/or language modeling to determine what a user is saying in audio provided to the authentication server 2502.

The authentication server 2502 may receive a CHM file 2512 to be used in authentication. The authentication may be performed for various reasons, such as to authenticate a login on a website, authenticate access to documents, etc. For example, a user may be provided a contract to be viewed only by the user. In order to access the contract, the user may need to first authenticate the user's identity by providing a voiced command or password. As another example, a website or other service provided to the user such as a mobile device app, etc., that allows for accounts to be created may use voice authentication to login. If a user who previously created an account with a website is for some reason banned from the website, the server may keep a record of the user's voice authentication data. If that user ever tries to create a new account on the website to circumvent the ban, the website may ask for voice authentication to be set up by the user. The server may then check banned user voice authentication or training data in order to determine if the user attempting to create the new account has been banned previously. If so, the account creation may be denied.

A CHM encoder 2514 may receive a textual authentication data stream 2516 including items such as a username password, etc., and may also receive a voice data stream 2518. The CHM encoder 2514 may encode the textual authentication data stream 2516 and the voice data stream 2518 into the CHM file 2512. The CHM file 2512 may be transmitted over a network 2520 to the authentication server 2502 by a mobile device (not shown). Upon receiving the CHM file 2512, the authentication server 2502 may decode the CHM file 2512 to separate the textual authentication data stream 2516 from the voice data stream 2518. The authentication server 2502 may then compare the textual authentication data stream 2516 to the user credentials 2508 stored on the database 2506. If the textual authentication data stream 2516 provided matches the user credentials 2508 stored on the database 2506, the system may then perform speech recognition on the speech data proved by the user.

The speech may be received initially through a microphone and the analog sound waves are converted into a digital format by an analog-to-digital (A/D) converter. The digital data may be converted into a spectrogram showing how the frequencies of sound change in intensity over time using fast Fourier transform FFT. The data may then be separated into acoustic frames. The speech data may be analyzed for specific phonemes, phones, formants, etc. to recognize what is being said in the speech data. The speech patterns may also be analyzed to determine who is speaking in the recording. Over time, a user's training data is updated to more effectively recognize speech from that user. The system 2500 may also utilize neural networks to assist in speech recognition.

Figure 26:
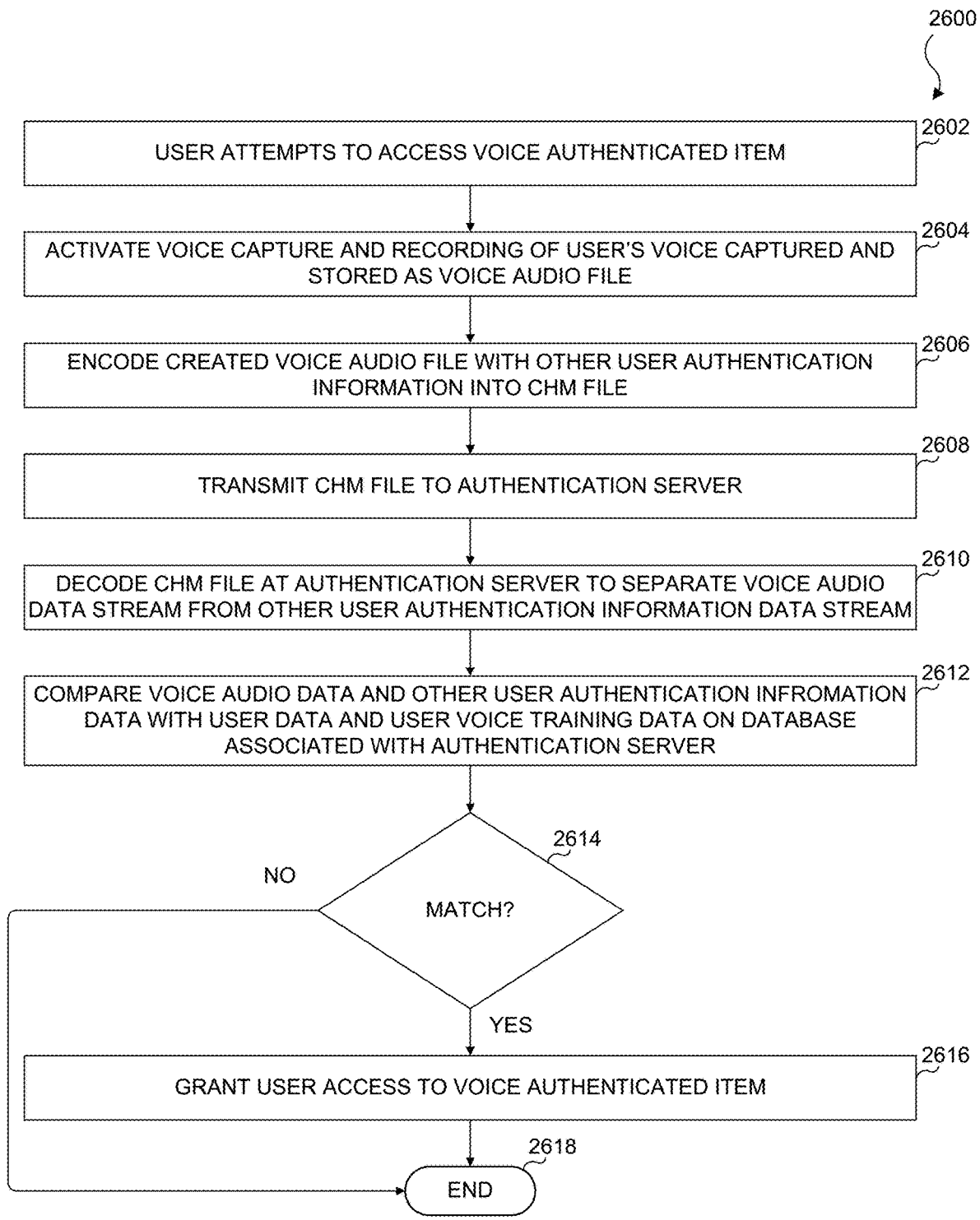
FIG. 26 illustrates a flowchart of a voice authentication process utilizing CHM files, in accordance with various embodiments of the present disclosure.

Referring now to FIG. 26, there is illustrated a flowchart of a voice authentication process 2600 utilizing CHM files, in accordance with various embodiments of the present disclosure. The process 2600 begins at step 2602 where a user attempts to access a voice authenticated item. At step 2604, the voice capture is activated and a recording of the user's voice is captured and stored as a voice audio file. At step 2606, the created voice audio file is encoded with other user authentication information into a CHM file, as described herein. The other user authentication information may include usernames, passwords, personal information, security questions and answers, etc. The other user authentication information may be in a text data type of format. At step 2608, the encoded CHM file is transmitted to an authentication server.

At step 2610, the authentication server decodes the CHM file to separate the voice audio data stream from the other user authentication information data stream. At step 2612, the authentication server compares the voice audio data with voice training data on an associated database and may also perform speech recognition processes using an audio conversion engine. Also, at step 2612, the authentication server may compare the other user information data with user data stored on the authentication server or associated database. At decision block 2614, it is determined whether there is a match between the other user authentication information and the user data stored on the authentication server or associated database, as well as if there is a match between the voice audio data and the training data. If there is a match, the process 2600 moves to step 2616 and grants the user access to the voice authenticated item. The process 2600 then ends at end block 2618. If at decision block 2614 no match is found, the process 2600 ends at end block 2618.

Figure 27:
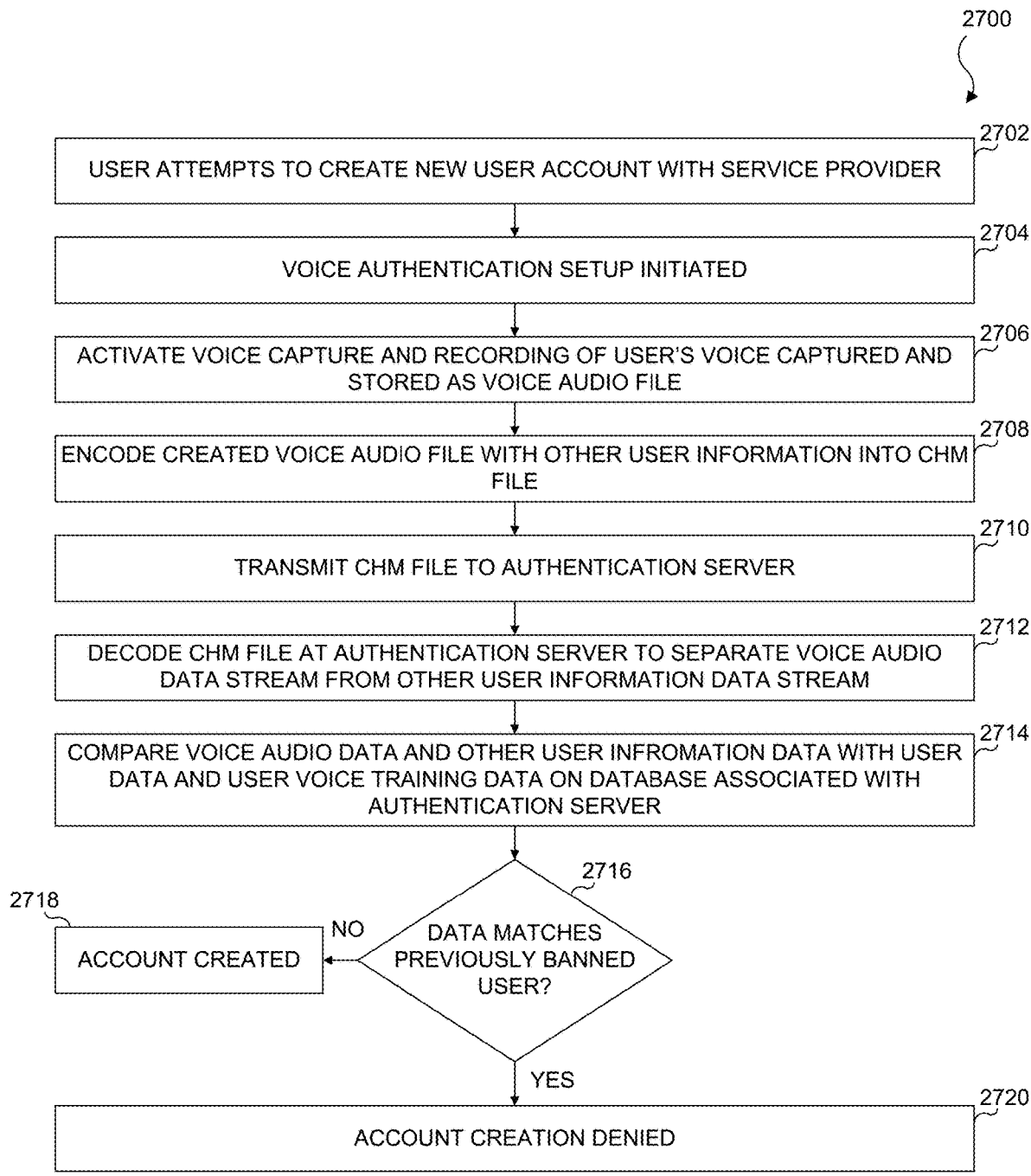
FIG. 27 illustrates an account creation abuse prevention process, in accordance with various embodiments of the present disclosure.

Referring now to FIG. 27, there is illustrated an account creation abuse prevention process 2700, in accordance with various embodiments of the present disclosure. At step 2702, a user attempts to create a new user account with a service provider, such as a website or other service provided to users such as a mobile device app, etc., that allows for accounts to be created. At step 2704, voice authentication setup is initiated. The voice authentication setup may be required to complete account creation. At step 2706, voice capture is activated and a recording of the user's voice is captured and stored as a voice audio file. At step 2708, the created voice audio file is encoded with other user information into a CHM file, as described herein. The other user information may include information the user has entered to be used for the user's potential new account, such as usernames, passwords, personal information, security questions and answers, etc. The other user information may be in a text data type of format. At step 2710, the encoded CHM file is transmitted to an authentication server.

At step 2712, the authentication server decodes the CHM file to separate the voice audio data stream from the other user information data stream. At step 2714, the authentication server compares the voice audio data with voice training data on an associated database and may also perform speech recognition processes using an audio conversion engine. Also, at step 2714, the authentication server may compare the other user information data with user data stored on the authentication server or associated database. At decision block 2716, it is determined whether the data decoded from the CHM file matches data stored on the authentication server or the associated database for a user that was previously banned from the service. All the textual user information may be checked against user data stored on the authentication server or the database for a match.

In some cases, if the user is attempting to create an account after another account owned by the user was banned, the user may use false textual data to try to create a new account. Therefore, the authentication server may also compare the voice data decoded from the CHM file against voice data stored on the authentication server or the database to determine if the user's voice data is already present on the database. If no match is found, at step 2718, the user account may be created, barring no other issues. If at decision block 2716 a match is found, at step 2720, account creation may be denied to prevent the user from abusing account creation to circumvent a ban on the user's account.

Figure 28:
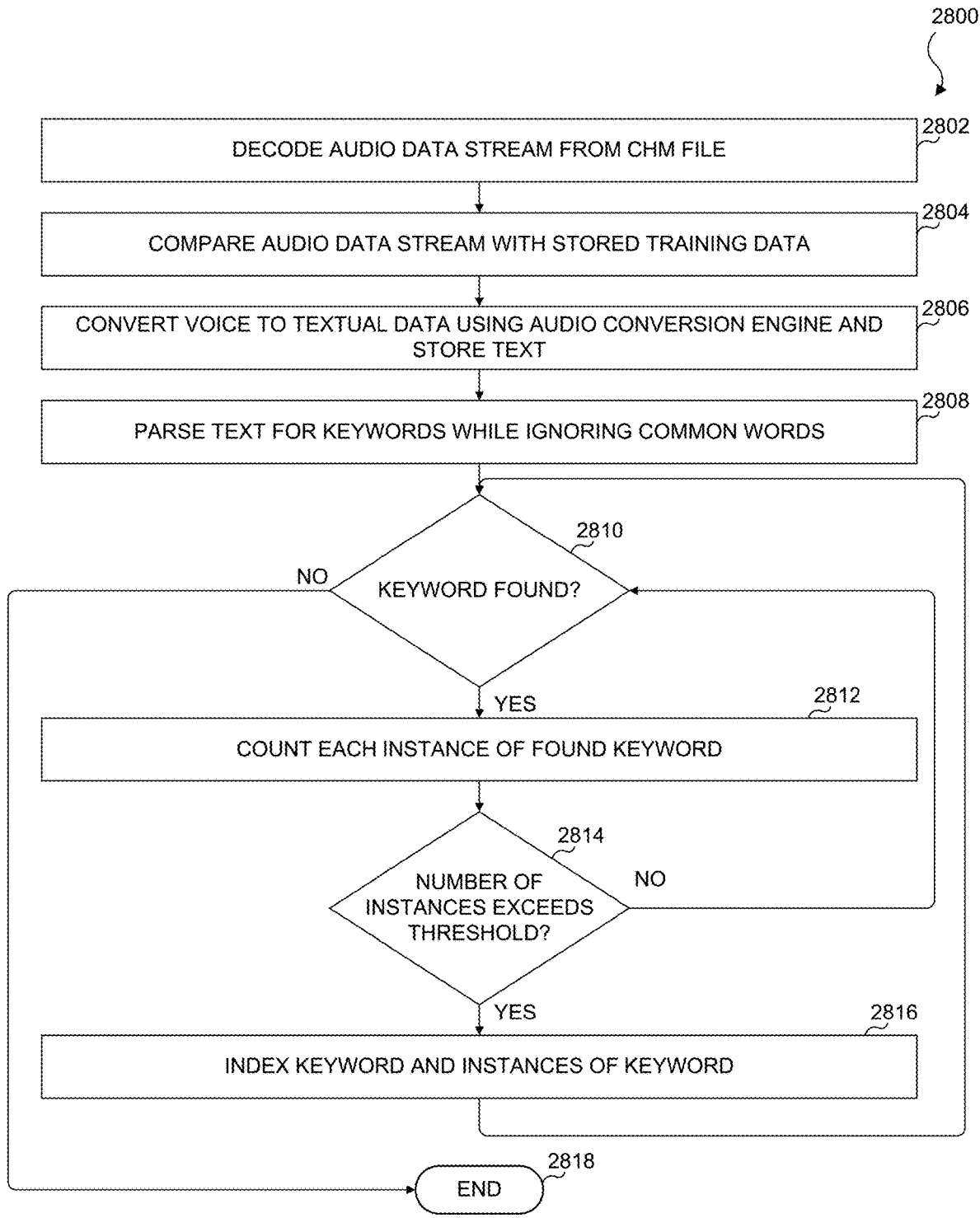
FIG. 28 illustrates a voice-to-text and indexing process utilizing CHM files, in accordance with various embodiments of the present disclosure.

Referring now to FIG. 28, there is illustrated a voice-to-text and indexing process 2800 utilizing CHM files, in accordance with various embodiments of the present disclosure. The process 2800 begins at step 2802 where a device, such as authentication server 2502, decodes an audio data stream from a CHM file. At step 2804, the audio data stream is compared to stored training data. At step 2806, the audio data stream is converted to textual data, such as by the audio conversion engine 2504, and the textual data is stored. At step 2808, the stored textual data is parsed for keywords, while ignoring common words. For example, the system may be configured to recognize verbs and nouns, and ignore article adjectives, conjunctions, etc.

At decision block 2810, it is determined whether a keyword is found during the text parsing operation of step 2808. If not, the process 2800 ends at end block 2818. If so, the process 2800 flows to step 2812. At step 2812, each instance of the particular keyword found during the parsing operation is counted. At decision block 2814, it is determined whether the number of instances counted for the keyword exceeds a threshold. In some embodiments, the number of times a keyword appears may be used in determining whether to index that keyword. For example, if the word is only used one time, the word may not be indexed. However, if the word is used over ten times, for example, the word may be indexed. If at decision block 2814 it is determined that the number of counted instances for the keyword does not exceed the threshold, the process 2800 moves back to decision block 2810 to determine if another keyword is found. If at decision block 2814 it is determined that the number of counted instances for the keyword exceeds the threshold, the process moves to step 2816. At step 2816, the keyword and the instances of the keywords are indexed. The process then moves back to decision block 2810 to determine if additional keywords are found during the parsing operation. If not, the process 2800 ends at end block 2818.

Figure 29:
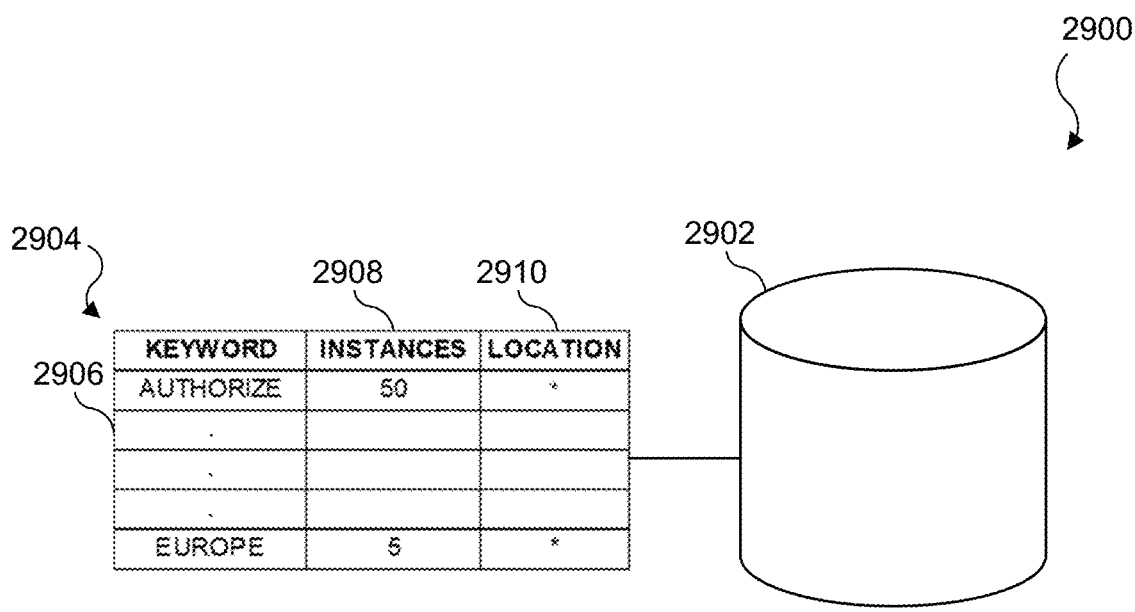
FIG. 29 illustrates a diagrammatic view of a database keyword index system, in accordance with various embodiments of the present disclosure.

Referring now to FIG. 29, there is illustrated a diagrammatic view of a database keyword index system 2900, in accordance with various embodiments of the present disclosure. There is illustrated a database 2902 having stored thereon keyword data 2904. The keyword data 2904 may be user-specific, or may encompass all users who provided text to the database 2902. The keyword data may include keywords 2906. The keywords 2906 may be all keywords previously indexed. The keyword data 2904 may also include instance data 2908 that includes the number of instances a keyword was used. Location data 2910 may also be stored. The location data 2910 may indicate where the text data that the keyword appears is stored in association with the database, such as a server. The location data 2910 may also be configured to point to each specific instance of the keyword. For example, if a keyword appears five times in a particular document, the location data 2910 may provide a file path to that document, and a link to each instance of the keyword within that document.

Figure 30:
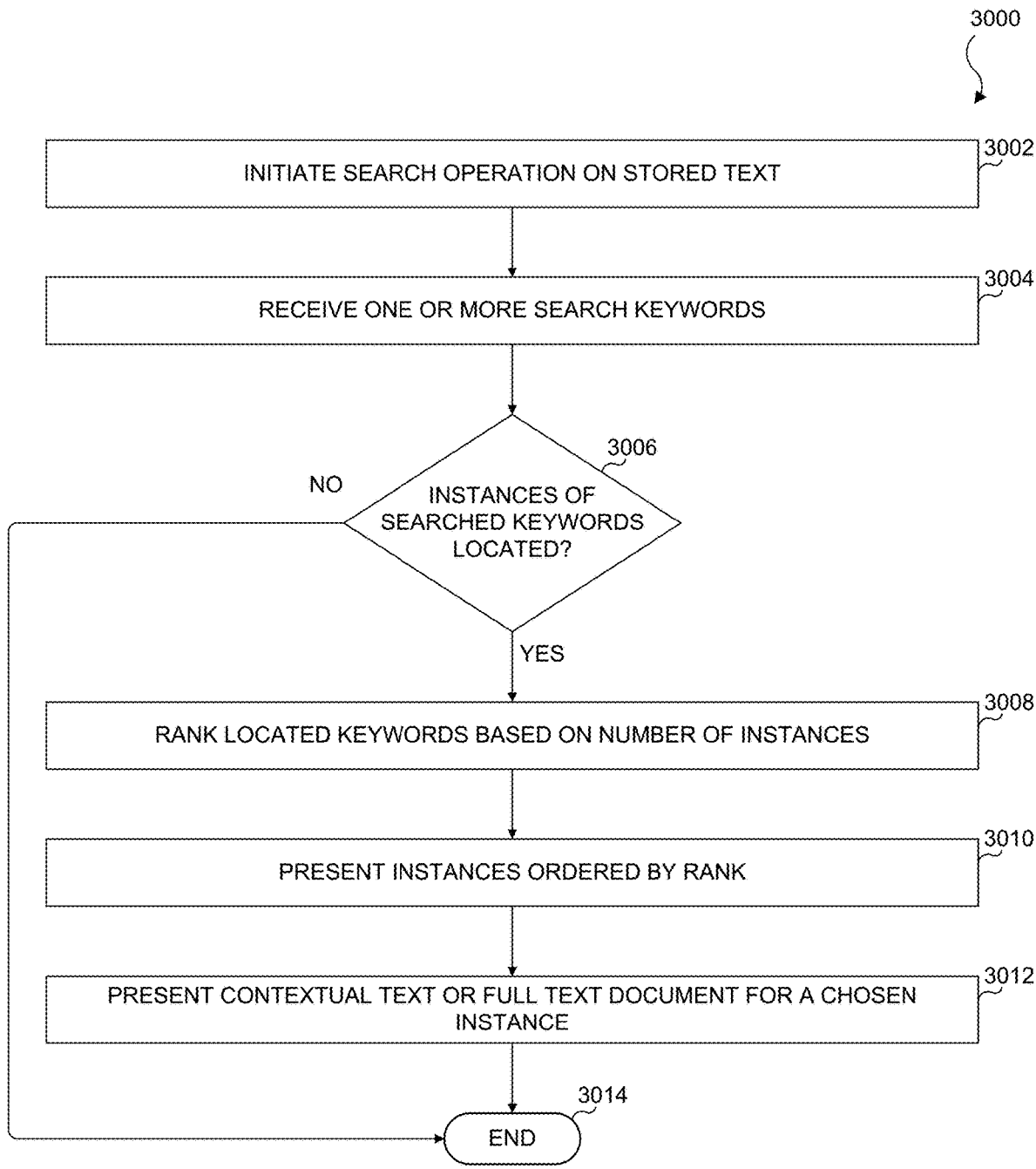
FIG. 30 illustrates a keyword search process, in accordance with various embodiments of the present disclosure.

Referring now to FIG. 30, there is illustrated a keyword search process 3000, in accordance with various embodiments of the present disclosure. The process 3000 begins at step 3002 where a search operation is initiated on stored text. At step 3004, one or more search keywords are received by a device, such as a server. At decision block 3006, it is determined whether any instances of the one or more search keywords are found. If not, the process 3000 ends at end block 3014. If so, the process 3000 moves to step 3008. At step 3008, the located keywords are ranked based on the number of instances for that keyword. At step 3010, the instances of the found keywords may be presented to a user in a list ordered by rank. At step 3012, in response to the user selecting one of the presented instances of the found keywords, contextual text or the full text document in which the keyword appears may be presented to the user. The process 3000 then ends at end block 3014.

Figure 31:
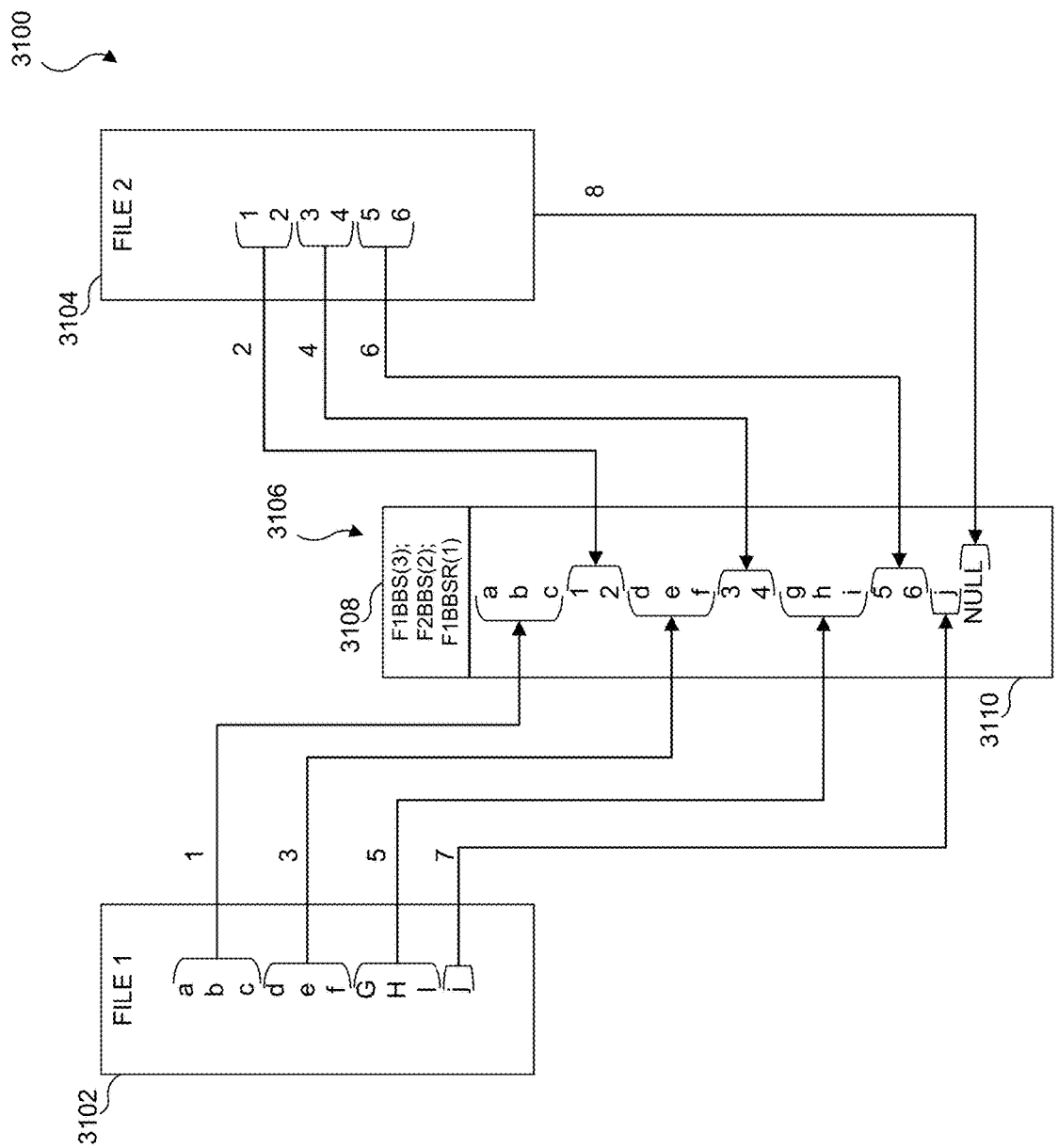
FIG. 31 illustrates a diagrammatic view of a combined file encoding process with remainders in accordance with various embodiments of the present disclosure.

Referring now to FIG. 31, there is illustrated a diagrammatic view of a combined file encoding process 3100 with remainders. There is illustrated a first file 3102, and second file 3104, and a combined file 3106. It is determined in accordance with processes described herein that the byte block size for the first file is 3 bytes, while the byte block size for the second file is 2 bytes. Either before encoding the bytes to the combined file 3106, or after such encoding, a header section 3108 of the combined file 3106 may be populated with information pertaining to the first file 3102 and the second file 3104. This information may include the byte block size assigned to the first file 3102 and the second file 3104. For example, as shown in FIG. 31, the header section 3108 includes the information "F1BB S(3); F2BB S(2); F1BBSR(1)," which indicates that the first file byte block size is equal to 3, the second file byte block size is equal to 2, and the first file has a remainder of bytes equal to 1 byte.

As illustrated in FIG. 31, the combined file 3106 has a body section 3110 including a plurality of bytes. Since the byte block size for the first file 3102 is three, at a first step the first three bytes of the first file 3102 are written to the combined file 3106. Since the byte block size for the second file 3104 is two, at a second step the first two bytes from the second file 3104 are written to the combined file 3106 after the first three bytes written to the combined file 3106 from the first file 3102 in the first step. At a third step, the next three bytes of the first file 3102 are written to the combined file 3106 after the first two bytes written to the combined file from the second file 3104. At a fourth step, the next two bytes are written from the second file 3104 to the combined file 3106. At a fifth step, the next three bytes are written from the first file 3102 to the combined file 3106. At a sixth step, the next, and last, two bytes are written from the second 3104 file to the combined file 3106.

At a seventh step, the first file only has one byte left, which is smaller than the assigned three byte block size. The encoder may have already analyzed the first file 3102 and determined there would be one byte left, or the encoder may have set the byte block size for the first file 3102 and, when encountering the end of the file with a number of bytes less than the byte block size, the encoder simply takes the remaining bytes and writes them to the combined file 3106. At an eighth step, the second file 3104 may be checked again, and it may be determined that the second file 3104 does not have any bytes left. In this case the encoder may simply move on, or it may write a NULL value in the combined file 3106.

Figure 32:
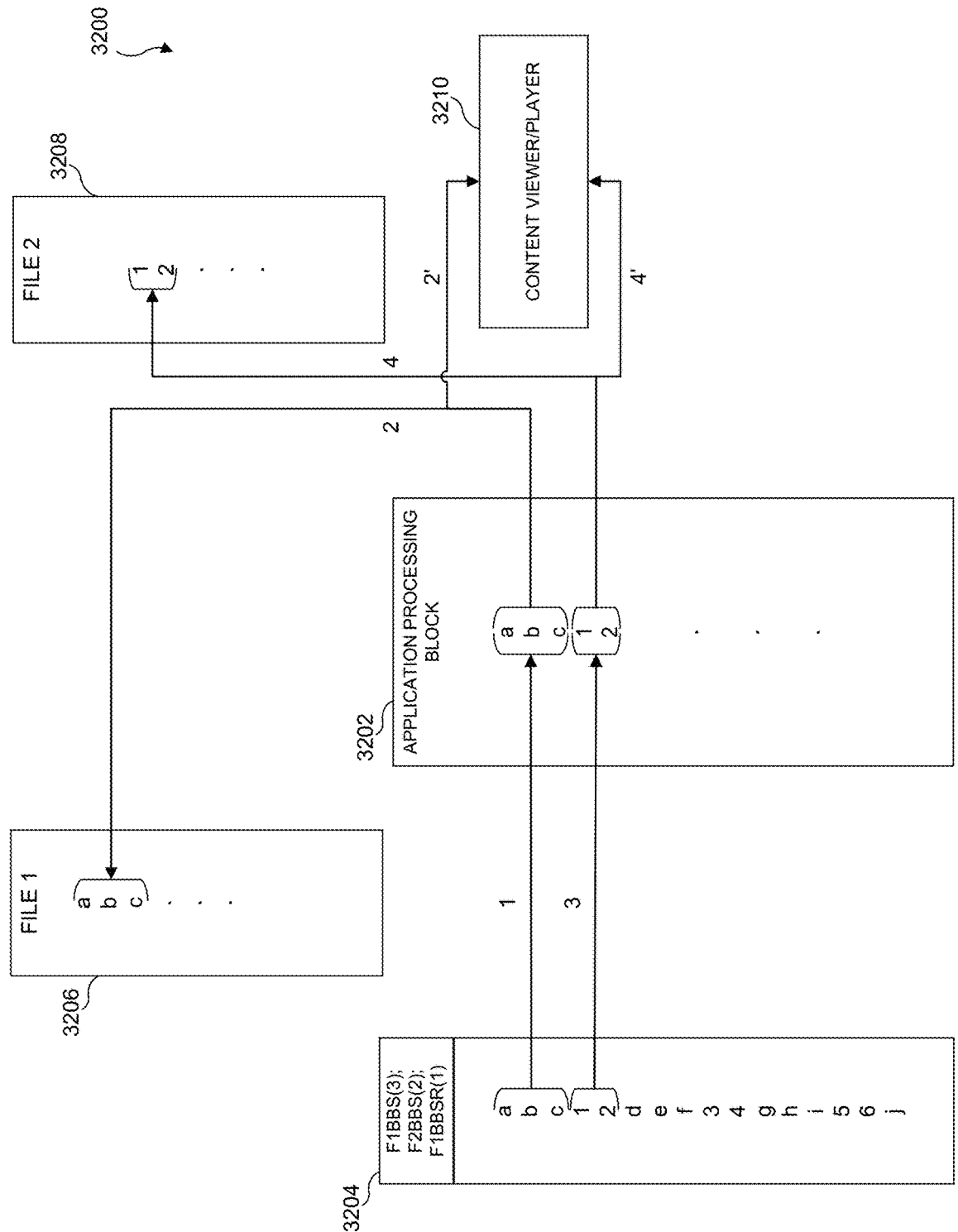
FIG. 32 illustrates a diagrammatic view of a combined file decoding process in accordance with various embodiments of the present disclosure.

Referring now to FIG. 32, there is illustrated a diagrammatic view of a combined file decoding process 3200. The process 3200 includes an application processing block 3202 that may be part of the codec or decoder, or part of another application, such as an application that calls a codec or an encoder/decoder API in order to perform encoding or decoding steps. A combined file 3204 is decoded to extract data streams pertaining to a first file 3206 and a second file 3208. During the decoding process, the application processing block 3202 may receive data streams pertaining to the first file 3206 and the second file 3208 a byte block at a time. As the application processing block 3202 receives each byte block, the application processing block 3202 may write the byte block to the appropriate one of the first file 3206 or the second file 3208. At substantially the same time, the application processing block 3202 may also utilize the byte blocks for further processing or for displaying content included within the byte blocks.

For example, as illustrated in FIG. 32, at a first step 1 a byte block the size of three bytes is copied from the combined file 3204 by the application processing block 3202. At a second step 2, the application processing block writes to the first file 3206 the byte block copied in the first step 1. At substantially the same time as the second step 2, a step 2' is taken to provide the bytes copied in the first step 1 to a content viewer or player 3210, to display the content copied from the combined file 3204 so far. For example, if the content viewer or player 3210 allows for audio to be played back, and the bytes copied in the first step 1 pertain to audio content, the content viewer or player 3210 may begin playing the partial audio file copied in the first three bytes of the combined file 3204. Thus, since streams of data are being pulled from the combined file 3204, this data can be used even before all the data byte are copied from the combined file 3204 and written to the first file 3206 and the second file 3208.

At a third step 3, the application processing block 3202 copies the next two bytes from the combined file 3204 that pertain to the second file 3208. At a fourth step, the application processing block 3202 writes the two bytes copied at the third step 3 to the second file 3208. At substantially the same time, at a step 4', the application processing block 3202 may provide the two bytes copied in the third step 3 to the content viewer or player 3210 so that the content viewer or player 3210 may begin using the data stream pertaining to the second file 3208. This pattern may continue until all the bytes from the combined file have been copied and written to the first file 3206 and the second file 3208.

Figure 33:
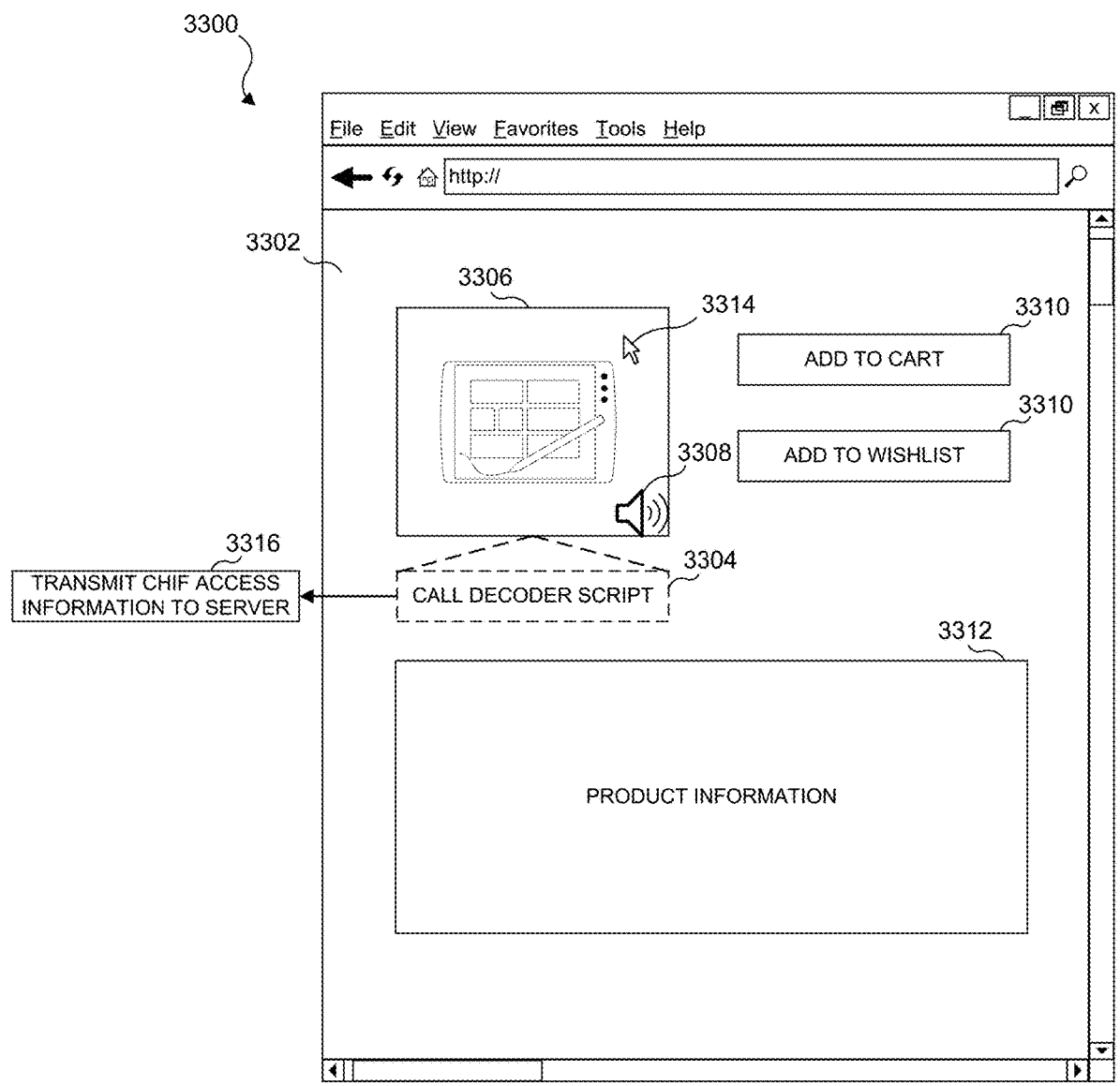
FIG. 33 illustrates a browser window showing a webpage that includes a call to a decoder script according to various embodiments of the present disclosure.

FIG. 33 illustrates a browser window 3300 showing a webpage 3302 that includes a call 3304 to a decoder script according to various embodiments of the present disclosure. The webpage 3302 further includes an image 3306 with accompanying audio 3308 presented on the webpage 3302. As described with respect to FIG. 12, a CHM, or CHIF, file may be received by a device on which a browser or other means of accessing web content resides. In some embodiments, the call 3304 to the decoder script initiates a decoding process by the script. In some embodiments, the script can be in JavaScript or another scripting language.

In some embodiments, the decoder script is stored as a component of the webpage 3302, and the call 3304 to the script stored on the webpage 3302 causes the script to decode the CHIF file that includes the image 3306 and the audio 3308, to both display the image 3306 and playback the audio 3308 in the webpage 3302. In some embodiments, the call 3304 to the decoder script transmits a request to a server to decode the CHIF file and then transmit the separated content to the device on which the webpage is loaded, the separated content providing the content to be presented on the webpage 3302. Once the webpage 3302 is loaded in the browser window 3300 the image 3306 and other webpage content such as user interaction buttons 3310 and textual product information 3312 may be presented. The audio 3308 may begin playing once the website is loaded, or the audio 3308 may only play upon a trigger instructing the audio 3308 to play. For example, the audio 3308 may only play when a mouse cursor 3314 is placed over the image 3306, when the image 3306 is clicked on, or when the webpage 3302 is scrolled such that the image 3306 is viewable in the browser window 3300, with the audio 3308 stopping once the user scrolls away from the image 3306.

Block 3316 illustrates a function of the decoder script. Block 3316 illustrates that the decoder script transmits CHIF access information to the server. The CHIF access information can include various data concerning the CHIF file embedded in the webpage, the user or user device that initiated the decoding of the CHIF file, the webpage 3302 or owner of the webpage 3302, or other data. For example, the decoder script can be configured to transmit to the server information concerning the identity of the particular user that navigated to the webpage and viewed the CHIF file content, device data of that particular user's electronic device used to view the webpage 3302, information regarding the nature of the CHIF file, or other information. For example, an identity of the user can be transmitted to the server to determine if a user who should not have access to the CHIF file is able to access the file, or for other identification reasons. As another example, the device data can be transmitted to the server to determine the types of devices being used to view CHIF content, in order to manage device compatibility.

As yet another example, the owner of the webpage 3302, the webpage URL, or other information pertaining to the webpage 3302 or the owner can be transmitted to the server to track where CHIF files are being used and decoded. In some embodiments, the CHIF decoder can be proprietary, requiring users who use encoded CHIF files, such as embedding an encoded CHIF file on a webpage, to call the decoding function from the server in order to allow for the decoding of the CHIF files. CHIF file user information, such as the URL or the owner of the webpage 3302, can be transmitted to the server to provide information on who is using encoded CHIF files. In some embodiments, unauthorized usage, such as by the owner of the webpage 3302, the user of the device loading and viewing the webpage 3302, or other sources, can be blocked by the server. For example, when the decoder script is called, the server can determine the entity calling the script, determine if access to use the decoder is authorized, and, if not, block or deny access to, or use of, the CHIF decoder. It will be understood that the CHIF file described with respect to FIG. 33 can include any number of content types, such as text files, audio files, image files, video files, or other file types. In some embodiments, the script can also capture information concerning the CHIF file, such as an identifier assigned to the CHIF file upon creation of the CHIF file, as well as metadata of the CHIF file.

Figure 34:
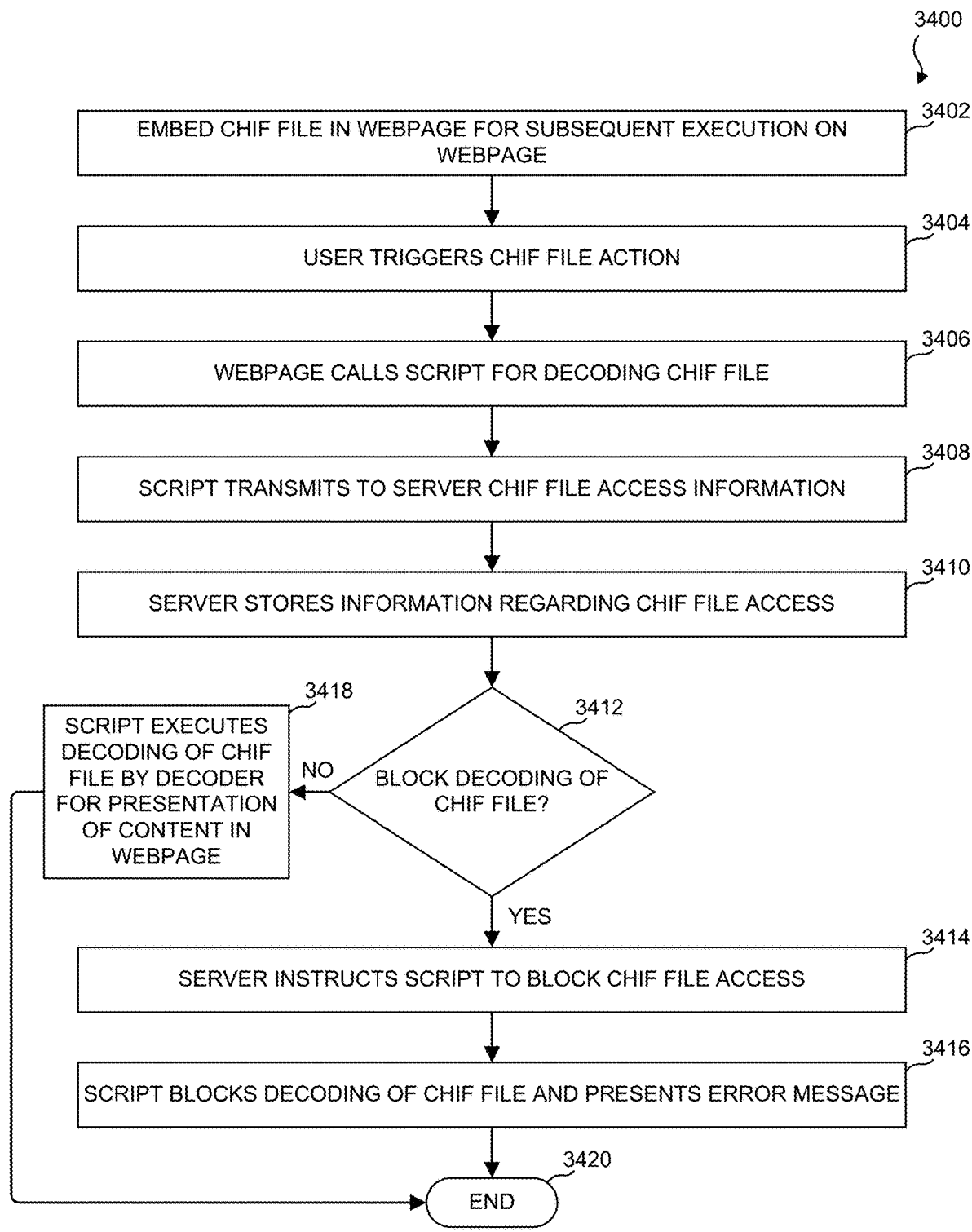
FIG. 34 illustrates a flowchart of a CHIF file decoding and blocking process in accordance with various embodiments of the present disclosure.

FIG. 34 illustrates a flowchart of a CHIF file decoding and blocking process 3400 in accordance with various embodiments of the present disclosure. The process 3400 begins at block 3402. At block 3402, a CHIF file is embedded in a webpage, and stored in a location, for subsequent execution on the webpage. It will be understood that the process 3400 is not limited to embedding CHIF files on webpages and decoding the embedded CHIF file. The process 3400 is applicable to any scenario in which a CHIF file is stored and decoded using a decoder script. For example, a medical office may store a CHIF file including patient documents, and may call a decoder script from a remote server to decode the CHIF file to view the patient documents.

At block 3404, a user triggers a CHIF file action, such as, in the case in which a CHIF file is embedded in a webpage, placing a mouse cursor over an area to display CHIF file contents. At block 3406, the webpage calls a script for decoding the CHIF file. In other embodiments, a decoder script may be otherwise called, such as when a CHIF file stored by an office is loaded into a decoder application that calls a script for remote decoding of the CHIF file. At block 3408, the script transmits CHIF file access information to the server. As described with respect to FIG. 33, the CHIF file access information can include various data concerning the CHIF file, the user or user device that initiated the decoding of the CHIF file, a webpage or owner of a webpage in which a CHIF file is embedded, an owner of a storage system in which a CHIF file is stored, or other data.

For example, the script can be configured to transmit to the server information concerning the identity of the particular user that navigated to the webpage and viewed the CHIF file content, device data of that particular user's electronic device used to view the webpage, or other user or device information. For example, an identity of the user can be transmitted to the server to determine if a user who should not have access to the CHIF file is able to access the file, or for other identification reasons. As another example, the device data can be transmitted to the server to determine the types of devices being used to view CHIF content, in order to manage device compatibility. As yet another example, the owner of the webpage, the webpage URL, or other information pertaining to the webpage, or the owner of the storage location of the CHIF file, can be transmitted to the server to track where CHIF files are being used and decoded. In some embodiments, the CHIF decoder can be proprietary, requiring users who use encoded CHIF files, such as embedding an encoded CHIF file on a webpage, to call the decoding function from the server in order to allow for the decoding of the CHIF files. CHIF file user information, such as the URL or the owner of the webpage, can be transmitted to the server to provide information on who is using encoded CHIF files.

At block 3410, the server stores the CHIF file access information. At decision block 3412, the server determines whether to block decoding of the CHIF file. This determination can be based on the various information of the CHIF file access information described above, such as an identity of a user attempting to decode a CHIF file. The server can deny or block decoding of a CHIF file if a particular user is unauthorized to use the decoding function. If the server determines that decoding of the CHIF file should be blocked, the process 3400 moves to block 3414. At block 3414, the server instructs the script, another script, or a process, to block CHIF file access for the current decoding attempt. At block 3416, the script blocks the decoding of the CHIF file and presents an error message to the user. In some embodiments in which a CHIF file is embedded in a webpage, the area of the webpage where content of the CHIF file would appear may display the error message, or some other icon indicating that decoding is blocked. In some embodiments, a window or other area can be displayed with an error message or icon. The process then ends at block 3420. If at decision block 3412 the server determines that decoding is not to be blocked, the process moves to block 3418. At block 3418, the script executes the decoding process to decode the CHIF file for presentation of the contents of the CHIF file to the user. The process then ends at block 3420.

Figure 35:
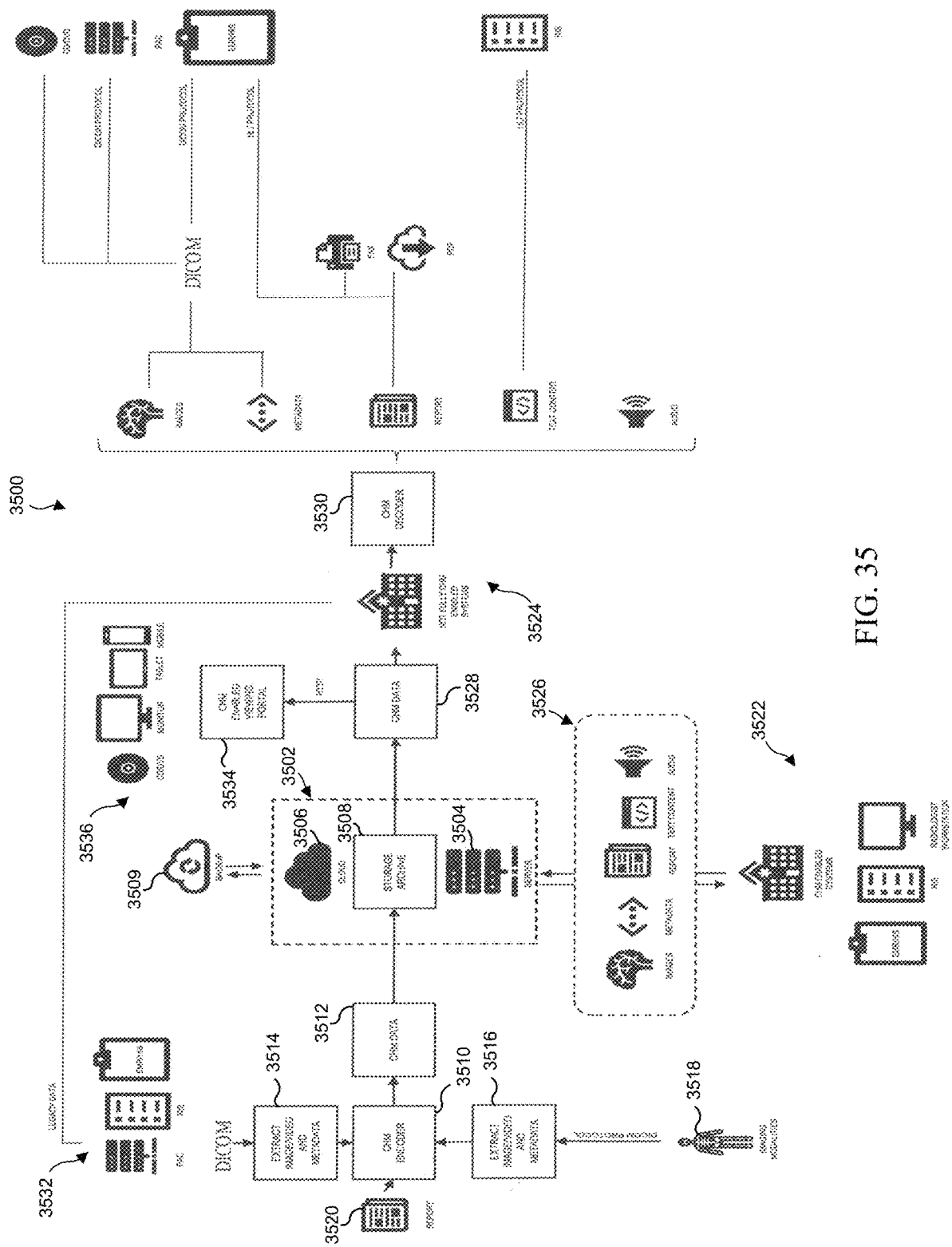
FIG. 35 illustrates a CHIF encoding and decoding system in accordance with various embodiments of the present disclosure.

FIG. 35 illustrates a CHIF encoding and decoding system 3500 in accordance with various embodiments of the present disclosure. Encoded CHIF files can be stored remotely for retrieval by an organization, or between organizations that share CHIF files. As illustrated in FIG. 35, the system 3500 includes a remote storage 3502. The remote storage 3502 can include one or more servers 3504, a cloud storage system 3506, and/or a storage archive 3508, to store CHIF encoded CHIF files for later retrieval and decoding. The remote storage 3502 can also include a backup storage location or backup functions 3509, to backup information stored on the remote storage 3502 in the case of a hardware or other storage failure. A CHIF encoder 3510 stored, or accessible and used, by an organization receives data from a plurality of sources, encodes the data into a CHIF file as described in the various embodiments herein, and transmits CHIF file data 3512 to the remote storage 3502. The data from the plurality of sources can include various information that the organization wishes to include in a CHIF file, such as files that are of different types, but provide complementary information.

For example, if an organization is a medical organization, the data from the plurality of sources can include information from a digital imaging and communications (DICOM) system. DICOM systems provide a standardized system for handling, storing, printing, and transmitting information related to medical imaging or radiology, such as X-Ray, magnetic resonance imaging (MRI) data, and other imaging modality data. DICOM systems often include file format definitions and a network communications protocol, such as TCP/IP, to communicate between DICOM systems. For instance, as illustrated in FIG. 35, first image/video data and metadata 3514 can be extracted from a DICOM system and provided to the CHIF encoder 3510. The first image/video data and metadata 3514 can include patient radiology image/video data and its associated metadata, and other patient data. Additionally, second image/video data and metadata 3516 can be extracted from DICOM imaging modalities 3518, such as via a DICOM protocol, and provided to the CHIF encoder 3510, as illustrated in FIG. 35. DICOM imaging modalities can include data objects that include a number of attributes, such as a name, an identifier (ID), image pixel data, DICOM modalities, and other information. DICOM modalities can include various information or attributes known to those skilled in the art that pertain to, and designate, the types of DICOM information, such as autorefraction (AR), content assessment results (ASMT), audio (AU), document (DOC), digital radiography (DX), electrocardiography (ECG), endoscopy (ES), panoramic X-Ray (PX), slide microscopy (SM), and many others. The CHIF encoder 3510 can also be provided with reports 3520, such as doctor audio dictations, dictation transcriptions, written reports, annotations, lab reports, radiology reports, patient information documents, and any other information the medical organization wishes to include in the CHIF file.

The information the medical organization wishes to include in the CHIF file, such as the data 3514 and 3516, and the reports 3520, are provided to the CHIF encoder 3510. The CHIF encoder 3510 combines this information into a single encoded CHIF file, using processes as described in the various embodiments of this disclosure. The single CHIF file thus can contain various information that are related and relevant for a patient. In traditional medical systems such as DICOM systems, various files pertaining to a patient may be stored at different locations in storage, and may not be obviously related or stored in such a way that a medical professional can review all the information in tandem. For example, imaging files may be stored in one location or system, while doctors' notes are stored in another location or system, doctor dictations in another location or system, lab reports in another location or system, etc. Encoding the data into a single CHIF file allows for organizations to associate all the data provided to the CHIF encoder 3510, and this data can be presented and reviewed together by professionals, allowing for professionals to have all relevant information before them in the CHIF file. It will be understood the resulting CHIF file can thus include data from various data types, such as image data, audio data, text data, radiology system data, video data, or other data types.

In some embodiments, files and data provided to the CHIF encoder 3510 can be indexed based on keywords or other parameters, and an index file created, to provide for the searchability of CHIF files either on a local storage or the remote storage 3502. In some embodiments, the CHIF file can be transmitted to the remote storage 3502, and the remote storage can decode the CHIF file, create the index, and re-encode the CHIF file for storage. The created index file includes data parsed from the CHIF file, and allows for organizations with access to the remote storage 3502 to search for CHIF files pertaining to certain criteria, such as searching for all CHIF files associated with a patient, associated with a doctor, pertaining to a particular medical condition, or other search parameters.

Additionally, during an imaging session such as an X-Ray or MRI session, there may be dozens or even hundreds of images recorded. However, a doctor or other qualified medical professional may only want to focus on a certain few relevant images in studying a patient complaint, and may only refer to these certain images in a related report, audio or textual dictation, notes, or other document types. Instead of a medical professional being required to sift through all images stored in a system, such as a DICOM system, only these certain images used in understanding the patient's complaint or status can be provided to the CHIF encoder 3510 along with the accompanying reports, notes, dictations, etc., such that, upon later review of the contents of the CHIF file, the CHIF file provides only the relevant information used in reaching a conclusion or diagnosis of the patient. Additionally, reducing the number of images or other content to include in the CHIF file provides for a smaller-sized CHIF file that can be more easily transmitted within or across organizations.

DICOM files can be exchanged between two entities that are capable of receiving image and patient data in DICOM format. A medical organization using a DICOM or other medical system or standard can leverage the CHIF encoding and decoding technology described herein to combine multiple sources of patient and diagnostic information into a single CHIF file for storing at the remote storage 3502, or at a local storage location. The medical organization can then retrieve the CHIF file from storage when review of the patient and diagnostic information is to be performed, or other medical organizations can be granted access to the CHIF file, such as when a patient is referred to a specialist. For example, a first medical organization can encode, using the CHIF encoder 3510, various data into a single CHIF file, and transmit the CHIF file data 3512 to the remote storage 3502. Once stored at the remote storage 3502, the CHIF files can be retrieved by various authorized organizations, such as by a CHIF-enabled system 3522 or a not fully CHIF-enabled system 3524.

The CHIF-enabled system 3522 is a system that is configured to retrieve CHIF files from the remote storage 3502, and is configured with one or more applications that enable the presentation of CHIF file contents simultaneously, such as within the same application window. For example, the CHIF-enabled system 3522 can include the one or more applications for viewing CHIF content installed on various workstations, such as radiology workstations, in hospital information systems (HIS), electronic medical records (EMR) systems, radiology information systems (RIS), or other systems, workstations, computers, or mobile devices used by the organization. The one or more applications for viewing CHIF content simultaneously can decode the CHIF file into its various data types 3526, such as images, metadata, reports, text content, audio content, and other data, and present the content to users in the CHIF-enabled system 3522, such as that shown in the example in FIG. 24 herein. CHIF-enabled systems 3522 can thus provide for the review of all relevant information together, such as patient demographic, diagnostic, and radiology data. In some embodiments, CHIF-enabled systems 3522 can also store CHIF files instead of decoding the CHIF file into its various components and saving them individually. This allows for the CHIF files to be the main file type for content stored on the CHIF-enabled systems 3522, and the one or more applications for viewing the CHIF content provides a central system for viewing content. In some embodiments, CHIF files may not be stored locally, but are stored on the remote storage 3502 and accessed temporarily for viewing.

The not fully CHIF-enabled system 3524 may not include the one or more applications for presenting CHIF content simultaneously. The not fully CHIF-enabled system 3524 requests and retrieves CHIF file data 3528 from the remote storage 3502, and views the information after decoding by a CHIF decoder 3530. In some embodiments, the CHIF decoder 3530 is stored locally at the not fully CHIF-enabled system 3524, and the CHIF decoder 3530 decodes the CHIF file into its various original data components for storage in appropriate systems, such as storing images and metadata in DICOM or other archiving systems, reports in EMR/HIS systems, converting reports into PDF or faxing reports, storing text content in RIS systems, etc. In some embodiments, legacy data 3532, such as data from RIS, EMR, HIS, and picture archiving and communication (PAC) systems, can be gradually encoded into CHIF files to begin converting not fully CHIF-enabled systems 3524 into CHIF-enabled systems.

In some embodiments, a CHIF-enabled viewing portal 3534 can be used by the not fully CHIF-enabled systems 3524. The CHIF-enabled viewing portal 3534 in some embodiments is a solution or application hosted by the remote storage 3502 or other remote system. The CHIF-enabled viewing portal 3534 allows for not fully CHIF-enabled systems 3524 to view CHIF file content simultaneously much like the one or more applications of the CHIF-enabled systems 3522. The CHIF-enabled viewing portal 3534 running at the remote or cloud-based location decodes, or receives from a decoder, CHIF file content and presents the CHIF file data simultaneously, or at least provides tools or options for viewing the various CHIF file data, such as switching between views of the various data. At the not fully CHIF-enabled system 3524, users can view the content presented by the CHIF-enabled viewing portal 3534 in a client-side application such as a web browser or dedicated application for viewing the CHIF content presented on various devices or mediums 3536 such as on a monitor, tablet device or other mobile device, or loaded from an external storage device such as a compact disc (CD), digital versatile disc (DVD), universal serial bus (USB) storage, or other external storage devices. The CHIF-enabled viewing portal 3534 can present content to the not fully CHIF-enabled systems 3524 without the CHIF files being downloaded to the not fully CHIF-enabled system 3524. In some embodiments, the CHIF-enabled systems 3522 can also use the CHIF-enabled viewing portal 3534, either in lieu of, or in conjunction with, the one or more applications for viewing CHIF content. As illustrated in FIG. 35, the system 3500 provides for the creation, storage, sharing, and decoding of CHIF files across a plurality of organizations, with the CHIF files providing multiple forms of related data together for review.

Figure 36:
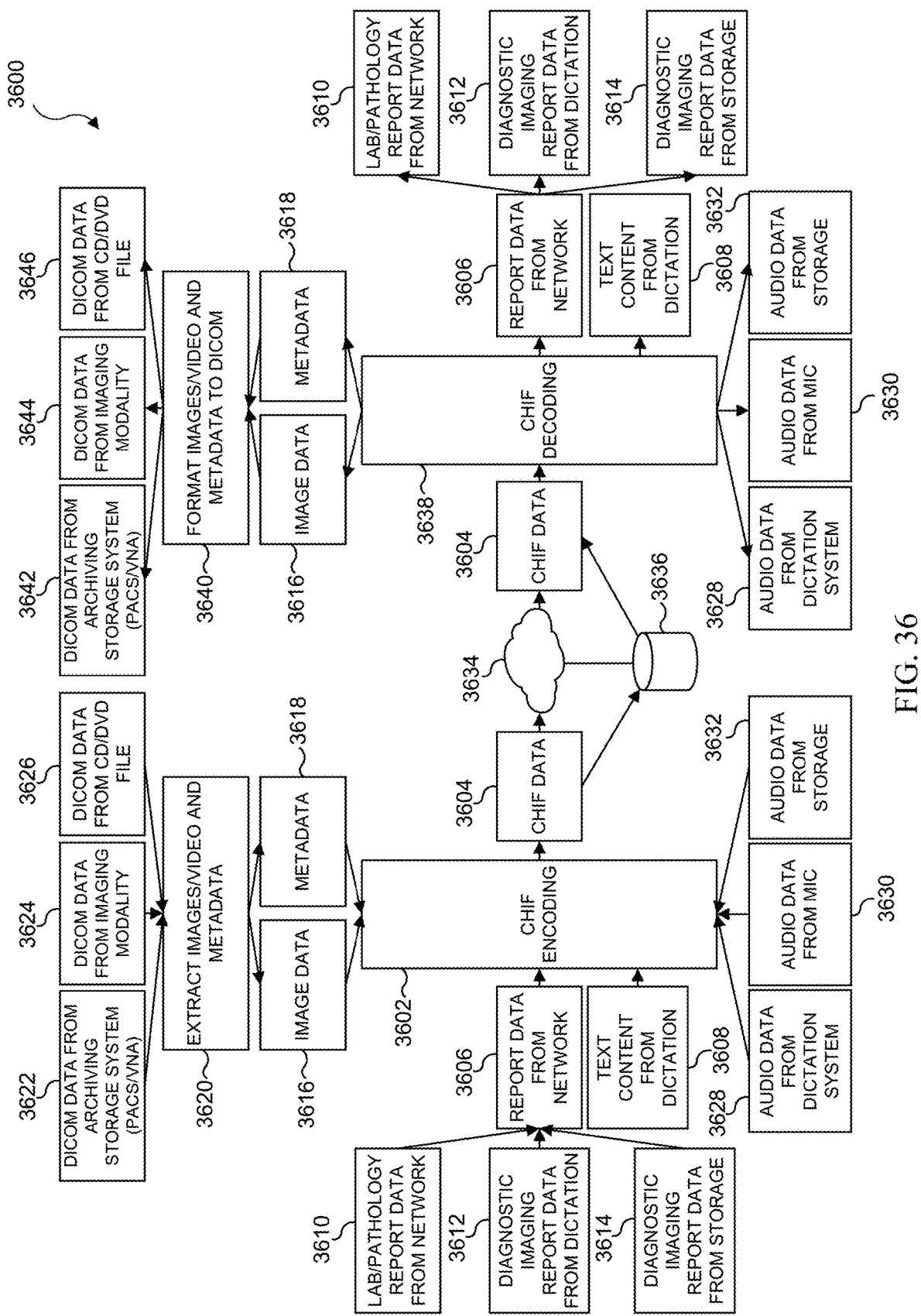
FIG. 36 illustrates a CHIF encoding and decoding process in accordance with various embodiments of the present disclosure.

FIG. 36 illustrates a CHIF encoding and decoding process 3600 in accordance with various embodiments of the present disclosure. The process 3600 can be used with a CHIF encoding and decoding system, such as the system 3500. A CHIF encoding process 3602, such as that executed by a CHIF encoder application, receives various forms of data and encodes the data into CHIF data 3604. The various forms of data for encoding can include report data 3606 from a networked system, and text content 3608 from one or more dictations. The report data 3606 from the networked system can include lab/pathology report data 3610 from the networked system, diagnostic imaging report data 3612 from one or more dictations, diagnostic imaging report data 3614 from storage, and other information. The CHIF encoding process 3602 can also receive information such as DICOM system information. The DICOM system information can include image data 3616 and metadata 3618, extracted during an extraction process 3620 from a DICOM system. The extraction process 3620 can extract image/video data and metadata from various DICOM system sources, such as DICOM data from an archiving storage system 3622, such as a PAC system or a vendor neutral archive (VNA) system, DICOM data from imaging modalities 3624, and/or DICOM data from CD/DVD files 3626, or other storage types. The CHIF encoding process 3602 can also encode, into a CHIF file, audio data 3628 from a dictation system, audio data 3630 from a microphone input, and/or audio data 3632 from storage. It will be understood that other data can be provided to the CHIF encoding process 3602 as desired for inclusion in a resulting CHIF file.

Once the CHIF encoding process 3602 combines all input data as disclosed in the various embodiments herein, the resulting CHIF data 3604 of the created CHIF file is transmitted to a storage location 3634 for storing at the storage location 3634. In some embodiments, the storage location can be the remote storage 3502. In some embodiments, an index file created from the content sources before or during the encoding process 3602 can also be transmitted to the storage location 3634. The storage location 3634 can include an associated database 3636 that keeps a record of CHIF files stored at the storage location 3634. For example, each CHIF file can have a universally unique identifier (UUID) added to the metadata of the CHIF file upon creation of the CHIF file, and the database 3636 can record each UUID in association with the storage location of the CHIF files on the storage location 3634. In some embodiments, the metadata and/or the UUID of the CHIF file can include a timestamp or other further identifying information. In some embodiments, the database 3636 can also store index information for indexes associated with CHIF files, to provide for keyword or other parameter searching of the indexes for retrieval of CHIF files matching, or being related to, the keywords or other parameters.

CHIF files stored at the storage location 3634 can be requested by a CHIF decoding process 3638 to decode the CHIF files for viewing the content of the CHIF files. For example, in some embodiments, an organization can create a CHIF file using the CHIF encoding process 3602, store the CHIF file at the storage location 3634, and later retrieve the CHIF file from the storage location 3634 to decode the CHIF file by the CHIF decoding process 3638. In some embodiments, a first organization creates and stores the CHIF file, while a second organization retrieves the CHIF file for decoding by the decoding process 3638. The decoding process 3638 decodes the various data previously encoded into the CHIF file, as described with respect to the system and processes herein. For example, decoding the CHIF data 3604 encoded as illustrated in FIG. 36 results in extracting from the CHIF data 3604 the report data 3606 from the networked system, including the lab/pathology report data 3610 from the networked system, the diagnostic imaging report data 3612 from one or more dictations, the diagnostic imaging report data 3614 from storage, and other information. The text content 3608 from one or more dictations can also be extracted from the CHIF data 3604.

The CHIF decoding process 3638 can also extract from the CHIF data 3604 the image data 3616 and metadata 3618.

The image data 3616 and the metadata 3618 can then be provided to a formatting process 3640 that formats the images/video data and metadata from the image data 3616 and the metadata 3618 into DICOM compatible data for storage in a DICOM system. This compatible data can be formatted as DICOM data for an archiving storage system 3642, such as a PAC system or a VNA system, DICOM data for imaging modalities 3644, and/or DICOM data for CD/DVD files 3646, or other storage types. The CHIF decoding process 3638 can also decode CHIF data 3604 from the CHIF file audio data 3628 from the dictation system, the audio data 3630 from the microphone input, and/or the audio data 3632 from storage. It will be understood that other data can be decoded by the CHIF decoding process 3638. The process 3600 provides for a plurality of related data, such as that illustrated in FIG. 36, to be efficiently stored and shared across a plurality of platforms and systems.

Figure 37:
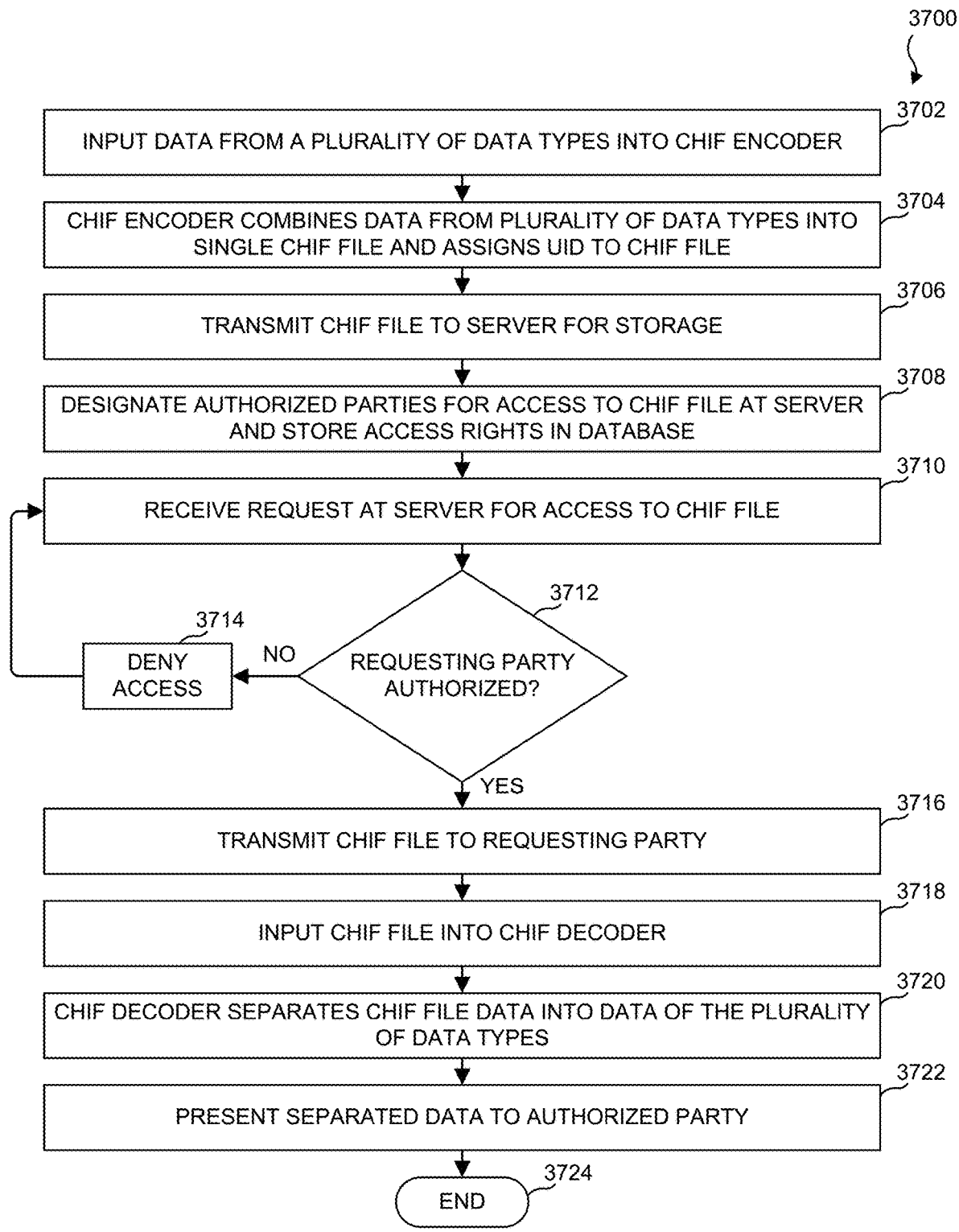
FIG. 37 illustrates a combined file storage and retrieval process in accordance with various embodiments of the present disclosure.

FIG. 37 illustrates a combined file storage and retrieval process 3700 in accordance with various embodiments of the present disclosure. The process 3700 can be used with any of the systems and other processes described herein, such as with system 3500 and process 3600. The process 3700 can be performed and executed by a processor such as the processor 6502 described herein. The process 3700 begins at block 3702. At block 3702, input data from a plurality of data types is input into a CHIF encoder. At block 3704, the CHIF encoder combines the data from the plurality of data types into a single CHIF file and assigns a UUID to the CHIF file. At block 3706, the CHIF file is transmitted to a server for storage. At block 3708, the server designates authorized parties that can access the CHIF file and stores access rights related to the authorized parties and the CHIF file in a database. For example, the server can store a plurality of user IDs in a database in association with one or more CHIF files, designating that the IDs have access to the one or more CHIF files. The users that are to have access rights to the CHIF files can, in some embodiments, be included in a message to the server sent with, or including, the CHIF file to be stored.

At block 3710, the server receives a request for access to the stored CHIF file. In some embodiments, only certain users within an organization may be granted access to certain CHIF files, to ensure that the content of CHIF files cannot be accessed by anyone at the organization. In some embodiments, a first organization can grant CHIF file access to another organization, and/or one or more users within that other organization, and the server thus only allows for the other organization to access the specific CHIF file, even though multiple other organizations may have access to the server. At decision block 3712, the server determines whether the requesting party is authorized to access the stored CHIF file. If the server determines that the requesting party is not authorized to access the stored CHIF file, the process 3700 moves to block 3714. At block 3714, access to the CHIF file is denied, and the process 3700 returns to block 3710. If at decision block 3712 the server determines that the requesting party is authorized to access the CHIF file, the process moves to block 3716.

At block 3716, the server transmits the CHIF file to the requesting party. At block 3718, a device associated with the requesting party inputs the CHIF file into a decoder. In some embodiments, the decoding can be performed at the server and the decoded CHIF file contents are transmitted to the requesting party or otherwise displayed to the requesting party, such as in the CHIF-enabled viewing portal 3534. At block 3720, the CHIF decoder separates the CHIF file data, as described with respect to the systems and processes disclosed herein, into data of the plurality of data types used to create the CHIF file by the encoder at block 3704. At block 3722, the separated content and/or data is presented to the authorized party. The process 3700 ends at block 3724. It will be understood that in various embodiments the server can be other devices such as local devices that determine CHIF file access. It will also be understood that the transmission of data and CHIF files in process 3700 and the other systems and processes disclosed herein can be secured via encryption and/or other security processes and protocols.

Figure 38:
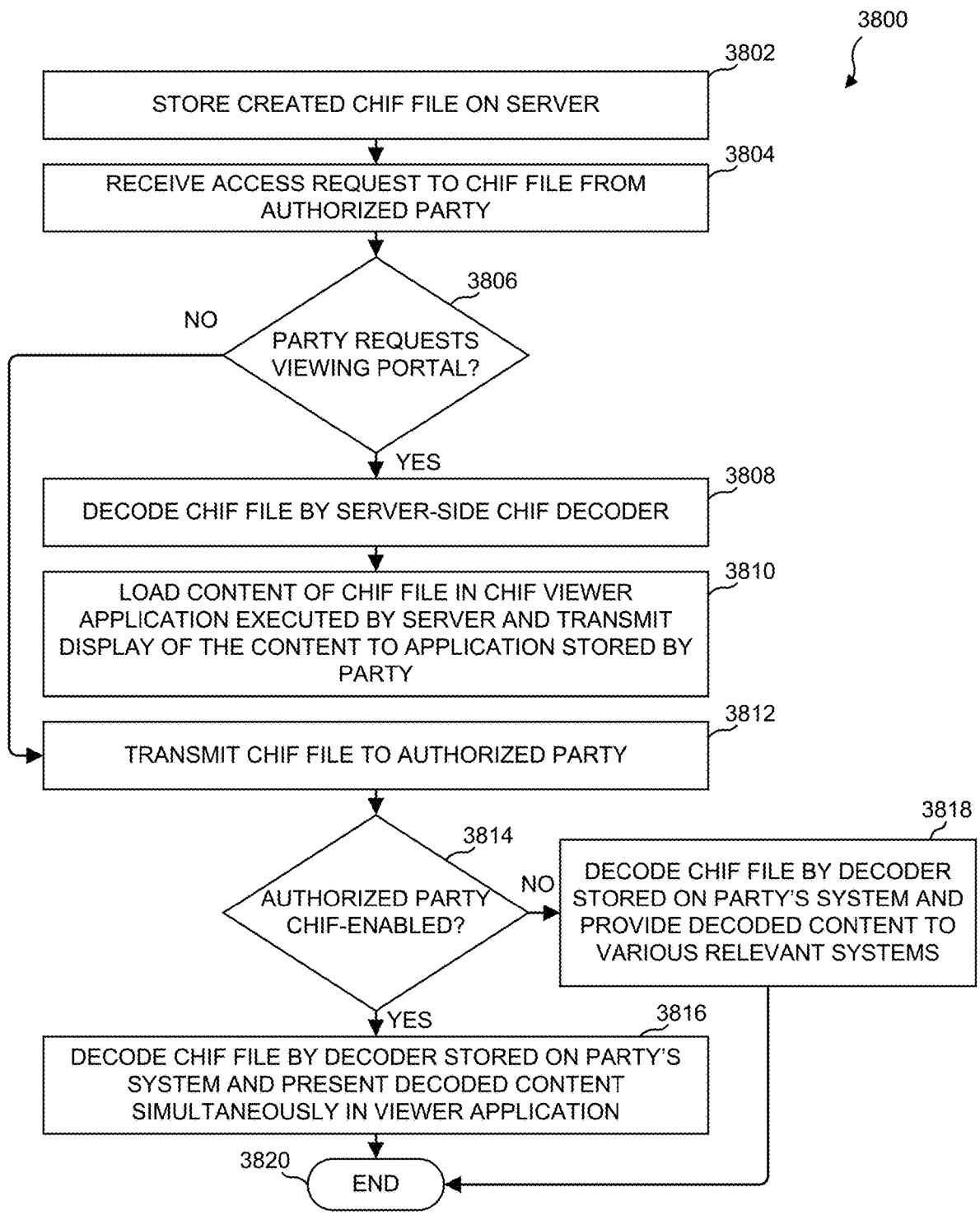
FIG. 38 illustrates a combined file system compatibility determination process in accordance with various embodiments of the present disclosure.

FIG. 38 illustrates a combined file system compatibility determination process 3800 in accordance with various embodiments of the present disclosure. The process 3800 can be used with any of the systems and other processes described herein, such as with system 3500 and process 3600. The process 3800 can be performed and executed by a processor such as the processor 6502 described herein. The process 3800 begins at block 3802. At block 3802, a server stores a created CHIF file. At block 3804, the server receives an access request from an authorized party. At decision block 3806, the server determines if the access request includes a request to use a viewing portal to view the content of the requested CHIF file, such as the CHIF-enabled viewing portal 3534. If at decision block 3806 the server determines that the party is requesting use of the viewing portal, the process 3800 moves to block 3808. At block 3808, a decoder stored at the server decodes the requested CHIF file. At block 3810, the server executes the CHIF viewing portal application, loads the decoded content of the CHIF file in the CHIF viewing portal application, and transmits a display of the content to the application stored by the party. The CHIF viewing portal application thus provides a cloud-based software application for providing viewing of CHIF files without software needing to be installed locally by the requesting party.

If at decision block 3806 the server determines that the party is not requesting use of the viewing portal, the process 3800 moves to block 3812. At block 3812, the server transmits the CHIF file to the authorized party. At decision block 3814, an authorized party device determines whether the authorized party, or a system associated with the authorized party, is CHIF-enabled. If so, at block 3816, a decoder used by the authorized party decodes the CHIF file and presents the decoded content simultaneously in a viewer application, as described with respect to various embodiments disclosed herein. In some embodiments, a single application can include both decoding and content viewing functions. The process 3800 then ends at block 3820. If at decision block 3814 the authorized party device determines that the authorized party is not fully CHIF-enabled, the process 3800 moves to block 3818. At block 3818, the decoder of the authorized party decodes the CHIF file and provides the decoded content to various relevant systems, such as patient record systems, imaging or DICOM systems, or other systems. The process 3800 then ends at block 3820.

Figure 39:
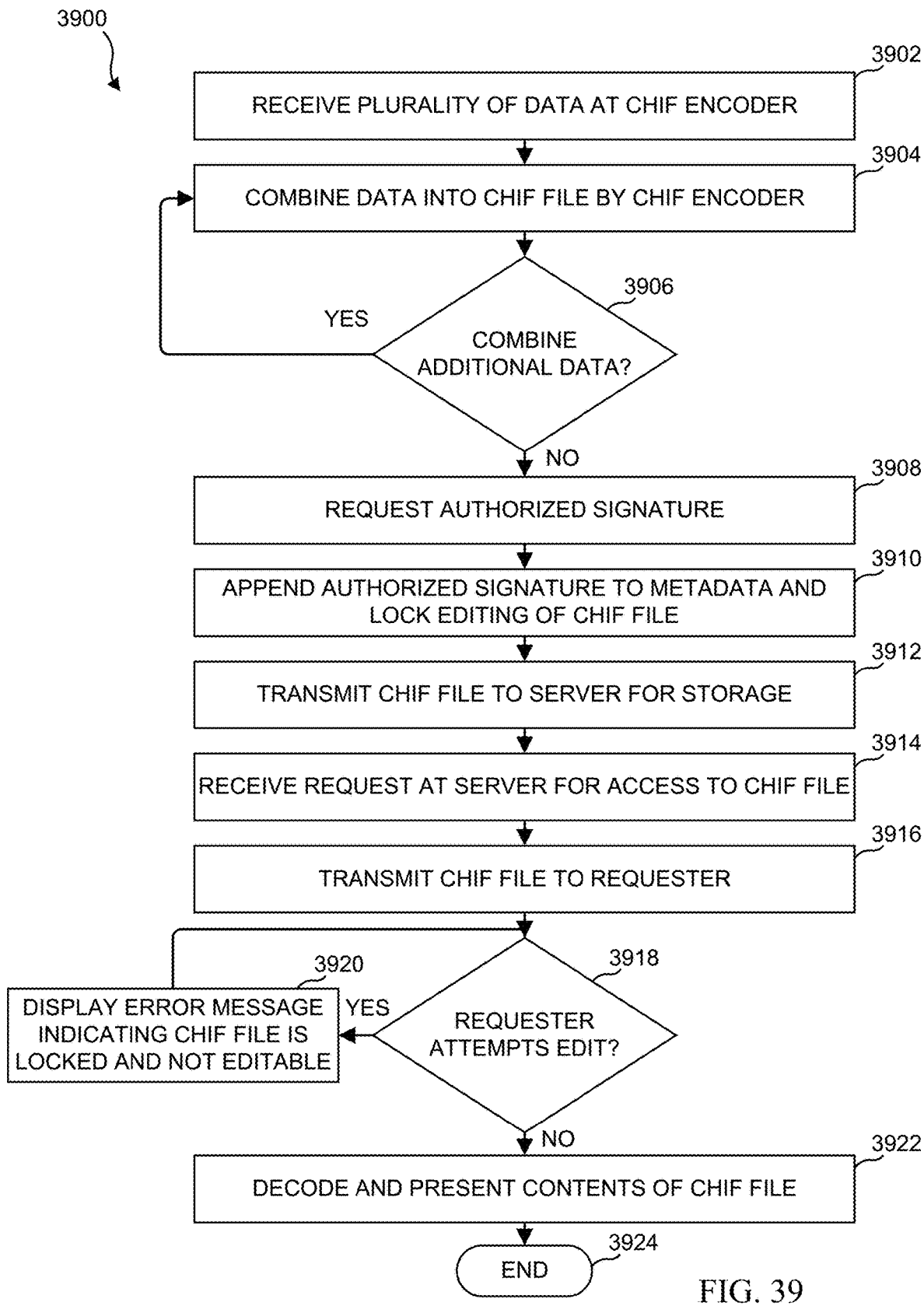
FIG. 39 illustrates a combined file signing and locking process in accordance with various embodiments of the present disclosure.

FIG. 39 illustrates a combined file signing and locking process 3900 in accordance with various embodiments of the present disclosure. The process 3900 can be used with any of the systems and other processes described herein, such as with system 3500 and process 3600. The process 3900 can be performed and executed by a processor such as the processor 6502 described herein. The process 3900 begins at block 3902. At block 3902, an encoder receives a plurality of data for encoding. At block 3904, the encoder combines the data into a combined CHIF file. At decision block 3906, it is determined whether an attempt to include additional data into the CHIF file is detected. In some embodiments, even after creation of a CHIF file, additional content can be combined into the CHIF file by the encoder, and the metadata is updated to reflect the additional content. In some embodiments, to create a new CHIF file, the original CHIF file is decoded, and then a new CHIF file is created by encoding the decoded content and the new content. For example, a doctor may receive a CHIF file that includes radiology images, lab reports, and other information to be used by the doctor in diagnosing or treating a patient. The doctor can review this information, and then provide additional information to be included in the CHIF file, such as images, audio dictation, textual notes, reports, or other information.

If at decision block 3906 it is determined that additional data is to be included in the CHIF file, the process 3900 returns to block 3904 to combine the additional data with the original data into a single CHIF file. If at decision block 3906 no additional data is to be combined with the CHIF file, the process 3900 moves to block 3908. At block 3908, the processor requests an authorized signature. In some embodiments, an authorized signature can be applied once contents of a CHIF file have been reviewed, potential additional content is added, and the contents of the CHIF file are finalized. For example, if a reviewing doctor reviews all original information in the CHIF file, and provides additional data in the form of a diagnosis or other conclusions, the data can be combined into a modified or new CHIF file, and the doctor can append an authorized doctor's signature to the file, indicating a complete diagnosis or opinion from the doctor. In some embodiments, the doctor can also remove delete contents not relied upon in studying the patient, such as extra radiology images not relied upon, and the CHIF file can be re-encoded with the relevant content and the doctor's signature. At block 3910, the processor appends the authorized signature to the metadata of the CHIF file, triggering a locked state in which editing of the CHIF file is locked, restricted, or prohibited. In some embodiments, content to be included in the CHIF file such as radiology images and lab reports can be reviewed before they are encoded into a CHIF file, and the doctor's signature is included and the CHIF file locked upon initial encoding of the CHIF file. Locking the CHIF file serves to provide that the CHIF file can no longer have additional information added to the CHIF file. This provides that CHIF files marked as complete with an authorized signature cannot be tampered with or otherwise altered. For example, although a second doctor may view a CHIF file that includes a first doctor's opinion and the underlying information, the second doctor, if desiring to create a CHIF file with the second doctor's own opinions, would create another CHIF file with an authorized signature of the second doctor. The other CHIF file may include a portion or all of the original CHIF file's data and content.

At block 3912, the processor transmits the CHIF file to a storage location, such as a server. At block 3914, the server receives a request for access to the CHIF file, and, at block 3916, the server transmits the CHIF file to the requester. At decision block 3918, a device such as a decoder and/or a processor detects whether the requester attempts to edit the CHIF file. If so, the device generates and displays an error message indicating that the CHIF file is locked and not editable. The process 3900 then moves back to decision block 3918, to determine if the requester makes any subsequent edit attempts and, if so, loops through the generation and display of the error message at block 3920. If at decision block 3918 the requester does not attempt to edit the CHIF file, at block 3922, the CHIF file can be decoded and the contents of the CHIF file presented, in accordance with various embodiments disclosed herein. The process 3900 ends at block 3924.

Figure 40:
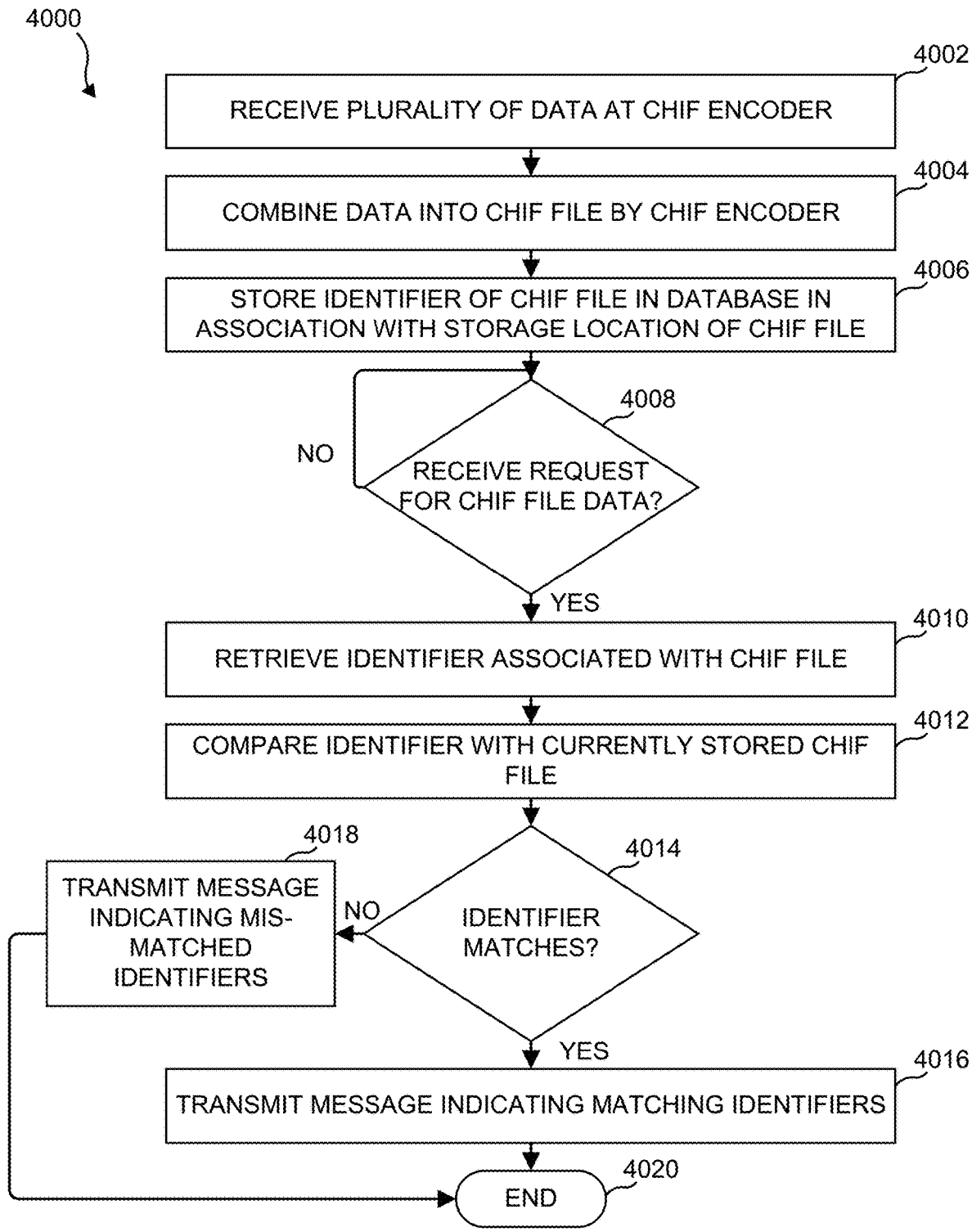
FIG. 40 illustrates a combined file tracking process in accordance with various embodiments of the present disclosure.

FIG. 40 illustrates a combined file tracking process 4000 in accordance with various embodiments of the present disclosure. The process 4000 can be used with any of the systems and other processes described herein, such as with system 3500 and process 3600. The process 4000 can be performed and executed by a processor such as the processor 6502 described herein. The process 4000 begins at block 4002. At block 4002, a CHIF encoder receives a plurality of data. At block 4004, the CHIF encoder combines the plurality of data into a single CHIF file. During creation of the CHIF file, the CHIF encoder can create an identifier or UUID for the CHIF file, which can be used to track and search for the CHIF file. In some embodiments, the UUID can be a unique SHA number created by a cryptographic hash function or other process and included in the metadata of the CHIF file. Since SHA numbers can be used consistently across files, the SHA numbers can be recorded and tracked.

At block 4006, the identifier associated with the CHIF file created in block 4004 is stored in a database in association with a storage location of the CHIF file. At decision block 4008, a processor determines if a request for the CHIF file, or data associated therewith, is received. If not, the process 4000 loops back to decision block 4008. If so, the process 4000 moves to block 4010. At block 4010, the processor retrieves the identifier associated with the requested CHIF file. At block 4012, the processor compares the identifier with the currently stored CHIF file, to determine if the identifier stored in the database matches the identifier included in the metadata of the CHIF file. In some embodiments, mismatched identifiers between the identifier stored in the database and the identifier in the metadata of the CHIF file can indicate that the CHIF file has been tampered with or altered.

At decision block 4014, the processer determines, based on the comparison in block 4012, whether the identifier stored in the database and the identifier included in the CHIF file match. If so, the processor transmits a message indicating matching identifiers, and can further transmit the CHIF file or the CHIF file contents. The process then ends at block 4020. If at decision block 4014 the processor determines that the identifiers do not match, the process 4000 moves to block 4018. At block 4018, the processor instructs a transmission of a message indicating that the identifiers are mismatched, alerting one or more users of a potential issue with the CHIF file. In some embodiments, the processor may block further transmission of the CHIF file until an error flag relating to the mismatched identifiers is cleared. The process then ends at block 4020.

Figure 41:
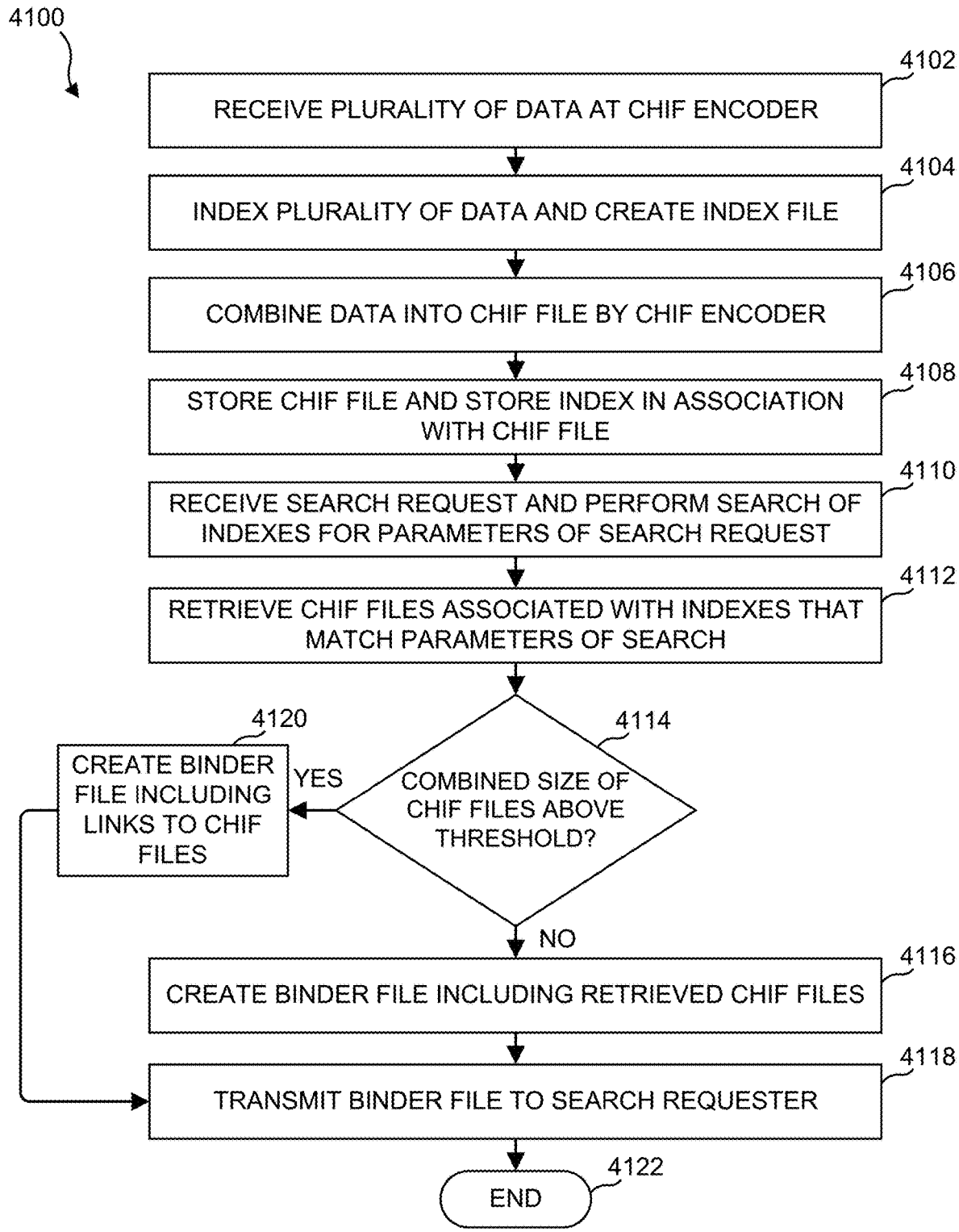
FIG. 41 illustrates a combined file indexing process in accordance with various embodiments of the present disclosure.

FIG. 41 illustrates a combined file indexing process 4100 in accordance with various embodiments of the present disclosure. The process 4100 can be used with any of the systems and other processes described herein, such as with system 3500 and process 3600. The process 4100 can be performed and executed by a processor such as the processor 6502 described herein. The process 4100 begins at block 4102. At block 4102, a CHIF encoder receives a plurality of data. At block 4104, the CHIF encoder or another process indexes the plurality of data. For example, the CHIF encoder can parse text data included in the plurality of data to look for keywords such as "diagnosis," "osteoporosis," "heart disease," or any other keywords, or other information such as patient names and other data. In some embodiments, audio data can be analyzed to recognize keywords, which can be added in text form in the index file. In some embodiments, radiology images can be scanned for attribute information such as DICOM attributes, and keywords or other information relating to the attributes can be added to the index file. In this way, a searchable index file is provided that allows for CHIF files relating to certain content, patients, etc., to be searchable on a server or other storage location.

At block 4106, the CHIF encoder combines the data into a CHIF file. At block 4108, the CHIF file and its associated index file are stored in association at a storage location, such as a server. For example, a database accessible by storage location devices or processors can relate index file storage locations with CHIF file storage locations. When a search is subsequently performed for keywords included in the index file, the CHIF file at the associated storage location can be provided as a search result and retrieved. In some embodiments, a master index file can be stored and updated with information pertaining to multiple CHIF files. At block 4110, the processor receives a search request and performs a search of one or more index files for parameters of the search request, such as keywords, patient data, or other data. At block 4112, the processor retrieves CHIF files associated with the indexes found during the search based on the parameters.

At decision block 4114, the processor determines if a combined or total size of the retrieved CHIF files exceeds a threshold. For example, the threshold may be a size value such as 5 gigabytes or any other size value. If the total size does not exceed the threshold, at block 4116 the processor creates a file including copies of the retrieved CHIF files. As disclosed in the various embodiments herein, binder files can be created to store multiple CHIF files together. At block 4118, the processor transmits the binder file containing the retrieved CHIF files relevant to the search to the requester. The process 4100 then ends at block 4122. If at decision block 4114 the processor determines the total size of the retrieved CHIF files exceeds the threshold, the processor creates a binder file including links to the CHIF files relevant to the search, rather than including copies of the CHIF files. The process 4100 then moves to block 4118 to transmit the binder file to the requester, and the process 4100 ends at block 4122. The binder file including links to the CHIF files can then be used by the requester to retrieve individual CHIF files. The binder file including links thus provides for a binder file with a significantly reduced file size that still provides the requester with access to the relevant search results. In some embodiments, the binder file can include additional information on the CHIF files to indicate to the requester the contents of the CHIF files. In some embodiments, a graphical user interface (GUI) can be presented to the requester on a requester's device, listing the search results, information pertaining to the search results, and providing links to the CHIF files.

Figure 42:
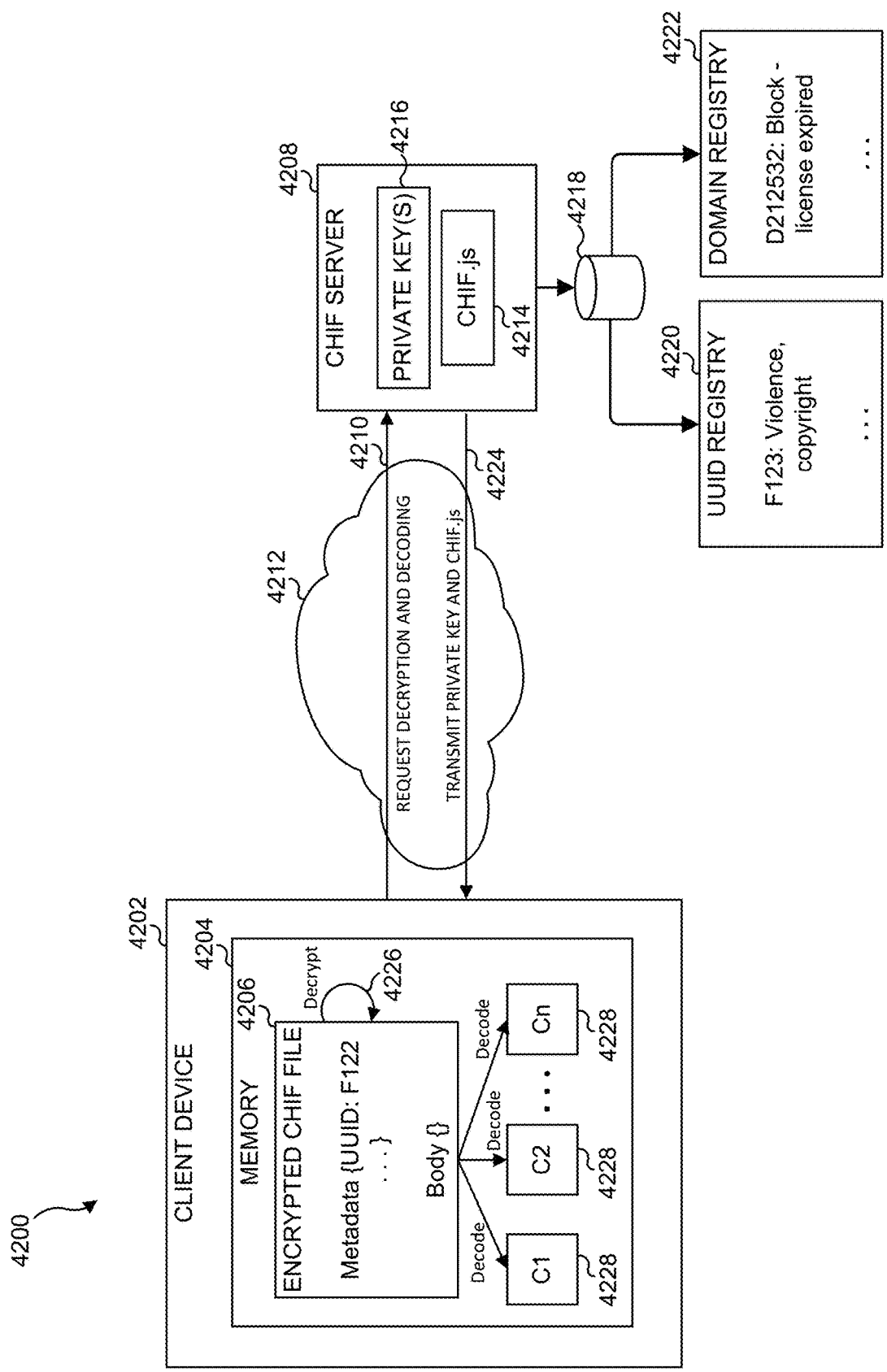
FIG. 42 illustrates a CHIF file decryption and decoding system in accordance with various embodiments of the present disclosure.

FIG. 42 illustrates a CHIF file decryption and decoding system 4200 in accordance with various embodiments of the present disclosure. As also described herein with respect to FIGS. 33 and 34, client devices storing and using CHIF files remotely from a central CHIF-enabled server, such as devices viewing a CHIF file in a decoder or viewer application, viewing in a web browser a webpage including an embedded CHIF file, etc., can trigger a script from the server to decode and present the contents of the CHIF file. If a user, a CHIF file, a website, etc., are considered to be disallowed from decoding the CHIF file, the decoding of the CHIF file can be blocked by the script.

The system 4200 includes a client device 4202 including a memory 4204. It will be understood that the client device 4202 can be any electronic device or computing device, such as that described in FIG. 65 herein. The client device 4202 can store in the memory 4204 an encrypted CHIF file 4206. In some embodiments, the CHIF file may not be encrypted. The encrypted CHIF file 4206 can be stored in the memory 4204, for example, when the CHIF file 4206 is created or encoded by the client device 4202, or otherwise retrieved by the client device 4202, such as from a server, from another electronic device, from a webpage loaded in a browser of the client device 4202, the contents of the webpage being stored in the memory 4204, or from other sources. As described with respect to the various embodiments herein, the encrypted CHIF file 4206 can include metadata and a body, where the body includes data on the plurality of content or one or more content types encoded into the CHIF file 4206. The metadata can also include a UUID that is unique to the CHIF file 4206, and that can be used to track, and associate information with, the CHIF file 4206. In some embodiments, the UUID can be a hexadecimal number, such as F122 as shown in FIG. 42.

When the client device 4202 is to decrypt and decode the encrypted CHIF file 4206 in order to view the contents of the CHIF file 4206, in some embodiments the client device 4202 does not have access to a decoder, and instead requests decryption and decoding of the encrypted CHIF file 4206 from a CHIF server 4208. The client device 4202 transmits a decryption and decoding request 4210 over a network 4212 to the CHIF server 4208. In some embodiments, the request 4210 includes the UUID for the encrypted CHIF file 4206, and, in some embodiments, the request 4210 includes a copy of the encrypted CHIF file 4206. In some embodiments, the CHIF file 4206 can first be decrypted, and then a request including the UUID is sent to the CHIF server 4208.

The CHIF server 4208 has stored thereon or associated therewith a script 4214, such as a JavaScript or other script, for decoding and presenting contents of CHIF files. The CHIF server 4208 also has stored thereon or associated therewith at least one private key 4216 for decrypting encrypted CHIF files encrypted by a public key. In some embodiments, the private key 4216 can be a public key, or some other type of decryption key. It will be understood that CHIF files can be encrypted and decoded using any combination of public or private keys, or any other form for encryption, without deviating from the scope of the present disclosure. The CHIF server 4208 also includes, or is communicatively connected to, a data store or database 4218 that includes a UUID registry 4220 and a domain registry 4222. In some embodiments, the UUID registry 4220 and the domain registry 4222 can be part of the same registry.

The UUID registry 4220 and the domain registry 4222 are used by the CHIF server 4208 to determine if a CHIF file, such as the encrypted CHIF file 4206, can be decoded and presented. The UUID registry 4220 includes a list of UUIDs that are to be blocked from decoding based on certain parameters, such as if the CHIF file is flagged for inappropriate or graphic content, such as violence, profanity, etc., if the CHIF file includes copyrighted material, if a license for the content contained in the CHIF file is expired, or for other reasons. During creation of a CHIF file, or at other times, a CHIF file can also be given a date range, such as a start date and an end date. The start date defines when a CHIF file is allowed to be accessed, decoded, viewed, or otherwise used by a user, domain, or other entities. The end date defines when the CHIF file can no longer be accessed, decoded, viewed, or otherwise used by a user, domain, or other entities. Decoding of CHIF files can also be blocked for other reasons, such as based on the identity of the particular user or client device that sent the request 4210.

The domain registry 4222 is used by the CHIF server 4208 to determine if websites hosting CHIF files are allowed to use the decoder script 4214. For example, the encrypted CHIF file 4206 stored in the memory 4204 of the client device 4202 may have been accessed on a website, and the request 4210 includes a domain name or domain ID for the website on which the encrypted CHIF file 4206 is hosted. The CHIF server 4208 can then look up the domain name or domain ID in the domain registry 4222. If the domain ID is not in the domain registry 4222, the CHIF server 4208 can block decoding of the CHIF file. If the domain ID is in the domain registry 4222, the CHIF server 4208 can review the information in the domain registry 4222 to determine if decoding of CHIF files hosted on the domain is allowed. If the domain registry 4222 indicates that decoding is not allowed, such as if a license for the domain to use CHIF files is expired, the CHIF server 4208 can block decoding of the CHIF file.

If decoding is determined by the CHIF server 4208 to be allowed, either indicated by one of or both of the UUID registry 4220 and the domain registry 4222, the CHIF server 4208 will facilitate decryption and decoding of the encrypted CHIF file 4206. The CHIF server 4208 then sends a transmission 4224 over the network 4212 to the client device 4202 that includes the decryption key 4216 and the CHIF decoder script 4214. The client device 4202 uses the decryption key 4216 to perform a decryption 4226 of the encrypted CHIF file 4206 to provide a decrypted CHIF file. The client device 4202 then uses the decoder script 4214 to decode the CHIF file into its separated content components 4228. The client device 4202 can then view, playback, or otherwise present, based on the content types of the separate content components 4228, the content components 4228.

Figure 43:
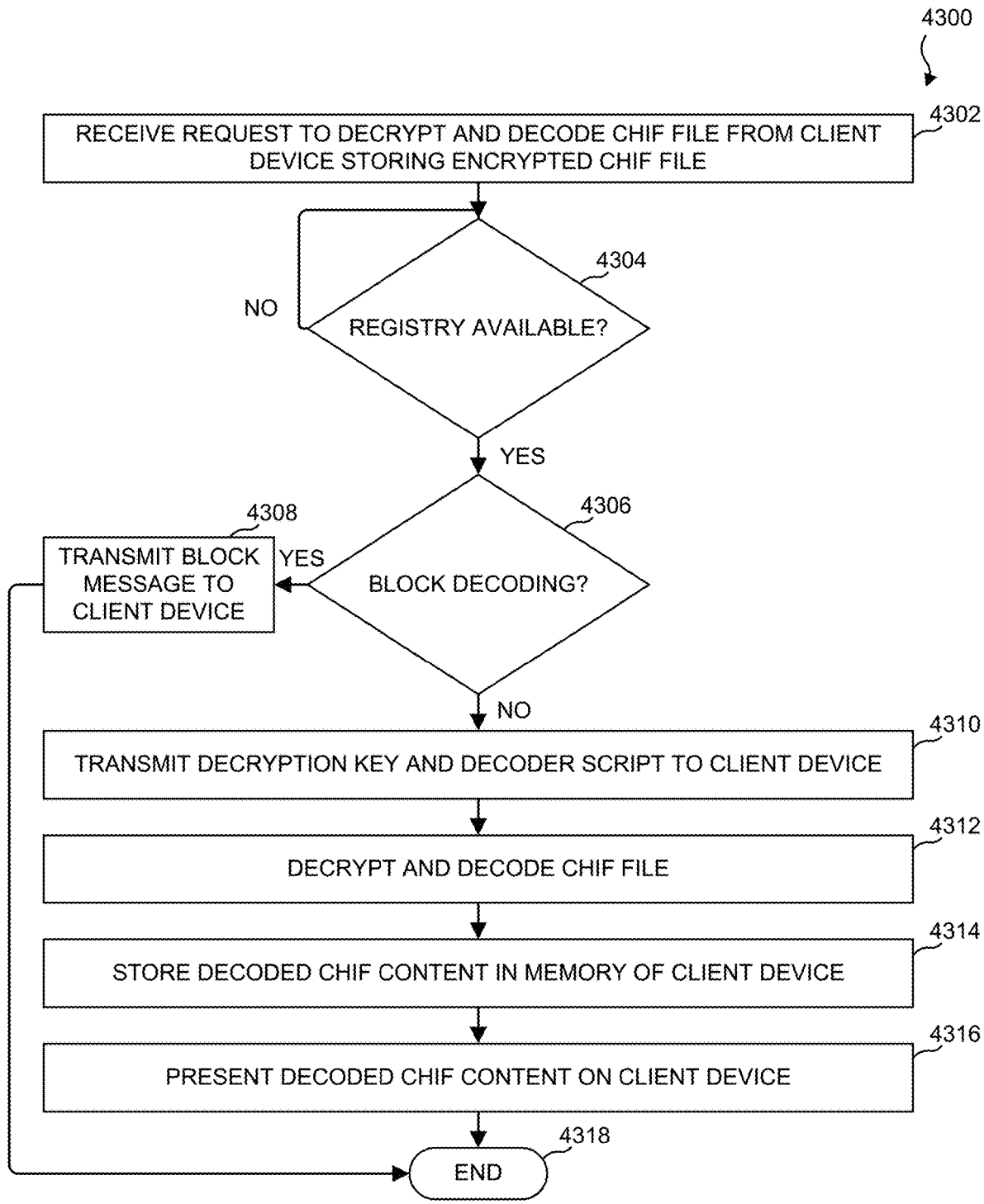
FIG. 43 illustrates a CHIF file decryption and decoding process in accordance with various embodiments of the present disclosure.

FIG. 43 illustrates a CHIF file decryption and decoding process 4300 in accordance with various embodiments of the present disclosure. The process 4300 can be used with any of the systems and other processes described herein, such as with system 4200. The process 4300 can be performed and executed by a processor such as the processor 6502 described herein. The process 4300 begins at block 4302. At block 4302, a request is received, such as by a processor of the CHIF server 4208, to decrypt and decode a CHIF file stored by the requester, such as the client device 4202, described with respect to FIG. 42. At decision block 4304, the processor determines if one or more CHIF registries are available, such as the UUID registry 4220 and/or the domain registry 4222. If the registries are not available, the process 4300 loops back to decision block 4304 until the one or more registries become available. In some embodiments, the process 4300 can continue on even if the registries are not available. If the registries are available, the process 4300 moves to decision block 4306. At decision block 4306, the processor determines if decoding of the CHIF file is to be blocked, based on information in the registries. For example, registries such as the UUID registry 4220 and the domain registry 4222 are used to determine if a CHIF file can be decoded and presented. The UUID registry 4220 includes a list of UUIDs that are to be blocked from decoding based on certain parameters, such as if the CHIF file is flagged for inappropriate or graphic content, such as violence, profanity, etc., if the CHIF file includes copyrighted material, if a license for the content contained in the CHIF file is expired, or for other reasons. Decoding of CHIF files can also be blocked for other reasons, such as based on the identity of the particular user or client device that sent the request in block 4302.

The domain registry 4222 is used to determine if websites hosting CHIF files are allowed to use the decoder script 4214. For example, the CHIF file for which decryption and decoding is requested may have been accessed on a website, and the request received in block 4302 can include a domain name or domain ID for the website on which the encrypted CHIF file is hosted. The domain name or domain ID can thus be looked up in the domain registry 4222. If the domain ID is not in the domain registry 4222, the processor can block decoding of the CHIF file. If the domain ID is in the domain registry 4222, the processor can review the information in the domain registry 4222 to determine if decoding of CHIF files hosted on the domain is allowed. If the domain registry 4222 indicates that decoding is not allowed, such as if a license for the domain to use CHIF files is expired, the processor can block decoding of the CHIF file.

If at decision block 4306 the processor determines that decoding of the CHIF file is to be blocked, at block 4308 the processor transmits back to the client device a block message. The block message can indicate to the user of the client device that decoding of the CHIF file is not allowed, and, in some embodiments, can state the reason for blocking decoding of the CHIF file. The process then ends at block 4318. If at decision block 4306 the processor determines that decoding of the CHIF file should not be blocked, the process moves to block 4310. At block 4310, the processor transmits a decryption key and a decoder script to the client device. In some embodiments, the decoder script can remotely access the CHIF file on the client device to decode the CHIF file without transmitting the decoder script to the client device. At block 4312, the client device decrypts the CHIF file using the decryption key, and decodes the CHIF file using the decoder script. At block 4314, the client device stores the decoded CHIF content in a memory of the client device. At block 4316, the client device presents the CHIF content on the client device. The process then ends at block 4318.

Figure 44:
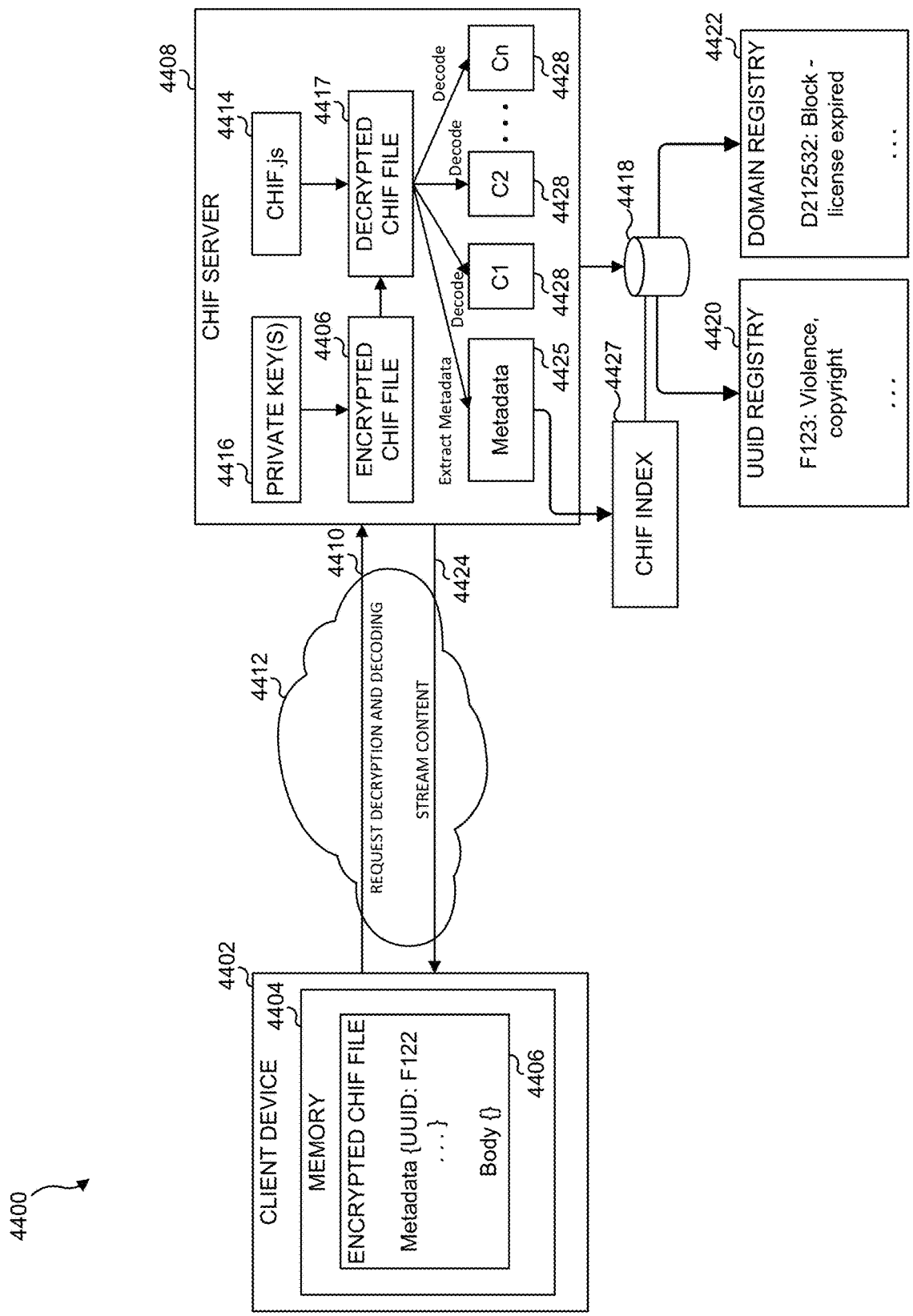
FIG. 44 illustrates a CHIF file decryption and decoding system in accordance with various embodiments of the present disclosure.

FIG. 44 illustrates a CHIF file decryption and decoding system 4400 in accordance with various embodiments of the present disclosure. As also described herein with respect to FIGS. 33, 34, 42, and 43, client devices storing and using CHIF files remotely from a central CHIF-enabled server, such as devices viewing a CHIF file in a decoder or viewer application, viewing in a web browser a webpage including an embedded CHIF file, etc., can trigger a script from the server to decode and present the contents of the CHIF file. If a user, a CHIF file, a website, etc., are considered to be disallowed from decoding the CHIF file, the decoding of the CHIF file can be blocked by the script.

The system 4400 includes a client device 4402 including a memory 4404. It will be understood that the client device 4402 can be any electronic device or computing device, such as that described in FIG. 65 herein. The client device 4402 can store in the memory 4404 an encrypted CHIF file 4406. In some embodiments, the CHIF file may not be encrypted. The encrypted CHIF file 4406 can be stored in the memory 4404, for example, when the CHIF file 4406 is created or encoded by the client device 4402, or otherwise retrieved by the client device 4402, such as from a server, from another electronic device, from a webpage loaded in a browser of the client device 4402, the contents of the webpage being stored in the memory 4404, or from other sources. As described with respect to the various embodiments herein, the encrypted CHIF file 4406 can include metadata and a body, where the body includes data on the plurality of content or one or more content types encoded into the CHIF file 4406.

The metadata can also include a UUID that is unique to the CHIF file 4406, and that can be used to track, and associate information with, the CHIF file 4406. In some embodiments, the UUID can be a hexadecimal number, such as F122 as shown in FIG. 44.

When the client device 4402 is to decrypt and decode the encrypted CHIF file 4406 in order to view the contents of the CHIF file 4406, in some embodiments the client device 4402 does not have access to a decoder, and instead requests decryption and decoding of the encrypted CHIF file 4406 from a CHIF server 4408. The client device 4402 transmits a decryption and decoding request 4410 over a network 4412 to the CHIF server 4408. In some embodiments, the request 4410 includes the UUID for the encrypted CHIF file 4406, and, in some embodiments, the request 4410 includes a copy of the encrypted CHIF file 4406. In some embodiments, the CHIF file 4406 can first be decrypted, and then a request including the UUID is sent to the CHIF server 4408. As illustrated in FIG. 44, the CHIF file 4406 is decoded at the server 4408 so that CHIF content and metadata cannot be viewed by the client device 4402. The CHIF file 4406 can be sent to the CHIF server 4408 in the request 4410, or the CHIF file 4406 can be retrieved by the CHIF server 4408 based on the UUID of the CHIF file 4406.

The CHIF server 4408 has stored thereon or associated therewith a script 4414, such as a JavaScript or other script, for decoding and presenting contents of CHIF files. The CHIF server 4408 also has stored thereon or associated therewith at least one private key 4416 for decrypting encrypted CHIF files encrypted by a public key. In some embodiments, the private key 4416 can be a public key, or some other type of decryption key. It will be understood that CHIF files can be encrypted and decoded using any combination of public or private keys, or any other form for encryption, without deviating from the scope of the present disclosure. The CHIF server 4408 uses the private key 4416 to decrypt the encrypted CHIF file 4406 into a decrypted CHIF file 4417.

The CHIF server 4408 also includes, or is communicatively connected to, a data store or database 4418 that includes a UUID registry 4420 and a domain registry 4422. In some embodiments, the UUID registry 4420 and the domain registry 4422 can be part of the same registry. The UUID registry 4420 and the domain registry 4422 are used by the CHIF server 4408 to determine if a CHIF file, such as the decrypted CHIF file 4417, can be decoded and presented. The UUID registry 4420 includes a list of UUIDs that are to be blocked from decoding based on certain parameters, such as if the CHIF file is flagged for inappropriate or graphic content, such as violence, profanity, etc., if the CHIF file includes copyrighted material, if a license for the content contained in the CHIF file is expired, or for other reasons. Decoding of CHIF files can also be blocked for other reasons, such as based on the identity of the particular user or client device that sent the request 4410.

The domain registry 4422 is used by the CHIF server 4408 to determine if websites hosting CHIF files are allowed to use the decoder script 4414. For example, the encrypted CHIF file 4406 stored in the memory 4404 of the client device 4402 may have been accessed on a website, and the request 4410 includes a domain name or domain ID for the website on which the encrypted CHIF file 4406 is hosted. The CHIF server 4408 can then look up the domain name or domain ID in the domain registry 4422. If the domain ID is not in the domain registry 4422, the CHIF server 4408 can block decoding of the CHIF file. If the domain ID is in the domain registry 4422, the CHIF server 4408 can review the information in the domain registry 4422 to determine if decoding of CHIF files hosted on the domain is allowed. If the domain registry 4422 indicates that decoding is not allowed, such as if a license for the domain to use CHIF files is expired, the CHIF server 4408 can block decoding of the CHIF file.

If decoding is determined by the CHIF server 4408 to be allowed, either indicated by one of or both of the UUID registry 4420 and the domain registry 4422, the CHIF server 4408 will facilitate decoding of the decrypted CHIF file 4417. In some embodiments, the determination as to whether to block decoding of a CHIF file may also be performed before decryption of the CHIF file 4406, and both decryption and decoding may be blocked based on the determination. If decoding is determined to be allowed, the CHIF server 4408 uses the script 4414 to decode the decrypted CHIF file 4417 into its separated content components 4428. The CHIF server 4408 also extracts metadata 4425, such as using a metadata extractor, from the decrypted CHIF file 4417. The metadata 4425 can contain valuable information on the decrypted CHIF file 4417, such as content tags, location data, sensory data, etc. This information, and, in some embodiments, other information such as the UUID and storage or retrieval location of the decrypted CHIF file 4717, can then be stored in a CHIF index 4427. The CHIF index 4427 can be continuously updated to provide for third-parties to send search requests for CHIF files to the CHIF server 4408. In some embodiments, the CHIF server 4408 stores copies of CHIF files received, such as the CHIF file 4406 received in the request 4410. The CHIF server 4408 can thus act as a central gateway for users to locate and access CHIF files.

The CHIF server 4408 then streams the decoded content 4428 in a transmission 4424 over the network 4412 to the client device 4402. The client device 4402 can then view, playback, or otherwise present, based on the content types of the separate content components 4428, the content components 4428. The client device 4402 is thus prevented from ever storing the decrypted CHIF file, or its metadata, as the client device 4402 only receives the decoded content 4428, and not the metadata. This prevents valuable metadata information from being distributed across multiple devices, and instead keeps the metadata stored on the CHIF server 4408. In some embodiments, the CHIF server 4408 can detect an attempted decoding of a CHIF file by a client device, and determine if the attempted decoding is the work of an unauthorized person such as a hacker attempting to access secure content. In some embodiments, the CHIF server 4408 can detect the location or IP address of the client device 4402, and alert authorities to the attempting hacking. This is especially important when the CHIF files attempted to be accessed are high-security CHIF files, such as CHIF files containing governmental or military data.

Figure 45:
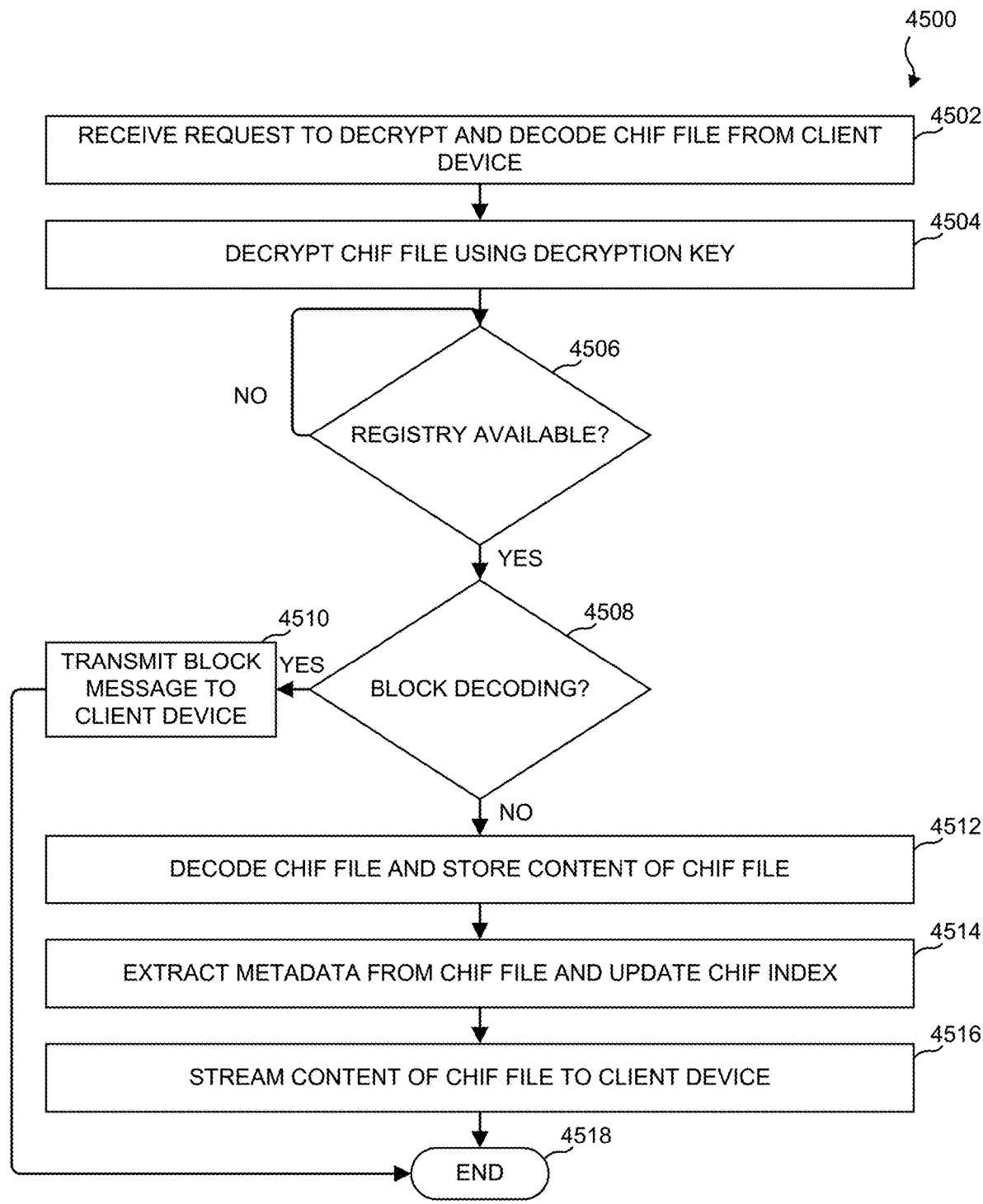
FIG. 45 illustrates a CHIF file decryption and decoding process in accordance with various embodiments of the present disclosure.

FIG. 45 illustrates a CHIF file decryption and decoding process 4500 in accordance with various embodiments of the present disclosure. The process 4500 can be used with any of the systems and other processes described herein, such as with system 4400. The process 4500 can be performed and executed by a processor such as the processor 6502 described herein. The process 4500 begins at block 4502. At block 4502, a request is received, such as by a processor of the CHIF server 4408, to decrypt and decode an encrypted CHIF file stored by the requester, such as the client device 4402, described with respect to FIG. 44. At block 4504, the processor decrypts the CHIF file using a decryption key. At decision block 4506, the processor determines if one or more CHIF registries are available, such as the UUID registry 4420 and/or the domain registry 4422. If the registries are not available, the process 4500 loops back to decision block 4506 until the one or more registries become available. In some embodiments, the process 4500 can continue on even if the registries are not available. If the registries are available, the process 4500 moves to decision block 4508.

At decision block 4508, the processor determines if decoding of the CHIF file is to be blocked, based on information in the registries. For example, registries such as the UUID registry 4420 and the domain registry 4422 are used to determine if a CHIF file can be decoded and presented. The UUID registry 4420 includes a list of UUIDs that are to be blocked from decoding based on certain parameters, such as if the CHIF file is flagged for inappropriate or graphic content, such as violence, profanity, etc., if the CHIF file includes copyrighted material, if a license for the content contained in the CHIF file is expired, or for other reasons. Decoding of CHIF files can also be blocked for other reasons, such as based on the identity of the particular user or client device that sent the request in block 4502.

The domain registry 4422 is used to determine if websites hosting CHIF files are allowed to use the decoder script 4414. For example, the CHIF file for which decryption and decoding is requested may have been accessed on a website, and the request received in block 4502 can include a domain name or domain ID for the website on which the encrypted CHIF file is hosted. The domain name or domain ID can thus be looked up in the domain registry 4422. If the domain ID is not in the domain registry 4422, the processor can block decoding of the CHIF file. If the domain ID is in the domain registry 4422, the processor can review the information in the domain registry 4422 to determine if decoding of CHIF files hosted on the domain is allowed. If the domain registry 4422 indicates that decoding is not allowed, such as if a license for the domain to use CHIF files is expired, the processor can block decoding of the CHIF file.

If at decision block 4508 the processor determines that decoding of the CHIF file is to be blocked, at block 4510 the processor transmits back to the client device a block message. The block message can indicate to the user of the client device that decoding of the CHIF file is not allowed, and, in some embodiments, can state the reason for blocking decoding of the CHIF file. The process then ends at block 4518. If at decision block 4508 the processor determines that decoding of the CHIF file should not be blocked, the process moves to block 4512.

At block 4512, the processor decodes the CHIF file and stores the contents of the CHIF file in a storage location. At block 4514, the processor extracts the metadata from the CHIF file and updates a CHIF index, such as CHIF index 4427. The metadata can contain valuable information on the CHIF file, such as content tags, location data, sensory data, etc. This information, and, in some embodiments, other information such as the UUID and storage or retrieval location of the CHIF file, can then be stored in the CHIF index. The CHIF index can be continuously updated to provide for third-parties to send search requests for CHIF files to a CHIF server. In some embodiments, the CHIF server stores copies of CHIF files received, such as the CHIF file received at block 4502. The CHIF server can thus act as a central gateway for users to locate and access CHIF files.

At block 4516, the processor streams the content decoded from the CHIF file in a to the client device that sent the request at block 4502. The client device can then view, playback, or otherwise present, based on the content types of the separate content components, the now separated content components of the original CHIF file. The process 4500 prevents the client device from storing the decrypted CHIF file, or its metadata, as the client device only receives the decoded content, and not the metadata. This prevents valuable metadata information from being distributed across multiple devices, and instead keeps the metadata stored on the CHIF server. The process then ends at block 4518.

Figure 46:
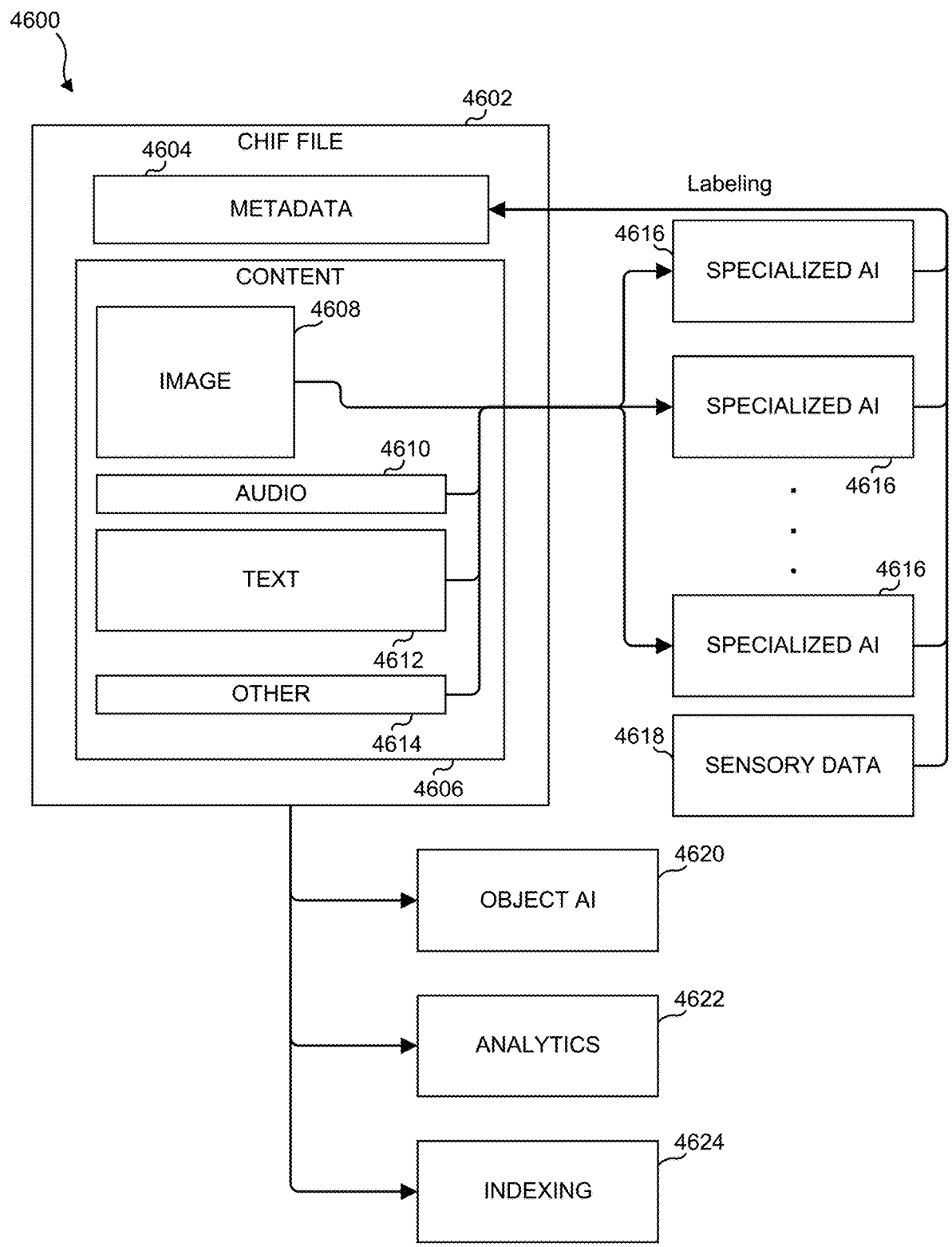
FIG. 46 illustrates a CHIF file continuous enrichment system in accordance with various embodiments of the present disclosure.

FIG. 46 illustrates a CHIF file continuous enrichment system 4600 in accordance with various embodiments of the present disclosure. Training of artificial intelligence (AI) models or engines can involve unsupervised or supervised learning. Unsupervised learning can include the raw input of data into an artificial intelligence model, determining errors and error rates from the outputs, and updating and retraining the model until an acceptable error rate is achieved. Supervised learning can involve providing training data to the artificial intelligence model that has been previously tagged or labeled, such as by humans, which can provide the model to be trained at least slightly better starting inputs, as the input already include certain identifying information. However, manual labeling can also introduce biases, or leave out certain, more specific or detailed, information.

The system 4600 includes provides for enrichment of CHIF files by using specialized artificial intelligence engines to provide contextual data with respect to the content of the CHIF file. The enriched CHIF file can then be used in to provide more accurate results in a variety of processes. For example, as illustrated in FIG. 46, the system 4600 includes a CHIF file 4602. The CHIF file 4602 includes metadata 4604, and content 4606 including an image 4608, audio 4610, text 4612, and other information 4614, such as video or other data types. The metadata 4604 can include various information such as a UUID for the CHIF file 4602 and can delineate how the CHIF file is constructed for later decoding, as described in the various embodiments herein.

The system 4600 provides for a means to further enrich the metadata with contextual information for the content 4606 of the CHIF file 4602. The content 4606 of the CHIF file 4602 can be decoded or extracted from the CHIF file 4602 and processed through one or more specialized artificial intelligence models 4616, to tag and/or label, or otherwise provide information concerning, the content 4606. For example, the audio 4610 can be processed by a various artificial intelligence models 4616 trained for detecting various properties of audio files, such as mood (emotion in voice or mood of a song, etc.), transcription of audio into text, song detail detection (artist, song name, etc.), or other data can be derived from the audio 4610 by the one or more of specialized artificial intelligence models 4616. In some embodiments, transcriptions of audio can be stored as extra text content in the content 4606 of the CHIF file 4602. Other content types such as the text 4612 and the other information 4614 can be processed in this way as well. For instance, the text 4612 in the CHIF file 4602 can be processed by the specialized AI models 4616 trained to extract keywords from text while removing other, non-critical words (article adjectives, proposition, etc.), the text 4612 can be translated by the specialized AI models 4616 into another language, etc.

Sensory data 4618 can also be detected and added to the metadata 4604. For example, a camera system in a warehouse that captures images of items in the warehouse can also be configured to capture audio that is sent through the specialized AI 4616 to provide extra information on the audio. The camera system can also capture sensory data such as temperature, such as if items in the warehouse are to be stored within a certain temperature range. The temperature can then be added to the metadata 4604. In this way, the CHIF file 4602 is enriched to contain even more context data for the content. The images of the warehouse would now be associated with audio in the warehouse (with tags from the AI models 4616), a temperature of the warehouse, and other sensory data to provide for a fully-contained snapshot of the warehouse environment at a point in time.

This provides an improvement over storing this data separately, even if related, such as in a relational database, because, even though the data may be associated, an association or certain data may change that taints the data. For example, in a law enforcement data system, a retina scan may become incorrectly associated with an individual that does not actually possess the matching retina, leading to a false identification. If the data is instead stored in a self-contained CHIF file pertaining to an individual, data associations between storage locations do not have to be relied upon, since all data on the individual can be stored in a single CHIF file. Other sensory information that can be gathered include scent detection, radiation, geographical location, altitude, vibrations, water level, or any other type of sensory information that can be detected by sensor or other devices.

In some embodiments, the CHIF file can be retained as an immutable file, wherein the CHIF file is not allowed to be modified. In such embodiments, to add the enriched data to the CHIF file, the CHIF file can be decoded and the original CHIF file deleted, the metadata updated with the enriched content, and a new CHIF file is created from the decoded content and including the enriched data. In some embodiments, the CHIF file can be a mutable file that can be modified to add enriched data to the CHIF file. In such embodiments, the CHIF file may only be editable by applications that have been granted permission to edit the CHIF file for security reasons. In some embodiments, a designated area of the CHIF file can be editable to insert enriched data into the designated area of the CHIF file. In some embodiments, the CHIF file can be added to a binder file, as disclosed herein, that includes the CHIF file and other data or files, such as other CHIF files, that include the enriched data. In embodiments that use a binder file, the CHIF file can thus be unaltered while providing enriched data in the binder file that, by virtue of being included in the binder file, is associated with the CHIF file.

This wealth of extra data from the specialized AIs 4616 and the sensory information 4618 is added to the metadata 4604 of the CHIF file 4602, such as in the form of tags (mood: somber, song name: Elegy, text tag: speech; funeral, temperature: 35° F., etc.), to enrich the CHIF file 4602 with contextual information describing the content. The enriched CHIF file 4602 can then be provided to various processes such as an object AI model 4620, an analytics engine 4622, and/or an indexing process 4624. This can lead to improved quantity of data on the CHIF file 4602, as well as improved quality of CHIF file data.

For example, if the image 4608 in the CHIF file 4602 is an image of a funeral on a beach in the winter, an object recognition AI 4620 may only detect that the image includes a beach with people on the beach, without further context indicating that the image includes a funeral or that it is during the winter. With the enriched data provided in the metadata 4604 of the CHIF file 4602, tags including that the audio mood is somber, that the text includes keywords related to funerals, and that the temperature is 35° F. (and possible coupled with a geographical location), the object AI model 4620 can further contextualize and categorize the image 4608 as being not just an image of a beach with people, but an image of a funeral on a beach in the winter. The enriched CHIF files 4602 therefore provides for a higher quality training sample for the object AI model 4620, and the object AI model 4620 can thus be trained to accept enrich files as input for more accurate and highly contextualized results.

The enriched CHIF file 4602 also provides extra data for the analytics engine 4622 to provide more accurate and informed analytics on the content of the CHIF file 4602, and provides more detailed indexing and searching of the CHIF file to the indexing process 4624. In some embodiments, the indexing process 4624 can provide for searchable CHIF files, such as with respect to the indexes describes in FIGS. 36, 37, and 44 of the present disclosure. As additional content is added to the CHIF file 4602, the enrichment shown in FIG. 46 can further provide information to the metadata 4604 on that additional content. Thus, the CHIF file 4602 can be continuously enriched. Metadata of the CHIF file format disclosed herein thus provides a flexible data structure that can be continuously enriched and updated to increase data quantity and quality of the CHIF file, and enhance the accuracy of processes and systems that utilize the CHIF file.

Figure 47:
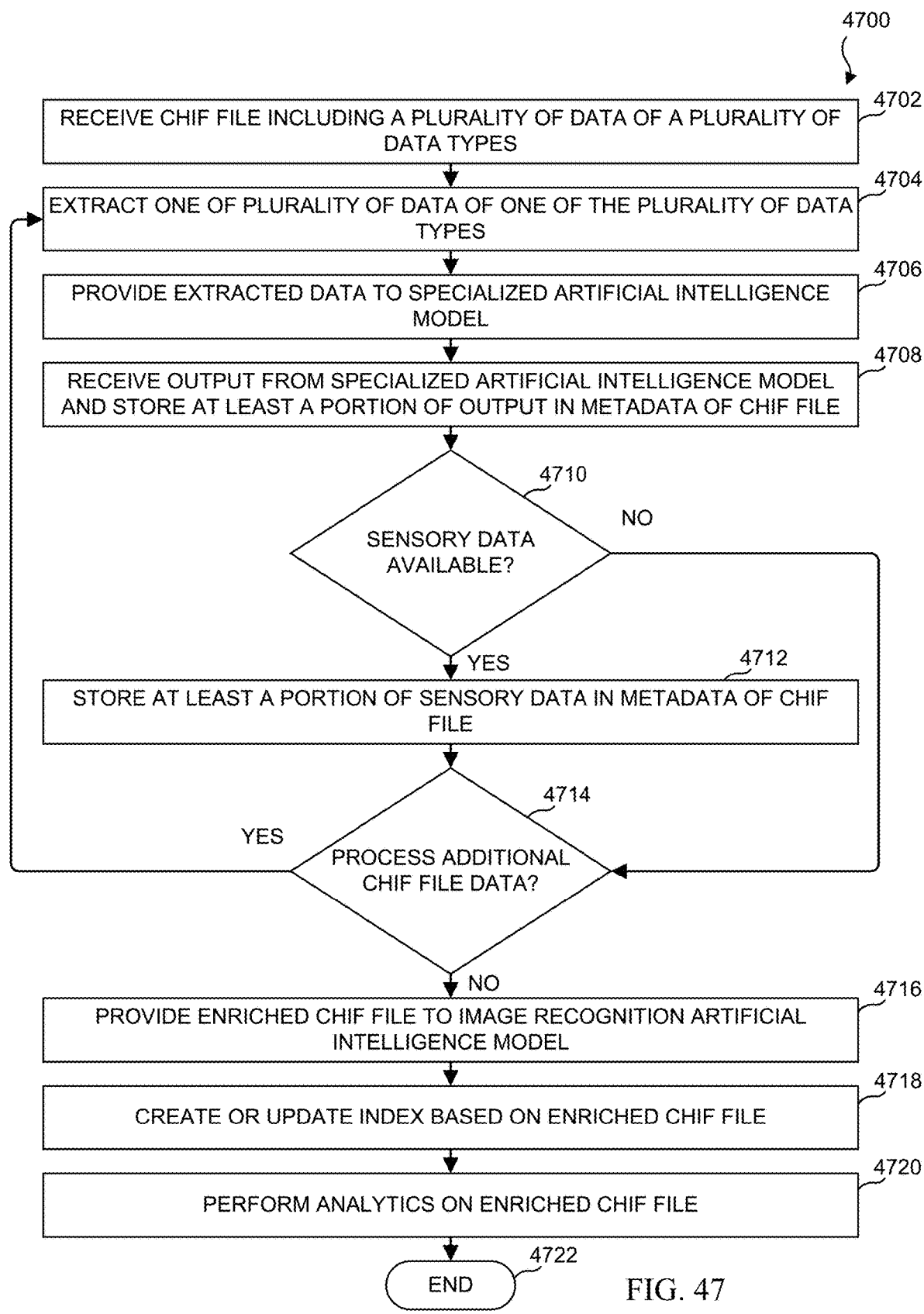
FIG. 47 illustrates a CHIF file continuous enrichment process in accordance with various embodiments of the present disclosure.

FIG. 47 illustrates a CHIF file continuous enrichment process 4700 in accordance with various embodiments of the present disclosure. The process 4700 can be used with any of the systems and other processes described herein, such as the system 4600. The process 4700 can be performed and executed by a processor such as the processor 6502 described herein. The process 4700 begins at block 4702. At block 4702, the processor receives a CHIF file including a plurality of data of a plurality of data types. At block 4704, the processor extracts one of the plurality of data of one of the plurality of data types. At block 4706, the processor provides the extracted data to at least one specialized artificial intelligence model. At block 4708, the processor receives one or more outputs from the specialized artificial intelligence model and stores at least a portion of the output in the metadata of the CHIF file.

At decision block 4710, the processor determines if sensory data is available. If not, the process 4700 moves to decision block 4714. If so, the process 4700 moves to block 4712. At block 4712, the processor stored at least a portion of the sensory data in the metadata of the CHIF file, and the process 4700 moves to decision block 4714. At decision block 4714, the processor determines if there is additional CHIF file data or content to process to provide further enriched metadata. If so, the process 4700 loops back to block 4704 to extract additional data from the CHIF file to enrich. If at decision block 4714 the processor determines that no additional CHIF file data is to be processed, the process 4700 moves to block 4716.

At block 4716, the processor provides the now enriched CHIF file to an image recognition AI model to use an image in the CHIF file for training or for runtime categorization and labeling, as also described with respect to FIG. 46. At block 4718, the processor creates or updates an index using the enriched CHIF file, as also described with respect to FIG. 46. At block 4720, the processor performs data analytics using the enriched CHIF file, as also described with respect to FIG. 46. The process then ends at block 4722.

Figure 48:
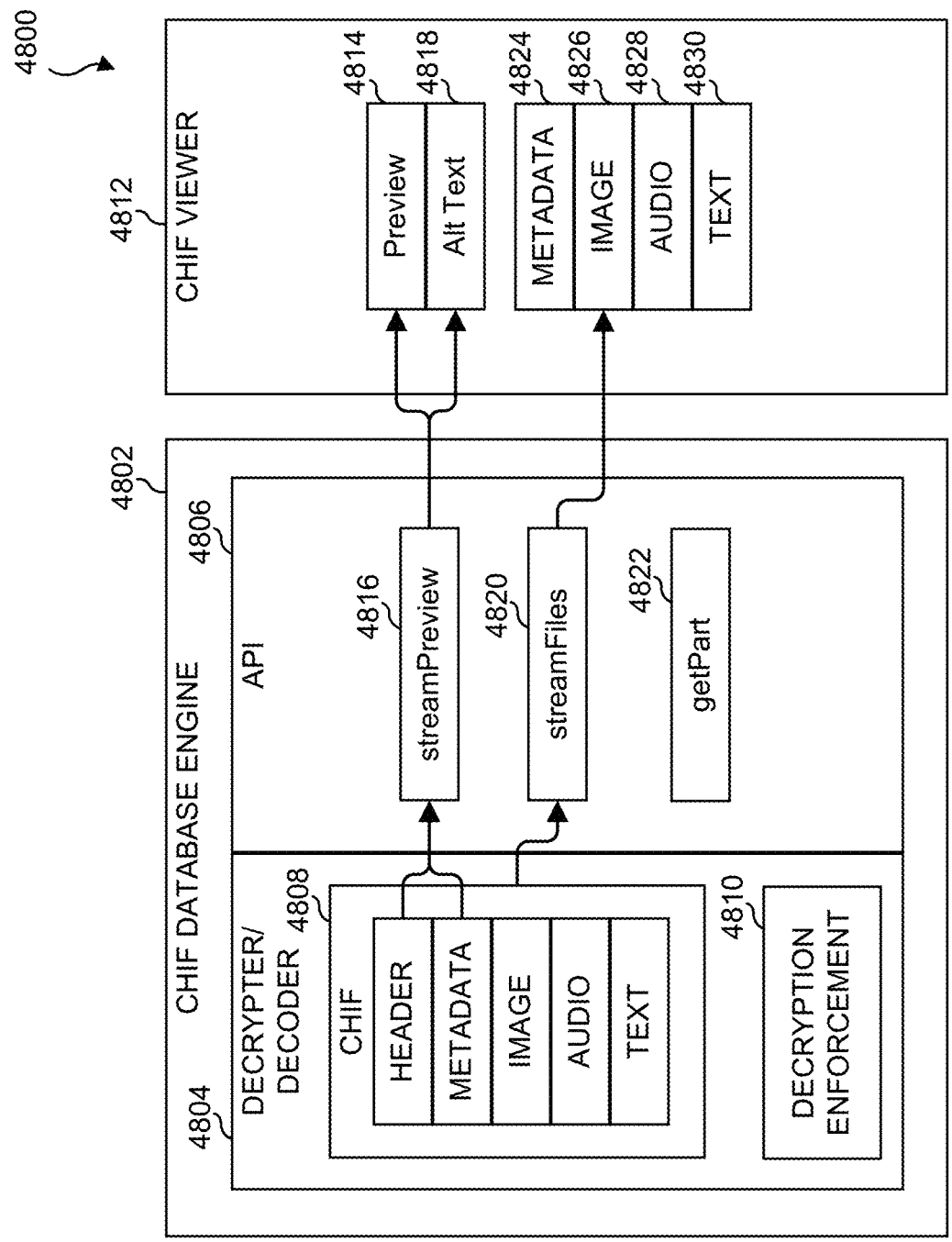
FIG. 48 illustrates a CHIF previewing architecture in accordance with various embodiments of the present disclosure.

FIG. 48 illustrates a CHIF previewing architecture 4800 in accordance with various embodiments of the present disclosure. The architecture 4800 includes a CHIF database engine 4802. The CHIF database engine 4802 can run locally on a client device, or remotely on a server, such as the CHIF server disclosed in various embodiments herein. In some embodiments, the CHIF database engine can be an obfuscated script such as a Javascript that handles decoding and streaming of files. The CHIF database engine can include a decrypter/decoder 4804 and an API 4806. The API 4806 can be a script function such as a Javascript function. The decrypter/decoder 4804 can access a CHIF container 4808 to be decoded. The CHIF container 4808 can include various encoded components including at least one header, metadata, an image, audio, text, or other components as disclosed in the various embodiments herein. The decrypter/decoder 4804 can also include a decryption enforcement script 4810 that can review requests for access or decoding of the CHIF container 4808 and either grant or deny such requests, as disclosed herein, for example, with respect to FIGS. 42-45.

A CHIF viewer 4812, such as an application installed on a client device or a web browser with CHIF viewing functionality, can present or display decoded content from CHIF files. Prior to decrypting and decoding of the CHIF container 4808, the CHIF viewer 4812 can display a preview 4814 of the contents of the CHIF container 4808, streamed via a streamPreview API function 4816 from the CHIF database engine 4802 to the CHIF viewer 4812. The streamPreview API function 4816 pulls data from the header and/or metadata of the CHIF container 4808, and provides or transmits this data to the CHIF viewer 4812 to present the preview 4814. The preview 4814 can include, for example, preview images, text, audio, or other data stored in the CHIF container 4808.

For example, if the CHIF container 4808 includes an image and audio data, wherein the audio data is to be played simultaneously with the display of the image, the preview 4814 can include only the image. The user then would interact with the preview image to initiate decoding of the CHIF container 4808 to provide the full contents of the CHIF container 4808 for presentation in the CHIF viewer 4812. For example, a user could touch or click on the preview image, prompting decoding and playback of the audio data with the image. The preview 4814 can also include alternate text 4818 that provides prompts or information to the user when the user performs an interaction with the preview 4814. For example, when a user places a mouse cursor over the preview 4814, the alternate text 4818 can appear with a message, such as "click to stream CHIF" or "click to find out more." In this example, in response to a click on the preview 4814, the CHIF database engine 4802 would decrypt and/or decode the CHIF container 4808 and provide the decoded content to the CHIF viewer 4812. To provide the decoded content to the CHIF viewer 4812, a streamFiles API function 4820 can retrieve and send the decoded content to the CHIF viewer 4812. In some embodiments, a getPart API function 4822 can retrieve certain parts or portions of the CHIF file. The decoded content provided to the CHIF viewer 4812 can include any or all of the data previously encoded into the CHIF container 4808, such as metadata 4824, image(s) 4826, audio data 4828, text data 4830, and/or other data.

Figure 49:
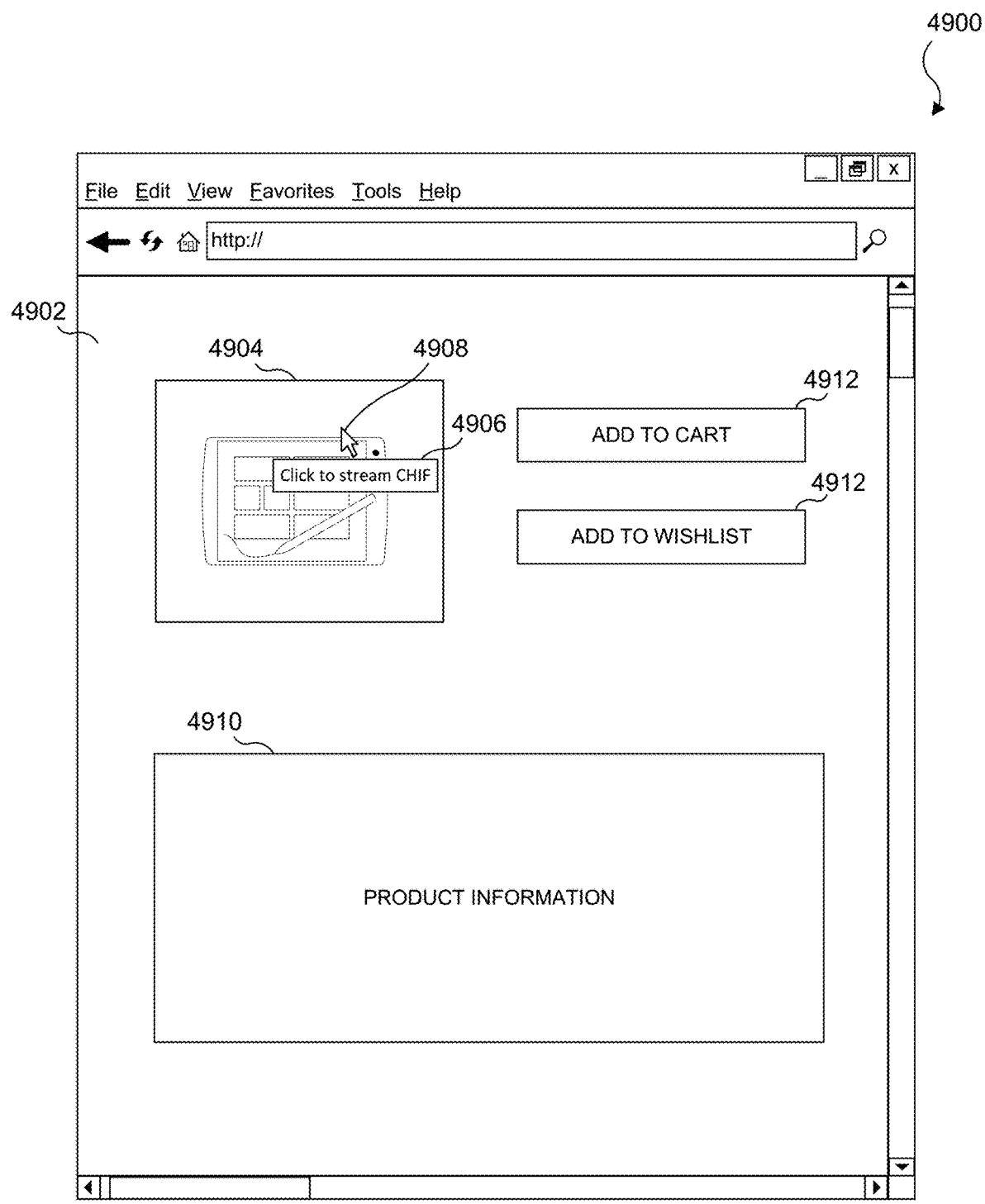
FIG. 49 illustrates an example browser window in accordance with various embodiments of the present disclosure.

FIG. 49 illustrates an example browser window 4900 in accordance with various embodiments of the present disclosure. As described herein with respect to FIG. 48, a preview of a CHIF file can be presented before decoding and/or presentation of CHIF file contents. The browser window 4900 includes a webpage 4902 that includes a preview image 4904. The preview image can be configured to display alternative text 4906 when a mouse cursor 4908 moves over the preview image 4904. The alternative text 4906 can provide additional information concerning the contents of a CHIF file, a user action prompt, or other information. In the example of FIG. 49, the alternative text 4906 prompts the user to click the preview image 4904, which initiates decoding and displaying of CHIF file contents. A server may decode a stored CHIF file and then transmit the content for presentation on the webpage 4902. The webpage 4902 can include other content such as user interaction buttons 4912 and textual product information 4910.

Presenting audio with an image in this way offers a more efficient means of providing audio information with an image. Typically, if one wishes to provide image content in association with audio content, one would create a video file, such as an MP4 file, and lay an audio track over the image. This may be an inefficient method of associating audio content with an image because if the goal is to provide audio content with one or more still images, rather than with moving video content, creating a video file to achieve such creates a bigger file than needed, as video files are commonly much larger than an image or an audio file, even when the image or audio file sizes are combined. The CHIF file can be the same or a similar size to the combined size of the image and audio files, and thus provides a more efficient file type that takes up less storage, is transmitted faster, etc. It will be understood that this may be the case for other file types as well, such as if a text document was also included in the CHIF file, the size of the CHIF file would only increase in an amount close to that of the size of the text document. Additionally, the preview of the CHIF contents enables a user to quickly view the preview before deciding whether to view all of the CHIF file contents. It will be understood that the example browser window 4900 is merely an example of where CHIF file content can be encountered by users. CHIF file contents and associated previews can also be presented in other applications, such as retailer applications, social media applications, app store applications, or others.

Figure 50:
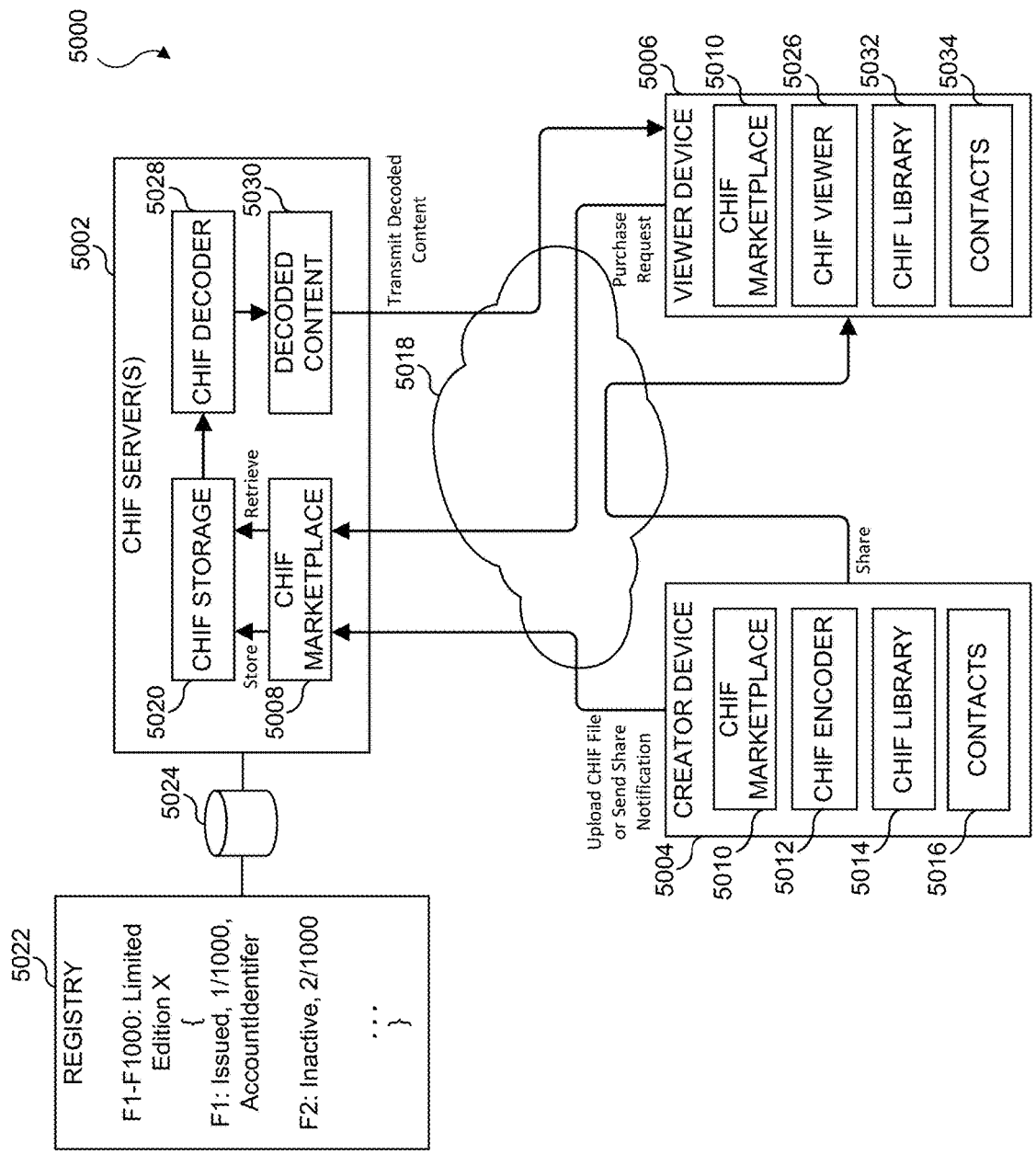
FIG. 50 illustrates a CHIF file scarcity creation system in accordance with various embodiments of the present disclosure.

FIG. 50 illustrates a CHIF file scarcity creation system 5000 in accordance with various embodiments of the present disclosure. The system 5000 can be used to create a limited number of digital assets. The system 5000 includes at least one CHIF server 5002, at least one creator device 5004, and at least one viewer device 5006. In various embodiments of the present disclosure, a content creator may desire to create a limited quantity of copies of a CHIF file for dissemination, such as a limited music single release, a special edition book or comic book, a limited video, or other content that can be limited by the number of copies. For example, a music artist may wish to release only 1000 copies of a promotional single to increase demand and mystique for the product. A digital CHIF marketplace can be managed by the CHIF server 5002 to provide access to, and a user interface for, a repository of CHIF files. The creator device 5004 can access the CHIF marketplace 5008 using a CHIF marketplace application 5010. The creator device 5004 can use a CHIF encoder 5012 to create a CHIF file, and then upload the CHIF file to the CHIF server 5002 via the CHIF marketplace application 5010. In some embodiments, the CHIF encoder 5012 can provide options for limiting the number of copies of the CHIF file. In some embodiments, limitations on copies can be provided during the upload process of CHIF files using the CHIF marketplace application 5010. The creator device 5004 can also include a CHIF library 5014 that can manage storage of CHIF files locally on the creator device 5004 and/or keep track of CHIF files associated with a user account to display to a user of the creator device 5004 the CHIF files to which the user has access via the CHIF marketplace 5008. The creator device 5004 can also include a contacts list 5016 that can be used, such as via the CHIF marketplace application 5010, to share CHIF files from the creator device 5004 to the viewer device 5006.

When the creator device 5004 creates a CHIF file using the CHIF encoder 5012 and requests to upload the CHIF file to the CHIF marketplace 5008 via the CHIF marketplace application 5010, the creator device 5004 transmits over a network 5018 the created CHIF file to the CHIF marketplace 5008 provided by the server 5002. The CHIF file is then saved in CHIF storage 5020. The CHIF file can also be assigned a UUID either at the time of creation by the CHIF encoder 5012, or upon upload to the server 5002. The UUID of the CHIF file can be associated with the creator of the CHIF file, or with other data, in a registry 5022 stored in a database 5024. If the CHIF file is to be a limited copy CHIF file, a series of UUIDs, such as a series of sequential UUIDs, can be allocated or reserved for use by CHIF file copies and stored in the registry 5022. For example, as shown in FIG. 50, the registry 5022 in this example includes 1000 reserved UUIDs F1-F1000 associated with content titled "Limited Edition X." For each UUID in the registry 5022, a status such as "issued" or "inactive" can be associated with the UUID, wherein "issued" designates that the UUID is already in use, and thus a copy has been created, while "inactive" designates that a copy has not yet been created and a UUID not yet assigned. It will be understood that the status can be listed in other ways, such as using an assigned flag with a binary 0 (unassigned) and 1 (assigned).

The registry 5022 can also store in association with UUIDs a sequence number that can either be a single number, or a number out of a total number as shown in FIG. 50. For example, UUID F1 in FIG. 50 shows a sequence number of 1/1000, indicating F1 is the first copy out of 1000 possible copies. When the max number of copies have been reached, the server 5002 can deny further requests via the marketplace for copies. In some embodiments, instead of reserving a series of sequential UUIDs, a separate sequential number can be assigned to a CHIF file when created based on examining the registry 5022 to determine how many CHIF files for a given limited content have previously been created. In such an embodiment, the UUID may not be sequential, but the registry 5022 and metadata of the CHIF file can include the sequence number for the CHIF file. The UUID and the sequence number, if any, can both be stored in the registry and in CHIF file metadata. The registry 5022 can also associate CHIF files with a user account such as a unique account name or account identifier. Associating the CHIF file to an account ensures that only users granted access to the copy of the CHIF file can view the CHIF file when logged in. That is, if a CHIF file is copied to another device that is not logged in to the associated user account, attempted decoding and viewing of the CHIF file can be blocked.

After a limited copy CHIF file is created and stored on the server 5002, the viewer device 5006 can browse the CHIF marketplace 5008 via a CHIF marketplace application 5010 installed on the viewer device 5006, or accessed via a web browser. The viewer device 5006 can then select a CHIF file for download and/or purchase, and send a request for the selected CHIF file to the CHIF server 5002. Upon the CHIF marketplace services 5008 on the CHIF server 5002 receiving the purchase request from the viewer device 5006, the server 5002 determines a storage location in the CHIF storage 5020 for the requested CHIF file, and consults the registry 5022 to find the next available UUID and/or sequence number to be used for the requested CHIF file. The server 5002 then alters the registry to mark the available UUID as issued. In some embodiments, the server 5002 can then transmit the CHIF file to the viewer device 5006 for download by the viewer device 5006, which can decode and view the CHIF file in a CHIF viewer 5026. In some embodiments, for example as shown in FIG. 50, the server 5002 decodes the CHIF file via a CHIF decoder 5028 executed by the server 5002, and transmits the decoded content 5030 to the viewer device 5006 for viewing via the CHIF viewer 5026. In some embodiments, the server 5002 can also generate a number of copies according to the copy limit for storage in the CHIF storage 5020, each having a UUID and sequence number in the CHIF file metadata.

The viewer device 5006 can also include a CHIF library 5032 that can manage storage of CHIF files locally on the viewer device 5006 and/or keep track of CHIF files associated with a user account to display to a user of the viewer device 5006 the CHIF files to which the user has access via the CHIF marketplace 5008. The viewer device 5006 can also include a contacts list 5034 that can be used, such as via the CHIF marketplace application 5010, to share CHIF files from the creator device 5004 to the viewer device 5006. For example, in some embodiments, a copy of a limited copy CHIF file can be shared from one device to another, such as between the creator device 5004 and the viewer device 5006. For example, the user of the viewer device 5006 can be in the contact list 5016 of the creator device 5004, and the creator device 5004 can share a copy of the CHIF file to the viewer device 5006 via an application with access to the contacts list 5016, such as the CHIF marketplace application 5010. As another example, an artist may wish to share free samples of a limited promotional single, and send an email to users in a fan list with a link to download the single via the marketplace. Other methods of sharing the CHIF file can include via email, short message service (SMS) or text message, or chat applications. When the creator device 5004 shares the CHIF file with the viewer device 5006, in some embodiments the creator device 5004 can create a CHIF file with a new UUID and/or sequence number, and then notify the server 5002 of the sharing event so that the server 5002 can update the registry 5022 accordingly using the UUID and/or sequence number in association with the particular item of content. The creator device 5004 can then transmit the CHIF file to the viewer device 5006. In some embodiments, instead of transmitting the CHIF file from the creator device 5004 to the viewer device 5006, the creator device 5004 can create and upload to, or request an already uploaded CHIF file from, the server 5002, and the server 5002 provides the shared CHIF file to the viewer device 5006, such as via the CHIF marketplace 5010. The sharing notification from the creator device 5004 also prompts the server 5002 to check the registry 5022 to determine if the CHIF file has reached its copy limit, and, if so, can deny the share event.

Figure 51:
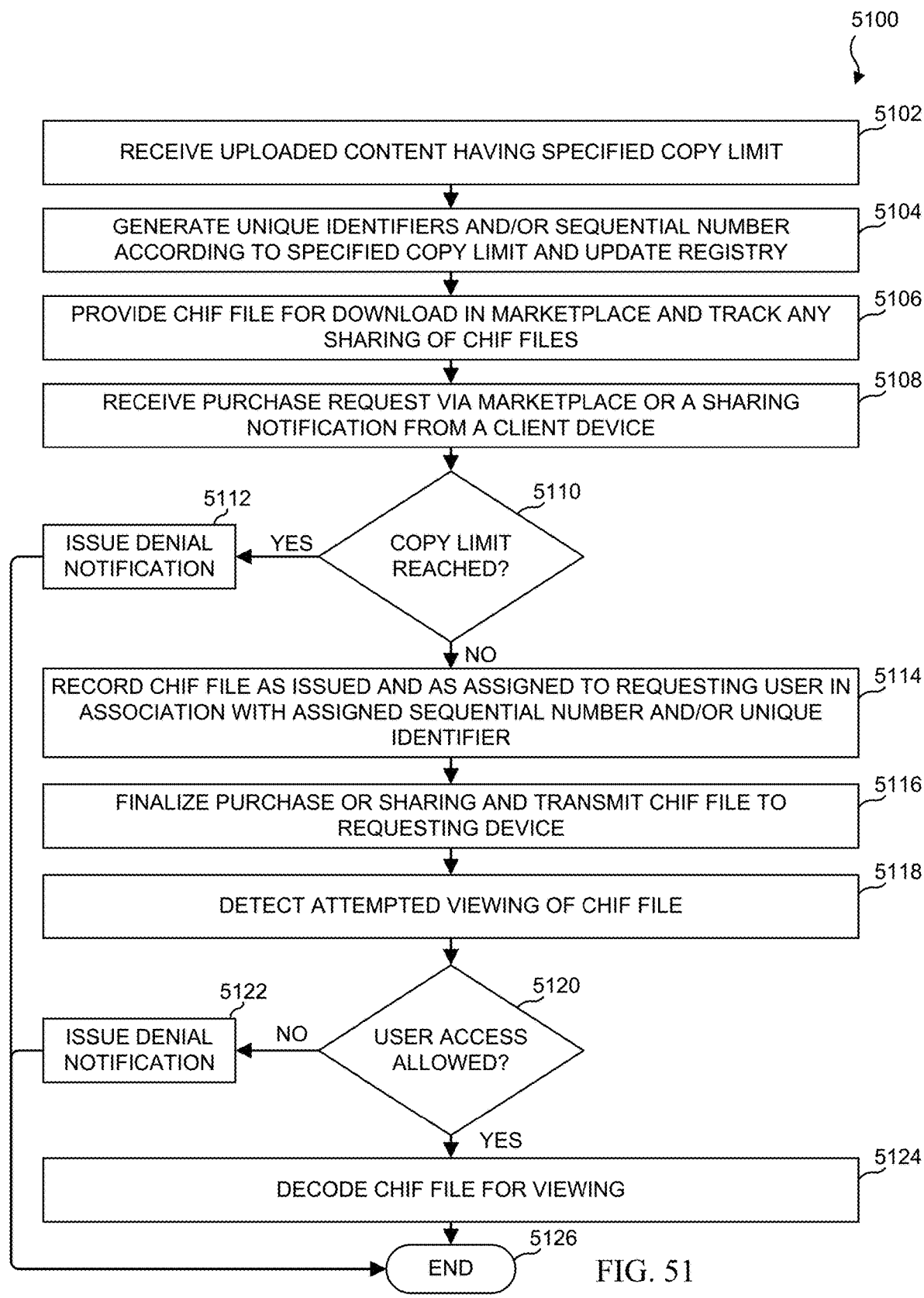
FIG. 51 illustrates a CHIF file scarcity creation process in accordance with various embodiments of the present disclosure.

FIG. 51 illustrates a CHIF file scarcity creation process 5100 in accordance with various embodiments of the present disclosure. The process 5100 can be used with any of the systems and other processes described herein, such as the system 5000. The process 5100 can be performed and executed by a processor such as the processor 6502 described herein, and/or by a server such as the CHIF server 5002. The process 5100 begins at block 5102. At block 5102, the processor receives uploaded content, such as a newly created CHIF file, that includes a specified copy limit. At block 5104, the processor generates a set of unique identifiers and/or sequence numbers according to the specified copy limit, such as that described with respect to FIG. 50. The processor updates a CHIF file registry with the set of unique identifiers and/or sequence numbers associated with the content included in the CHIF file, to track the creation, copying, and sharing of the CHIF file, such as described in FIG. 50. At block 5106, the processor provides the CHIF file for download in a CHIF marketplace and tracks the downloading of CHIF files from the marketplace, and otherwise tracks the sharing of CHIF files, such as sharing between client devices.

At block 5108, the processor receives a request via the marketplace, or receives a sharing notification, indicating a request or sharing event for a copy of the uploaded CHIF file. At decision block 5110, the processor determines if the copy limit has been reached, that is, the number of downloads/purchases and shares of the limited CHIF file exceeds the specified copy limit. If so, at block 5112, the processor issues a denial notification that is transmitted to the device that requested the CHIF file at block 5108. The process then ends at block 5126. If, at decision block 5110, the processor determines that the copy limit has not been reached, the process 5100 moves to block 5114. At block 5114, the processor records a new copy of the CHIF file as issued and as being assigned or associated with the requesting user account, all in association with an assigned sequential number and/or unique identifier of the CHIF file, which information can be recorded in the registry accessible to the server. At block 5116, the processor finalizes the purchase or sharing, and transmits, or allows transmission of, the CHIF file to the requesting device.

At block 5118, the processor, such as via a decoder script that notifies the processor of decoding and/or viewing attempts for CHIF files, detects an attempted viewing of the CHIF file. At decision block 5120, the processor determines if there is a user account associated with the attempted viewing, and, if so, if the user account is allowed access to the CHIF file based on the data associated with the UUID of the CHIF file previously recorded. If the user account is not allowed access, at block 5122, the processor issues a denial notification. The process 5100 then ends at block 5126. If, at decision block 5120, the processor determines that the user account is allowed access to the CHIF file, the processor, at block 5124, decodes, or allows another device, such as the requesting device, to decode, the CHIF file for viewing of the contents of the CHIF file. The process 5100 then ends at block 5126.

Figure 52:
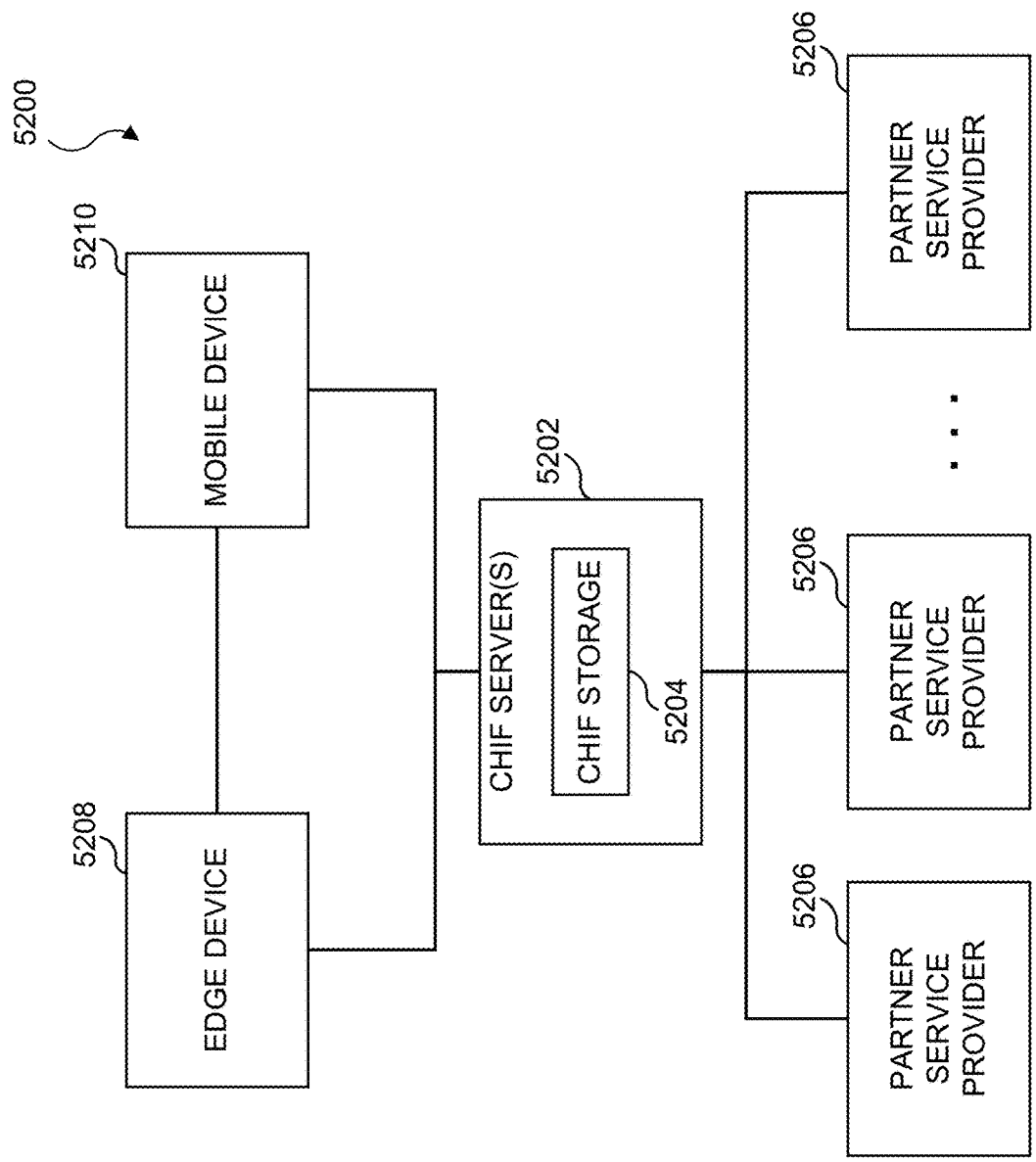
FIG. 52 illustrates an example data mobility and edge computing system in accordance with various embodiments of the present disclosure.

FIG. 52 illustrates an example data mobility and edge computing system 5200 in accordance with various embodiments of the present disclosure. Existing systems for providing information and/or offers to users via mobile devices are limited in that the existing systems often use a realtime database to store information and offers pertaining to users from various businesses, wherein the realtime database must include information and offers from all partners for all customers. This is expensive and often risky to build and maintain. It also presents a security risk, as customer may not want their data aggregated and shared within the realtime offer database with third-party businesses.

In addition to the disadvantages of maintaining a realtime database for third-party information and offers, traditional cloud computing in which content storage and online computations are performed by remote servers that send and receive data from client devices can have poor performance due to latency. The time it takes for data to travel over even fiber networks connecting servers to radios in towers or base stations, client devices, or other network devices often provides for poor user experience, as the user must wait for communications to travel the required distance to and from the servers. To counter poor performance of traditional cloud computing, and with the advent of 5G networks, the various embodiments of this disclosure can incorporate edge computing strategies to decrease latency and improve the user experience for users creating, receiving, and viewing CHIF files. Edge computing, or multi-access edge computing (MEC), as provided in the various embodiments herein, incorporates a network architecture that enables cloud computing to be performed at the edge of a network, such as near a base station, at CDN edge cache servers, or on client mobile devices. Online computations can therefore be performed closer to end users, speeding up communications between the users and service providers.

While edge computing can provide the above benefits, there exist issues with edge computing solutions. The distributed nature of edge computing introduces a shift in security schemes used in cloud computing. Different encryption mechanisms should be implemented for edge computing systems, since data may transit between different distributed nodes connected through the Internet before eventually reaching the cloud. Edge nodes or devices may also be resource constrained devices, limiting the choice in terms of security methods. Additionally, edge computing results in a shift from a centralized top-down infrastructure to a decentralized trust model. An advantage of edge computing, however, is that data can be kept at the edge, shifting ownership of collected data from service providers to end-users. The various embodiments of the present disclosure can address the security issues of edge computing by providing data to edge devices in secure, encrypted, and self-contained CHIF files. The various embodiments of the present disclosure also allow at least portions of data to be retained and cached by edge devices, such as CDN edge cache servers, 5G base stations, and user mobile devices.

The data mobility and edge computing system 5200 includes one or more CHIF servers 5202 that include one or more CHIF storages 5204 for storing CHIF files to be provided to edge devices and/or end users. While the CHIF servers 5202 can provide various services that involve the creation and transmission of CHIF files for use by edge devices and client devices, partner service providers 5206 can also offer various services through the CHIF servers 5202 such as travel arrangement services, advertising services, content management services such as music library store, management, and streaming services, special retail offers for subscribing users, or any other services that can be offered by third-parties to end users. The CHIF servers 5202 can act as a middle man for these offered services, receiving and storing CHIF files containing offers, advertisements, purchased content, or other services. The CHIF servers 5202 can also provide an integrated user marketing and preferences platform. Consent can be provided in advance from users for various services provided by the partner service providers 5206, so that users only receive CHIF files, or decoded CHIF file content, from authorized partner service providers 5206.

Additionally, the CHIF server 5202, or an edge device 5208 in some embodiments, can detect events that trigger a request from the CHIF servers 5202 for offers, information, or other services from the partner service providers 5206. For example, if a user purchases a physical or digital good from a retailer, the edge device 5208 and/or the CHIF server 5202 can be notified, and in turn request offers from relevant partner service providers 5206, such as a partner service provider 5206 associated with the retailer from which the physical or digital good was purchased, or partner service providers 5206 that offer goods or services related to the purchased physical or digital good. As another example, if an end user misses a travel arrangement, such as a flight, the user's mobile device 5210 can send a notification to an edge device 5208 or to the CHIF server 5202. The edge device 5208 and/or the server 5202 can then request travel arrangement offers from the partner service providers 5206, such as alternative flight options, hotel bookings, restaurant reservations, or other offers.

To reduce latency and facilitate quicker response times for users to send notifications regarding events, receive information, offers, etc., from partner service providers 5206, or send responses to the information, offers, etc., CHIF files containing the information, offers, etc. can be provided to the edge device 5208 from the CHIF server 5202. The edge device 5208 can also be provided with the necessary assets and code to decode CHIF files, present the information, offers, etc. to the mobile device 5210, such as via a web browser or other type of application on the mobile device, and receive responses from the mobile device 5210 regarding the information, offers, etc. The edge device 5208 can, in some embodiments, receive CHIF files directly from partner service providers 5206. In various embodiments disclosed herein, the edge device 5208 can be one or more CDN edge cache servers that reside at various locations for providing service to nearby end users, base stations such as 5G radio towers, or other edge computing devices. Therefore, instead of the mobile device 5210 being required to transmit and receive all responses regarding the information, offers, etc., to and from a remote server such as the CHIF server 5202, the mobile device 5210 can communication with the edge device 5208. The edge device 5208 can thus store or cache the assets and code necessary to decode data from the CHIF files, provide the information, offers, etc. from the CHIF files to the mobile device 5210, and receive messages from the mobile device 5210 regarding the decoded data, such as selecting one of the offers. The selection can then be transmitted to the partner service provider 5206 associated with the selected offer to facilitate service to the mobile device 5210 for the selected offer.

For example, if a CHIF file provided by a partner service provider 5206 including an offer for alternative travel accommodations is sent to the edge device 5208, the edge device can use cached assets and code to decrypt and/or decode the CHIF file, and transmit the decoded CHIF file contents to the mobile device 5210 for viewing by the mobile device 5210. In various embodiments disclosed herein, the CHIF server 5202 can detect a location of the mobile device 5210, and route CHIF files received from partner service providers 5206 to one or more edge devices 5208 near the mobile device 5210, so that the mobile device 5210 receives service with reduced latency and to provide the user with an enhanced user experience.

In some embodiments, the mobile device 5210 can act as an edge computing device. CHIF files can be transmitted from the CHIF server 5202, or from one or more partner service providers 5206, to the mobile device 5210, along with the assets and code necessary to decrypt and decode the CHIF files. The mobile device 5210 can then decrypt and/or decode CHIF files to view the information, offers, etc., and respond to the information, offers, etc., either to the CHIF server 5202, or directly to the partner service providers 5206. In some embodiments, the assets and code necessary to decrypt and decode CHIF files can be stored or cached on the mobile device 5210. Therefore, the mobile device 5210 need only receive one communication including a CHIF file, and can then view the CHIF file contents and send one response back, if any, rather than sending and receiving multiple communications between the mobile device 5210 and a remote server, such as the CHIF server 5202. In some embodiments wherein CHIF files provided by the partnered service providers 5206 are immutable, updated CHIF files, such as if an offer expires, including new information can be transmitted by the partnered service providers 5206. In some embodiments wherein CHIF files are mutable containers, the original CHIF file can be edited with the offer information.

Figure 53:
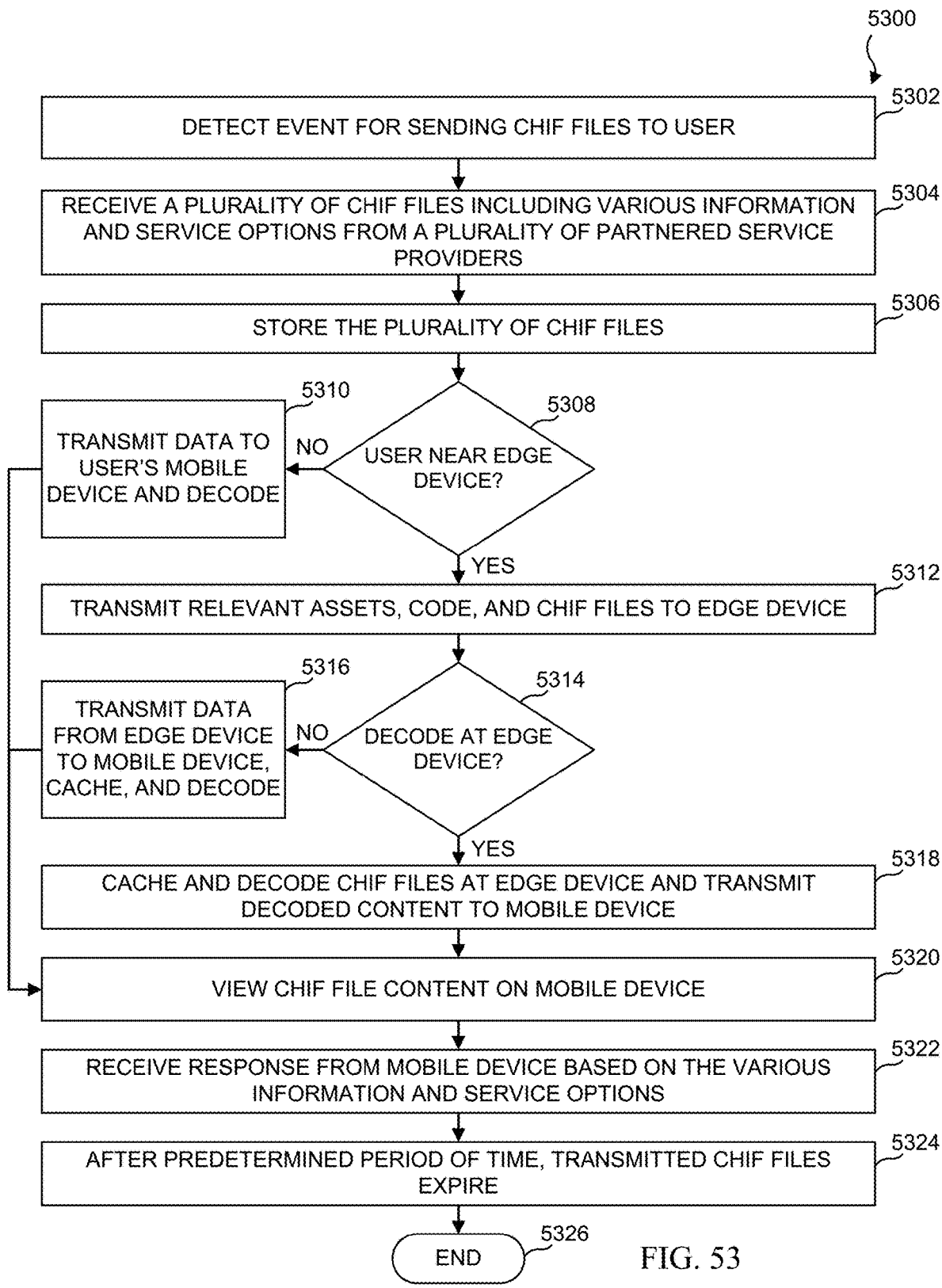
FIG. 53 illustrates an example data mobility and edge computing process in accordance with various embodiments of the present disclosure.

FIG. 53 illustrates an example data mobility and edge computing process 5300 in accordance with various embodiments of the present disclosure. The process 5300 can be used with any of the systems and other processes described herein, such as the system 5200. The process 5300 can be performed and executed by a processor such as the processor 6502 described herein, and/or by a server such as the CHIF server 5202, or a processor of an edge device such as edge device 5208. The process 5300 begins at block 5302. At block 5302, the processor detects an event that triggers sending of CHIF files to a user, such as a new purchase by the user, a user checking in at a location, a travel delay or change, or other events. At block 5304, the processor receives a plurality of CHIF files including various information, service options, offers, advertisements, or other content from a plurality of partnered service providers, related to the event detected in block 5302. At block 5306, the processor causes the plurality of CHIF files to be stored, such as in a storage device of a CHIF server. In some embodiments, the processor may not cause the plurality of CHIF files to be permanently stored, but may instead temporarily store the CHIF files long enough to transmit the CHIF files to an edge device or a user's mobile device.

At decision block 5308, the processor determines if a user's mobile device is near an edge device, such as a CDN edge server or a base station. If not, at block 5310, the processor causes the relevant CHIF files previously stored to be transmitted to the user's mobile device, along with any code or assets the mobile device can use to decrypt and decode the relevant CHIF files. In some embodiments, the mobile device may already have cached the assets and code used to decrypt and decode the relevant CHIF files. The processor then moves to block 5320, where the user views the decoded CHIF file contents on the mobile device. In some embodiments, if the mobile device is not to be used as an edge device, the processor can cause the server to decode the CHIF file contents and transmit the CHIF file contents to the mobile device for viewing by the mobile device. If, at decision block 5308, the processor determines that the mobile device is near an edge device, such as a CDN edge server or a base station, the process 5300 moves to block 5312. At block 5312, the processor causes the relevant assets, code, and CHIF files to be transmitted to the edge device. At decision block 5314, the processor and/or the edge device determines if the CHIF files should be decoded at the edge device. If not, at block 5316, the edge device transmits data including the CHIF files and any items needed to decrypt and decode the CHIF files locally on the mobile device, such as encryption keys and decoding scripts. The process 5300 then moves to block 5320.

If, at decision block 5314, the processor and/or the edge devices determines that the CHIF files are to be decrypted and/or decoded by the edge device, the process 5300 moves to block 5318. At block 5318, the edge device caches the assets and code, if such has not already been cached before, decrypts and/or decodes the received CHIF files, and transmits the decoded content to the mobile device. At block 5320, the mobile device views the decoded content, such as advertisements, offers, service provider information, etc. At block 5322, the processor and/or the edge device receive a response from the mobile device based on the various information and service options provided to the mobile device user via the transmitted CHIF files. In some embodiments, the mobile device can send a response directly to a partnered service provider. The response can trigger other events based on the information, offers, etc. provided in the CHIF files, such as purchasing a good, booking a travel arrangement, or other events. At block 5324, after a predetermined period of time has elapsed, the CHIF files transmitted to the edge device and/or the mobile device expire, so that out-of-date information, offers, etc. cannot be accepted or responded to by users. The process 5300 ends at block 5326.

Figure 54:
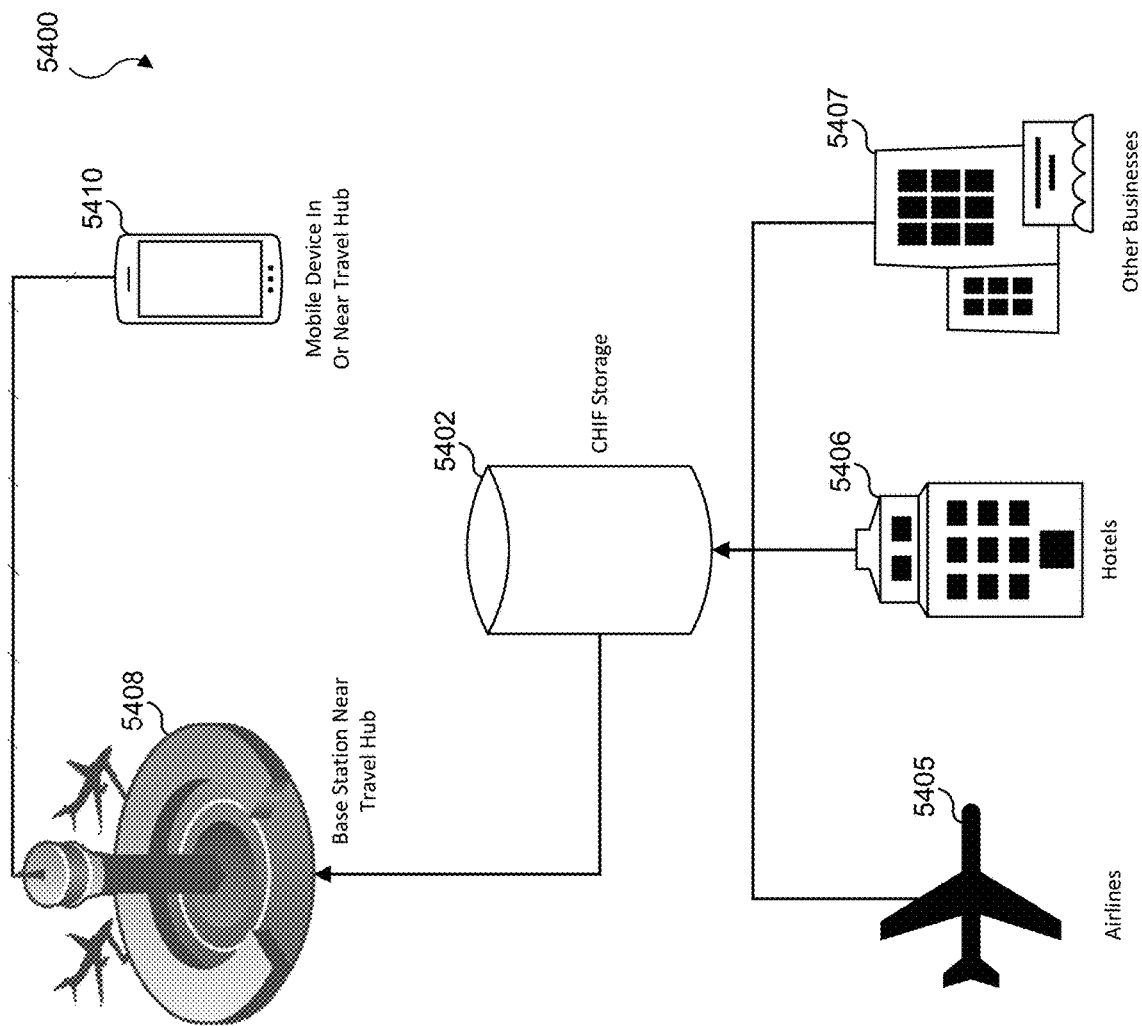
FIG. 54 illustrates an example travel arrangement offers and edge computing system in accordance with various embodiments of the present disclosure.

FIG. 54 illustrates an example travel arrangement offers and edge computing system 5400 in accordance with various embodiments of the present disclosure. As described with respect to FIGS. 52 and 53, edge devices can be utilized to provide services to mobile devices with reduced latency and thus an improved user experience. This can be even more important when a user needs to quickly make new travel arrangements, such as if the user misses a flight or other transportation option. In this example, if a user misses a flight, the user's mobile device 5410 can send a notification of the missed flight to a base station 5408 that is nearby to the travel hub, such as a base station near an airport. The base station 5408, in some embodiments, can already have cached thereon assets and code used for decrypting and decoding CHIF files and/or providing other travel options to the user. In some embodiments, a CHIF storage 5402 can receive offers secured in CHIF files for alternate travel arrangements from partnered service providers, such as one or more airlines 5405, one or more hotels 5406, and/or one or more other business types 5407, which can be the partnered service providers 5206 described in FIG. 52. The CHIF files received by the CHIF storage 5402 can then be provided to the base station 5408. In some embodiments, if the base station 5408 does not already have cached thereon assets and code for manipulating CHIF files and for providing the offers to the mobile device 5410, the CHIF storage 5402 can also send the assets and code to the base station 5408. The CHIF storage 5402 can, in some embodiments, be the CHIF server 5202 described in FIG. 52. In some embodiments, the base station 5408 can receive CHIF files directly from the partnered service provider without using the CHIF storage 5402. In some embodiments, the CHIF storage 5402 can be associated with or be part of the base station 5408.

As the base station 5408 receives the CHIF files from the partnered service providers, the base station 5408 can either provide the CHIF files to the mobile device 5410 for decoding of the CHIF files, such as in a mobile application or a webpage in a web browser in which the user selects offers and a script decodes the CHIF file for the offer to present the offer information to the user, or the base station 5408 can decode the CHIF files, the contents of which are then presented to the user. The offers presented to the user can include, in this example, flight options, hotel reservation options, restaurant reservation options, or other options related to travel. The code cached on the base station can also be configured to present options, timelines, sorted information, and otherwise assist the customer with making a decision based on the available offers. At the end of the session between the base station 5408 and the client device 5410, or at any other predetermined time, the CHIF files can expire, and all decoded contents deleted. This prevents data from being permanently moved or stored on the base station 5408 or the mobile device 5410.

Figure 55:
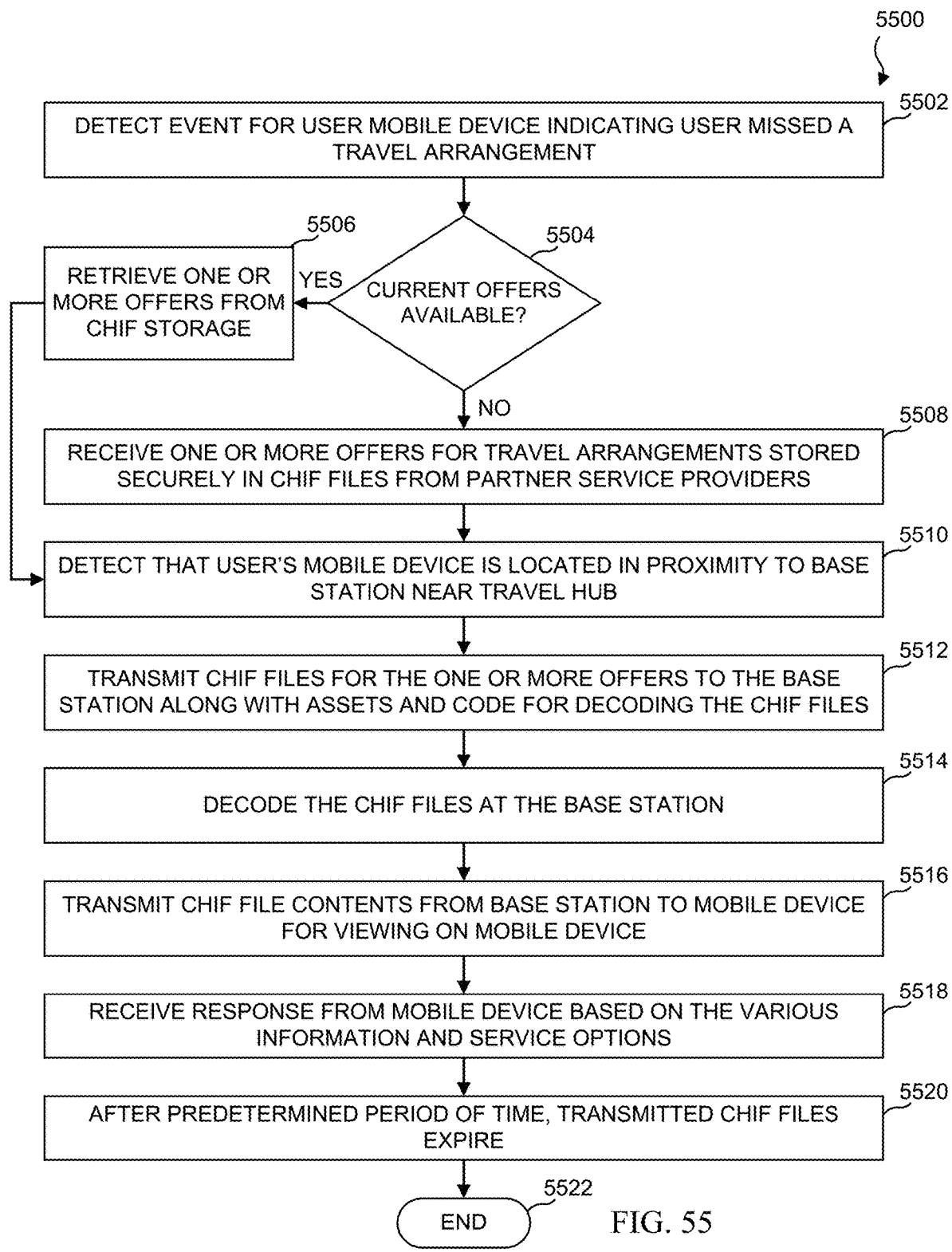
FIG. 55 illustrates an example travel arrangement offers and edge computing process in accordance with various embodiments of the present disclosure.

FIG. 55 illustrates an example travel arrangement offers and edge computing process 5500 in accordance with various embodiments of the present disclosure. The process 5500 can be used with any of the systems and other processes described herein, such as the system 5400. The process 5500 can be performed and executed by a processor such as the processor 6502 described herein, and/or by a server such as the CHIF server 5202, or a processor of an edge device such as edge device 5408. The process 5500 begins at block 5502. At block 5502, the processor detects an event from a user's mobile device indicating the user missed a travel arrangement. In some embodiments, the detection of the event can be due to a notification from the user's mobile device, while, in some embodiments, the processor can track the user's travel arrangements and can detect if a user does not board a flight, check-in to a hotel by a certain point in time, etc.

At decision block 5504, the processor determines if there are any current offers available. In some embodiments, limited time offers can be provided from partnered service providers even when there is not a known event such as a missed travel arrangement, in which case, if the offers have not expired, the processor can retrieve the offers for the user of the mobile device. If there are current offers available, at block 5506, the processor retrieves one or more current offers from a CHIF storage. The process 5500 then moves to block 5510. If, at decision block 5504, the processor determines that there are not currently any relevant offers to provide to the user, the process 5500 moves to block 5508. At block 5508, the processor requests and receives one or more offers for travel arrangements stored securely in CHIF files from partner service providers. At block 5510, the processor detects that the user's mobile device is located in proximity to a base station near a travel hub. It will be understood that the base station can be another edge computing device, such as one or more CDN edge servers. At block 5512, the processor causes the CHIF files, whether retrieved at block 5506 or received at block 5508, to be transmitted to the base station. In some embodiments, assets and code for the decoding of CHIF files and for presenting offers to the user can also be transmitted to the base station. In some embodiments, this data may already be cached at the base station, and only the CHIF files are sent. In some embodiments, instead of detecting a user's mobile device is near a base station, and then transmitting the CHIF files to the base station, a base station that already has cached assets and code for providing travel arrangement offers to users can detect the event in block 5502, and retrieve or request offers directly from service providers.

At block 5514, the base station decrypts and decodes the CHIF files containing the offers, and, at block 5516, the base station transmits the decoded offers to the mobile device for presentation of the offers to the user, such as in a mobile application or a web browser application. In some embodiments as described herein, the CHIF files can be transmitted to the mobile device and decoded at the mobile device. At block 5518, the processor receives a response from the mobile device related to one of the present offers, which can trigger further events such as booking an alternative flight option, booking a hotel, making a restaurant reservation, calling a cab, or other events. At block 5520, the CHIF files in which the offers were provided expire after a predetermined period of time, such as a number of minutes or hours, or at the end of a communication session between the base station and the mobile device. The process 5500 ends at block 5522.

Figure 56:
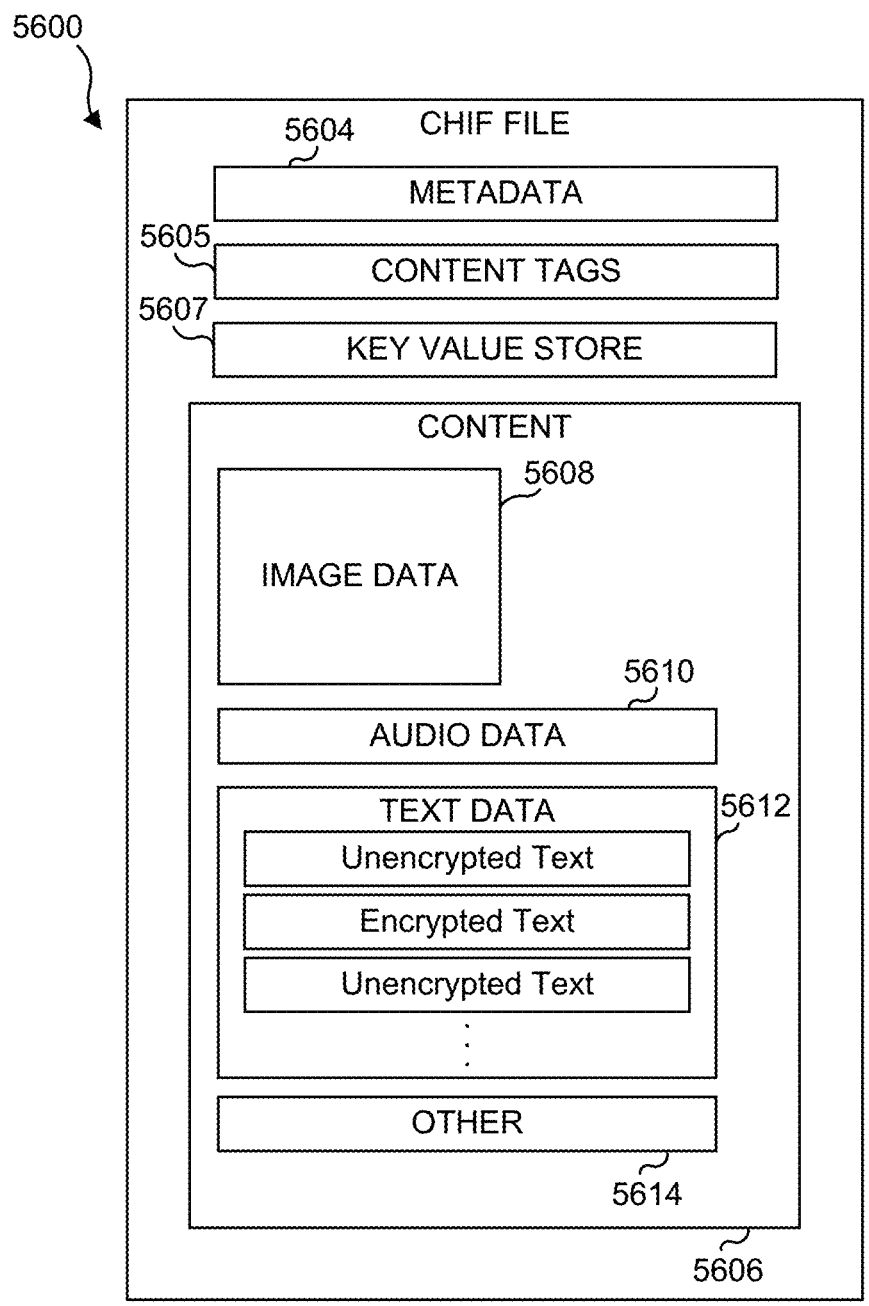
FIG. 56 illustrates an example CHIF file with selectively encrypted content in accordance with various embodiments of the present disclosure.

FIG. 56 illustrates an example CHIF file 5600 with selectively encrypted content in accordance with various embodiments of the present disclosure. The CHIF file 5600 includes metadata 5604 and content 5606. Content 5606 can include image data 5608, audio data 5610, text data 5612, and other data 5614, such as video data or other data types or file types. The metadata 5604 can include various information such as a UUID for the CHIF file 5600 and can delineate how the CHIF file 5600 is constructed for later decoding, as described in the various embodiments herein.

As illustrated in FIG. 56, the text data 5612 can include both unencrypted text and encrypted text. During creation of the CHIF file 5600, certain portions of the text data 5612 can be selected for encryption, such that certain text data is encrypted, and other text data remains unencrypted and available for public inspection upon decoding of the CHIF file. Once the CHIF file 5600 is decoded, the encrypted text data can be decrypted if a user or a user's device is able to generate, retrieve, or access an associated decryption key. In some embodiments, the text data 5612 comprises data structures that include specific text. For example, a data structure included in the text data 5612 can be a string data structure that includes a person's first and/or last name. As another example, a data structure included in the text data 5612 can be an array of text data that includes several associated textual data components. For instance, the array could include medical testing diagnostic information including a testing type, such as a viral test type, e.g., influenza, a test result, e.g., positive or negative, a date first contracted, a testing location, and/or other information. This array could be encrypted or remain unencrypted. For example, the data on just the testing results in the array could remain unencrypted and so that this information in the CHIF file can be easily indexed and searched, while other information, such as personally identifiable information (PII) stored in other data structures, can be encrypted. This creates a public information layer that can be seen as long as the user can decode the CHIF file, and a secure and immutable personal information layer that requires the proper encryption key to access. In some embodiments, a tag data layer 5605 can also include tags that identify or categorize content, such as testing results information, or other types of information, and can be mutable such that this tag data can be changed if needed. For example, the tag data layer 5605 can include tags related to disease data such as a diagnosis, treatment plans, prognosis, etc. with a public classification in an unencrypted state for open examination and aggregate analysis. Encrypted data in the CHIF file 5600 can include a patient's personally identifiable data with PII or HIPPA classification and encrypted with a designated encryption key so only certain roles can access the encrypted data to protect this more sensitive data. In some embodiments, the tag data layer 5605 can be within one of the content areas of the CHIF file 5600, such as the image data 5608, audio data 5610, the text data 5612, or other content types. In some embodiments, such as illustrated in FIG. 56, the tag data layer 5605 can be a layer separate from the content 5606.

Selective encryption thus allows for different data to be encrypted based on data type classifications, and, during creation and encoding of a CHIF file, the specific data components of the text data 5612 can be selected for encryption and encrypted with an encryption key. In some embodiments, each data structure can have a key value and, if a data structure is selected for encryption, the key value for the data structure is stored in a key value store 5607 of the CHIF file 5600. In some embodiments, the key value store 5607 also includes encryption data, such as an initialization vector or hash function used in conjunction with a passphrase provided by a user to generate an encryption key to encrypt the selected data to be encrypted. When the encrypted information in the CHIF file 5600 is to be decrypted, a user again provides the passphrase, which, if correct, is used in conjunction with the initialization vector to decrypt the selectively encrypted content. In some embodiments, key stretching can also be used by also using a random salt, or key strengthening can be used, such as by extending the key with a random salt and then deleting the salt, requiring a legitimate user to have or obtain the salt value. In some embodiments, a different passphrase can be provided for each item of content to be encrypted, to differentially protect each item of content and/or to allow for different users having different passphrases to access only certain encrypted content, while not being able to access other encrypted content for which they do not have the passphrase. In some embodiments, a different initialization vector can also be used for each item of content. For instance, one string including a user's last name and another string including a user's home address can each have a different key value and can be encrypted using a different encryption key generated from using different passphrases. The content key value for each content data structure can then be stored in the key value store 5607, along with the initialization vector. In some embodiments, the content key value can be stored in the metadata 5604. Once the CHIF file 5600 is decoded, each separately encrypted data component can be decrypted by the decoder identifying which content is encrypted according to the key values stored in the key value store 5607, and the decoder can then request the passphrase for each separately encrypted content structure. If the correct passphrase is provided, the content associated with the passphrase is decrypted using the passphrase and the initialization vector. In some embodiments, if an incorrect passphrase is provided, the passphrase may still be used to attempt to decrypt the content, but the resulting decrypted content would be unrecognizable or indiscernible to the user, as the incorrect passphrase would not provide the original content. In some embodiments, other portions of the CHIF file 5600 can also be encrypted, such as the image data 5608, the audio data 5610, and/or the metadata 5604.

Figure 57:
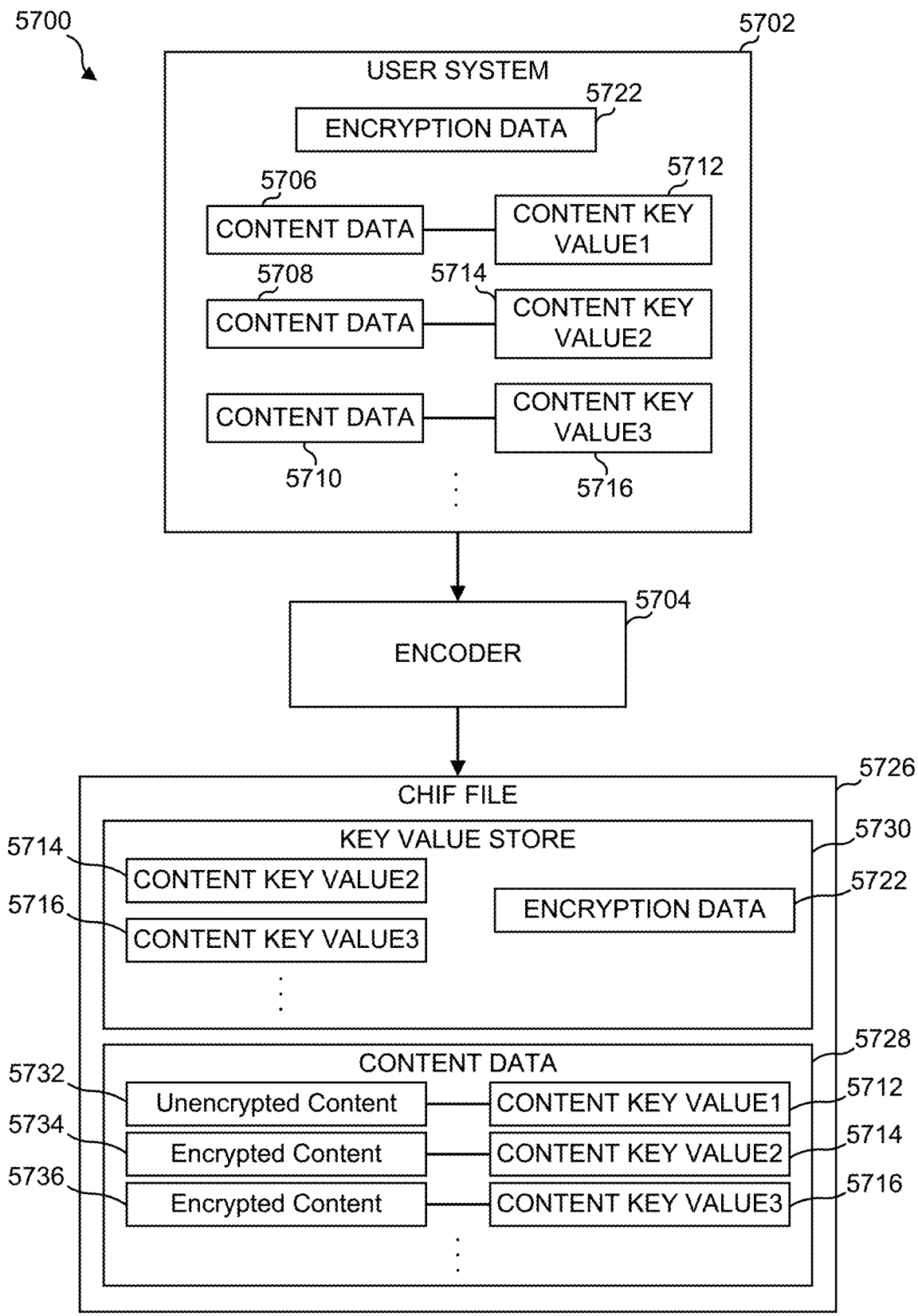
FIG. 57 illustrates an example CHIF selective encryption system in accordance with various embodiments of the present disclosure.

FIG. 57 illustrates an example CHIF selective encryption system 5700 in accordance with various embodiments of the present disclosure. The system 5700 includes a user system 5702. The user system 5702 can be any user device capable of encoding and/or decoding CHIF files. The user system 5702 can have stored thereon, or at least stored in a storage location accessible by the user system 5702, a plurality of content such as text data, audio data, video data, image data, or other data as described in the various embodiments herein. As illustrated in the example of FIG. 57, the user system 5702 stores a plurality of data including content data 5706, 5708, and 5710. The plurality of data can be organized to be embodied in various data structures. For example, data can be contained in various data structures such as strings, arrays, stacks, trees, linked lists, graphs, various numerical structures such as integers, floats, etc., graphs, or other data structures. To track content and to facilitate and organize how data is to be encrypted, the plurality of data on the user system 5702 can be associated with content key values, such that a data structure is associated with a content key value and can be accessed or retrieved by its content key value. For example, as illustrated in FIG. 57, content data 5706 is associated with a first content key value 5712, content data 5708 is associated with a second content key value 5714, and content data 5710 is associated with a third content key value 5716. Thus, for instance, content data 5706 can be accessed, retrieved, or otherwise used by referring to the first content key value 5712. This association between content data and content key values can also be useful in presenting information to users of the user system 5702, such as providing information in a fielded form that loads content into the form by retrieving content for each field according to content key values assigned to the fields.

In addition to allowing for content data to be presented in an organized manner to users, the content key values can also be used to associate content data with encryption data 5722 when selectively encrypting content for CHIF files, such as an initialization vector or hash function. As described in other embodiments herein, content to be encoded into a CHIF file can also be selectively encrypted. This allows for different data portions of the CHIF file to be protected by encryption and only accessed if a user has possession of, or access to, the appropriate decryption data, such as a passphrase. In some embodiments of the present disclosure, the selective encryption of CHIF file content can be in a "bring your own key" ("BYOK") arrangement, such that users of the user system 5702 that are creating CHIF files have their own methods encrypting/decrypting content, such as particular key derivation functions. In some embodiments, a central CHIF server, such as CHIF server 4208 or other CHIF servers disclosed herein, can store encryption data for use by third parties that are allowed access to the CHIF server, such as via a login or authentication process.

Whether in a BYOK arrangement, a CHIF server arrangement, or in some other arrangement, the user system 5702 can use a CHIF encoder 5704 stored either on the user system 5702 or on a device to which the user system 5702 has access. The encoder 5704 receives the content data and content key values, and selections for which data to encrypt. The content key values 5712, 5714, 5716 and encryption data 5722 are used when creating a selectively encrypted CHIF file to enable later decryption of CHIF file content by authorized users. For example, as illustrated in FIG. 57, a CHIF file 5726 can be created by the encoder 5704 using the content data and content key values from the user system 5702, and the encryption data 5722. For instance, during creation of a CHIF file by a user of the user system 5702, the user can select from the plurality of content data which of the content data to encrypt, if any, before encoding the data into the CHIF file 5726. When a user selects content data for encryption, an the encryption data 5722 is used to encrypt the selected content data. For example, the encryption data 5722 can include an initialization vector or hash function that takes a passphrase provided by a user and, using the passphrase to generate a secret key, encrypts the selected content data. In some embodiments, different passphrases can be used for certain content data, such as if a first user has a passphrase and is meant to access content data 5708, while a second user has a different passphrase and is meant to access content data 5710. Once the CHIF file 5726 is created, the first user would only be able to decrypt and view the content data 5708 using the first user's passphrase, and the second user would only be able to decrypt and view the content data 5710 using the second user's passphrase. In some embodiments, different encryption data 5722 can be used for each content data structure selected for encryption, to further protect the different content data. In some embodiments, the same encryption data 5722 can be used for more than one content data structure, if chosen to do so by the user. When encryption data 5722 is retrieved and is used to encrypt one or more content data, the CHIF encoder 5704, as disclosed in various embodiments herein, stores the encrypted content and its associated content key value in a content data portion 5728 of the CHIF file 5726. The CHIF encoder also stores in a key value store 5730 of the CHIF file 5726 the content key value associated with the stored encrypted content and the encryption data 5722, such as the initialization of hash function used previously to encrypt the content. In embodiments wherein different encryption data is used for different content data, the encoder 5704 can also store in the key value store 5730 each encryption data used in association with the content key value for the content that particular encryption data was used to encrypt.

For example, as illustrated in FIG. 57, the CHIF file 5726 encoded using the content data from the user system 5702 includes, among other data, unencrypted content 5732 associated with the first content key value 5712, encrypted content 5734 associated with the second content key value 5714, and encrypted content 5736 associated with the third content key value 5716. Thus, the unencrypted content 5732, the encrypted content 5734, and the encrypted content 5736 are the content data 5706, the content data 5708, and the content data 5710, respectively. It will be understood that the unencrypted content 5732, the encrypted content 5734, and the encrypted content 5736, and the content key values 5712, 5714, 5716 encoded in the CHIF file 5700 are unrecognizable and unusable unless decoded by the appropriate CHIF decoder, as described in the various embodiments herein. In order to decrypt the encrypted content 5734 and the encrypted content 5736, the second content key value 5714 is stored in the key value store 5730 of the CHIF file 5726, along with encryption data 5722. Similarly, the third content key value 5716 is stored in the key value store 5730 of the CHIF file 5726.

If different encryption data is used to encrypt the content data 5708 and 5710, the different encryption data can be stored in the key value store 5730 in association with the respective content key values 5714 and 5716. This thus creates an association made up of a content data key value and an encryption data, used in decryption of content. In some embodiments, passphrases used to decrypt content would be known to users who are meant to access the encrypted content, and users can provide a passphrase that is used with the encryption data associated with the content key value as indicated in the key value store 5730 to decrypt content after the CHIF file 5726 is decoded by a decoder. In some embodiments, the encryption data can be an identifier for encryption/decryption keys stored on the user system 5702 or elsewhere, which can be retrieved using the identifier for decryption of the selectively encrypted content. It will be understood that any number of unencrypted or encrypted data can be encoded in this manner in a CHIF file.

When a CHIF file is decoded and encrypted content is encountered, a user may see a message or other indicator that the content is encrypted and is only capable of being decrypted by authorized users. In some embodiments, an authentication process can then be initiated to establish whether or not the user is authorized to access the encryption/decryption key for the content data. In some embodiments, an authentication operation can be performed before decoding to establish the rights of the user so that the user does not have to perform authentication to access data after decoding. For example, the CHIF file 5726 in FIG. 57 can be decoded and, when a user attempts to access one of the encrypted content 5734, 5736, the decoder uses a passphrase provided by the user to attempt to decrypt the content. In some embodiments, the decoder can determine that decryption was unsuccessful, and provide a failure message to the user. In some embodiments, the decoder decrypts the content using the provided passphrase, and, if the passphrase is incorrect, the user is presented with useless or unrecognizable decrypted data. Different encrypted content may have different access parameters. For example, the encrypted content 5734 may only be accessed by one or more certain individuals, accounts, or devices, while the encrypted content 5736 may only be accessed by one or more other individuals, accounts, or devices. If a user is authorized to access the encrypted content 5734 and/or the encrypted content 5736, the decoder uses the data provided by the user with the encryption data 5722 to successfully decrypt the second content key value 5714 and/or the third content key value 5716. In some embodiments, secret keys can be stored in the user system 5702 or another system and retrieved by the decoder for decryption of content. After successful decryption, the encrypted content 5734 and/or the encrypted content 5736 is presented to the authorized user. Selective encryption of content data in this manner allows for users of differing access levels to view certain portions of data stored in CHIF files, while restricting access to more sensitive data, such as PII, stored in a CHIF file.

For example, if a CHIF file stores medical diagnostic or testing information, the CHIF file could have unencrypted portions pertaining to a diagnosis, and perhaps other useful information such as patient geographic area or patient demographics like ethnicity, gender, or age (but not personal information such as name, address, birthdate, etc.), that can be used by a researcher to determine disease trends among diagnosed or tested patients. In addition to a diagnosis or testing result such as a positive or negative test result, the unencrypted content can include testing types such as viral culture, real-time reverse transcription polymerase chain reaction, serology, hemagglutination inhibition, immunofluorescence, enzyme immunoassay, rapid diagnostic tests, or other testing types. The personal information can be encrypted and denied access except to authorized persons, such as a patient's primary care physician. In this manner, positive and negative tests or diagnoses can be tracked by researchers to determine trends among positive or negative cases, such as by testing type, ethnicity, gender, geographic area, or other factors, while also protecting personal patient data or other sensitive data from access. It will be understood that each item of data, whether encrypted or unencrypted, such as diagnosis result, testing type, geographic area, name, address, birthdate, etc., can each be a separate content data structure with an associated content data key value. It will be understood that, in various embodiments herein, the determination as to which content is ultimately encrypted or left unencrypted is up to users creating CHIF files, or coded parameters that encrypt certain data routinely as part of organizational policy.

Figure 58:
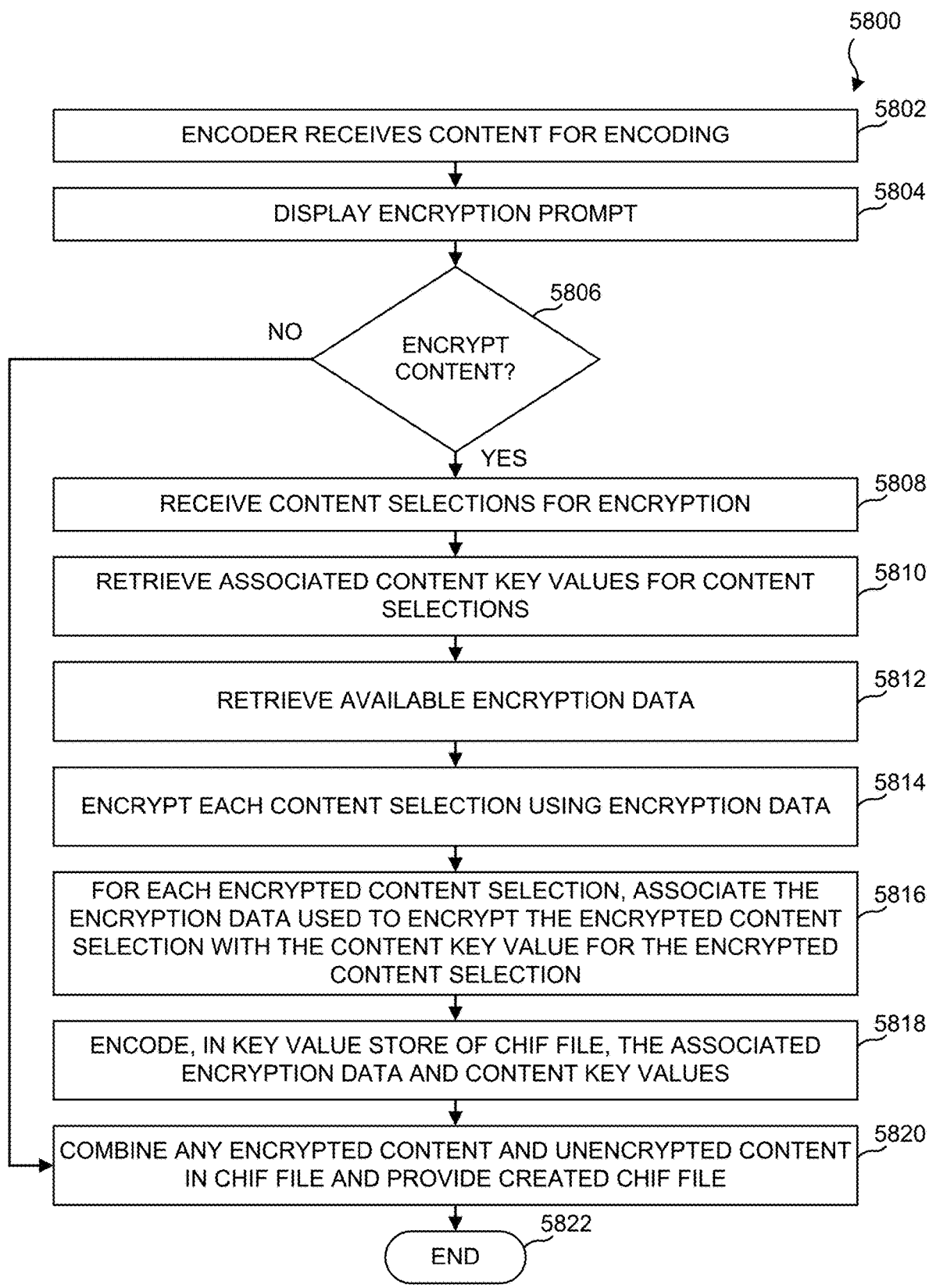
FIG. 58 illustrates an example selective encryption process in accordance with various embodiments of the present disclosure.

FIG. 58 illustrates an example selective encryption process 5800 in accordance with various embodiments of the present disclosure. The process 5800 can be used with any of the systems and other processes described herein. The process 5800 can be performed and executed by a processor such as the processor 6502 described herein, and/or by a server such as the CHIF server 5202, or a processor of an edge device such as edge device 5408. The process 5800 begins at block 5802. At block 5802, the processor, via a CHIF encoder, receives content data for encoding into a CHIF file. At block 5804, the processor displays an encryption prompt. For example, the processor can cause a display of a user device to display a prompt asking the user if any of the content provided for encoding into a CHIF file is to be selected for encryption. In some embodiments, a GUI can be provided allowing a user to see representations of each content data item to be encoded, and to choose which of these to encrypt. In some embodiments, as each content item is provided for encoding into the CHIF file, a user can be prompted as to whether that content item is also selected for encryption.

At decision block 5806, the processor determines if content is to be encrypted. If not, the process 5800 moves to block 5822 wherein the processor encodes the content data into a CHIF file and provides the created CHIF file. The process then ends at block 5824. If, at decision block 5806, the processor determines that there is content to be encrypted, the process 5800 moves to block 5808. At block 5808, the processor receives or retrieves the selected content for encryption. At block 5810, the processor retrieves content key values associated with each of the content selections, as described for example with respect to FIG. 57. At block 5812, the processor retrieves available encryption data, such as an initialization vector or hash function as described with respect to FIG. 57. The processor can also receive a passphrase to be used with the encryption data to derive a secret key to be used for encryption of the content data. In some embodiments, different encryption data and/or passphrases can be used for each content selection to be encrypted, or specific encryption data and/or passphrases can be used for one or more content selections, while another can be used for one or more other content selections, depending how many differing levels of security the user wishes to place on the content data items. At block 5814, the content selections are encrypted using the encryption data.

At block 5816, for each encrypted content selection, the processor associates the encrypted data used to encrypt the content selection with a content key value for the encrypted content selection. As described herein, in some embodiments multiple content keys can be associated with encryption data, or different content keys can be associated with different encryption data. At block 5818, the processor encodes, in a key value store of a CHIF file, the associated encryption data and content key values for the encrypted content. At block 5820, the processor combines the encrypted content and the unencrypted content in a data portion of the CHIF file, completes encoding of the CHIF file, and provides the encoded CHIF file. In some embodiments, content key values for unencrypted content and encrypted content are also encoded into the data portion of the CHIF file. The process 5800 ends at block 5822.

Figure 59:
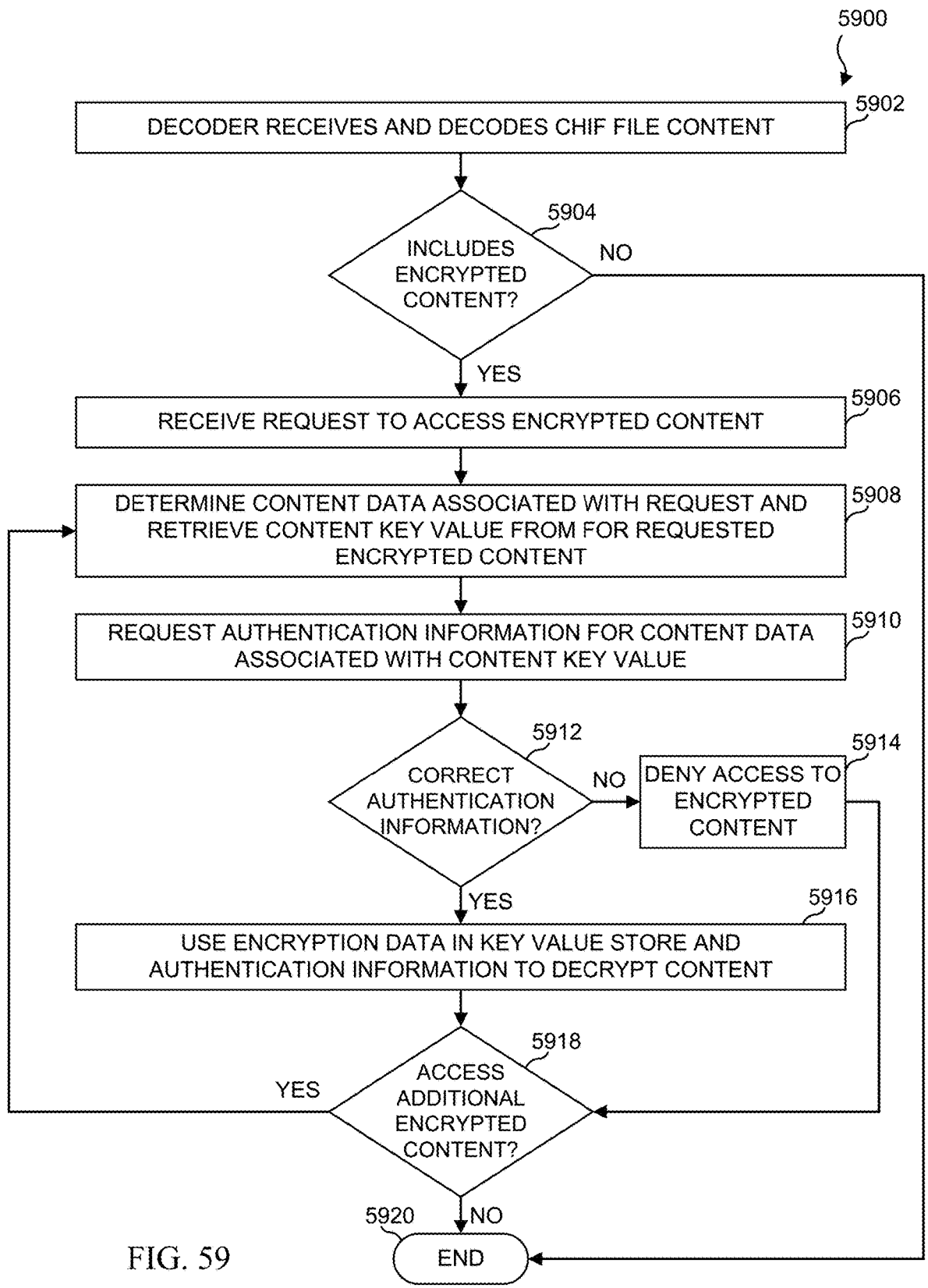
FIG. 59 illustrates an example selective decryption process in accordance with various embodiments of the present disclosure.

FIG. 59 illustrates an example selective decryption process 5900 in accordance with various embodiments of the present disclosure. The process 5900 can be used with any of the systems and other processes described herein. The process 5900 can be performed and executed by a processor such as the processor 6502 described herein, and/or by a server such as the CHIF server 5202, or a processor of an edge device such as edge device 5408. The process 5900 begins at block 5902. At block 5902, the processor, via a CHIF decoder, receives and decodes the CHIF file, as described in the various embodiments herein. At decision block 5904, the processor determines if the decoded content includes encrypted content. In some embodiments, a flag or other indicator can be included in the metadata of the CHIF file indicating that the CHIF file includes encrypted content. If not, the process 5900 ends at block 5920. If so, the process 5900 moves to block 5906.

At block 5906, the processor receives a request to access the encrypted content. At block 5908, the processor determines the content data associated with the request stored in the content data portion of the CHIF file, and retrieves the content key value for the encrypted content to which access is requested, as also described with respect to FIG. 57. In some embodiments, the content key value can be retrieved from the content data portion of the CHIF file. The processor can then locate the content key value stored in the key value store, and determine encryption data associated with the content key value. At block 5910, the processor requests authentication information from the user, such as a passphrase. In some embodiments, authentication information can be provided by the user prior to block 5910, such that the processor already has the authentication information when attempting to decrypt requested content. In some embodiments, a user may provide a secret key to be used, such as choosing a secret key stored on the user's system, prompting the processor to attempt to use the provided secret key.

At decision block 5912, the processor determines if the user provided correct authentication information. For example, if the processor attempts to use a passphrase provided by a user along with encryption data stored in the key value store, such as an initialization vector or hash function, the processer, in some embodiments, can determine the attempt failed based on resulting data from attempting the decryption using the incorrect passphrase. In some embodiments, the processor decrypts the encrypted content using the provided passphrase, resulting in a failure to provide the original unencrypted content. If the correct authentication is not provided, the process 5900 moves to block 5914. At block 5914, access is denied to the encrypted content. The process 5900 then moves to decision block 5918, wherein the processor determines whether access is requested to additional or other encrypted content.

If, at decision block 5912, the authentication information is correct, the process 5900 moves to block 5916. At block 5916, the processor retrieves or uses previously retrieved encryption data from the key value store and, along with the provided authentication information, derives a secret key or decryption key and decrypts the requested content for viewing by the authenticated user. The process 5900 then moves to decision block 5918. If, at decision block 5918, access is requested to additional or other encrypted content, the process 5900 moves back to block 5908 to retrieve the content key value for the additional or other requested content to begin the decryption process for that content. If, at decision block 5918, access is not requested to additional or other encrypted content, the process 5900 ends at block 5920.

Figure 60:
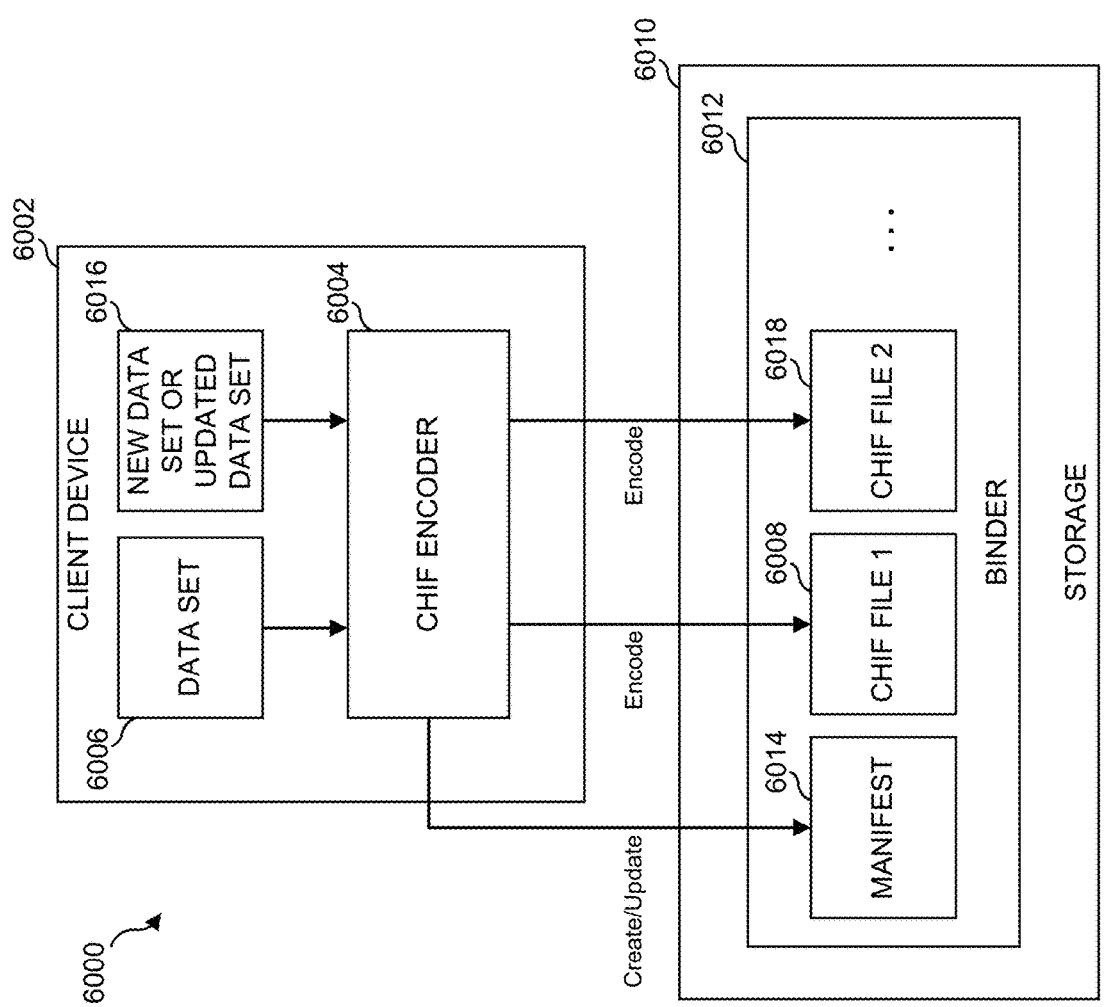
FIG. 60 illustrates an example binder creation system in accordance with various embodiments of the present disclosure.

FIG. 60 illustrates an example binder creation system 6000 in accordance with various embodiments of the present disclosure. The system 6000 includes a client device 6002. The client device 6002 includes a CHIF encoder 6004 configured to encode and combine data into a CHIF file, as disclosed in the various embodiments herein. The CHIF encoder 6004 can also create or update binder files that are container for multiple CHIF containers. A binder file can be useful for associating multiple CHIF files having common data, common ownership, or other factors that create an association between the CHIF files. For example, if an artist is creating a new audio recording, a first recording can be recorded in a first CHIF file, a second recording in a second CHIF file, and so on. Each version of the recording can be saved as each one is created in a binder file, essentially providing a container for multiple data versions. As another example, initial patient diagnostic information can be recorded in a first CHIF file, and further patient testing can be recorded in subsequent CHIF files, which are all stored upon creation in a binder file, such that all diagnostic information on a patient is stored together. In various embodiments herein, CHIF files can be immutable containers that, once created, are not modified, such as not adding any additional content to the created CHIF file. Binders therefore allow a degree of mutability for CHIF files, since subsequent CHIF files can be creates that include new information, updated information, or new versions of content.

In the example illustrated in FIG. 60, the CHIF encoder 6004 receives a data set 6006 to be encoded into a CHIF file. The CHIF encoder 6004 encodes the data set 6006 into a first CHIF file 6008. Upon creation of the first CHIF file 6008, the first CHIF file 6008 can be stored in a storage 6010 as a standalone CHIF file, or a binder file 6012 can be created to store the first CHIF file 6008. When creating the binder file 6012, a CHIF manifest 6014 is created that provides information on the arrangement of CHIF files in the binder file 6012, such as an order of the stored CHIF files, CHIF file content or content types, content tag information, versioning information, such as if the first CHIF file 6008 is a first version, and subsequent CHIF files are subsequent versions, etc. In some embodiments, the CHIF manifest 6014 can provide graphical relationships between CHIF files, such as a graph database including various relationship among the CHIF files stored in the binder 6012. In some embodiments, the CHIF manifest 6014 can also be accessed to search for CHIF content using the various information concerning the CHIF files in the CHIF manifest 6014. For example, if a medical professional wishes to search for all testing results for COVID-19, the manifest is accessed to look up which of the CHIF files in the binder 6012 are associated with COVID-19 test results.

As also illustrated in FIG. 60, new data sets or updated data sets, such as data set 6016, can be encoded into CHIF files by the CHIF encoder 6004 and stored in the binder 6012. For example, data set 6016 is encoded and stored as a second CHIF file 6018 in the binder 6012. When creating the second CHIF file 6018, the CHIF encoder accesses CHIF manifest 6014 in the binder 6012 to update the manifest 6014 with information concerning the second CHIF file 6018. The CHIF manifest 6014 is updated for each subsequently created CHIF file.

Figure 61:
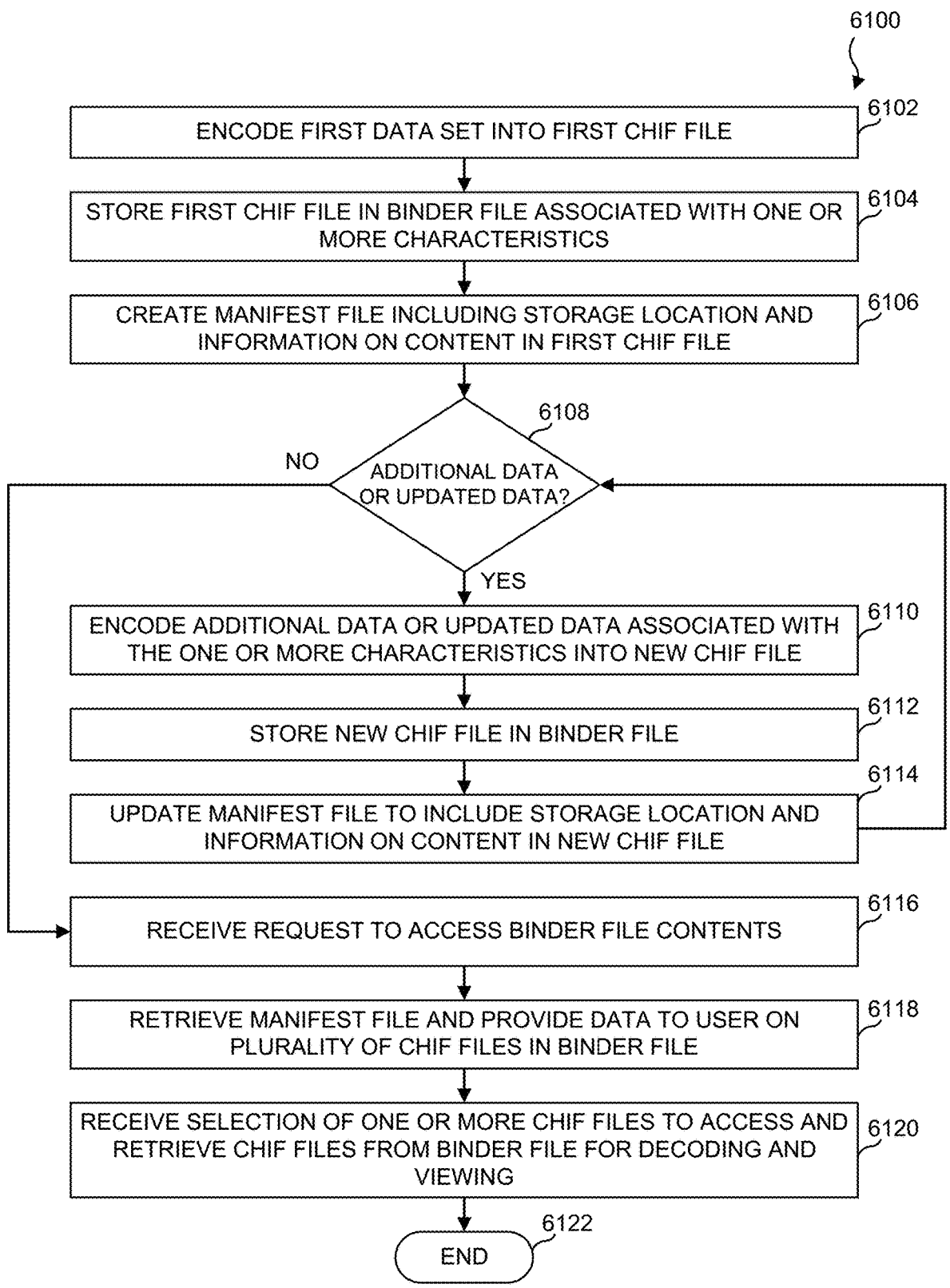
FIG. 61 illustrates an example binder creation process in accordance with various embodiments of the present disclosure.

FIG. 61 illustrates an example binder creation process 6100 in accordance with various embodiments of the present disclosure. The process 6100 can be used with any of the systems and other processes described herein. The process 6100 can be performed and executed by a processor such as the processor 6502 described herein, and/or by a server such as the CHIF server 5202, or a processor of an edge device such as edge device 5408. The process 6100 begins at block 6102. At block 6102, the processor encodes a first data set into a first CHIF file, as described in the various embodiments herein. At block 6104, the processor stores the first CHIF file in a binder associated with one or more characteristics, such as a person, facility, content identifier, or other characteristics. At block 6106, the processor creates a manifest file including the storage location and various information concerning the content of the first CHIF file.

At decision block 6108, the processor determines if additional data or updated data associated with the one or more characteristics is provided to the processor via an encoder. If so, the process moves to block 6110. At block 6110, the processor encodes the additional or updated data associated with the one or more characteristics into a new CHIF file. At block 6112, the processor stores the new CHIF file in the binder. At block 6114, the processor updates the manifest file in the binder to include storage location information of the new CHIF file and various other information concerning the content of the new CHIF file. The process 6100 then moves to back to decision block 6108.

If, at decision block 6108, the processor determines there is no additional or updated data, the process 6100 moves to block 6116. At block 6116, the processor receives a request to access binder file contents. At block 6118, the processor retrieves the manifest file and outputs data retrieved from the manifest file regarding a plurality of CHIF files to a user. At block 6120, the processor receives a selection of one or more CHIF files to access, and retrieves the selected CHIF files from the binder for decoding and viewing. In some embodiments described herein, content from the selected one or more CHIF files can be presented simultaneously to the user. The process 6100 ends at block 6122.

Figure 62:
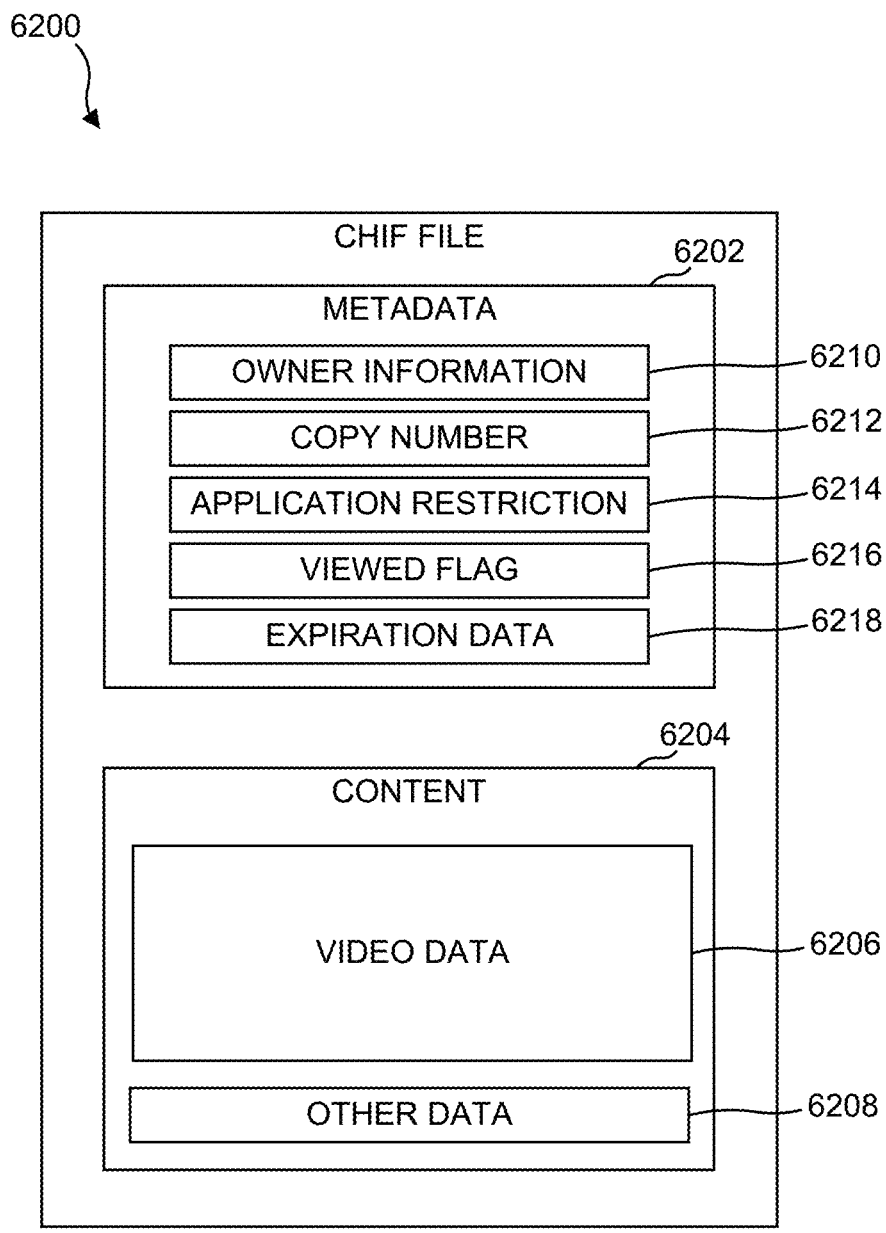
FIG. 62 illustrates an example secured CHIF container in accordance with various embodiments of the present disclosure.

FIG. 62 illustrates an example secured CHIF container 6200 in accordance with various embodiments of the present disclosure. The secured CHIF container 6200 includes various control information in a metadata portion 6202 that enables the control of access to or decoding of the CHIF container 6200. It will be understood that the metadata portion 6202 can also include other information as described in the various embodiments herein, such as CHIF container decoding information. A content portion 6204 of the CHIF container 6200 includes encoded content, the access to which can be controlled, such as text data, image data, audio data, video data, or other data. For example, as illustrated in FIG. 62, the content portion 6204 can include video data 6206, and other data 6208 such as image data like a thumbnail image or art associated with the video data. The video data 6206 can be full movie files, commercials, video snippets such as sneak peaks or trailers, instructional videos, work-in-progress videos that can be disseminated to others in a company to pick up working on the video, or other video content.

Access to the content portion 6204 can be managed using the control information in the metadata portion 6202 to ensure that the content portion 6204, such as the video data 6206, is not viewed or copied without authorization. For example, a movie may be disseminated to reviewers and press ahead of an official release date for the movie. However, if a movie file is simply provided to the reviewers and press, the movie file becomes susceptible to copying and sharing with others the movie studio or other owner of the movie did not intend to view the movie ahead of the official release date. The CHIF container 6200, and otherwise as disclosed herein, can thus be used to secure the movie or other video content so that only authorized users can access the contents.

For example, the metadata portion 6202 can include owner information 6210 that identifies the owner of the content in content portion 6204, such as a movie studio or other owner. In some embodiments, the owner information 6210 can be displayed to users that access the CHIF container 6200, indicating that the content in content portion 6204 is owned or copyrighted by a third party, discouraging any unauthorized dissemination. The metadata portion 6202 can also include a copy number 6212. The copy number 6212 includes, in some embodiments, a number indicating which numbered copy the CHIF container 6200 is of an original CHIF file. For example, a plurality of unique CHIF containers, in an amount that a content owner wishes to provide to others, can be encoded to include the content in content portion 6204, with each created CHIF container including an incremented number as the copy number 6212 in the metadata portion 6202. The copy number 6212 assists in tracking which unique CHIF container is accessed, and such tracking can be utilize a viewed flag 6216. The viewed flag 6216 can be a binary, negative or positive, 0 or 1, flag that indicates whether the CHIF container 6200 has ever been decoded and viewed. In some embodiments, the viewed flag 6216 can include a number of times the CHIF container 6200 has been decoded and viewed.

The metadata portion 6202 can also include application restriction data 6214 that indicates one or more specific applications that are allowed to decode and view the contents of the CHIF container 6200. For example, if a movie studio wishes to disseminate CHIF containers including a movie for advanced viewing, a specific CHIF decoding and viewing application can be provided to the reviewers. The application restriction data 6214 can include an identification of the specific application, and include commands for rejecting any attempted decoding of the CHIF container 6200. In some embodiments, the application restriction data 6214 can also include a list of applications that are not allowed to access the CHIF container 6200.

The CHIF container 6200 can also include expiration data 6218 in the metadata portion 6202. The expiration data 6218 can include various information concerning expiration of the CHIF container 6200, that is, parameters for when decoding of the CHIF container 6200 is no longer allowed. For example, the expiration data 6218 can include a certain date of expiration, a parameter to expire the CHIF container 6200 when the viewed flag 6216 is positive, a parameter to expire the CHIF container 6200 after a certain number of views, a parameter to expire the CHIF file 6200 after an attempt to decode and view the CHIF container 6200 using an application other than the application designated in application restriction data 6214, or other expiration parameters. To further control access to CHIF container 6200, the CHIF container 6200 can be stored on a server that provides access to the CHIF container 6200 via the authorized application designated in application restriction data 6214. For example, a link to the copy of the remotely stored CHIF container 6200 can be provided to a user, which either launches the authorized application or is input into the authorized application such that the authorized application remotely retrieves the CHIF container 6200 for decoding and viewing. In some embodiments, the CHIF container 6200 can be decoded server-side, and the decoded content is downloaded or streamed to the authorized application.

Upon the contents of the CHIF container 6200 being decoded and viewed, the CHIF container can be updated or recreated with the viewed flag 6216 changed to positive, or a number of views updated. If expiration is dependent on viewing the contents of the CHIF container 6200 or a number of views, subsequent attempts to retrieve, decode, or otherwise access the CHIF container 6200 can be denied. In some embodiments, CHIF containers stored on a device such as the CHIF server can be deleted upon expiration. In some embodiments, if an unauthorized decoding attempt of the CHIF container 6200 is detected, the CHIF container 6200 can be remotely expired and even deleted.

Figure 63:
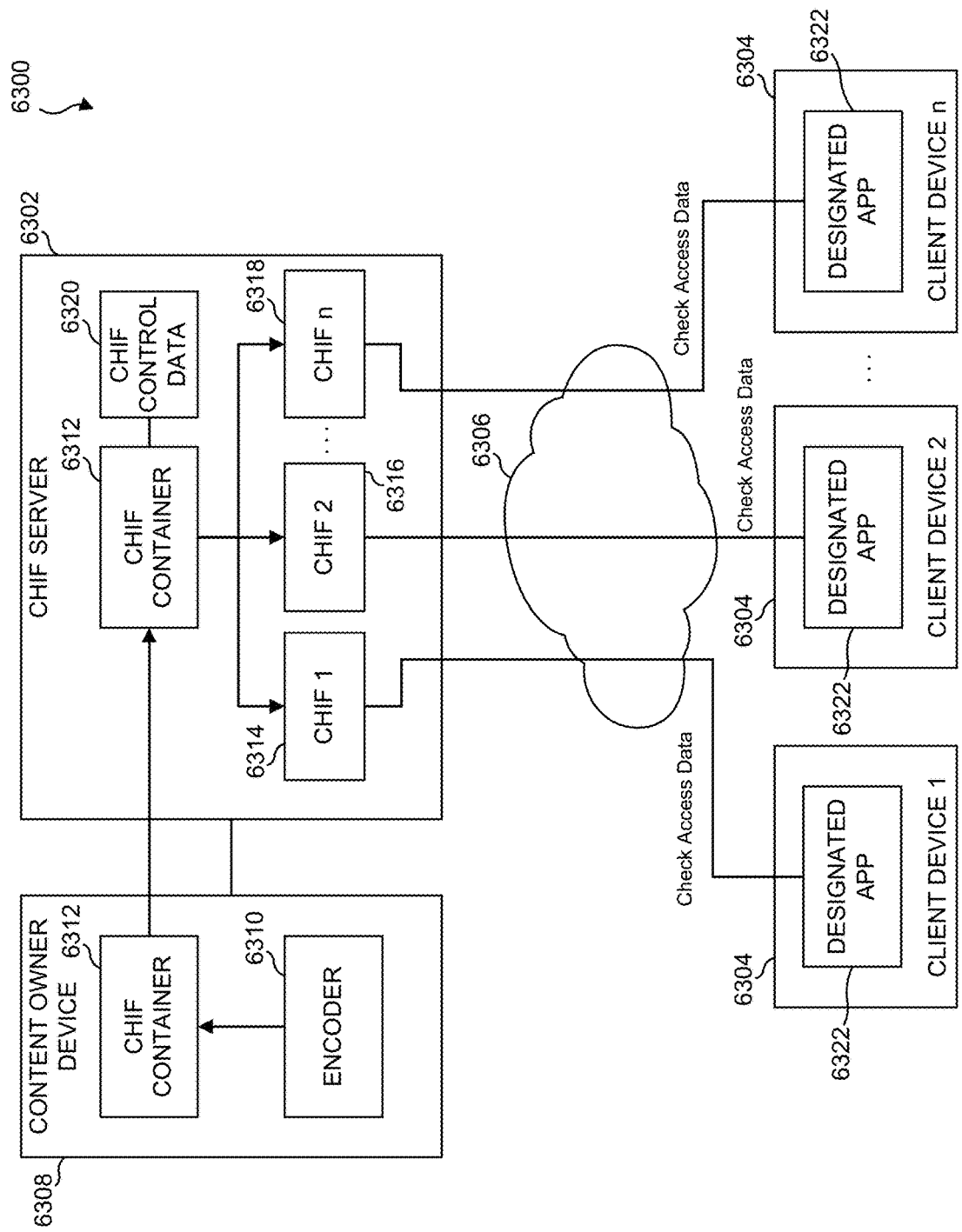
FIG. 63 illustrates an example secured CHIF system in accordance with various embodiments of the present disclosure.

FIG. 63 illustrates an example secured CHIF system 6300 in accordance with various embodiments of the present disclosure. The system includes a CHIF server 6302 that can store CHIF containers for access by a plurality of client devices 6304 over a network 6306. The CHIF server 6302 can be a single server or multiple servers that provide a distributed server network. The system 6300 further includes a content owner device 6308. The content owner device 6308 can be a device used by a content creator that desires to provide content in one or more CHIF files to disseminate the content to certain users, such as the users of the plurality of client devices 6304. For example, the content owner device 6308 can be an electronic device used by a movie studio to encode movie files, trailers, or other video data into CHIF files for dissemination and viewing by others in a secured and restricted manner. As illustrated in FIG. 63, the content owner device 6308 includes an encoder 6310, which is used to create a CHIF container 6312, such as a CHIF container including a movie or video file, along with control data, such as disclosed herein with respect to FIG. 62. After creation of the CHIF container 6312, the content owner device 6308 can provide the CHIF container 6312 to the CHIF server 6302 for storage of the CHIF container 6312 on the CHIF server 6302. In some embodiments, the content owner device 6308 can be the same devices as the CHIF server 6302, or a device in the distributed server network.

In some embodiments, access to the contents of the CHIF container 6312 by the plurality of client devices 6304 can be accomplished by providing access to the CHIF container 6312 to the plurality of client devices 6304, such that the plurality of client devices 6304 each access the same CHIF container, and the CHIF container 6312 can be updated or recreated upon each access to have updated viewing information, expiration information, etc. In some embodiments, a predetermined number of copies of the CHIF container 6312 can be created for access by the plurality of client devices 6304, with each of the plurality of client devices 6304 being provided access to one of the copies. In some embodiments, to reduce usage of storage space on the CHIF server 6302, copies of the CHIF container 6312 can be created on demand, such as in response to an access request from one of the plurality of client devices 6304. For example, as illustrated in FIG. 63, copies of the CHIF container 6312 are created and stored on the CHIF server 6302, including a first copy 6314, a second copy 6316, and an nth copy 6318, access to each of which is requested by one of the plurality of client devices 6304. In some embodiments, the original CHIF container 6312 can have initial or default control information encoded in the metadata, and the copies each have different or updated control information, such as a specific copy number, expiration date, or other control information.

In addition to encoding control information into the metadata of the CHIF container 6312, the CHIF server 6302 can also store CHIF control data 6320 in association with the CHIF container 6312. The CHIF control data 6320 includes various information that can be checked against the control information of CHIF containers, to determine if access should be denied, such as due to expiration of a CHIF container. For example, if a client device of the plurality of client devices 6304 requests access to the first copy 6314, the CHIF server 6302 can read the metadata in the first copy 6314 and compare the metadata to the CHIF control data 6320. For instance, the CHIF control data 6320 can indicate that access to the CHIF container copies should expire upon a single viewing or a certain number of viewings. If the viewed flag or a number of views indicated in the metadata of the first copy 6314 meets this expiration parameter in the CHIF control data 6320, access to the first copy 6314 is denied, and, in some embodiments, the first copy can be deleted so that the CHIF server 6302 no longer has to process any further requests for access to the first copy 6314. The CHIF control data 6320 can also include other data, such as authorized applications, expiration dates, or other control information. In some embodiments, to further control access to the CHIF files on the CHIF server 6302, each of the plurality of client devices 6304 must use a designated application 6322 to view requested CHIF file content. In some embodiments, the designated application 6322 submits the requests to access a CHIF file and remotely checks the access data for the CHIF file to determine if access is allowed. In some embodiments, the designated application 6322 can either download the requested CHIF file, or downloads or streams contents of the requested CHIF file decoded server-side.

Figure 64:
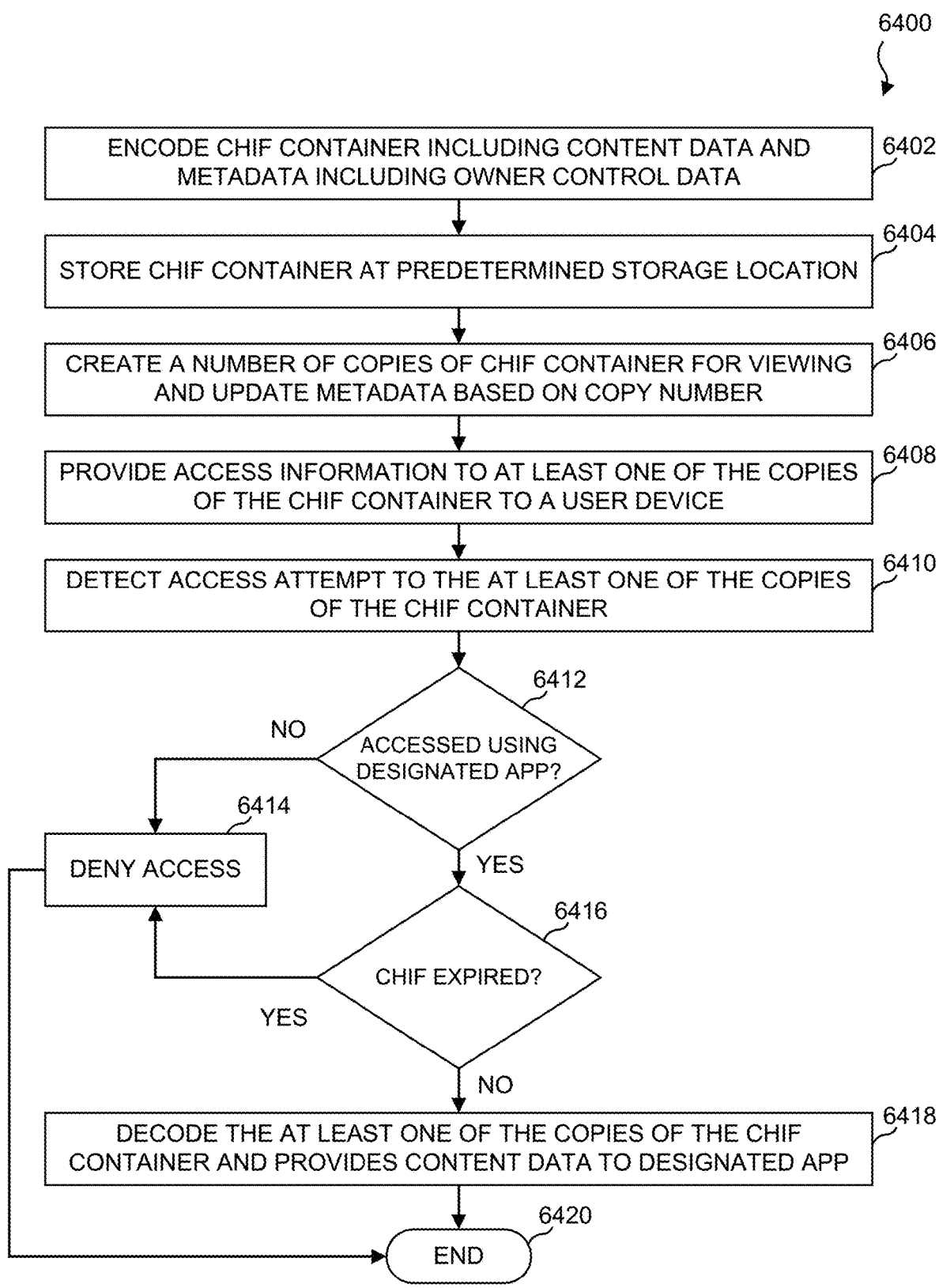
FIG. 64 illustrates an example secured CHIF container process in accordance with various embodiments of the present disclosure.

FIG. 64 illustrates an example secured CHIF container process 6400 in accordance with various embodiments of the present disclosure. The process 6400 can be used with any of the systems and other processes described herein. The process 6400 can be performed and executed by a processor such as the processor 6502 described herein, and/or by a server such as the CHIF server 5202 or 6302, or a processor of an edge device such as edge device 5408. The process 6400 begins at block 6402.

At block 6402, a CHIF container is encoded to include content data such as video data or other data, and metadata including owner control data, such as described with respect to FIGS. 62 and 63. At block 6404, the encoded CHIF container is stored at a predetermined storage location, such as CHIF server 6302 or another storage device. At block 6406, the processor creates a number of copies of the CHIF container for viewing and updates the metadata for each copy based on a copy number and any other information such as custom expiration data. In some embodiments, the encoded CHIF file created and stored at block 6402 and 6404 may not be copied, and access to the encoded CHIF file can be provided to a plurality of users.

At block 6408, the processor provides access information to at least one of the copies of the CHIF container to a user or a user device. In some embodiments, the access information can include a link to the stored copy of the CHIF container, or to the original CHIF container in some embodiments. This link can be used by a user to download a CHIF file, or remotely access a CHIF file, such as via a designated application that at least partly controls access to CHIF files and that can download or stream CHIF file content. At block 6410, the processor detects an attempt to access the at least one of the copies of the CHIF container by another device.

At decision block 6412, the processor determines if the access attempt is from a designated application. In some embodiments, the processor can look up a designated application type from application restriction data in the metadata of the CHIF container, such as described with respect to FIG. 62. In some embodiments, CHIF control data such as CHIF control data 6320 can be consulted to determine the appropriate designated application that is allowed to access the CHIF file and/or view contents of the CHIF file. If, at decision block 6412, the processor determines that the application attempting to access or request the CHIF file contents is not the designated application type, at block 6414, the processor denies access to the CHIF file. The process 6400 then ends at block 6420. If, at decision block 6412, the processor determines the application attempting to access or request the CHIF file is the designated application type, the process 6400 moves to decision block 6416.

At decision block 6416, the processor determines if the CHIF file has expired. For example, the metadata of the CHIF file or the CHIF control data stored on the server can indicate various expiration parameters, such as also described with respect to FIGS. 62 and 63. For example, the expiration parameters can include that the CHIF file expires after a single viewing, and, upon examining a viewed flag of the CHIF file, the processor determines that the CHIF file is expired. The expiration parameters can be based on a number of views, an expiration date, a number of copies, or other parameters. If, at decision block 6416, the processor determines the CHIF file is expired, the process 6400 moves to block 6414 to deny access to the CHIF file. In some embodiments, the CHIF file can also be deleted upon determining the CHIF file is expired. The process 6400 then ends at block 6420. If, at decision block 6416, the processor determines the CHIF file is not expired, the process 6400 moves to block 6418. At block 6418, the processor decodes the at least one of the copies of the CHIF container and presents the content data to the designated application. For example, if the content data includes video data, the video data can be decoded from the CHIF file and downloaded or streamed to a client device running the designated application. The content data can also be presented in the designated application, to restrict the use of the content data to the designated application. In some embodiments, the designated application can only store the content data temporarily and delete the content data as it is presented, either periodically or at the end of presentation of the content data, so that the data cannot be accessed, copied, or otherwise used by the user of the client devices besides viewing the content in the designated application in response to the approvals at decision blocks 6412 and 6414. In some embodiments, viewing of the content at block 6418 can also trigger the processor to update CHIF control or expiration parameters, such as updating a viewed flag or updating a viewed count. The process 6400 then ends at block 6420.

Figure 65:
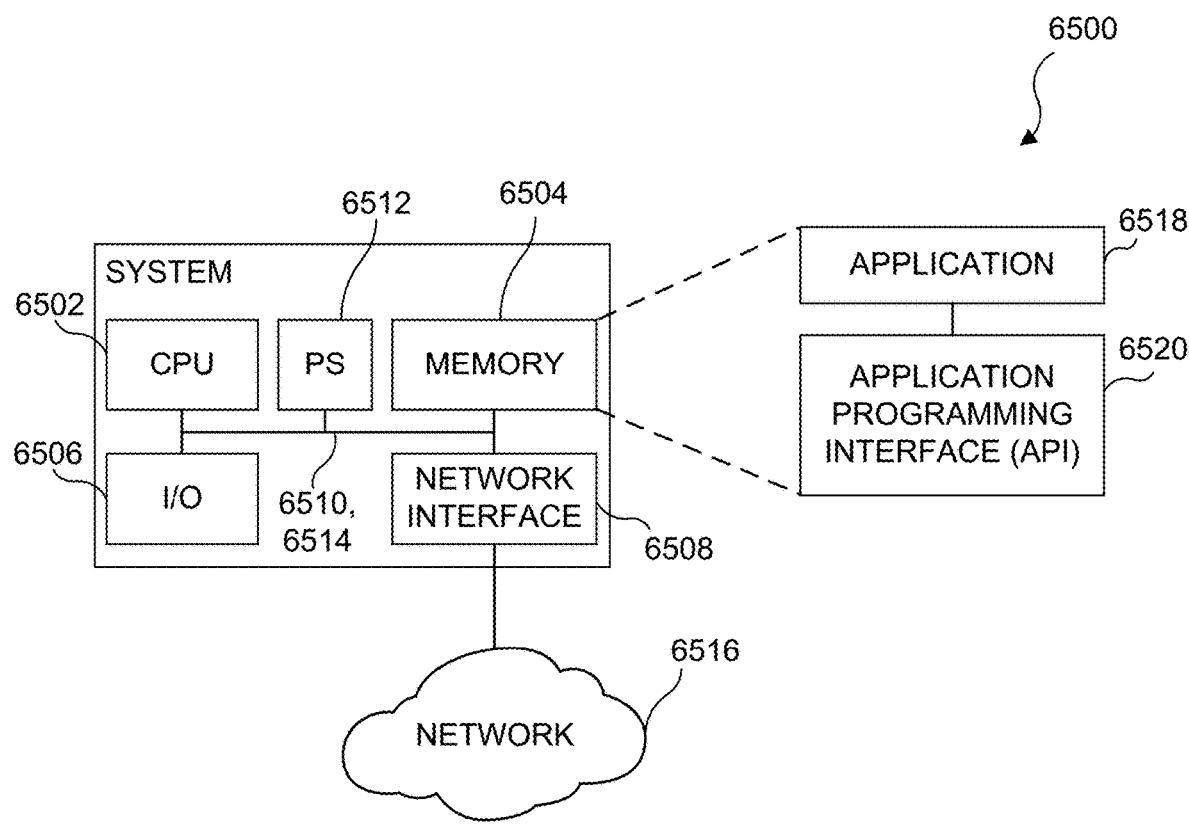
FIG. 65 illustrates a diagrammatic view of one embodiment of a system device that may be used within the environment described herein.

Referring to FIG. 65, one embodiment of an electronic device or a system device 6500 is illustrated. The system device 6500 is one possible example of a device used by an end user, such as a mobile device, a device used in the systems described herein, such as the authentication server 2502, CHIF servers such as servers 4208, 4408, 5002, 5202, etc., or other devices. Embodiments include cellular telephones (including smart phones), personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. It is understood that the device may be implemented in many different ways and by many different types of systems, and may be customized as needed to operate within a particular environment.

The system 6500 may include a processor or controller (e.g., a central processing unit ("CPU")) 6502, a memory unit 6504, an input/output ("I/O") device 6506, and a network interface 6508. The components 6502, 6504, 6506, and 6508 are interconnected by a transport system (e.g., a bus) 6510. A power supply (PS) 6512 may provide power to components of the computer system 6500, such as the CPU 6502 and memory unit 6504, via a power system 6514 (which is illustrated with the transport system 6510 but may be different). It is understood that the system 6500 may be differently configured and that each of the listed components may actually represent several different components. For example, the CPU 6502 may actually represent a multi-processor or a distributed processing system; the memory unit 6504 may include different levels of cache memory, main memory, hard disks, and remote storage locations; the I/O device 6506 may include monitors, keyboards, and the like; and the network interface 6508 may include one or more network cards providing one or more wired and/or wireless connections to a network 6516. Therefore, a wide range of flexibility is anticipated in the configuration of the computer system 6500.

The system 6500 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 6500. The operating system, as well as other instructions, may be stored in the memory unit 6504 and executed by the processor 6502. For example, the memory unit 6504 may include instructions for performing some or all of the methods described herein. These instructions may reside within an application 6518. The application 6518 may also include an application programming interface (API) 6520. The application 6518 may in some embodiments be the CHM code, CHM encoder, CHM decoder, etc. In some embodiments, the API 6520 may be an API for a CHM codec, CHM encoder, CHM decoder, etc., allowing for API calls to be made in order to initiate CHM encoding and decoding operations.

It will be understood that the CHM file, encoding and decoding operations, and other processes described herein may include data compression steps, encryption steps, or other processes to either decrease the file size for transmission of the CHM file or provide additional security. In various embodiments, CHM file and CHIF file can refer to a same file type assembled using the systems and methods disclosed herein.

In an example embodiment, a method of a codec for encoding data streams into a combined file is provided. The method comprises accessing a first file having a first plurality of data bytes, accessing a second file having a second plurality of data bytes, combining the first file and the second file to provide the combined file containing a header and a body, comprising the steps of in a first storing step, storing a block of data bytes of a first byte block size, from the first plurality of data bytes, in the body of the combined file as a first file byte block, wherein a byte block size includes at least one or more bytes of data, in a second storing step, sequentially storing a block of data bytes of a second byte block size, from the second plurality of data bytes, in the body of the combined file as a second file byte block, repeating the first and second storing steps to sequentially store all of the data bytes in the first file and the second file in the combined file, and storing, in the header, information relating to the first byte block size and the second byte block size.

In one or more of the above examples, the first file is of a first file format and the second file is of a second file format.

In one or more of the above examples, the first file is an image file and the second file is a non-image file.

In one or more of the above examples, the bytes are stored in sequential and adjacent storage locations in the combined file.

In one or more of the above examples, the method further comprises transferring the combined file to an application processing block to decode the combined file into the first and second files by the steps of reading the header to determine the byte block size of each of the first and second files, sequentially accessing a number of bytes associated with the byte block size of the first file and a number of bytes associated with the byte block size of the second file, and creating the first and second files with the accessed bytes.

In one or more of the above examples, the byte block size of the first file and the byte block size of the second file are calculated in accordance with a ratio that is a number of bytes of the first file to a number of bytes of the second file.

In one or more of the above examples, the step of calculating the byte block size for each of the first file and the second file includes determining which of the first file and the second file includes a greater number of bytes, dividing the number of bytes of the first file or the second file that includes the greater number of bytes by the other one of the first file or the second file to produce a result, determining if the result includes a remainder and, if so, rounding the result up to an integer that is a next integer up from the result, and setting the byte block size of the first file or the second file that includes the greater number of bytes to be equal to the integer.

In one or more of the above examples, if a total number of data blocks in either of the first and second data files causes, after all previous bytes in the first or second file are written, there to be a number of bytes left in either the first or second file that is, for the first file, less than the first byte block size, or, for the second file, less than the second byte block size, the method further comprises storing a partial byte block in the combined file, wherein the partial byte block is associated with one of the first or second files and wherein the partial byte block includes a number of data bytes less than the byte block size for the first or second file that is associated with the partial byte block.

In one or more of the above examples, the step of calculating the byte block size for each of the first file and the second file further includes setting the byte block size of the second file to one byte and determining if a speed multiplier is to be set and, if so, setting the speed multiplier, wherein the speed multiplier is a value to manipulate by the byte block size of the first file and the byte block size of the second file in order to set the byte block size of the first file to the result of the value multiplied by the byte block size of the first file and to set the byte block size of the second file to the result of the value multiplied by the byte block size of the second file.

In another example embodiment, a method of a codec for decoding a data stream of a combined file into separate data streams is provided. The method comprises analyzing header data included in the combined file, calculating a byte block size for each of a first data stream and a second data stream, wherein a byte block is a number of bytes of data within a file, reading a first file byte block included in the combined file, wherein the first file byte block includes a number of bytes in the combined file corresponding to the byte block size calculated for a first data stream, writing the first file byte block to a first file, reading a second file byte block included in the combined file, wherein the second file byte block includes a number of bytes in the combined file corresponding to the byte block size calculated for a second data stream, and writing the second file byte block to a second file.

In one or more of the above examples, the first file is of a first file type and the second file is of a second file type.

In one or more of the above examples, the first file is an image file and the second file is a non-image file.

In one or more of the above examples, the method further comprises determining if each byte included within the combined file has been read from the combined file and written to one of the first file or the second file and repeating, upon a determination that each of the bytes included within the combined file have not been written to one of the first file or the second file, the reading, writing, and determining steps.

In one or more of the above examples, calculating the byte block size for each of a first data stream and a second data stream includes reading byte block size data in the header data, wherein the byte block size data includes byte block sizes used during creation of the combined file.

In one or more of the above examples, a system for encoding data streams into a combined file and decoding the combined file into separate data streams is provided. The system comprises a network interface coupled to a processor and a memory to the processor, the processor configured to access a first file having a first plurality of data bytes, access a second file having a second plurality of data bytes, combine the first file and the second file to provide the combined file containing a header and a body, wherein, during combining, the processor is further configured to in a first storing step, store a block of data bytes of a first byte block size, from the first plurality of data bytes, in the body of the combined file as a first file byte block, wherein a byte block size includes at least one or more bytes of data, in a second storing step, sequentially store a block of data bytes of a second byte block size, from the second plurality of data bytes, in the body of the combined file as a second file byte block, repeat the first and second storing steps to sequentially store all of the data bytes in the first file and the second file in the combined file, and store, in the header, information relating to the first byte block size and the second byte block size.

In one or more of the above examples, the first file is of a first file format and the second file is of a second file format.

In one or more of the above examples, the first file is an image file and the second file is a non-image file.

In one or more of the above examples, the step of calculating the byte block size for each of the first file and the second file includes determining which of the first file and the second file includes a greater number of bytes, dividing the number of bytes of the first file or the second file that includes the greater number of bytes by the other one of the first file or the second file to produce a result, determining if the result includes a remainder and, if so, rounding the result up to an integer that is a next integer up from the result, and setting the byte block size of the first file or the second file that includes the greater number of bytes to be equal to the integer.

In one or more of the above examples, the processor is further configured to analyze header data included in the combined file, calculate the byte block size for each of the first file and the second file based on byte block size data included in the header data, record a combined file byte block included in the combined file, wherein the combined file byte block includes a number of bytes in the combined file corresponding to the byte block size calculated for the first file, copy the combined file byte block to a third file, record a next combined file byte block included in the combined file, wherein the next combined file byte block includes a number of bytes in the combined file corresponding to the byte block size calculated for the second file, and copy the next combined file byte block to a fourth file.

In one or more of the above examples, the processor is further configured to ascertain whether each byte included within the combined file has been read from the combined file and written to one of the third file or the fourth file, and repeat, upon a determination that each of the bytes included within the combined file have not been written to one of the third file or the fourth file, all of the record, copy, and ascertain steps.

In another example embodiment, a method of blending an image file with a non-image file is provided. The method may begin with accessing both image and non-image data streams or files by the application program which implements the technology set forth by this disclosure. Once accessed, the application may read the data information of both image and non-image streams or files, and based on the chm format, it may create and write the metadata bytes into the beginning header section of a chm format data stream or file. Next, the application may read one chunk of data bytes from each of the image and non-image data streams or files, and write the two chunks of data bytes into the chm format stream or file. And the application may continue and repeat reading one chunk of data bytes from two data streams and writing the two chunks of data bytes into the chm format data stream or file until it reaches the end of the two image and non-image data streams or files. The process of this method is called "chm encoding."

In another example embodiment, a method of separating the chm format data stream or file and returning back the image stream or file and the non-image stream or file is provided. The method may begin with accessing the chm format data stream or file which is generated by the blending method above with the application program. Once accessed, the application may read and retrieve the metadata information from a header section of the stream or file. Next, based on protocol, the application may read two chunks of bytes from the chm format data stream or file, and it may write one chunk of bytes into the image stream or file, and another chunk of bytes into the non-image stream or file. And the application may continue and repeat reading the next two chunks of bytes from the chm format data stream, and writing each chunk of the bytes into their own data streams or files until it reaches the end of the chm format data stream or file, and it returns the image and non-image data streams or files back to their original states. The process of this method is called "chm decoding."

In another example embodiment, a method for encoding and decoding disparate content includes receiving, at a storage location, a combined file created by an encoder, wherein the combined file includes a plurality of data of one or more content types. The method further includes receiving, from a client device, a request for retrieval of the combined file. The method further includes determining a compatibility of the client device to decode and view content of the combined file. The method further includes transmitting, based on the determination, the combined file to a decoder, wherein the decoder separates the combined file into the plurality of data of the one or more content types.

In another example embodiment, an electronic device includes a memory, a network interface, and at least one processor coupled to the memory and the network interface. The at least one processor is configured to receive a combined file created by an encoder, wherein the combined file includes a plurality of data of one or more content types. The at least one processor is further configured to receive, from a client device, a request for retrieval of the combined file. The at least one processor is further configured to determine a compatibility of the client device to decode and view content of the combined file. The at least one processor is further configured to transmit, via the network interface, and based on the determination, the combined file to a decoder, wherein the decoder separates the combined file into the plurality of data of the one or more content types.

In another example embodiment, an electronic device includes a memory, a network interface, and at least one processor coupled to the memory and the network interface. The at least one processor is configured to receive, from a client device, a request for decryption and decoding of a combined file, wherein the combined file includes metadata and plurality of data of one or more content types, wherein the metadata includes a universally unique identifier (UUID), and wherein the combined file is encrypted. The at least one processor is further configured to decrypt the combined file. The at least one processor is further configured to determine, based on the UUID, that decoding of the combined file is allowed. The at least one processor is further configured to decode, based on the determination, the combined file, wherein the decoding separates the combined file into the plurality of data of the one or more content types. The at least one processor is further configured to transmit, via the network interface, the plurality of data of the one or more content types to the client device.

In another example embodiment, an electronic device includes a memory and at least one processor coupled to the memory. The at least one processor is configured to receive a combined file created by an encoder, wherein the combined file includes metadata and an image associated with a plurality of data of one or more content types. The at least one processor is further configured to feed at least one of the plurality of data into at least one artificial intelligence model. The at least one processor is further configured to receive one or more outputs from the at least one artificial intelligence model. The at least one processor is further configured to create an enriched combined file by modifying the metadata of the combined file based on at least a portion of the one or more outputs from the at least one artificial intelligence model, The at least one processor is further configured to perform on the enriched combined file at least one of: analytics, indexing, or object recognition.

In another example embodiment, a method of an electronic device for selective encryption of content to be encoded into a container includes receiving, by a processor of the electronic device, a plurality of content items for encoding into a container, wherein each one of the plurality of content items is associated with a content key value, receiving, by the processor, one or more content selections from among the plurality of content items, retrieving, by the processor, encryption data for use in encrypting the one or more content selections, encrypting, by the processor, at least one content selection of the one or more content selections using an encryption key derived using the encryption data, for the encrypted at least one content selection, associating, by the processor, a corresponding content key value of the encrypted at least one content selection with the encryption data, encoding, by the processor, the associated corresponding content key value of the encrypted at least one content selection and the encryption data into the container, and encoding, by the processor, the encrypted at least one content selection and remaining content items of the plurality of content items into the container.

In one or more of the above examples, the encrypted at least one content selection is encoded into the container as encrypted content and the remaining content items of the plurality of content items are encoded into the container as unencrypted content.

In one or more of the above examples, the method further includes encrypting, by the processor, another content selection of the one or more content selections using another encryption key derived using the encryption data, for the encrypted other content selection, associating, by the processor, another corresponding content key value of the encrypted other content selection with the encryption data, encoding, by the processor, the associated other corresponding content key value of the encrypted at least one content selection, and encoding, by the processor, the encrypted other content selection into the container.

In one or more of the above examples, the method further includes retrieving, by the processor, second encryption data, encrypting, by the processor, another content selection of the one or more content selections using another encryption key derived using the second encryption data, for the encrypted other content selection, associating, by the processor, another corresponding content key value of the encrypted other content selection with the second encryption data, encoding, by the processor, the associated other corresponding content key value of the encrypted at least one content selection and the second encryption data into the container, and encoding, by the processor, the encrypted other content selection into the container.

In one or more of the above examples, the encrypted at least one content selection and the other content selection are encoded into the container as encrypted content and the remaining content items of the plurality of content items are encoded into the container as unencrypted content.

In one or more of the above examples, the processor uses the encryption data to derive the encryption key from a passphrase provided to the processor.

In one or more of the above examples, the method further includes decoding the container into decoded content, receiving a request to access the encrypted at least one content selection, identifying, from the decoded content, the associated corresponding content key value for the at least one content selection, retrieving the encryption data associated with the identified associated corresponding content key value, and decrypting the encrypted at least one content selection.

In one or more of the above examples, decrypting the encrypted at least one content selection includes receiving a passphrase by the processor, deriving a decryption key using the passphrase and the encryption data, and decrypting the encrypted at least one content selection using the derived decryption key.

In one or more of the above examples, the at least one content selection includes text data.

In one or more of the above examples, the associated corresponding content key value of the encrypted at least one content selection and the encryption data are encoded into a key value storage portion of the container separate from a content data portion of the container in which the encrypted at least one content selection is encoded.

In another example embodiment, an electronic device includes a memory, and at least one processor coupled to the memory. The at least one processor is configured to receive a plurality of content items for encoding into a container, wherein each one of the plurality of content items is associated with a content key value, receive one or more content selections from among the plurality of content items, retrieve encryption data for use in encrypting the one or more content selections, encrypt at least one content selection of the one or more content selections using an encryption key derived using the encryption data, for the encrypted at least one content selection, associate a corresponding content key value of the encrypted at least one content selection with the encryption data, encode the associated corresponding content key value of the encrypted at least one content selection and the encryption data into the container, and encode the encrypted at least one content selection and remaining content items of the plurality of content items into the container.

In one or more of the above examples, the encrypted at least one content selection is encoded into the container as encrypted content and the remaining content items of the plurality of content items are encoded into the container as unencrypted content.

In one or more of the above examples, the at least one processor is further configured to encrypt another content selection of the one or more content selections using another encryption key derived using the encryption data, for the encrypted other content selection, associate another corresponding content key value of the encrypted other content selection with the encryption data, encode the associated other corresponding content key value of the encrypted at least one content selection, and encode the encrypted other content selection into the container.

In one or more of the above examples, the at least one processor is further configured to retrieve second encryption data, encrypt another content selection of the one or more content selections using another encryption key derived using the second encryption data, for the encrypted other content selection, associate another corresponding content key value of the encrypted other content selection with the second encryption data, encode the associated other corresponding content key value of the encrypted at least one content selection and the second encryption data into the container, and encode the encrypted other content selection into the container.

In one or more of the above examples, the encrypted at least one content selection and the other content selection are encoded into the container as encrypted content and the remaining content items of the plurality of content items are encoded into the container as unencrypted content.

In one or more of the above examples, the processor uses the encryption data to derive the encryption key from a passphrase provided to the processor.

In one or more of the above examples, the at least one processor is further configured to decode the container into decoded content, receive a request to access the encrypted at least one content selection, identify, from the decoded content, the associated corresponding content key value for the at least one content selection, retrieve the encryption data associated with the identified associated corresponding content key value, and decrypt the encrypted at least one content selection.

In one or more of the above examples, to decrypt the encrypted at least one content selection, the at least one processor is further configured to receive a passphrase, derive a decryption key using the passphrase and the encryption data, and decrypt the encrypted at least one content selection using the derived decryption key.

In one or more of the above examples, the at least one content selection includes text data.

In one or more of the above examples, the associated corresponding content key value of the encrypted at least one content selection and the encryption data are encoded into a key value storage portion of the container separate from a content data portion of the container in which the encrypted at least one content selection is encoded.

In another example embodiment, a method for encoding and decoding disparate content includes receiving, at a storage location, a combined file created by an encoder, wherein the combined file includes a plurality of data of one or more content types, receiving, from a client device, a request for retrieval of the combined file, determining a compatibility of the client device to decode and view content of the combined file, and transmitting, based on the determination, the combined file to a decoder, wherein the decoder separates the combined file into the plurality of data of the one or more content types.

In one or more of the above examples, transmitting, based on the determination, the combined file to the decoder includes identifying that the compatibility of the client device includes that the client device comprises one or more applications for decoding and presenting the plurality of data of the one or more content types simultaneously, and transmitting the combined file to the client device.

In one or more of the above examples, transmitting, based on the determination, the combined file to the decoder includes identifying that the compatibility of the client device includes that the client device does not include one or more applications for decoding and presenting the plurality of data of the one or more content types simultaneously, and transmitting the combined file to the client device, wherein the decoder is associated with the client device and wherein the separated plurality of data of the one or more content types is each stored separately in association with the client device.

In one or more of the above examples, the method further includes receiving from the client device a request to use a viewing portal to view the plurality of data of the one or more content types, decoding, by the decoder, the combined file, wherein the decoder is stored in association with the storage location, providing the plurality of data of the one or more content types to a viewer application, and transmitting, via the viewer application, a simultaneous output of the plurality of data of the one or more content types to the client device.

In one or more of the above examples, the method further includes receiving the combined file in a locked state, wherein the locked state is a state in which the combined file cannot be edited, and wherein the combined file is transitioned into the locked state upon appending an authorized signature to the combined file.

In one or more of the above examples, the method further includes storing, in association with the combined file, an index, wherein the index includes searchable information regarding the combined file, receiving a search request from the client device, wherein the search request include one or more search parameters, retrieving one or more combined files based on the one or more search parameters, and based on one or more indexes associated with the one or more combined files, creating a binder file, wherein the binder file includes information regarding the one or more combined files, and transmitting the binder file to the client device.

In one or more of the above examples, the method further includes determining that a total size of the one or more combined files exceeds a threshold, and creating the binder file such that the binder file includes retrieval links to the one or more combined files.

In one or more of the above examples, the method further includes detecting execution of a decoder script, determining an identity of a user executing the decoder script, and blocking decoding of the combined file based on the determination of the identity of the user executing the decoder script.

In one or more of the above examples, the encoder creates the combined file by accessing a first file including a first plurality of data bytes, accessing a second file including a second plurality of data bytes, and combining the first file and the second file to provide the combined file including only one header and one body. Combining the first file and the second file includes the steps of in a first storing step, sequentially storing a first file byte block of a first byte block size in the body of the combined file, wherein the first file byte block includes one or more bytes of data from the first plurality of data bytes of the first file, in a second storing step, sequentially storing a second file byte block of a second byte block size in the body of the combined file, wherein the second file byte block includes one or more bytes of data from the second plurality of data bytes of the second file, repeating the first and second storing steps to sequentially store the first plurality of data bytes of the first file and the second plurality of data bytes of the second file in the body of the combined file, and storing, in the header of the combined file, a number of bytes of the first file and the second file, the first byte block size, and the second byte block size, wherein the first byte block size and the second byte block size are determined according to a file size relationship between the first file and the second file for use in a decoding process of the combined file.

In one or more of the above examples, the first plurality of data bytes and the second plurality of data bytes are both stored in the one body of the combined file in association with only the one header separate from the body, and wherein no byte block from the first file is stored adjacent another byte block from the first file, and no byte block from the second file is stored adjacent another byte block from the second file.

In one or more of the above examples, the decoder separates the combined file into the plurality of data of the one or more content types by analyzing header data included in a header of the combined file, wherein the combined file includes only one header and includes both data from a first data stream of a first original file and data from a second data stream of a second original file in one body of the combined file in association with only the one header separate from the body, reading from the header data a number of bytes of the first original file and the second original file, and a byte block size for each of a first data stream and a second data stream, wherein a byte block includes one or more bytes of data within a file, and wherein the byte block size for each of the first data stream and the second data stream are determined according to a file size relationship between the first original file and the second original file, reading a first file byte block included in the combined file, wherein the first file byte block includes a number of bytes in the combined file corresponding to the byte block size for the first data stream read from the header of the combined file, writing the first file byte block to a first file, reading a second file byte block included in the combined file, wherein the second file byte block includes a number of bytes in the combined file corresponding to the byte block size for the second data stream read from the header of the combined file, and writing the second file byte block to a second file.

In another example embodiment, an electronic device includes a memory, a network interface, and at least one processor coupled to the memory and the network interface. The at least one processor is configured to receive a combined file created by an encoder, wherein the combined file includes a plurality of data of one or more content types, receive, from a client device, a request for retrieval of the combined file, determine a compatibility of the client device to decode and view content of the combined file, and transmit, via the network interface, and based on the determination, the combined file to a decoder, wherein the decoder separates the combined file into the plurality of data of the one or more content types.

In one or more of the above examples, to transmit, based on the determination, the combined file to the decoder, the at least one processor is further configured to identify that the compatibility of the client device includes that the client device comprises one or more applications for decoding and presenting the plurality of data of the one or more content types simultaneously, and transmit the combined file to the client device.

In one or more of the above examples, the at least one processor is further configured to receive from the client device a request to use a viewing portal to view the plurality of data of the one or more content types, decode, by the decoder, the combined file, wherein the decoder is stored in association with a storage location, provide the plurality of data of the one or more content types to a viewer application, and transmit, via the viewer application, a simultaneous output of the plurality of data of the one or more content types to the client device.

In one or more of the above examples, the at least one processor is further configured to receive the combined file in a locked state, wherein the locked state is a state in which the combined file cannot be edited, and wherein the combined file is transitioned into the locked state upon appending an authorized signature to the combined file.

In one or more of the above examples, the at least one processor is further configured to store, in association with the combined file, an index, wherein the index includes searchable information regarding the combined file, receive a search request from the client device, wherein the search request include one or more search parameters, retrieve one or more combined files based on the one or more search parameters, and based on one or more indexes associated with the one or more combined files, create a binder file, wherein the binder file includes information regarding the one or more combined files, and transmit the binder file to the client device.

In one or more of the above examples, the at least one processor is further configured to determine that a total size of the one or more combined files exceeds a threshold, and create the binder file such that the binder file includes retrieval links to the one or more combined files.

In one or more of the above examples, the at least one processor is further configured to detect execution of a decoder script, determine an identity of a user executing the decoder script, and block decoding of the combined file based on the determination of the identity of the user executing the decoder script.

In one or more of the above examples, to create the combined file, the encoder is configured to access a first file including a first plurality of data bytes, access a second file including a second plurality of data bytes, and combine the first file and the second file to provide the combined file including only one header and one body, wherein, during combining, the encoder is further configured to in a first storing step, sequentially store a first file byte block of a first byte block size in the body of the combined file, wherein the first file byte block includes one or more bytes of data from the first plurality of data bytes of the first file, in a second storing step, sequentially store a second file byte block of a second byte block size in the body of the combined file, wherein the second file byte block includes one or more bytes of data from the second plurality of data bytes of the second file, repeat the first and second storing steps to sequentially store the first plurality of data bytes of the first file and the second plurality of data bytes of the second file in the body of the combined file, and store, in the header of the combined file, a number of bytes of the first file and the second file, the first byte block size, and the second byte block size, wherein the first byte block size and the second byte block size are determined according to a file size relationship between the first file and the second file for use in a decoding process of the combined file.

In one or more of the above examples, the decoder is configured to, to separate the combined file into the plurality of data of the one or more content types analyze header data included in a header of the combined file, wherein the combined file includes only one header and includes both data from a first data stream of a first original file and data from a second data stream of a second original file in one body of the combined file in association with only the one header separate from the body, read from the header data a number of bytes of the first original file and the second original file, and a byte block size for each of a first data stream and a second data stream, wherein a byte block includes one or more bytes of data within a file, and wherein the byte block size for each of the first data stream and the second data stream are determined according to a file size relationship between the first original file and the second original file, read a first file byte block included in the combined file, wherein the first file byte block includes a number of bytes in the combined file corresponding to the byte block size for the first data stream read from the header of the combined file, write the first file byte block to a first file, read a second file byte block included in the combined file, wherein the second file byte block includes a number of bytes in the combined file corresponding to the byte block size for the second data stream read from the header of the combined file, and write the second file byte block to a second file.

In another example embodiment, an electronic device includes a memory, a network interface, and at least one processor coupled to the memory and the network interface. The at least one processor is configured to receive, from a client device, a request for decryption and decoding of a combined file, wherein the combined file includes metadata and plurality of data of one or more content types, wherein the metadata includes a universally unique identifier (UUID), and wherein the combined file is encrypted, decrypt the combined file, determine, based on the UUID, that decoding of the combined file is allowed, decode, based on the determination, the combined file, wherein the decoding separates the combined file into the plurality of data of the one or more content types, and transmit, via the network interface, the plurality of data of the one or more content types to the client device.

In another example embodiment, an electronic device includes a memory, and at least one processor coupled to the memory. The at least one processor is configured to receive a combined file created by an encoder, wherein the combined file includes metadata and an image associated with a plurality of data of one or more content types, feed at least one of the plurality of data into at least one artificial intelligence model, receive one or more outputs from the at least one artificial intelligence model, create an enriched combined file by modifying the metadata of the combined file based on at least a portion of the one or more outputs from the at least one artificial intelligence model, and perform on the enriched combined file at least one of: analytics, indexing, or object recognition.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of an electronic device for selective encryption of content to be encoded into a container, the method comprising:
   receiving, by a processor of the electronic device, a plurality of content items for encoding into a container, wherein each one of the plurality of content items is associated with a corresponding content key value related to a particular content type and an encryption status of the associated one of the plurality of content items;
   receiving, by the processor, one or more content selections from among the plurality of content items;
   retrieving, by the processor, encryption data for use in encrypting the one or more content selections;
   encrypting, by the processor, at least one content selection of the one or more content selections using an encryption key derived using the encryption data;
   for the encrypted at least one content selection, associating, by the processor, the encryption data with the corresponding content key value associated with the content item of the encrypted at least one content selection;
   encoding, by the processor, the associated corresponding content key value of the encrypted at least one content selection and the encryption data into the container;
   encoding, by the processor, the encrypted at least one content selection and remaining content items of the plurality of content items into the container;
   selecting, by the processor, one of the remaining content items for presenting as a preview of the container; and
   identifying, by the processor in response to a decoding request, whether decoding of the container is allowed or is blocked based on a UUID of the container and an access parameter stored in a container registry, wherein the access parameter includes at least one of an inappropriate content flag, a license status, or a current number of decoding requests associated with the container.

2. The method of claim 1, wherein the encrypted at least one content selection is encoded into the container as encrypted content and the remaining content items of the plurality of content items are encoded into the container as unencrypted content.

3. The method of claim 1, further comprising:
   encrypting, by the processor, another content selection of the one or more content selections using another encryption key derived using the encryption data;
   for the encrypted other content selection, associating, by the processor, another corresponding content key value of the encrypted other content selection with the encryption data;
   encoding, by the processor, the associated other corresponding content key value of the encrypted at least one content selection; and
   encoding, by the processor, the encrypted other content selection into the container.

4. The method of claim 1, further comprising:
   retrieving, by the processor, second encryption data;
   encrypting, by the processor, another content selection of the one or more content selections using another encryption key derived using the second encryption data;
   for the encrypted other content selection, associating, by the processor, another corresponding content key value of the encrypted other content selection with the second encryption data;
   encoding, by the processor, the associated other corresponding content key value of the encrypted at least one content selection and the second encryption data into the container; and
   encoding, by the processor, the encrypted other content selection into the container.

5. The method of claim 4, wherein the encrypted at least one content selection and the other content selection are encoded into the container as encrypted content and the remaining content items of the plurality of content items are encoded into the container as unencrypted content.

6. The method of claim 1, wherein the processor uses the encryption data to derive the encryption key from a passphrase provided to the processor.

7. The method of claim 1, further comprising:
   decoding the container into decoded content;
   receiving a request to access the encrypted at least one content selection;
   identifying, from the decoded content, the associated corresponding content key value for the at least one content selection;
   retrieving the encryption data associated with the identified associated corresponding content key value; and
   decrypting the encrypted at least one content selection.

8. The method of claim 7, wherein decrypting the encrypted at least one content selection includes:
   receiving a passphrase by the processor;
   deriving a decryption key using the passphrase and the encryption data; and
   decrypting the encrypted at least one content selection using the derived decryption key.

9. The method of claim 1, wherein the at least one content selection includes text data.

10. The method of claim 1, wherein the associated corresponding content key value of the encrypted at least one content selection and the encryption data are encoded into a key value storage portion of the container separate from a content data portion of the container in which the encrypted at least one content selection is encoded.

11. An electronic device, comprising:
    a memory; and
    at least one processor coupled to the memory, wherein the at least one processor is configured to:
      receive a plurality of content items for encoding into a container, wherein each one of the plurality of content items is associated with a corresponding content key value related to a particular content type and an encryption status of the associated one of the plurality of content items;
      receive one or more content selections from among the plurality of content items;
      retrieve encryption data for use in encrypting the one or more content selections;
      encrypt at least one content selection of the one or more content selections using an encryption key derived using the encryption data;
      for the encrypted at least one content selection, associate the encryption data with the corresponding content key value associated with the content item of the encrypted at least one content selection;

encode the associated corresponding content key value of the encrypted at least one content selection and the encryption data into the container;

encode the encrypted at least one content selection and remaining content items of the plurality of content items into the container;

select, by the processor, one of the remaining content items for presenting as a preview of the container; and identify, by the processor in response to a decoding request, whether decoding of the container is allowed or is blocked based on a UUID of the container and an access parameter stored in a container registry, wherein the access parameter includes at least one of an inappropriate content flag, a license status, or a current number of decoding requests associated with the container.

12. The electronic device of claim 11, wherein the encrypted at least one content selection is encoded into the container as encrypted content and the remaining content items of the plurality of content items are encoded into the container as unencrypted content.

13. The electronic device of claim 11, wherein the at least one processor is further configured to:

encrypt another content selection of the one or more content selections using another encryption key derived using the encryption data;

for the encrypted other content selection, associate another corresponding content key value of the encrypted other content selection with the encryption data;

encode the associated other corresponding content key value of the encrypted at least one content selection; and encode the encrypted other content selection into the container.

14. The electronic device of claim 11, wherein the at least one processor is further configured to:

retrieve second encryption data;

encrypt another content selection of the one or more content selections using another encryption key derived using the second encryption data;

for the encrypted other content selection, associate another corresponding content key value of the encrypted other content selection with the second encryption data;

encode the associated other corresponding content key value of the encrypted at least one content selection and the second encryption data into the container; and encode the encrypted other content selection into the container.

15. The electronic device of claim 14, wherein the encrypted at least one content selection and the other content selection are encoded into the container as encrypted content and the remaining content items of the plurality of content items are encoded into the container as unencrypted content.

16. The electronic device of claim 11, wherein the processor uses the encryption data to derive the encryption key from a passphrase provided to the processor.

17. The electronic device of claim 11, wherein the at least one processor is further configured to:

decode the container into decoded content;

receive a request to access the encrypted at least one content selection;

identify, from the decoded content, the associated corresponding content key value for the at least one content selection;

retrieve the encryption data associated with the identified associated corresponding content key value; and decrypt the encrypted at least one content selection.

18. The electronic device of claim 17, wherein to decrypt the encrypted at least one content selection, the at least one processor is further configured to:

receive a passphrase;

derive a decryption key using the passphrase and the encryption data; and decrypt the encrypted at least one content selection using the derived decryption key.

19. The electronic device of claim 11, wherein the at least one content selection includes text data.

20. The electronic device of claim 11, wherein the associated corresponding content key value of the encrypted at least one content selection and the encryption data are encoded into a key value storage portion of the container separate from a content data portion of the container in which the encrypted at least one content selection is encoded.

* * * * *